(12) United States Patent
Chen et al.

(10) Patent No.: US 11,340,757 B2
(45) Date of Patent: *May 24, 2022

(54) CLOCK FACES FOR AN ELECTRONIC DEVICE

(71) Applicant: Apple Inc., Cupertino, CA (US)

(72) Inventors: Kevin Will Chen, Sunnyvale, CA (US); Alan C. Dye, San Francisco, CA (US); Lauren Kim Trottier, San Jose, CA (US); Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,588

(22) Filed: Aug. 19, 2020

(65) Prior Publication Data
US 2020/0379413 A1 Dec. 3, 2020

Related U.S. Application Data

(63) Continuation of application No. 16/585,399, filed on Sep. 27, 2019.
(Continued)

(51) Int. Cl.
*G06F 3/0481* (2013.01)
*G06F 3/0483* (2013.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC ...... G06F 1/163; G06F 3/0482; G06F 3/0483; G06F 3/04817; G06F 3/0481; G06F 3/0488
See application file for complete search history.

(56) References Cited

U.S. PATENT DOCUMENTS 3,148,500 A 9/1964 Thomas
4,205,628 A 6/1980 Null
(Continued)

FOREIGN PATENT DOCUMENTS

AU 2010249319 A1 6/2012
AU 2015101019 A4 9/2015
(Continued)

OTHER PUBLICATIONS

Non-Final Office Action received for U.S. Appl. No. 15/405,122, dated Sep. 24, 2020, 30 pages.
(Continued)

*Primary Examiner* — Ting Z Lee
(74) *Attorney, Agent, or Firm* — Dentons US LLP

(57) ABSTRACT

A device displays a clock face in response to receiving a request to display a clock face. In accordance with a determination that a respective graphical element is to be displayed at a respective location on the clock face, the clock face includes a plurality of analog-dial graphical elements corresponding to respective units of time, where the plurality of analog-dial graphical elements includes a first analog-dial graphical element that occupies a first position and has a first size. In accordance with a determination that the respective graphical element is not to be displayed at a respective location on the clock face, the clock face includes the plurality of analog-dial graphical elements corresponding to the respective units of time, and the first analog-dial graphical element of the plurality of analog-dial graphical elements occupies a second position and/or has a second size. In some embodiments, clock faces are reordered.

27 Claims, 60 Drawing Sheets

Related U.S. Application Data

(60) Provisional application No. 62/856,038, filed on Jun. 1, 2019, provisional application No. 62/844,108, filed on May 6, 2019.

(51) Int. Cl.

| | | |
|---|---|---|
| *G06F 3/0482* | (2013.01) | |
| *G06F 3/0488* | (2013.01) | |
| *G06F 3/04817* | (2022.01) | |
| G04G 9/00 | (2006.01) | |
| G04G 9/02 | (2006.01) | |
| G06F 1/16 | (2006.01) | |
| G04G 9/04 | (2006.01) | |
| G04G 21/08 | (2010.01) | |
| G06F 3/01 | (2006.01) | |
| G06F 3/0362 | (2013.01) | |
| G06F 3/04847 | (2022.01) | |
| G06F 3/041 | (2006.01) | |

(52) U.S. Cl.
CPC .......... *G06F 3/0483* (2013.01); *G06F 3/0488* (2013.01); *G04G 9/007* (2013.01); *G04G 9/027* (2013.01); *G04G 9/04* (2013.01); *G04G 21/08* (2013.01); *G06F 1/163* (2013.01); *G06F 3/016* (2013.01); *G06F 3/0362* (2013.01); *G06F 3/041* (2013.01); *G06F 3/04847* (2013.01)

(56) References Cited

U.S. PATENT DOCUMENTS

| | | |
|---|---|---|
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,760,773 A | 6/1998 | Berman et al. |
| 5,809,267 A | 9/1998 | Moran et al. |
| 5,825,353 A | 10/1998 | Will |
| 5,845,257 A | 12/1998 | Fu et al. |
| 5,892,519 A | 4/1999 | Hirai et al. |
| 5,914,718 A | 6/1999 | Chiu et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,749 B1 | 2/2003 | Moran et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,590,568 B1 | 7/2003 | Astala et al. |
| 6,690,623 B1 | 2/2004 | Maano |
| 6,728,533 B2 | 4/2004 | Ishii et al. |
| 6,809,724 B1 | 10/2004 | Shiraishi et al. |
| 6,871,076 B2 | 3/2005 | Samn et al. |
| 6,883,145 B2 | 4/2005 | Jaeger |
| 6,959,425 B1 | 10/2005 | Krauklis |
| 7,089,292 B1 | 8/2006 | Roderick et al. |
| 7,117,451 B2 | 10/2006 | Sielken |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,680,814 B2 | 3/2010 | Mercer et al. |
| 7,693,724 B2 | 4/2010 | Bryant |
| 7,707,231 B2 | 4/2010 | Lachapelle et al. |
| 7,716,579 B2 | 5/2010 | Gunn et al. |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,122,354 B1 | 2/2012 | Torgerson |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,725,842 B1 | 5/2014 | Al-nasser |
| 8,847,903 B2 | 9/2014 | Stokes et al. |
| 8,854,925 B1 | 10/2014 | Lee et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,020,538 B1 | 4/2015 | White et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilia et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,369,537 B1 | 6/2016 | Mathew et al. |
| 9,411,422 B1 | 8/2016 | Mcclendon et al. |
| 9,459,781 B2 | 10/2016 | Kocienda et al. |
| 9,547,425 B2 | 1/2017 | Kocienda et al. |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,696,809 B2 | 7/2017 | Temple |
| 9,753,436 B2 | 9/2017 | Ely et al. |
| 9,794,397 B2 | 10/2017 | Min et al. |
| 9,798,388 B1 | 10/2017 | Murali |
| 9,870,114 B1 | 1/2018 | Jones et al. |
| 10,019,599 B1 | 7/2018 | Moran et al. |
| 10,062,133 B1 | 8/2018 | Mishra et al. |
| 10,304,347 B2 | 5/2019 | Wilson et al. |
| 10,356,070 B2 | 7/2019 | Cha et al. |
| 10,489,508 B2 | 11/2019 | Zhai et al. |
| 10,620,590 B1 | 4/2020 | Guzman et al. |
| 10,643,246 B1 | 5/2020 | Suprasadachandran Pillai |
| 10,684,592 B2 | 6/2020 | Chang et al. |
| 10,721,711 B2 | 7/2020 | Kirov et al. |
| 10,739,971 B2 | 8/2020 | Wilson et al. |
| 10,788,797 B1 | 9/2020 | Guzman et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,915,225 B2 | 2/2021 | Jeon |
| 10,936,345 B1 | 3/2021 | Guzman et al. |
| 11,050,873 B2 | 6/2021 | Kim et al. |
| 11,061,372 B1 | 7/2021 | Chen et al. |
| 2001/0043514 A1 | 11/2001 | Kita et al. |

(56) References Cited

U.S. PATENT DOCUMENTS

| | | |
|---|---|---|
| 2002/0054066 A1 | 5/2002 | Kikinis et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0131331 A1 | 9/2002 | Molander et al. |
| 2002/0178191 A1 | 11/2002 | Sielken |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0081507 A1 | 5/2003 | Kitazawa et al. |
| 2003/0164847 A1 | 9/2003 | Zaima et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075700 A1 | 4/2004 | Liu et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0115816 A1 | 6/2005 | Gelfond et al. |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0035628 A1 | 2/2006 | Miller et al. |
| 2006/0071947 A1 | 4/2006 | Ubillos et al. |
| 2006/0085765 A1 | 4/2006 | Peterson et al. |
| 2006/0092770 A1 | 5/2006 | Demas |
| 2006/0166708 A1 | 7/2006 | Kim et al. |
| 2006/0214935 A1 | 9/2006 | Boyd et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0094330 A1 | 4/2007 | Russell et al. |
| 2007/0101279 A1 | 5/2007 | Chaudhri et al. |
| 2007/0101292 A1 | 5/2007 | Kupka |
| 2007/0113181 A1 | 5/2007 | Blattner et al. |
| 2007/0146344 A1 | 6/2007 | Martin et al. |
| 2007/0160345 A1 | 7/2007 | Sakai et al. |
| 2007/0211042 A1 | 9/2007 | Kim et al. |
| 2007/0213955 A1 | 9/2007 | Ishida et al. |
| 2007/0236475 A1 | 10/2007 | Wherry |
| 2007/0239754 A1 | 10/2007 | Schnitman et al. |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0127268 A1 | 5/2008 | Bergeron et al. |
| 2008/0127999 A1 | 6/2008 | Joerger et al. |
| 2008/0130421 A1 | 6/2008 | Akaiwa et al. |
| 2008/0150959 A1 | 6/2008 | Marui et al. |
| 2008/0151700 A1 | 6/2008 | Inoue et al. |
| 2008/0165136 A1 | 7/2008 | Christie et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0012988 A1 | 1/2009 | Brown |
| 2009/0024233 A1 | 1/2009 | Shirai et al. |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0106687 A1 | 4/2009 | De et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0013613 A1 | 1/2010 | Weston |
| 2010/0026640 A1 | 2/2010 | Kim et al. |
| 2010/0060586 A1 | 3/2010 | Pisula et al. |
| 2010/0064255 A1 | 3/2010 | Rottier et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0188327 A1 | 7/2010 | Frid et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0229130 A1 | 9/2010 | Edge et al. |
| 2010/0235726 A1 | 9/2010 | Ording et al. |
| 2010/0243516 A1 | 9/2010 | Martin et al. |
| 2010/0257469 A1 | 10/2010 | Kim et al. |
| 2010/0281374 A1 | 11/2010 | Schulz et al. |
| 2010/0281399 A1 | 11/2010 | Banker |
| 2010/0289723 A1 | 11/2010 | London |
| 2010/0295789 A1 | 11/2010 | Shin et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0010667 A1 | 1/2011 | Sakai et al. |
| 2011/0022294 A1 | 1/2011 | Apley |
| 2011/0025719 A1 | 2/2011 | Yanase et al. |
| 2011/0029870 A1 | 2/2011 | May et al. |
| 2011/0029891 A1 | 2/2011 | Kim et al. |
| 2011/0047014 A1 | 2/2011 | De Angelo |
| 2011/0061010 A1 | 3/2011 | Wasko et al. |
| 2011/0070924 A1 | 3/2011 | Kim et al. |

(56) References Cited

U.S. PATENT DOCUMENTS

| | | |
|---|---|---|
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0138295 A1 | 6/2011 | Momchilov et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0191675 A1 | 8/2011 | Kauranen |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0224523 A1 | 9/2011 | Budiman |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0252376 A1 | 10/2011 | Chaudhri et al. |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0028707 A1 | 2/2012 | Raitt et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0105225 A1 | 5/2012 | Valtonen |
| 2012/0110438 A1 | 5/2012 | Peraza et al. |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0154156 A1 | 6/2012 | Kuntzel |
| 2012/0169776 A1 | 7/2012 | Rissa et al. |
| 2012/0182226 A1 | 7/2012 | Tuli |
| 2012/0185467 A1 | 7/2012 | Prager et al. |
| 2012/0197523 A1 | 8/2012 | Kirsch |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0044072 A1 | 2/2013 | Kobayashi et al. |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111342 A1 | 5/2013 | Alameh et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0151959 A1 | 6/2013 | Flynn et al. |
| 2013/0162667 A1 | 6/2013 | Eskolin et al. |
| 2013/0185642 A1 | 7/2013 | Gammons |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326401 A1 | 12/2013 | Van et al. |
| 2013/0326418 A1 | 12/2013 | Utsuki et al. |
| 2013/0332856 A1 | 12/2013 | Sanders et al. |
| 2013/0345980 A1 | 12/2013 | Van Os et al. |
| 2014/0013271 A1 | 1/2014 | Moore et al. |
| 2014/0013414 A1 | 1/2014 | Bruck et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047525 A1 | 2/2014 | Bonhoff |
| 2014/0055495 A1 | 2/2014 | Kim et al. |
| 2014/0059493 A1 | 2/2014 | Kim |
| 2014/0068477 A1 | 3/2014 | Roh |
| 2014/0068755 A1 | 3/2014 | King et al. |
| 2014/0074570 A1 | 3/2014 | Hope et al. |
| 2014/0082533 A1 | 3/2014 | Kelley et al. |
| 2014/0092035 A1 | 4/2014 | Su |
| 2014/0094224 A1 | 4/2014 | Lozovoy et al. |
| 2014/0101169 A1 | 4/2014 | Kurata et al. |
| 2014/0101597 A1 | 4/2014 | Bamford et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0173439 A1 | 6/2014 | Gutierrez et al. |
| 2014/0189578 A1 | 7/2014 | Shuttleworth et al. |
| 2014/0189584 A1 | 7/2014 | Weng et al. |
| 2014/0200691 A1 | 7/2014 | Lee et al. |
| 2014/0201655 A1 | 7/2014 | Mahaffey et al. |
| 2014/0229752 A1 | 8/2014 | Lee et al. |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Jerry |
| 2014/0282132 A1 | 9/2014 | Daly et al. |
| 2014/0282153 A1 | 9/2014 | Christiansen et al. |
| 2014/0282208 A1 | 9/2014 | Chaudhri |
| 2014/0282254 A1 | 9/2014 | Feiereisen et al. |

(56) References Cited

U.S. PATENT DOCUMENTS

| | | |
|---|---|---|
| 2014/0289660 A1 | 9/2014 | Min |
| 2014/0293755 A1 | 10/2014 | Geiser et al. |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0347275 A1 | 11/2014 | Jung et al. |
| 2014/0347289 A1 | 11/2014 | Lee et al. |
| 2014/0351722 A1 | 11/2014 | Frederickson et al. |
| 2014/0359477 A1 | 12/2014 | Chen |
| 2014/0362105 A1 | 12/2014 | Kocienda et al. |
| 2014/0365929 A1 | 12/2014 | Ding |
| 2014/0371887 A1 | 12/2014 | Hoffman et al. |
| 2014/0380229 A1 | 12/2014 | Volodin et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0049033 A1 | 2/2015 | Kim et al. |
| 2015/0049591 A1 | 2/2015 | Adams et al. |
| 2015/0052461 A1 | 2/2015 | Sullivan et al. |
| 2015/0055197 A1 | 2/2015 | Romanoff et al. |
| 2015/0056974 A1 | 2/2015 | Kim et al. |
| 2015/0058651 A1 | 2/2015 | Choi et al. |
| 2015/0062130 A1 | 3/2015 | Ho |
| 2015/0067596 A1 | 3/2015 | Brown et al. |
| 2015/0071043 A1 | 3/2015 | Kubota |
| 2015/0082193 A1 | 3/2015 | Wallace et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0169146 A1 | 6/2015 | Lalwani |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0248235 A1 | 9/2015 | Offenberg et al. |
| 2015/0253740 A1 | 9/2015 | Nishijima et al. |
| 2015/0254875 A1 | 9/2015 | Zhang |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0293592 A1 | 10/2015 | Cheong et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0324067 A1 | 11/2015 | Cabral |
| 2015/0324751 A1 | 11/2015 | Orenstein et al. |
| 2015/0332031 A1 | 11/2015 | Mistry et al. |
| 2015/0339007 A1 | 11/2015 | Yoshizawa et al. |
| 2015/0339261 A1 | 11/2015 | Jha et al. |
| 2015/0346694 A1 | 12/2015 | Hoobler et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0370529 A1 | 12/2015 | Zambetti et al. |
| 2015/0371195 A1 | 12/2015 | Boss et al. |
| 2015/0379476 A1 | 12/2015 | Chaudhri et al. |
| 2016/0004393 A1 | 1/2016 | Faaborg et al. |
| 2016/0018891 A1 | 1/2016 | Levesque et al. |
| 2016/0022202 A1 | 1/2016 | Peterson et al. |
| 2016/0027420 A1 | 1/2016 | Eronen |
| 2016/0034133 A1* | 2/2016 | Wilson .................... G06F 1/163 715/772 |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0048283 A1 | 2/2016 | Yang et al. |
| 2016/0048296 A1 | 2/2016 | Gan et al. |
| 2016/0054710 A1 | 2/2016 | Jo et al. |
| 2016/0054892 A1 | 2/2016 | Kim et al. |
| 2016/0058337 A1 | 3/2016 | Blahnik et al. |
| 2016/0059864 A1 | 3/2016 | Feit et al. |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0077790 A1 | 3/2016 | Kim et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0109861 A1 | 4/2016 | Kim et al. |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0170731 A1 | 6/2016 | Maddern et al. |
| 2016/0180568 A1 | 6/2016 | Bullivant et al. |
| 2016/0188179 A1 | 6/2016 | Roh |
| 2016/0188181 A1 | 6/2016 | Smith |
| 2016/0191511 A1 | 6/2016 | Tijerina et al. |
| 2016/0217601 A1 | 7/2016 | Tsuda et al. |
| 2016/0259416 A1 | 9/2016 | Birnbaum |
| 2016/0259488 A1 | 9/2016 | Chan et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0306328 A1 | 10/2016 | Ko et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357354 A1 | 12/2016 | Chen et al. |
| 2016/0357386 A1* | 12/2016 | Choi .................... G06F 3/0421 |
| 2016/0357420 A1 | 12/2016 | Chen et al. |
| 2016/0358311 A1* | 12/2016 | Chen .................... G06F 40/109 |
| 2016/0370181 A1 | 12/2016 | Yong et al. |
| 2017/0011210 A1 | 1/2017 | Cheong et al. |
| 2017/0024226 A1 | 1/2017 | Yan |
| 2017/0039535 A1 | 2/2017 | Park et al. |
| 2017/0045958 A1 | 2/2017 | Battlogg |
| 2017/0046024 A1 | 2/2017 | Dascola et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0134321 A1 | 5/2017 | Ushio et al. |
| 2017/0149795 A1 | 5/2017 | Day |
| 2017/0160898 A1 | 6/2017 | Lee et al. |
| 2017/0176950 A1 | 6/2017 | Jung et al. |
| 2017/0209766 A1 | 7/2017 | Riley et al. |

(56) References Cited

U.S. PATENT DOCUMENTS

| | | |
|---|---|---|
| 2017/0220005 A1 | 8/2017 | Han et al. |
| 2017/0230236 A1 | 8/2017 | Kim et al. |
| 2017/0249020 A1 | 8/2017 | Wild et al. |
| 2017/0255169 A1 | 9/2017 | Lee et al. |
| 2017/0257426 A1 | 9/2017 | Wilbur et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357426 A1 | 12/2017 | Wilson et al. |
| 2017/0357427 A1 | 12/2017 | Wilson et al. |
| 2017/0359461 A1 | 12/2017 | De Vries et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1 | 3/2018 | Murai |
| 2018/0088797 A1 | 3/2018 | Mcatee et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0181381 A1 | 6/2018 | Michaely et al. |
| 2018/0188925 A1 | 7/2018 | Na et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0317287 A1 | 11/2018 | Kling et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0343023 A1 | 11/2018 | Park et al. |
| 2018/0352435 A1 | 12/2018 | Donley et al. |
| 2018/0374429 A1 | 12/2018 | Nakamura |
| 2019/0069244 A1 | 2/2019 | Jeon et al. |
| 2019/0121300 A1 | 4/2019 | Peterson et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0250813 A1 | 8/2019 | Block et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0125037 A1 | 4/2020 | Jo et al. |
| 2020/0133206 A1 | 4/2020 | Jo et al. |
| 2020/0249632 A1 | 8/2020 | Olwal et al. |
| 2020/0322479 A1 | 10/2020 | De Vries et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0359204 A1 | 11/2020 | Hawkins et al. |
| 2020/0393957 A1 | 12/2020 | Wilson et al. |
| 2021/0042028 A1 | 2/2021 | Block et al. |
| 2021/0048929 A1 | 2/2021 | Agnoli et al. |
| 2021/0149694 A1 | 5/2021 | Guzman et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1337638 A | 2/2002 |
| CN | 1397904 A | 2/2003 |
| CN | 1536511 A | 10/2004 |
| CN | 1918533 A | 2/2007 |
| CN | 1997957 A | 7/2007 |
| CN | 101382438 A | 3/2009 |
| CN | 101505320 A | 8/2009 |
| CN | 101627349 A | 1/2010 |
| CN | 101702112 A | 5/2010 |
| CN | 101819486 A | 9/2010 |
| CN | 101828166 A | 9/2010 |
| CN | 101939740 A | 1/2011 |
| CN | 101981987 A | 2/2011 |
| CN | 102439558 A | 5/2012 |
| CN | 102687176 A | 9/2012 |
| CN | 102750070 A | 10/2012 |
| CN | 103336651 A | 10/2013 |
| CN | 103399480 A | 11/2013 |
| CN | 103562832 A | 2/2014 |
| CN | 103607660 A | 2/2014 |
| CN | 103649897 A | 3/2014 |
| CN | 103902165 A | 7/2014 |
| CN | 103914238 A | 7/2014 |
| CN | 103973899 A | 8/2014 |
| CN | 104182123 A | 12/2014 |
| CN | 104281405 A | 1/2015 |
| CN | 104487929 A | 4/2015 |
| CN | 104501043 A | 4/2015 |
| CN | 104580576 A | 4/2015 |
| CN | 104834439 A | 8/2015 |
| CN | 105094551 A | 11/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 105637451 A | 6/2016 |
| CN | 205608658 U | 9/2016 |
| CN | 106056848 A | 10/2016 |
| CN | 106486044 A | 3/2017 |
| CN | 106605201 A | 4/2017 |
| CN | 107239101 A | 10/2017 |
| CN | 107643677 A | 1/2018 |
| CN | 109313655 A | 2/2019 |
| CN | 109690445 A | 4/2019 |
| DE | 202017105858 U1 | 3/2018 |
| EP | 0579093 A1 | 1/1994 |
| EP | 0831629 A2 | 3/1998 |
| EP | 1637969 A2 | 3/2006 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 2120115 A2 | 11/2009 |

(56) References Cited

FOREIGN PATENT DOCUMENTS

| | | |
|---|---|---|
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2629483 A1 | 8/2013 |
| EP | 2682850 A1 | 1/2014 |
| EP | 2703974 A1 | 3/2014 |
| EP | 2738640 A2 | 6/2014 |
| EP | 2942932 A1 | 11/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3376342 A1 | 9/2018 |
| EP | 3401770 A1 | 11/2018 |
| GB | 2475669 A | 6/2011 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 11-160470 A | 6/1999 |
| JP | 11-232013 A | 8/1999 |
| JP | 3062531 B2 | 7/2000 |
| JP | 2001-318852 A | 11/2001 |
| JP | 2002-73486 A | 3/2002 |
| JP | 2002-507718 A | 3/2002 |
| JP | 2002-271451 A | 9/2002 |
| JP | 2003-296246 A | 10/2003 |
| JP | 2004-28918 A | 1/2004 |
| JP | 2004-184396 A | 7/2004 |
| JP | 2005-521890 A | 7/2005 |
| JP | 2005-339017 A | 12/2005 |
| JP | 2009-147889 A | 7/2009 |
| JP | 2010-124181 A | 6/2010 |
| JP | 2010-257051 A | 11/2010 |
| JP | 3168099 U | 6/2011 |
| JP | 2011-159172 A | 8/2011 |
| JP | 2011-217000 A | 10/2011 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2014-123197 A | 7/2014 |
| JP | 2014-519126 A | 8/2014 |
| JP | 2014-216868 A | 11/2014 |
| JP | 2015-210587 A | 11/2015 |
| JP | 2016-13151 A | 1/2016 |
| JP | 2017-531230 A | 10/2017 |
| JP | 2018-514838 A | 6/2018 |
| JP | 2018-113544 A | 7/2018 |
| JP | 2018-116067 A | 7/2018 |
| KR | 20-0425314 Y1 | 9/2006 |
| KR | 10-2007-0025292 A | 3/2007 |
| KR | 10-2008-0058246 A | 6/2008 |
| KR | 10-2009-0112132 A | 10/2009 |
| KR | 10-2013-0109466 A | 10/2013 |
| KR | 10-2014-0025552 A | 3/2014 |
| KR | 10-2014-0064687 A | 5/2014 |
| KR | 10-2015-0038711 A | 4/2015 |
| KR | 10-2015-0081140 A | 7/2015 |
| KR | 10-2017-0032471 A | 3/2017 |
| KR | 10-2017-0076452 A | 7/2017 |
| KR | 10-2017-0082698 A | 7/2017 |
| KR | 10-2018-0011581 A | 2/2018 |
| KR | 10-2019-0020850 A | 3/2019 |
| KR | 10-2019-0071285 A | 6/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |
| WO | 1998/40795 A1 | 9/1998 |
| WO | 2000/16186 A2 | 3/2000 |
| WO | 2001/71433 A1 | 9/2001 |
| WO | 2002/054157 A1 | 7/2002 |
| WO | 2003/032139 A2 | 4/2003 |
| WO | 03/085460 A2 | 10/2003 |
| WO | 2006/012343 A2 | 2/2006 |
| WO | 2006/112641 A1 | 10/2006 |
| WO | 2007/018881 A2 | 2/2007 |
| WO | 2008/004772 A1 | 1/2008 |
| WO | 2008/114491 A1 | 9/2008 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2012/021507 A2 | 2/2012 |
| WO | 2012/087939 A1 | 6/2012 |
| WO | 2012/161434 A2 | 11/2012 |
| WO | 2012/170446 A2 | 12/2012 |
| WO | 2013051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2015/023419 A1 | 2/2015 |
| WO | 2015/065402 A1 | 5/2015 |
| WO | 2015/163536 A1 | 10/2015 |
| WO | 2015/192085 A2 | 12/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213937 A1 | 12/2017 |
| WO | 2018/048700 A1 | 3/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Office Action received for Korean Patent Application No. 10-2020-7001340, dated Sep. 24, 2020, 19 pages (8 pages of English Translation and 11 pages of Official Copy).

Barbosa Jonathan, "Weather Clock 2.1 for Android", APKPure, Online Available at https://apkpure.com/weather-clock/com.urbandroid.wclock, Oct. 15, 2015, 3 pages.

Advisory Action received for U.S. Appl. No. 14/841,606, dated Feb. 28, 2019, 3 pages.

Advisory Action received for U.S. Appl. No. 14/815,898, dated Aug. 30, 2016, 3 pages.

(56) References Cited

OTHER PUBLICATIONS

Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 14/868,757, dated Jan. 17, 2019, 5 pages.
Advisory Action received for U.S. Appl. No. 15/421,865, dated Apr. 16, 2020, 7 pages.
Advisory Action received for U.S. Appl. No. 15/554,204, dated Mar. 12, 2020, 3 pages.
"Adyclock—Night Alarm Clock", App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Andro Dollar, "Huawei Watch Gt Always on Mode Update is Finally Here! ????", Online Available at: https://www.youtube.com/watch?v=AJw_FIAf7v4, Jun. 6, 2019, 4 pages.
Android Central, "BeWeather weather App for Android", Available online at: <https://www.youtube.com/watch?v=G2EY2K-XkSI>, Sep. 1, 2011, 1 page.
Android Central, "Changing the Watchface on Your Android Wear Device", Retrieved from: https://www.youtube.com/watch?v=YYwFe2K_qil, Jul. 2, 2014, 4 pages.
Android Tips, "Create a Minimal Lock Screen with Widgetlocker", Online Available at: http://appstap192.blogspot.com/2012/01/create-minimal-lock-screen-with.html, Jan. 18, 2012, 6 pages.
"Aod Too Dim. I've Answered My Own Question to Help Others", Online Available https://forums.androidcentral.com/samsung-galaxy-s9-s9-plus/874444-aod-too-dim-ive-answered-my-own-question-help-others.html, Mar. 11, 2018, 3 pages.
Apk Root, "Butterfly 3D Live Wallpaper 1.0 Apk", Available at <http://net-suckga-ilauncher2.apk-dl.com/butterfly-3d-live-wallpaper>, Feb. 26, 2013, 7 pages.
Applicant Initiated Interview Summary received for U.S. Appl. No. 14/846,511, dated Apr. 20, 2020, 4 pages.
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-initiated Interview Summary received for U.S. Appl. No. 14/868,757, dated Mar. 23, 2020, 4 pages.
Applicant-initiated Interview Summary received for U.S. Appl. No. 15/405,122, dated May 21, 2020, 5 pages.
Applicant-initiated Interview Summary received for U.S. Appl. No. 15/421,865, dated Feb. 3, 2020, 5 pages.
Applicant-initiated Interview Summary received for U.S. Appl. No. 15/554,204, dated Jan. 31, 2020, 3 pages.
Applicant-initiated Interview Summary received for U.S. Appl. No. 15/554,204, dated Oct. 11, 2019, 5 pages.
Applicant-initiated Interview Summary received for U.S. Appl. No. 15/798,235, dated Feb. 3, 2020, 3 pages.
Avdonin, Nikita, "Astroviewer 3d", Available at https://www.youtube.comjwatch?v=zY0tslx3JHY/>, Nov. 5, 2013, 2 pages.
Big Phil TV, "Gear S3 Watch Faces with Great Always on Display(a O D)", Available online at: https://www.youtube.com/watch?v=2cxMnrMiGU8, Apr. 5, 2017, 3 pages.
Bogdanov, Alexei, "Skmei 1016", XP054977588, Available online at <URL: https://www.youtube.com/watch?v=E4q4Fug05Fw>, Jun. 21, 2014, 2 pages.
Brief Communication Regarding Oral Proceedings received for European Patent Application No. 15730925.3, mailed on Feb. 18, 2020, 7 pages.
Brief Communication Regarding Oral Proceedings received for European Patent Application No. 17206177.2, mailed on Nov. 21, 2019, 5 pages.

"Brightness on Lock Screen", Online Available at: https://www.reddit.com/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Castellini, Rick, "Google Earth", Retrieved from <https://www.youtube.com/watch?v=bgjMSBXsFZQ>, Feb. 12, 2013, 3 pages.
Cengic, Suad, "Samsung Gear S3—Display Always On! Cool!", Available online at: https://www.youtube.com/watch?v=ceeDinbPwOY, Mar. 10, 2017, 3 pages.
Clark, Josh, "Designing Great Iphone Apps", O'Reilly Japan Co., O'Reilly Tim, vol. 1, May 24, 2012, 5 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, Sep. 21, 2017, 2 pages.
Corrected Notice of Allowance received for U.S. Appl. No. 15/183,663, Feb. 25, 2019, 3 pages.
Corrected Notice of Allowance received for U.S. Appl. No. 15/183,663, Mar. 27, 2019, 2 pages.
Corrected Notice of Allowance received for U.S. Appl. No. 15/355,956, dated Jan. 3, 2020, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Cyr, Jim, "Apple Watch—Customize Modular Watch Face", available online at: https://www.youtube.com/watch?v=02W93HbKIK8, May 13, 2015, 2 pages.
Dan, "Get This Look: 'minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, dated Jul. 19, 2019, 18 pages.
Decision on Opposition received for Australian Patent Application No. 2015298710, dated Aug. 9, 2019, 4 pages.
Decision on Opposition received for Australian Patent Application No. 2015298710, dated Aug. 20, 2018, 20 pages.
Decision to Grant received for Danish Patent Application No. PA201770397, dated Feb. 6, 2018, 2 pages.
Decision to Refuse received for European Patent Application No. 15730924.6, dated Mar. 15, 2019, 12 pages.
"Deluxe Moon-Guide", available online at:—https://web.archive.org/web/20130520161057/http://www.lifewaresolutions.com/deluxe_moon_guide_ip.html, May 20, 2013, 5 pages.
"Digital Alarm Clock App for Android", Goggle play store digital alarm clock description page, Mar. 25, 2015, 3 pages.
Droid Life, "How To: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to Customize the Clock Face", Available online at: https://www.youtube.com/watch?v=evraMWFb1fY, Jul. 25, 2014, 1 page.
European Search Report received for European Patent Application No. 17206177.2, dated Apr. 30, 2018, 4 pages.
Evgenyevich, Sergey, "Earth & Moon in HD Gyro 3d", Available at <https://www.youtube.com/watch?v=IRwNcaSYrls/>, Dec. 1, 2013, 2 pages.
Examiner's Answer to Appeal Brief received for U.S. Appl. No. 14/815,890, dated Mar. 20, 2020, 16 pages.
Extended European Search Report received for European Patent Application No. 16762356.0, dated Nov. 9, 2018, 10 pages.
Extended European Search Report received for European Patent Application No. 16837432.0, dated Mar. 11, 2019, 10 pages.
Extended European Search Report received for European Patent Application No. 17810723.1, dated Nov. 12, 2019, 9 pages.

(56) References Cited

OTHER PUBLICATIONS

Feist, Jonathan, "Android Customization—How to Create a Custom Clock Widget Using Zooper Widget", Available Online at: https://www.androidauthority.com/zooper-widget-clock-366476/, May 15, 2014, 10 pages.
Feldman, Ari, "Excerpts From: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/841,606, dated Sep. 7, 2018, 34 pages.
Final Office Action received for U.S. Appl. No. 14/846,511 dated May 10, 2018, 21 pages.
Final Office Action received for U.S. Appl. No. 14/846,511, dated Jun. 5, 2019, 24 pages.
Final Office Action received for U.S. Appl. No. 14/868,757, dated Jan. 22, 2020, 19 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/554,204, dated Oct. 31, 2019, 22 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 15/881,544, dated Jan. 29, 2019, 14 pages.
Final Office Action received for U.S. Appl. No. 16/582,020, dated Apr. 28, 2020, 31 pages.
Final Office Action received for U.S. Appl. No. 14/815,879, dated Mar. 24, 2016, 46 pages.
Final Office Action received for U.S. Appl. No. 14/868,757, dated Sep. 20, 2018, 18 pages.
First Action Interview received for U.S. Appl. No. 14/815,890, dated Aug. 12, 2016, 3 pages.
"Fitbit Surge Fitness Watch", Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual", Sotec Co., Ltd., No. 1, Nov. 15, 2013, pp. 217-218.
Gazer, "Iphone 4s Super Manual", Shuwa System Co., SAITO Kazukuni, vol. 1, Jun. 6, 2013, 7 pages.
Geary, David, "Programming Html5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
"Google Earth 7.0.1.8244", retrieved from the Internet: http://dl.google.com/dl/earth/client/ge7/release_7_0_1/googleearth-win-bundle-7.0.1.8244.exe Oct. 29, 2012, 1 page.
"Google Earth on Android—Androidcentral.com", Available online at:-https://www.youtube.com/watch?v=1WxN1RunrE4, Feb. 22, 2010, 1 page.
Gottabemobile, "How to Change Watch Faces on Android Wear", available online at URL: https://www.youtube.com/watch?v=B8iRGkGq6a8, Jul. 9, 2014, 4 pages.
Intention to Grant received for Danish Patent Application No. PA201570496, dated Feb. 17, 2016, 6 pages.
Intention to Grant received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant received for European Patent Application No. 15730925.3, dated May 28, 2020, 10 pages.
Intention to Grant received for European Patent Application No. 15747595.5, dated Feb. 17, 2020, 8 pages.
Intention to Grant received for European Patent Application No. 17206177.2, dated Feb. 24, 2020, 8 pages.
International Preliminary Report on Patentability received for PCT Application No. PCT/US2016/037686, dated Mar. 1, 2018, 12 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017., 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/031064, dated Dec. 14, 2017, 7 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2018/032164, dated Nov. 21, 2019, 11 pages.
International Search Report & Written Opinion received for PCT Patent Application No. PCT/US2016/031064, dated Aug. 8, 2016, 8 pages.
International Search Report and Written Opinion received for PCT Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.

(56) References Cited

OTHER PUBLICATIONS

International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2018/032164, dated Oct. 18, 2018, 16 pages.
International Search Report and Written Opinion received for PCT Patent Application No. PCT/US2019/030770, dated Oct. 31, 2019, 23 pages.
International Search Report and Written Opinion received for PCT Patent Application No. PCT/US2015/034607, dated Dec. 1, 2015, 23 pages.
Internet Blog Post, "[pc] Pre-customization of Black Desert's Characters", Online Available at:-<https://blog.naver.com/hsh6051/220209813968>, Dec. 14, 2014, 41 pages.
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/053353, dated Jan. 21, 2016, 7 pages.
Invitation to Pay Additional Fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
ISO 9241-13:1998, "Ergonomic Requirements for Office Work with Visual Display Terminals (vdts)", Part 13: User guidance, International Standard ISO, Zuerich, CH, vol. 9241-13, Jul. 15, 1998, 40 pages.
Kenney, Briley, "How to Customize a Smartwatch and Other Personalization Questions", Available online at: <https://smartwatches.org/learn/customize-smartwatch/>, Jan. 23, 2014, 3 pages.
"Kidizoom Smartwatch", Available online at URL: https://www.vtechnl.com/media/downloads/Kidizoom-Smart-Watch.pdf, Jun. 24, 2014, 23 pages.
"Living Earth", available at: http;//www.livingcarthapp.com/, 2014, 6 pages.
"Looking for a Launcher that Changes the Default Homescreen or Widgets Based on Wifi, Location, or Other Context.", Online Available at: https://www.reddit.com/r/androidapps/comments/35lu90/looking_for_a_launcher_that_changes_the_default/, 2015, 2 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
"Ms Excel 2013", Jan. 29, 2013, 2 pages.
Nerdtalk, "The Best Android Clock Widgets", available at: https://www.youtube.com/watch?v=E1bAprWByfU, Apr. 25, 2011, 1 page.
"New, but Unsigned—Easy Stopwatch for Symbian", XP55393563, Available online at http://www.allaboutsymbian.com/flow/item/19490_New_but_unsigned-Easy_StopWatc.php, Mar. 15, 2014, 15 pages.
"Night Display (alarm Clock) App", Google Play Store Night Display (Alarm Clock) Description page available at <https://web.archive.org/web/20141007124222/https://play.google.com/store/apps/details?id=com.srk.nighttimedisplay&hl=en> Oct. 7, 2014, pp. 1-3.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.
Non-Final Office Action received for U.S. Appl. No. 14/868,757, dated Dec. 19, 2017, 17 pages.
Non-Final Office Action received for U.S. Appl. No. 14/868,757, dated May 17, 2019, 19 pages.
Non-Final Office Action received for U.S. Appl. No. 15/183,663, dated Jul. 9, 2018, 13 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 15/421,865, dated Mar. 21, 2019, 18 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 15/881,544, dated Jun. 7, 2018, 15 pages.
Non-Final Office Action received for U.S. Appl. No. 16/389,722, dated Apr. 3, 2020, 15 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Non-Final Office Action received for U.S. Appl. No. 14/846,511, dated Nov. 30, 2018, 22 pages.

(56) References Cited

OTHER PUBLICATIONS

Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.
Notice of Acceptance received for Australian Patent Application No. 2017277813, dated Jun. 16, 2020, 3 pages.
Notice of Acceptance received for Australian Patent Application No. 2018279037, dated May 13, 2020, 3 pages.
Notice of Allowance received for Chinese Patent Application No. 201510481525.6, dated May 27, 2019, 2 pages.
Notice of Allowance received for Chinese Patent Application No. 201510483268.x, dated Nov. 6, 2019, 2 pages.
Notice of Allowance received for Chinese Patent Application No. 201510483305.7, dated Jan. 8, 2019, 3 pages.
Notice of Allowance received for Chinese Patent Application No. 201510484514.3, dated Jun. 6, 2019, 2 pages.
Notice of Allowance received for Chinese Patent Application No. 201520594249.x, dated Jul. 12, 2016, 4 pages.
Notice of Allowance received for Chinese Patent Application No. 201810037665.8, dated Jul. 9, 2019, 4 pages.
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Japanese Patent Application No. 2017-505450, dated Mar. 9, 2018, 10 pages.
Notice of Allowance received for Japanese Patent Application No. 2017-505842, dated Mar. 16, 2020, 4 pages.
Notice of Allowance received for Japanese Patent Application No. 2017-505847, dated May 20, 2019, 4 pages.
Notice of Allowance received for Japanese Patent Application No. 2017-545918, dated Jul. 22, 2019, 4 pages.
Notice of Allowance received for Japanese Patent Application No. 2018-074971, dated Apr. 23, 2019, 4 pages.
Notice of Allowance received for Japanese Patent Application No. 2018-537840, dated Mar. 19, 2020, 4 pages.
Notice of Allowance received for Japanese Patent Application No. 2019-096219, dated Jun. 26, 2020, 4 pages.
Notice of Allowance received for Korean Patent Application No. 10-2017-7005939, dated Mar. 30, 2018, 5 pages.
Notice of Allowance received for Korean Patent Application No. 10-2018-7022101, dated Oct. 14, 2019, 4 pages.
Notice of Allowance received for Taiwanese Patent Application No. 104124962, dated Jul. 27, 2017, 3 pages.
Notice of Allowance received for Taiwanese Patent Application No. 104124963, dated Sep. 28, 2017, 5 pages.
Notice of Allowance received for Taiwanese Patent Application No. 104124995, dated Jul. 27, 2017, 3 pages.
Notice of Allowance received for Taiwanese Patent Application No. 104124997, dated Jun. 16, 2017, 5 pages.
Notice of Allowance received for Taiwanese Patent Application No. 104124998, dated Mar. 31, 2017, 3 pages.
Notice of Allowance received for Taiwanese Patent Application No. 104134740, dated Dec. 8, 2016, 5 pages.
Notice of Allowance received for U.S. Appl. No. 14/815,879, dated Jun. 26, 2017, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/839,889, dated Oct. 30, 2017, 16 pages.
Notice of Allowance received for U.S. Appl. No. 14/868,757, dated Apr. 2, 2020, 10 pages.
Notice of Allowance received for U.S. Appl. No. 15/183,663, dated Jan. 17, 2019, 6 pages.
Notice of Allowance received for U.S. Appl. No. 15/355,956, dated Nov. 22, 2019, 29 pages.
Notice of Allowance received for U.S. Appl. No. 15/798,235, dated Apr. 1, 2020, 8 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 16/585,366, dated Jan. 2, 2020, 6 pages.
Notice of Allowance received for U.S. Appl. No. 16/585,399, dated Jul. 21, 2020, 9 pages.
"Nova Launcher—Lock Screen Edit", Online Available at: https://forums.androidcentral.com/ask-question/835057-nova-launcher-lock-screen-edit.html, Sep. 2017, 2 pages.
Nova, "Tour of the Solar System", Retrieved from: <http://www.pbs.org/wgbh/nova/space/tour-solar-system.html>, May 24, 2013, 14 pages.
Obara, Yuuta, "Iphone Application Selection for University Students", Shuwa System Co., Saito Kazukuni, vol. 1, May 16, 2013, 4 pages.
Octoba, "Just Install It—Utilizing Method for Android Application Business", ASCII Media Works Co. Takano Kiyoshi, vol. 1, Apr. 25, 2013, 6 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2018201089, dated Oct. 11, 2019, 4 pages.

(56) References Cited

OTHER PUBLICATIONS

Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2019208225, dated Mar. 20, 2020, 3 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages.
Office Action received for Chinese Patent Application No. 201510479088.4, dated Apr. 22, 2020, 7 pages.
Office Action received for Chinese Patent Application No. 201510479088.4, dated Mar. 12, 2018, 20 pages.
Office Action received for Chinese Patent Application No. 201510479088.4, dated May 7, 2019, 6 pages.
Office Action received for Chinese Patent Application No. 201510481525.6, dated Aug. 29, 2018, 10 pages.
Office Action received for Chinese Patent Application No. 201510481525.6, dated Nov. 29, 2017, 9 pages.
Office Action received for Chinese Patent Application No. 201510483268.x, dated Apr. 16, 2019, 6 pages.
Office Action received for Chinese Patent Application No. 201510483268.x, dated Dec. 1, 2017, 11 pages.
Office Action received for Chinese Patent Application No. 201510483268.x, dated Oct. 19, 2018, 10 pages.
Office Action received for Chinese Patent Application No. 201510483305.7, dated Aug. 31, 2018, 10 pages.
Office Action received for Chinese Patent Application No. 201510483305.7, dated Dec. 1, 2017, 13 pages.
Office Action received for Chinese Patent Application No. 201510484514.3, dated Apr. 4, 2018, 12 pages.
Office Action received for Chinese Patent Application No. 201510484514.3, dated Dec. 24, 2018, 13 pages.
Office Action received for Chinese Patent Application No. 201520594249.x, dated Mar. 25, 2016, 3 pages.
Office Action received for Chinese Patent Application No. 201520595384.6, dated Dec. 30, 2016, 2 pages.
Office Action received for Chinese Patent Application No. 201520595384.6, dated Jul. 22, 2016, 3 pages.
Office Action received for Chinese Patent Application No. 201520595385.0, dated Dec. 30, 2016, 2 pages.
Office Action received for Chinese Patent Application No. 201520595385.0, dated Jul. 22, 2016, 3 pages.
Office Action received for Chinese Patent Application No. 201520595385.0, dated Mar. 25, 2016, 3 pages.
Office Action received for Chinese Patent Application No. 201520595408.8, dated Dec. 9, 2015, 4 pages.
Office Action received for Chinese Patent Application No. 201520595408.8, dated Dec. 30, 2016, 2 pages.
Office Action received for Chinese Patent Application No. 201520595408.8, dated Jul. 25, 2016, 3 pages.
Office Action received for Chinese Patent Application No. 201520595408.8, dated Mar. 25, 2016, 3 pages.
Office Action received for Chinese Patent Application No. 201520595538.1, dated Dec. 30, 2016, 2 pages.
Office Action received for Chinese Patent Application No. 201520595538.1, dated Jul. 22, 2016, 3 pages.
Office Action received for Chinese Patent Application No. 201520595538.1, dated Mar. 25, 2016, 3 pages.
Office Action received for Chinese Patent Application No. 201680013193.1, dated Mar. 25, 2020, 21 pages.
Office Action received for Chinese Patent Application No. 201680047983.1, dated Mar. 18, 2019, 18 pages.
Office Action received for Chinese Patent Application No. 201680047983.1, dated Nov. 28, 2019, 9 pages.
Office Action received for Chinese Patent Application No. 201810037665.8, dated Dec. 7, 2018, 10 pages.
Office Action received for Chinese Patent Application No. 201520594249.x, dated Dec. 9, 2015, 4 pages.
Office Action received for Chinese Patent Application No. 201520595384.6, dated Dec. 9, 2015, 4 pages.
Office Action received for Chinese Patent Application No. 201520595385.0, dated Dec. 9, 2015, 4 pages.
Office Action received for Chinese Patent Application No. 201520595538.1, dated Dec. 9, 2015, 4 pages.
Office Action received for Danish Patent Application No. PA201570495, dated Dec. 9, 2016, 2 pages.
Office Action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570497, dated Oct. 30, 2015, 6 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016., 8 pages.
Office Action received for Danish Patent Application No. PA201570499, dated Jun. 19, 2018, 4 pages.
Office Action received for Danish Patent Application No. PA201570499, dated Nov. 1, 2017, 6 pages.
Office Action received for Danish Patent Application No. PA201570499, dated Nov. 3, 2015, 7 pages.
Office Action received for Danish Patent Application No. PA201570768, dated Sep. 13, 2016, 8 pages.
Office Action received for Danish Patent Application No. PA201570770, dated Apr. 7, 2017., 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201570775, dated Aug. 23, 2016, 7 pages.
Office Action received for Danish Patent Application No. PA201570775, dated Mar. 21, 2016, 12 pages.
Office Action received for Danish Patent Application No. PA201570775, dated Mar. 28, 2017., 3 pages.
Office Action received for Danish Patent Application No. PA201570775, dated Oct. 25, 2017, 3 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.

(56) References Cited

OTHER PUBLICATIONS

Office Action received for Danish Patent Application No. PA201570496, dated Oct. 29, 2015, 6 pages.
Office Action received for European Patent Application No. 15730924.6, dated Dec. 12, 2017, 8 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 16837432.0, dated Jan. 10, 2020, 7 pages.
Office Action received for European Patent Application No. 17206177.2, dated May 15, 2018, 6 pages.
Office Action received for European Patent Application No. 15730925.3, dated Feb. 27, 2019, 5 pages.
Office Action received for German Patent Application No. 112015003083.2, dated Mar. 9, 2018, 12 pages.
Office Action received for Japanese Patent Application No. 2017-505450, dated Jun. 20, 2017, 8 pages.
Office Action received for Japanese Patent Application No. 2017-505842, dated Feb. 22, 2019, 11 pages.
Office Action received for Japanese Patent Application No. 2017-505842, dated Sep. 9, 2019, 7 pages.
Office Action received for Japanese Patent Application No. 2017-505847, dated Feb. 12, 2019, 13 pages.
Office Action received for Japanese Patent Application No. 2017-545918, dated Sep. 14, 2018, 12 pages.
Office Action received for Japanese Patent Application No. 2018-074971, dated Jan. 28, 2019, 6 pages.
Office Action received for Japanese Patent Application No. 2018-537840, dated Jul. 8, 2019, 15 pages.
Office Action received for Korean Patent Application No. 10-2017-7005939, dated Jun. 30, 2017, 6 pages.
Office Action received for Korean Patent Application No. 10-2017-7024570, dated Jul. 10, 2019, 6 pages.
Office Action received for Korean Patent Application No. 10-2017-7024570, dated Sep. 28, 2018, 14 pages.
Office Action received for Korean Patent Application No. 10-2018-7018904, dated Aug. 20, 2019, 8 pages.
Office Action received for Korean Patent Application No. 10-2018-7022101, dated Feb. 14, 2019, 15 pages.
Office Action received for Korean Patent Application No. 10-2018-7022101, dated Jul. 9, 2019, 10 pages.
Office Action received for Korean Patent Application No. 10-2019-7029673, dated Nov. 5, 2019, 10 pages.
Office Action received for Netherland Patent Application No. 2015245, dated Jan. 24, 2017, 11 pages.
Office Action received for Netherlands Patent Application No. 2015239, dated Oct. 28, 2016, 13 pages.
Office Action received for Taiwanese Patent Application No. 104124962, dated Nov. 29, 2016, 6 pages.
Office Action received for Taiwanese Patent Application No. 104124963, dated Jan. 5, 2017, 11 pages.
Office Action received for Taiwanese Patent Application No. 104124995, dated Dec. 1, 2016, 6 pages.
Office Action received for Taiwanese Patent Application No. 104124997, dated Dec. 8, 2016, 12 pages.
Office Action received for Taiwanese Patent Application No. 104124998, dated Nov. 29, 2016, 6 pages.
Office Action received for Taiwanese Patent Application No. 104126627, dated Nov. 29, 2016, 9 pages.
Office Action received for Taiwanese Patent Application No. 104126627, dated Aug. 30, 2018, 22 pages.
Office Action received for Taiwanese Patent Application No. 104126627, dated Dec. 20, 2018, 4 pages.
Office Action received for Taiwanese Patent Application No. 104126627, dated Oct. 16, 2017, 7 pages.
Office Action received for Taiwanese Patent Application No. 104132636, dated Dec. 13, 2018, 26 pages.
Office Action received for Taiwanese Patent Application No. 104132636, dated Mar. 23, 2017, 25 pages.
Office Action received for Taiwanese Patent Application No. 104132636, dated Oct. 31, 2017, 10 pages.
Omar Romero, "Sony Smartwatch 2 Custom Watchfaces Tutorial", Retrieved From: <https://www.youtube.com/watch?v=8odbxqwSQR8>, May 1, 2014, 2 pages.
"Online Alarm Clock", https://web.archive.org/web/20150505081746/http://www.online-stopwatch.com/online-alarm-clock, May 5, 2015, 2 pages.
PA201570497, "Link to Wayback Machine with Link to Google Play Showing Different Layouts of Complications Associated with a Clock Face", available online at: https://play.google.com/store/apps/details?id=com.levelup.beautifulwidgets.free&hl=da >, Sep. 9, 2013, 6 pages.
"Pentax K20d Operating Manual", http://www.ricoh-imaging.eu/en/operating-manuals-download.html, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Pre-interview First Office Action received for U.S. Appl. No. 14/815,890, dated May 26, 2016, 4 pages.
Rehman, A, "Install Android 4.2 Gesture-based Keyboard & Clock App on Jelly Bean 4.1 or Higher", Excerpts From, Available online at: http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 Pages., 5 Pages.
"Reuse Animations—Synfig Animation Studio", Available online at: https://wiki.synfig.org/index.php?title=Doc:Reuse_Animations&oldid=18173 May 20, 2013, 5 pages.
Search Report and Opinion received for Netherland Patent Application No. 2015232, dated Jan. 25, 2017, 9 pages.
Search Report and Opinion received for Netherlands Patent Application No. 2015242, dated Jul. 4, 2017., 20 pages.
Search Report and Opinion received for Netherlands Patent Application No. 2018531, dated Jul. 27, 2017, 14 pages.
Search Report received for Danish Patent Application No. 201570768, dated Mar. 17, 2016, 11 pages.
Shiota, Shinji, "Windows 7 Dojo", Weekly ASCII, Ascii Mediaworks Inc., vol. 798, Aug. 31, 2010, 3 pages.
Smartwatch, "App Earth Space HD Live Wallpaper Apk for Smart Watch", Version 1.7, Android version 2.2, Aug. 27, 2013, 1 page.
"Solar Walk Free", Vito Technology, Jun. 19, 2014, 9 pages.
Sony, "Live View™ Micro Display", Extended User Guide, Aug. 2010, 27 pages.
Sony, "Sony Smartwatch", User Guide, Dec. 2011, 18 pages.
Stateoftech, "Samsung Galaxy Gear Tips—Change the Clock Face", Retrieved from https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 17206177.2, mailed on Jun. 3, 2019, 8 pages.
Sun Set, "Sun Set Solar Image Clock", Available at <https://web.archive.orgjweb/20140719005410/http://www.sunsetclock.com/>, 2013, 5 pages.
Supplemental Notice of Allowance received for U.S. Appl. No. 16/585,399, dated Aug. 26, 2020, 2 pages.
Talkandroid, "Android Wear Walkthrough", Available online at: https://www.youtube.com/watch?v=4xntpZac4sw, Jun. 30, 2014, 1 page.
"The Simply Alarm App for Pebble", "available online at <https://web.archive.org/web/20150517070400>/http://www.rebootsramblings.ca/n/sahhelp/https://www.youtube.com/watch?v=IVp1scQPw08" May 17, 2015, 1 page.
"Tropical Fish 14", Available online at: https://www.turbosquid.com/3d-models/tropical-fish-3d-model/388510 Feb. 4, 2008, 2 pages.

(56) References Cited

OTHER PUBLICATIONS

Tweedie, Steven, "Create and Customize Your Own Emojis with 'makemoji' for Iphone", Available online at: http://www.businessinsider.com/create-custom-emojis-with-makemoji-app-2014-8, Aug. 19, 2014, 6 pages.
"Uikit User Interface Catalog: Page Controls", Available online at https://web.archive.org/web/20140703123442/https://developer.apple.com/library/ios/documentation/userexperience/conceptual/UIKitUICatalog/UIPageControl.html Dec. 16, 2013, 4 pages.
Viticci, Frederico, "Checking Time Zones with Living Earth—Macstories", Available at <https://www.macstories.net/reviews/checking-time-zones-with-living-earth/>, Dec. 11, 2013, pp. 1-5.
Wade, Cliff, "Get the Most Out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the Most Out of Nova Launcher: Customizing the Dock (contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The Watch Every Father Needs: M-i-c-k-e-y, M-o-u-s-e. Mickey Mouse..?", Online Available at: https://forums.watchuseek.com/f2/watch-every-father-needs-m-i-c-k-e-y-m-o-u-s-e-mickey-mouse-855069.html, 2013, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Xperia ZL2 SOL25, "Instruction Manual", Detailed version, KDDI Corporation, No. 1, vol. 1, Jun. 2014, 4 pages.
Zephyrnix, "Steam's In-game Home Menu", Online Available at: <https://www.youtube.com/watch?v=jLoRFiPkcUw>, see 0;00-1;06., Feb. 15, 2011, 3 pages.
Zukerman, Erez, "6 Beautiful, Interesting & Versatile Timer Apps [android]", available at: http://www.makeuseof.com/tag/beautiful-interesting-versatile-timer-apps-android/, May 18, 2012, 5 pages.
Extended European Search Report received for European Patent Application No. 20185974.1, dated Oct. 28, 2020, 7 pages.
Notice of Allowance received for U.S. Appl. No. 16/585,721, dated Oct. 30, 2020, 9 pages.
Office Action received for Danish Patent Application No. PA201970597, dated Oct. 29, 2020, 4 pages.
Office Action received for Japanese Patent Application No. 2019-151358, dated Oct. 2, 2020, 5 pages (2 pages of English Translation and 3 pages of Official Copy).
Advisory Action received for U.S. Appl. No. 16/582,020, dated Aug. 3, 2020, 4 pages.
Applicant Initiated Interview Summary received for U.S. Appl. No. 16/582,020, dated Jul. 14, 2020, 5 pages.
Corrected Notice of Allowance received for U.S. Appl. No. 15/554,204, dated Aug. 19, 2020, 3 pages.
Decision to Grant received for Danish Patent Application No. PA201770791, dated Jul. 7, 2020, 2 pages.
Decision to Grant received for European Patent Application No. 15747595.5, dated Jul. 16, 2020, 2 pages.
Decision to Grant received for European Patent Application No. 17206177.2, dated Aug. 6, 2020, 2 pages.
European Search Report received for European Patent Application No. 20172197.4, dated Jul. 28, 2020, 4 pages.
Extended European Search Report received for European Patent Application No. 17810737.1, dated Oct. 28, 2019, 11 pages.
Final Office Action received for U.S. Appl. No. 11/770,725, dated Mar. 25, 2011, 13 pages.
Final Office Action received for U.S. Appl. No. 14/846,511, dated Aug. 11, 2020, 25 pages.
Final Office Action Received for U.S. Appl. No. 15/608,866, dated Mar. 8, 2019, 36 pages.
International Preliminary Report on Patentability received for PCT Patent Application No. PCT/US2017/035326, dated Dec. 20, 2018, 19 pages.
International Search Report and Written Opinion received for PCT Patent Application No. PCT/US2017/035326, dated Oct. 5, 2017, 22 pages.
International Search Report and Written Opinion received for PCT Patent Application No. PCT/US2020/030079, dated Sep. 4, 2020, 18 pages.
Invitation to Pay Additional Fee received for PCT Patent Application No. PCT/US2017/035326, dated Aug. 7, 2017., 2 pages.
Invitation to Pay Additional Fees received for PCT Patent Application No. PCT/US2020/030079, dated Jul. 14, 2020, 12 pages.
Non-Final Office Action received for U.S. Appl. No. 15/608,866, dated Nov. 2, 2018, 46 pages.
Non-Final Office Action received for U.S. Appl. No. 11/770,725 dated Sep. 3, 2010, 22 pages.
Notice of Allowance received for U.S. Appl. No. 11/770,725 dated Aug. 8, 2011, 13 pages.
Notice of Allowance received for U.S. Appl. No. 11/770,725 dated Oct. 14, 2011, 11 pages.
Notice of Allowance received for Korean Patent Application No. 10-2018-7018904, dated Jun. 26, 2020, 4 pages (1 page of English Translation and 3 pages of Official copy).
Notice of Allowance received for U.S. Appl. No. 15/554,204, dated Jul. 13, 2020, 10 pages.
Notice of Allowance received for U.S. Appl. No. 15/608,866, dated Feb. 28, 2020, 2 pages.
Notice of Allowance received for U.S. Appl. No. 15/798,235, dated Sep. 22, 2020, 8 pages.
Notice of Allowance received for U.S. Appl. No. 15/608,866, dated Dec. 18, 2019, 9 pages.
Office Action received for Australian Patent Application No. 2018201089, dated Jul. 23, 2020, 4 pages.
Office Action received for Chinese Patent Application No. 201680047983.1, dated Jul. 1, 2020, 6 pages (3 pages of English Translation and 3 pages of Official Copy).
Office Action received for Chinese Patent Application No. 201780033771.2, dated Jul. 15, 2020, 18 pages (9 pages of English Translation and 9 pages of Official Copy).
Office Action received for European Patent Application No. 20172197.4, dated Aug. 5, 2020, 6 pages.
Office Action received for Korean Patent Application No. 10-2019-7029673, dated Sep. 3, 2020, 9 pages (4 pages of English Translation and 5 pages of Official Copy).
Supplemental Notice of Allowance received for U.S. Appl. No. 15/608,866, dated Feb. 20, 2020, 2 pages.
International Preliminary Report on Patentability received for PCT Patent Application No. PCT/US2007/089023, dated Jul. 7, 2009, 8 pages.
Written Opinion received for PCT Patent Application No. PCT/US2007/089023, dated Jul. 11, 2008, Jul. 11, 2008, 7 pages.
Phlam Dev, "Clockwork Tomato Presentation", Retrieved from the Internet: URL: https://www.youtube.com/watch?v=2IQDx9REn0E, Apr. 29, 2016, 6 pages.
Notice of Allowance received for U.S. Appl. No. 16/584,445, dated Oct. 21, 2020, 6 pages.
Office Action received for Chinese Patent Application No. 201680013193.1, dated Sep. 7, 2020, 6 pages (3 pages of English Translation and 3 pages of Official Copy).
Office Action received for Danish Patent Application No. PA201970598, dated Oct. 9, 2020, 4 pages.
Applicant Initiated Interview Summary received for U.S. Appl. No. 16/584,445, dated Mar. 17, 2020, 5 pages.
Applicant-Initiated Interview Summary received for U.S. Appl. No. 16/584,281, dated Mar. 9, 2020, 5 pages.

(56) References Cited

OTHER PUBLICATIONS

Applicant-Initiated Interview Summary received for U.S. Appl. No. 16/584,281, dated Sep. 14, 2020, 6 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
Non-Final Office Action received for U.S. Appl. No. 15/421,865, dated Oct. 7, 2020, 20 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,714, dated Apr. 16, 2020, 18 pages.
Non-Final Office Action received for U.S. Appl. No. 16/585,721, dated Dec. 27, 2019, 25 pages.
Non-Final Office Action received for U.S. Appl. No. 16/659,507, dated Oct. 7, 2020, 16 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.
Notice of Allowance received for U.S. Appl. No. 16/585,714, dated Sep. 25, 2020, 15 pages.
Notice of Allowance received for U.S. Appl. No. 16/585,721, dated Sep. 30, 2020, 15 pages.
Office Action and Search Report received for Danish Patent Application No. PA201970598, dated Jan. 28, 2020, 6 pages.
Office Action received for Chinese Patent Application No. 201910906898.1, dated Sep. 9, 2020, 8 pages (3 pages of English Translation and 5 pages of Official Copy).
Office Action received for Danish Patent Application No. PA201970596, dated May 6, 2020, 4 pages.
Office Action received for Danish Patent Application No. PA201970599, dated Jan. 23, 2020, 6 pages.
Office Action received for Danish Patent Application No. PA201970599, dated May 27, 2020, 4 pages.
Office Action received for Japanese Patent Application No. 2020-074878, dated Sep. 7, 2020, 13 pages (7 pages of English Translation and 6 pages of Official Copy).
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.
Search Report and Opinion received for Danish Patent Application No. PA201970599, dated Nov. 8, 2019, 12 pages.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
Applicant-Initiated Interview Summary received for U.S. Appl. No. 15/405,122, dated Dec. 22, 2020, 5 pages.
Office Action received for Danish Patent Application No. PA202070609, dated Dec. 10, 2020, 8 pages.

Office Action received for Korean Patent Application No. 10-2020-7026036, dated Dec. 7, 2020, 8 pages (3 pages of English Translation and 5 pages of Official Copy).
Singh Lovepreet, "Samsung Galaxy Watch: How to Change Watch Face—Tips and Tricks", Online available at: https://www.youtube.com/watch?pp=desktop&v=IN7gPxTZ1qU, Dec. 4, 2018, 1 page.
Vids Tube, "Bitmoji Clockface on Fitbit Versa Sense/Versa 3/Versa 2", Available online at: https://www.youtube.com/watch?v=4V_xDnSLeHE, Jun. 30, 2019, 1 page.
Woolsey Amanda, "How To Customize The Clock on the Apple Watch", Available online at: https://www.youtube.com/watch?v=t-3Bckdd9B4, Apr. 25, 2015, 1 page.
Baar, Marius, "Fitbit Ace—Unboxing, Setup and 24 Hour Test", YouTube [online] [video], Retrieved from: <https://youtu.be/ekvkfqOyrls>, See especially 4:44, Oct. 24, 2018, 3 pages.
Final Office Action received for U.S. Appl. No. 16/418,786, dated Jan. 13, 2021, 14 pages.
Intention to Grant received for Danish Patent Application No. PA202070609, dated Jan. 14, 2021, 2 pages.
International Search Report and Written Opinion received for PCT Patent Application No. PCT/US2020/045814, dated Jan. 20, 2021, 16 pages.
My Mate Vince, "Setting up the Fitbit Alta HR Activity Tracker on Apple iOS", Online available at: <https://youtu.be/FdwRF4lfvFc, Jun. 18, 2017, 3 pages.
Notice of Allowance received for U.S. Appl. No. 16/585,714, dated Jan. 8, 2021, 8 pages.
Notice of Allowance received for U.S. Appl. No. 16/585,714, dated Jan. 27, 2021, 2 pages.
Office Action received for Australian Patent Application No. 2019208225, dated Dec. 21, 2020, 3 pages.
Office Action received for European Patent Application No. 17810737.1, dated Jan. 20, 2021, 6 pages.
Search Report and Opinion received for Danish Patent Application No. PA202070610, dated Jan. 8, 2021, 9 pages.
Wearablezone, "How To Set Up Your Fitbit Profile", Online available at: <https://youtu.be/jsWPtcDWiJM>, Jun. 6, 2016, 3 pages.
Xdream, "TickTalk Video User Manual", YouTube [online] [video], Online available at: <https://youtu.be/jYhq3DwmVzo>, Mar. 17, 2017, 3 pages.
Decision to Grant received for Danish Patent Application No. PA201970596, dated Feb. 26, 2021, 2 pages.
Non-Final Office Action received for U.S. Appl. No. 16/989,626, dated Mar. 3, 2021, 35 pages.
Office Action received for Australian Patent Application No. 2020239670, dated Mar. 3, 2021, 4 pages.
Office Action received for Chinese Patent Application No. 201680047983.1, dated Feb. 1, 2021, 6 pages (3 pages of English Translation and 3 pages of Official Copy).
Office Action received for Danish Patent Application No. PA201970599, dated Mar. 1, 2021, 4 pages.
Applicant-Initiated Interview Summary received for U.S. Appl. No. 15/421,865, dated Dec. 15, 2020, 6 pages.
Final Office Action received for U.S. Appl. No. 16/389,722, dated Dec. 8, 2020, 18 pages.
Intention to Grant Received for Danish Patent Application No. PA201970596, dated Dec. 1, 2020, 2 pages.
Non-Final Office Action received for U.S. Appl. No. 16/401,934, dated Dec. 11, 2020, 26 pages.
Office Action received for Australian Patent Application No. 2020102158, dated Dec. 8, 2020, 9 pages.
Office Action received for Australian Patent Application No. 2020204506, dated Dec. 7, 2020, 6 pages.
Office Action received for European Patent Application No. 16762356.0, dated Dec. 11, 2020, 7 pages.
Applicant-Initiated Interview Summary received for U.S. Appl. No. 16/389,722, dated Feb. 11, 2021, 4 pages.
Applicant-Initiated Interview Summary received for U.S. Appl. No. 16/401,934, dated Feb. 23, 2021, 8 pages.
Notice of Allowance received for U.S. Appl. No. 14/815,890, dated Feb. 12, 2021, 8 pages.
Notice of Allowance received for U.S. Appl. No. 16/659,507, dated Feb. 24, 2021, 7 pages.

(56) References Cited

OTHER PUBLICATIONS

Applicant-Initiated Interview Summary received for U.S. Appl. No. 16/659,507, dated Nov. 17, 2020, 3 pages.
Decision on Appeal received for U.S. Appl. No. 14/815,890, dated Nov. 24, 2020, 13 pages.
International Preliminary Report on Patentability received for PCT Patent Application No. PCT/US2019/030770, dated Nov. 19, 2020, 14 pages.
International Search Report and Written Opinion received for PCT Patent Application No. PCT/US2020/031536, dated Sep. 23, 2020, 16 pages.
International Search Report and Written Opinion received for PCT Patent Application No. PCT/US2020/031575, dated Aug. 20, 2020, 14 pages.
Invitation to Pay Additional Fees received for PCT Patent Application No. PCT/US2020/031536, dated Jul. 31, 2020, 9 pages.
Invitation to Pay Additional Fees received for PCT Patent Application No. PCT/US2020/045814, dated Nov. 18, 2020, 11 pages.
Non-Final Office Action received for U.S. Appl. No. 16/861,651, dated Nov. 27, 2020, 11 pages.
Notice of Allowance received for U.S. Appl. No. 16/584,281, dated Nov. 18, 2020, 8 pages.
Record of Oral Hearing received for U.S. Appl. No. 14/815,890, mailed on Nov. 20, 2020, 18 pages.
Result of Consultation received for European Patent Application No. 15730925.3, dated Nov. 24, 2020, 4 pages.
Feist, Jonathan, "Android customization—How to create a custom clock widget using Zooper Widget", Android Authority, Available Online at: https://www.androidauthority.com/zooper-widget-clock-366476/, May 15, 2014, pp. 1-13.
Notice of Acceptance received for Australian Patent Application No. 2019208225, dated Jan. 21, 2021, 3 pages.
Notice of Allowance received for Chinese Patent Application No. 201510479088.4, dated Jan. 21, 2021, 2 pages (1 page of English Translation and 1 page of Official Copy).
Notice of Allowance received for Chinese Patent Application No. 201780033771.2, dated Feb. 3, 2021, 2 pages (1 page of English Translation and 1 page of Official Copy).
Notice of Allowance received for Japanese Patent Application No. 2019-151358, dated Jan. 22, 2021, 4 pages (1 page of English Translation and 3 pages of Official Copy).
Office Action received for Australian Patent Application No. 2020309093, dated Jan. 21, 2021, 3 pages.
Office Action received for Chinese Patent Application No. 201780033973.7, dated Jan. 22, 2021, 27 pages (11 pages of English Translation and 16 pages of Official Copy).
Office Action received for European Patent Application No. 16837432.0, dated Jan. 27, 2021, 7 pages.
Applicant-Initiated Interview Summary received for U.S. Appl. No. 16/389,722, dated Sep. 7, 2021, 4 pages.
Applicant-Initiated Interview Summary received for U.S. Appl. No. 16/861,651, dated Sep. 3, 2021, 5 pages.
Applicant-Initiated Interview Summary received for U.S. Appl. No. 16/943,737, dated Sep. 7, 2021, 4 pages.
Decision to Grant received for Danish Patent Application No. PA201970597, dated Aug. 19, 2021, 2 pages.
Final Office Action received for U.S. Appl. No. 17/031,671, dated Sep. 7, 2021, 27 pages.
Office Action received for Danish Patent Application No. PA202070623, dated Aug. 24, 2021, 3 pages.
Applicant-Initiated Interview Summary received for U.S. Appl. No. 17/041,350, dated Aug. 18, 2021, 2 pages.
Intention to Grant received for European Patent Application No. 15730925.3, dated Aug. 16, 2021, 10 pages.
Notice of Allowance received for Korean Patent Application No. 10-2019-7029673, dated Aug. 3, 2021, 3 pages (1 page of English Translation and 2 pages of Official Copy).
Notice of Allowance received for Korean Patent Application No. 10-2021-7013453, dated Aug. 11, 2021, 5 pages (2 pages of English Translation and 3 pages of Official Copy).
Notice of Allowance received for Korean Patent Application No. 10-2021-7013454, dated Aug. 12, 2021, 4 pages (1 page of English Translation and 3 pages of Official Copy).
Notice of Allowance received for U.S. Appl. No. 16/867,002, dated Aug. 20, 2021, 12 pages.
Applicant-Initiated Interview Summary received for U.S. Appl. No. 15/421,865, dated Jun. 30, 2021, 6 pages.
Applicant-Initiated Interview Summary received for U.S. Appl. No. 16/989,626, dated Jun. 29, 2021, 5 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Office Action received for Danish Patent Application No. PA202070610, dated Jun. 18, 2021, 8 pages.
Office Action received for Korean Patent Application No. 10-2021-7013453, dated Jun. 5, 2021, 6 pages (2 pages of English Translation and 4 pages of Official Copy).
Office Action received for Korean Patent Application No. 10-2021-7013454, dated Jun. 5, 2021, 6 pages (2 pages of English Translation and 4 pages of Official Copy).
Phonebuff, "Hybrid Stopwatch & Timer Android App Review", Available Online at: https://www.youtube.com/watch?v=B43oCFPiWvY, Apr. 4, 2012, 7 pages.
Rosa et al., "Stripe Generator—a Free Tool for the Web Design Community", Available online at: http://www.stripegenerator.com/, Mar. 28, 2019, 2 pages.
Final Office Action received for U.S. Appl. No. 16/989,626, dated Jul. 28, 2021, 38 pages.
Non-Final Office Action received for U.S. Appl. No. 17/068,386, dated Jul. 15, 2021, 16 pages.
Notice of Acceptance received for Australian Patent Application No. 2020309093, dated Jul. 8, 2021, 3 pages.
Notice of Acceptance received for Australian Patent Application No. 2021202834, dated Jul. 15, 2021, 3 pages.
Notice of Allowance received for U.S. Appl. No. 16/582,020, dated Jul. 27, 2021, 29 pages.
Office Action received for Australian Patent Application No. 2020239749, dated Jul. 16, 2021, 5 pages.
Office Action received for Korean Patent Application No. 10-2020-7028759, dated Jun. 29, 2021, 12 pages (5 pages of English Translation and 7 pages of Official Copy).
Applicant Initiated Interview Summary received for U.S. Appl. No. 17/031,671, dated Aug. 2, 2021, 5 pages.
Corrected Notice of Allowance received for U.S. Appl. No. 16/582,020, dated Aug. 11, 2021, 2 pages.
Invitation to Pay Additional Fees received for PCT Patent Application No. PCT/US2021/031212, dated Jul. 28, 2021, 19 pages.
Non-Final Office Action received for U.S. Appl. No. 16/859,101, dated Aug. 5, 2021, 19 pages.
Notice of Allowance received for Korean Patent Application No. 10-2020-7026036, dated Jul. 26, 2021, 4 pages (1 page of English Translation and 3 pages of Official Copy).
Office Action received for Chinese Patent Application No. 201910906898.1, dated Jun. 23, 2021, 6 pages (3 pages of English Translation and 3 pages of Official Copy).
Advisory Action received for U.S. Appl. No. 16/389,722, dated Mar. 9, 2021, 5 pages.
Applicant-Initiated Interview Summary received for U.S. Appl. No. 16/418,786, dated Mar. 30, 2021, 4 pages.
Applicant-Initiated Interview Summary received for U.S. Appl. No. 16/861,651, dated Mar. 25, 2021, 6 pages.
Applicant-Initiated Interview Summary received for U.S. Appl. No. 16/989,626, dated Jun. 7, 2021, 3 pages.
Certificate of Examination received for Australian Patent Application No. 2020102158, dated Jun. 8, 2021, 2 pages.
Decision on Acceptance received for Australian Patent Application No. 2018201089, dated Apr. 20, 2021, 28 pages.
Decision to Grant received for Danish Patent Application No. PA202070609, dated May 3, 2021, 2 pages.
Examiner's Answer to Appeal Brief received for U.S. Appl. No. 14/846,511, dated Jun. 14, 2021, 15 pages.

(56) References Cited

OTHER PUBLICATIONS

Final Office Action received for U.S. Appl. No. 15/421,865, dated Mar. 19, 2021, 20 pages.
Final Office Action received for U.S. Appl. No. 16/401,934, dated Jun. 14, 2021, 30 pages.
Final Office Action received for U.S. Appl. No. 16/861,651, dated Apr. 20, 2021, 14 pages.
Intention to Grant received for Danish Patent Application No. PA201970597, dated Apr. 20, 2021, 2 pages.
Jean, "Our Pact Parental Control Review", Available online at: https://www.bewebsmart.com/parental-controls/our-pact-parental-control-review/, Jun. 25, 2016, 25 pages.
Non-Final Office Action received for U.S. Appl. No. 15/405,122, dated Apr. 2, 2021, 35 pages.
Non-Final Office Action received for U.S. Appl. No. 16/389,722, dated Jun. 3, 2021, 17 pages.
Non-Final Office Action received for U.S. Appl. No. 16/582,020, dated Apr. 5, 2021, 29 pages.
Non-Final Office Action received for U.S. Appl. No. 17/041,350, dated Jun. 10, 2021, 24 pages.
Notice of Acceptance received for Australian Patent Application No. 2020204506, dated Apr. 8, 2021, 3 pages.
Notice of Allowance received for Chinese Patent Application No. 201680013193.1, dated May 7, 2021, 5 pages (1 page of English Translation and 4 pages of Official Copy).
Notice of Allowance received for Chinese Patent Application No. 201680047983.1, dated Apr. 28, 2021, 3 pages (1 page of English Translation and 2 pages of Official Copy).
Notice of Allowance received for Japanese Patent Application No. 2020-074878, dated May 28, 2021, 4 pages (1 page of English Translation and 3 pages of Official Copy).
Notice of Allowance received for Korean Patent Application No. 10-2020-7001340, dated May 10, 2021, 5 pages (2 pages of English Translation and 3 pages of Official Copy).
Notice of Allowance received for Korean Patent Application No. 10-2021-7002597, dated Feb. 25, 2021, 5 pages (1 page of English Translation and 4 pages of Official Copy).
Office Action received for Australian Patent Application No. 2020102158, dated Apr. 27, 2021, 5 pages.
Office Action received for Australian Patent Application No. 2021202834, dated May 28, 2021, 2 pages.
Office Action received for Chinese Patent Application No. 201680013193.1, dated Feb. 1, 2021, 8 pages (3 pages of English Translation and 5 pages of Official Copy).
Office Action received for Danish Patent Application No. PA201970598, dated Apr. 15, 2021, 6 pages.
Office Action received for Korean Patent Application No. 10-2019-7029673, dated Apr. 8, 2021, 7 pages (3 pages of English Translation and 4 pages of Official Copy).
Office Action received for Korean Patent Application No. 10-2020-7001340, dated Mar. 26, 2021, 13 pages (6 pages of English Translation and 7 pages of Official Copy).
Rowinski Dan, "Why the All-in-One Smartwatch Isn't Happening Any Time Soon", Online available at: https://web.archive.org/web/20140123074218if_/https://readwrite.com/2014/01/20/smartwatch-wearable-fitness-remote-control/, Jan. 20, 2014, 6 pages.
Search Report received for Netherlands Patent Application No. 2015236, dated Apr. 21, 2021, 19 pages (13 pages of English Translation and 6 pages of Official Copy).
"Sony Smartwatch 2 update—New feartures and watchface creator!!! NEW!!!", Online available at: https://www.youtube.com/watch?v=k3jjBv7QZSk, May 8, 2014, 3 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.
Summons to Attend Oral Proceedings received for European Patent Application No. 16762356.0, mailed on May 10, 2021, 10 pages.
Supplemental Notice of Allowance received for U.S. Appl. No. 14/815,890, dated Mar. 10, 2021, 2 pages.

Techcloud, "How to Create Custom Watch Face for Samsung Galaxy Gear Smartwatch just in Few Seconds", Online available at: https://www.youtube.com/watch?v=6rO-_SREDjQ, Oct. 9, 2013, 3 pages.
Theunlockr, "How to Change the Watch Face on the Galaxy Gear", Online available at: https://www.youtube.com/watch?v=Z7EBG5aBiZg, Jan. 3, 2014, 3 pages.
Applicant Initiated Interview Summary received for U.S. Appl. No. 16/582,020, dated Jul. 9, 2021, 4 pages.
Applicant-Initiated Interview Summary received for U.S. Appl. No. 15/405,122, dated Jul. 7, 2021, 4 pages.
Applicant-initiated Interview Summary received for U.S. Appl. No. 17/031,654, dated Feb. 1, 2021, 2 pages.
Intention to Grant received for European Patent Application No. 17810737.1, dated Jul. 5, 2021, 8 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Notice of Acceptance received for Australian Patent Application No. 2020239670, dated Jul. 2, 2021, 3 pages.
Notice of Acceptance received for Australian Patent Application No. 2021202836, dated Jun. 25, 2021, 3 pages.
Notice of Allowance received for Chinese Patent Application No. 201780033973.7, dated Jul. 7, 2021, 5 pages (1 page of English Translation and 4 pages of Official Copy).
Notice of Allowance received for Japanese Patent Application No. 2020-551465, dated Jun. 28, 2021, 4 pages (1 page of English Translation and 3 pages of Official Copy).
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Australian Patent Application No. 2019267413, dated Jun. 29, 2021, 3 pages.
Office Action received for Australian Patent Application No. 2020239774, dated Jun. 28, 2021, 8 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for European Patent Application No. 17810723.1, dated Jul. 9, 2021, 8 pages.
Office Action received for European Patent Application No. 20172197.4, dated Jul. 8, 2021, 5 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Wade Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Applicant-Initiated Interview Summary received for U.S. Appl. No. 16/935,002, dated Sep. 21, 2021, 4 pages.
Applicant-Initiated Interview Summary received for U.S. Appl. No. 17/031,765, dated Sep. 22, 2021, 5 pages.
Applicant-Initiated Interview Summary received for U.S. Appl. No. 17/068,386, dated Sep. 21, 2021, 2 pages.
Final Office Action received for U.S. Appl. No. 17/041,350, dated Sep. 17, 2021, 25 pages.
Supplemental Notice of Allowance received for U.S. Appl. No. 16/867,002, dated Sep. 9, 2021, 2 pages.
Applicant-Initiated Interview Summary received for U.S. Appl. No. 17/068,386, dated Jan. 13, 2022, 2 pages.
Final Office Action received for U.S. Appl. No. 16/861,651, dated Jan. 26, 2022, 16 pages.
Notice of Acceptance received for Australian Patent Application No. 2020239774, dated Jan. 5, 2022, 3 pages.

(56) References Cited

OTHER PUBLICATIONS

Notice of Allowance received for U.S. Appl. No. 16/859,101, dated Jan. 18, 2022, 10 pages.
Office Action received for European Patent Application No. 20729346.5, dated Jan. 17, 2022, 8 pages.
Office Action received for Japanese Patent Application No. 2020-159825 dated Dec. 10, 2021, 4 pages (2 pages of English Translation and 2 pages of Official Copy).
Office Action received for Japanese Patent Application No. 2020-562622, dated Jan. 7, 2022, 13 pages (6 pages of English Translation and 7 pages of Official Copy).
ILOVEX, "Stripe Generator", a tool that makes it easy to create striped materials, Online available at: https://www.ilovex.co.jp/blog/system/webconsulting/stripe-generator.html, May 2, 2012, 3 pages (Official Copy Only) See Communication Under 37 CFR § 1.98(a) (3).
Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) See Communication Under 37 CFR § 1.98(a) (3).
Corrected Notice of Allowance received for U.S. Appl. No. 16/418,786, dated Jan. 5, 2022, 3 pages.
Final Office Action received for U.S. Appl. No. 16/935,002, dated Jan. 5, 2022, 25 pages.
Office Action received for Japanese Patent Application No. 2020-159823, dated Dec. 23, 2021, 8 pages (4 pages of English Translation and 4 pages of Official Copy).
Office Action received for Korean Patent Application No. 10-2021-7036678, dated Dec. 22, 2021, 6 pages (2 pages of English Translation and 4 pages of Official Copy).
Applicant-Initiated Interview Summary received for U.S. Appl. No. 16/389,722, dated Feb. 18, 2022, 5 pages.
Office Action received for Australian Patent Application No. 2021202797, dated Feb. 4, 2022, 5 pages.
Office Action received for Chinese Patent Application No. 202110409273.1, dated Jan. 11, 2022, 11 pages (6 pages of English Translation and 5 pages of Official Copy).
Office Action received for Danish Patent Application No. PA202070624, dated Feb. 4, 2022, 4 pages.
Office Action received for Danish Patent Application No. PA202070625, dated Feb. 8, 2022, 2 pages.
Applicant-Initiated Interview Summary received for U.S. Appl. No. 17/041,350, dated Feb. 2, 2022, 2 pages.
Extended European Search Report received for European Patent Application No. 21206800.1, dated Jan. 24, 2022, 8 pages.
Final Office Action received for U.S. Appl. No. 16/943,737, dated Feb. 4, 2022, 24 pages.
Non-Final Office Action received for U.S. Appl. No. 17/373,163, dated Jan. 27, 2022, 14 pages.
Notice of Allowance received for Korean Patent Application No. 10-2021-7034748, dated Jan. 27, 2022, 6 pages (2 pages of English Translation and 4 pages of Official Copy).
Notice of Allowance received for U.S. Appl. No. 16/401,934, dated Feb. 2, 2022, 8 pages.
Office Action received for Australian Patent Application No. 2020239749, dated Jan. 21, 2022, 4 pages.
Supplemental Notice of Allowance received for U.S. Appl. No. 16/859,101, dated Feb. 7, 2022, 2 pages.
Applicant-Initiated Interview Summary received for U.S. Appl. No. 16/861,651, dated Dec. 29, 2021, 5 pages.
Applicant-Initiated Interview Summary received for U.S. Appl. No. 17/031,765, dated Dec. 15, 2021, 4 pages.
Corrected Notice of Allowance received for U.S. Appl. No. 16/401,934, dated Dec. 23, 2021, 3 pages.
Decision on Appeal received for U.S. Appl. No. 14/846,511, dated Dec. 29, 2021, 20 pages.
Intention to Grant received for European Patent Application No. 16762356.0, dated Dec. 23, 2021, 8 pages.
Minutes of Oral Proceedings received for European Patent Application No. 16762356.0, mailed on Dec. 17, 2021, 5 pages.
Non-Final Office Action received for U.S. Appl. No. 15/421,865, dated Dec. 29, 2021, 23 pages.
Non-Final received for U.S. Appl. No. 17/078,896, dated Dec. 24, 2021, 17 pages.
Notice of Acceptance received for Australian Patent Application No. 2020269232, dated Dec. 16, 2021, 3 pages.
Office Action received for Australian Patent Application No. 2020250323, dated Dec. 14, 2021, 2 pages.
Office Action received for Chinese Patent Application No. 201910055588.3, dated Nov. 24, 2021, 24 pages (14 pages of English Translation and 10 pages of Official Copy).
Office Action received for Chinese Patent Application No. 202110454541.1, dated Oct. 20, 2021, 19 pages (10 pages of English Translation and 9 pages of Official Copy).
Office Action received for Indian Patent Application No. 202017041557, dated Dec. 8, 2021, 8 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-7036246, dated Nov. 26, 2021, 5 pages (2 pages of English Translation and 3 pages of Official Copy).
Decision to Grant received for European Patent Application No. 15730925.3, dated Dec. 9, 2021, 2 pages.
Final Office Action received for U.S. Appl. No. 16/389,722, dated Dec. 6, 2021, 19 pages.
Invitation to Pay Search Fees received for European Patent Application No. 20761084.1, dated Dec. 7, 2021, 3 pages.
Notice of Acceptance received for Australian Patent Application No. 2019267413, dated Nov. 23, 2021, 3 pages.
Notice of Allowance received for U.S. Appl. No. 16/418,786, dated Dec. 9, 2021, 9 pages.
Office Action received for Chinese Patent Application No. 202110453180.9, dated Nov. 8, 2021, 21 pages (11 pages of English Translation and 10 pages of Official Copy).
Result of Consultation received for European Patent Application No. 16762356.0, dated Nov. 29, 2021, 3 pages.
Applicant Initiated Interview Summary received for U.S. Appl. No. 16/859,101, dated Nov. 30, 2021, 2 pages.
Applicant Initiated Interview Summary received for U.S. Appl. No. 17/031,671, dated Nov. 8, 2021, 5 pages.
Decision to Grant received for European Patent Application No. 17810737.1, dated Nov. 11, 2021, 2 pages.
Examiner-Initiated Interview Summary received for U.S. Appl. No. 16/859,101, dated Dec. 1, 2021, 2 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
Final Office Action received for U.S. Appl. No. 15/405,122, dated Nov. 5, 2021, 45 pages.
Final Office Action received for U.S. Appl. No. 17/031,765, dated Oct. 29, 2021, 34 pages.
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.
International Search Report and Written Opinion received for PCT Patent Application No. PCT/US2021/031212, dated Sep. 21, 2021, 21 pages.
International Search Report and Written Opinion received for PCT Patent Application No. PCT/US2021/031669, dated Oct. 13, 2021, 17 pages.
Invitation to Pay Additional Fees received for PCT Patent Application No. PCT/US2021/031669, dated Aug. 19, 2021, 9 pages.

(56) References Cited

OTHER PUBLICATIONS

Non-Final Office Action received for U.S. Appl. No. 16/418,786, dated Oct. 4, 2021, 10 pages.
Non-Final Office Action received for U.S. Appl. No. 16/861,651, dated Sep. 30, 2021, 16 pages.
Non-Final Office Action received for U.S. Appl. No. 17/068,386, dated Oct. 28, 2021, 20 pages.
Non-Final Office Action received for U.S. Appl. No. 17/317,042, dated Nov. 10, 2021, 13 pages.
Notice of Allowance received for Chinese Patent Application No. 201910906898.1, dated Oct. 28, 2021, 4 pages (1 page of English Translation and 3 pages of Official Copy).
Notice of Allowance received for Korean Patent Application No. 10-2020-7028759, dated Oct. 19, 2021, 4 pages (1 page of English Translation and 3 pages of Official Copy).
Notice of Allowance received for U.S. Appl. No. 16/401,934, dated Nov. 1, 2021, 11 pages.
Notice of Allowance received for U.S. Appl. No. 17/087,845, dated Oct. 28, 2021, 9 pages.
Office Action received for Australian Patent Application No. 2020239774, dated Oct. 5, 2021, 3 pages.
Office Action received for Chinese Patent Application No. 202110194015.6, dated Sep. 28, 2021, 13 pages (6 pages of English Translation and 7 pages of Official Copy).
Office Action received for Japanese Patent Application No. 2020-124605, dated Sep. 3, 2021, 5 pages (2 pages of English Translation and 3 pages of Official Copy).
Office Action received for Korean Patent Application No. 10-2021-7025301, dated Oct. 15, 2021, 5 pages (2 pages of English Translation and 3 pages of Official Copy).
Office Action received for Korean Patent Application No. 10-2021-7036016, dated Nov. 10, 2021, 13 pages (6 pages of English Translation and 7 pages of Official Copy).
Notice of Allowance received for Korean Patent Application No. 10-2021-7036246, dated Mar. 2, 2022, 5 pages (1 page of English Translation and 4 pages of Official Copy).
Applicant-Initiated Interview Summary received for U.S. Appl. No. 15/405,122, dated Mar. 1, 2022, 4 pages.
Applicant-Initiated Interview Summary received for U.S. Appl. No. 15/421,865, dated Feb. 28, 2022, 5 pages.
Corrected Notice of Allowance received for U.S. Appl. No. 16/401,934, dated Feb. 28, 2022, 3 pages.
Final Office Action received for U.S. Appl. No. 17/068,386, dated Mar. 3, 2022, 29 pages.
Notice of Allowance received for Chinese Patent Application No. 201910055588.3, dated Mar. 2, 2022, 2 pages (1 page of English Translation and 1 page of Official Copy).
Notice of Allowance received for U.S. Appl. No. 16/867,002, dated Mar. 1, 2022, 7 pages.
Notice of Allowance received for U.S. Appl. No. 17/041,350, dated Feb. 24, 2022, 6 pages.
Notice of Allowance received for U.S. Appl. No. 17/087,845, dated Mar. 3, 2022, 9 pages.
Office Action received for Japanese Patent Application No. 2021-023661, dated Feb. 25, 2022, 6 pages (3 pages of English Translation and 3 pages of Official Copy).
Supplemental Notice of Allowance received for U.S. Appl. No. 16/859,101, dated Feb. 25, 2022, 2 pages.

\* cited by examiner

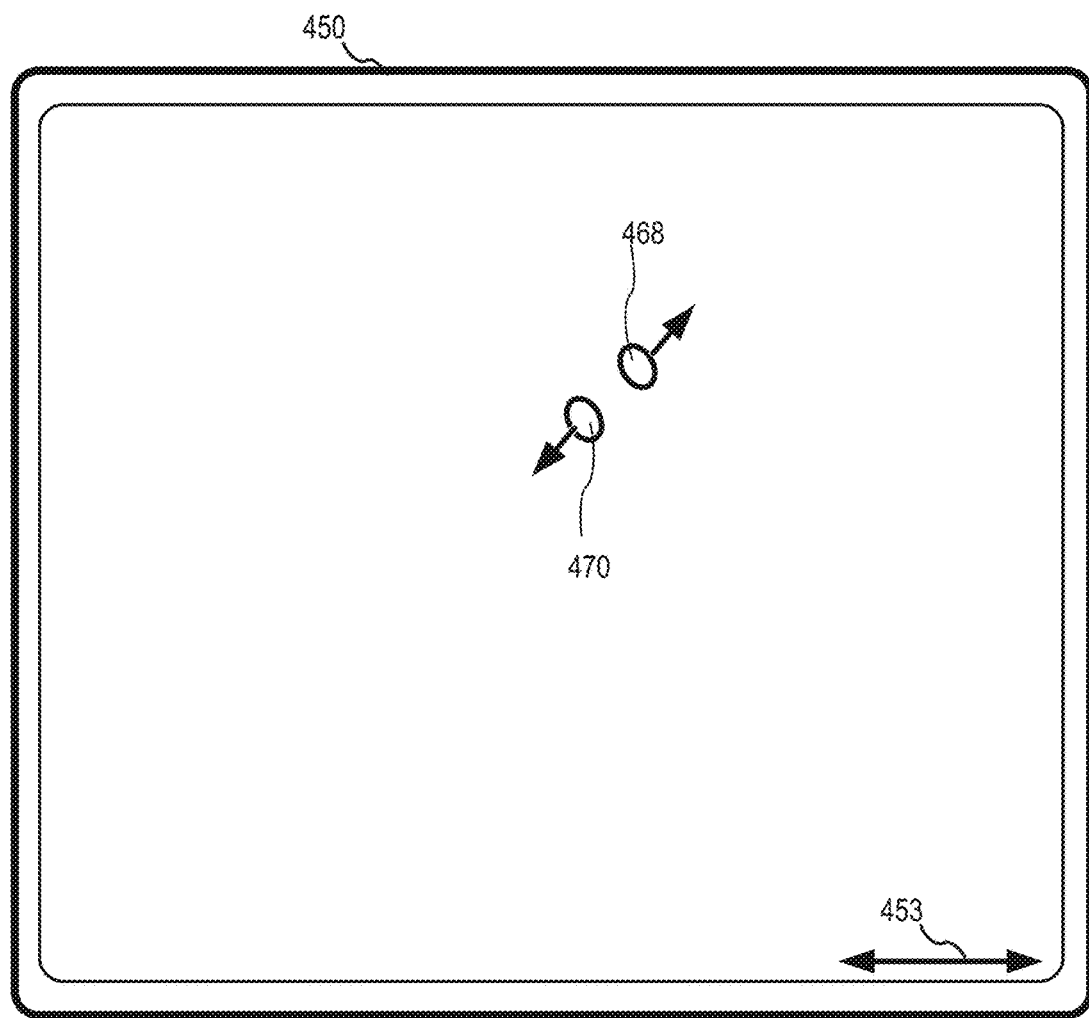
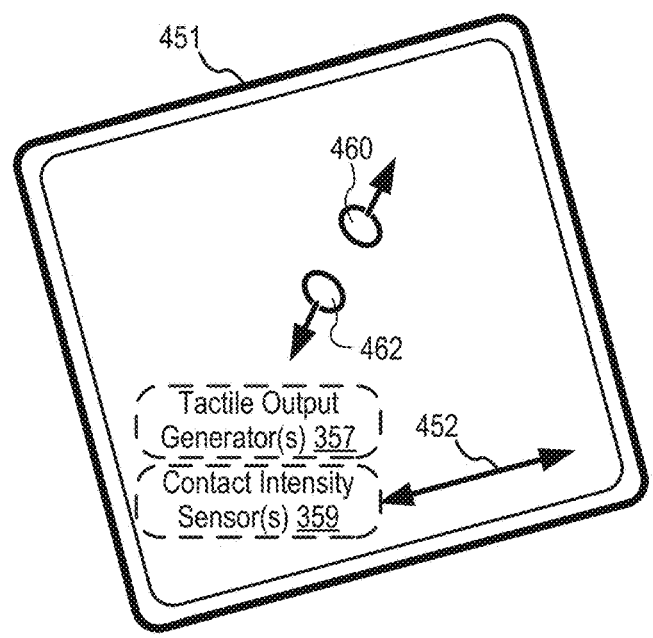
*FIG. 4B*

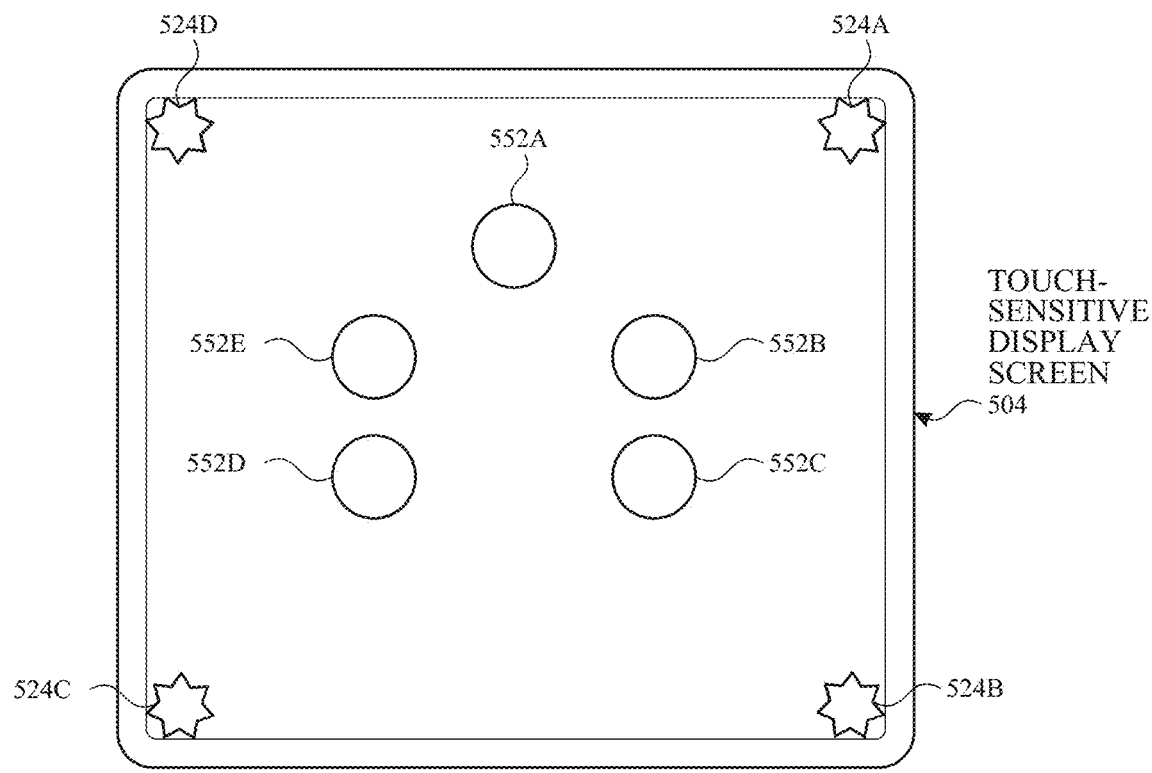
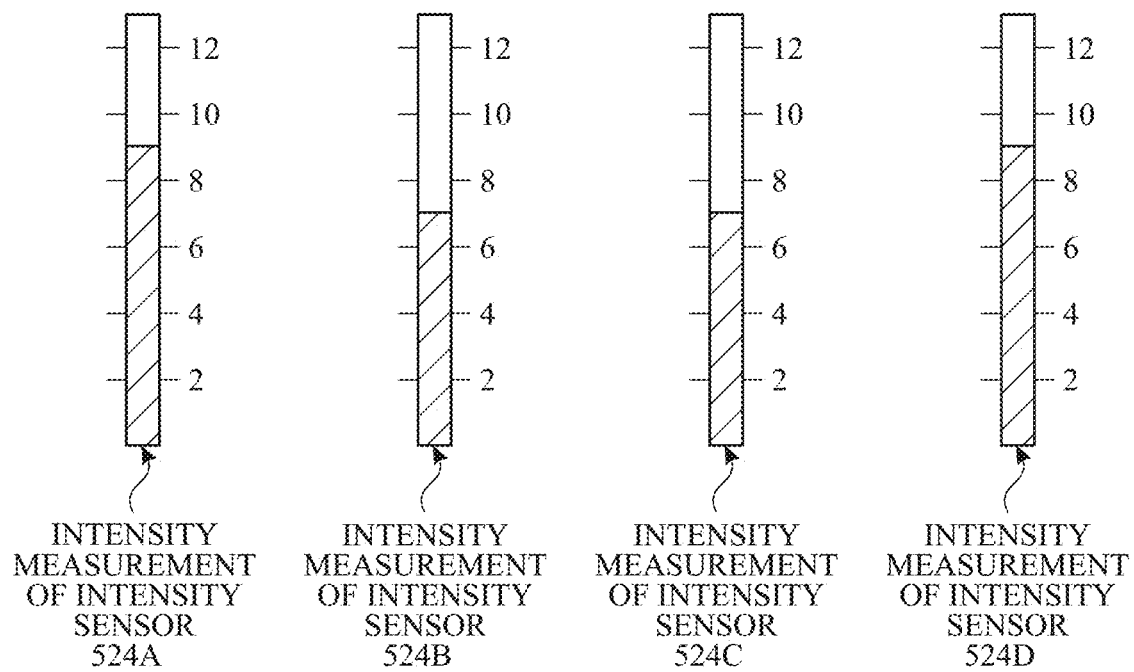
*FIG. 5C*

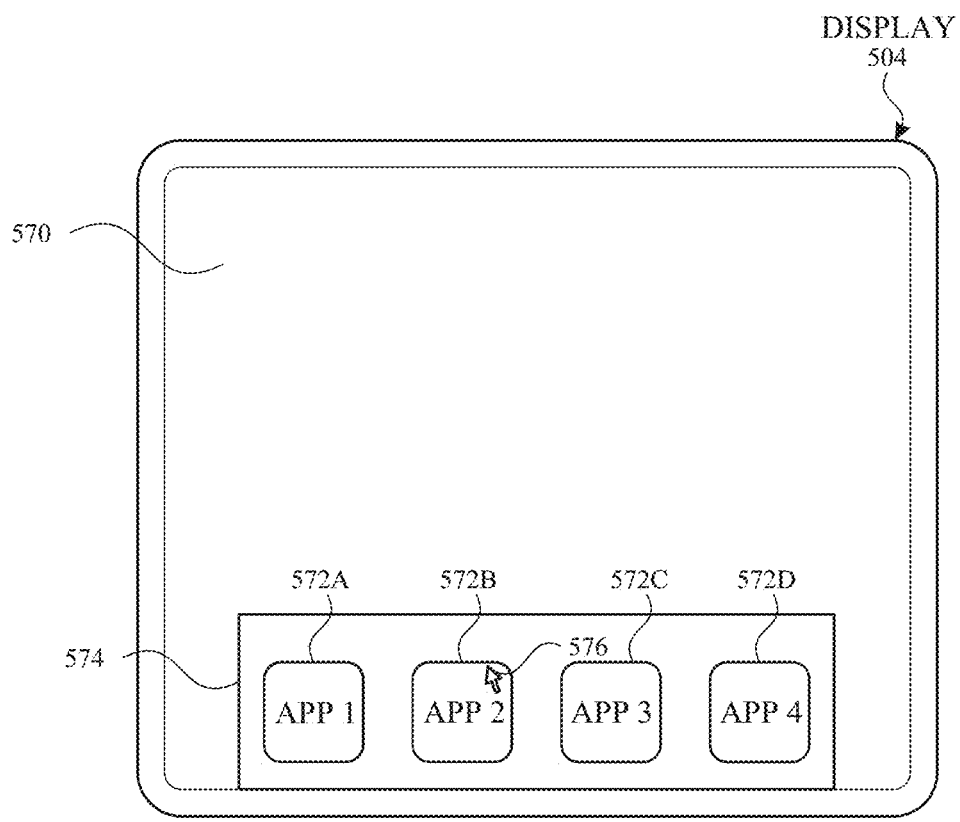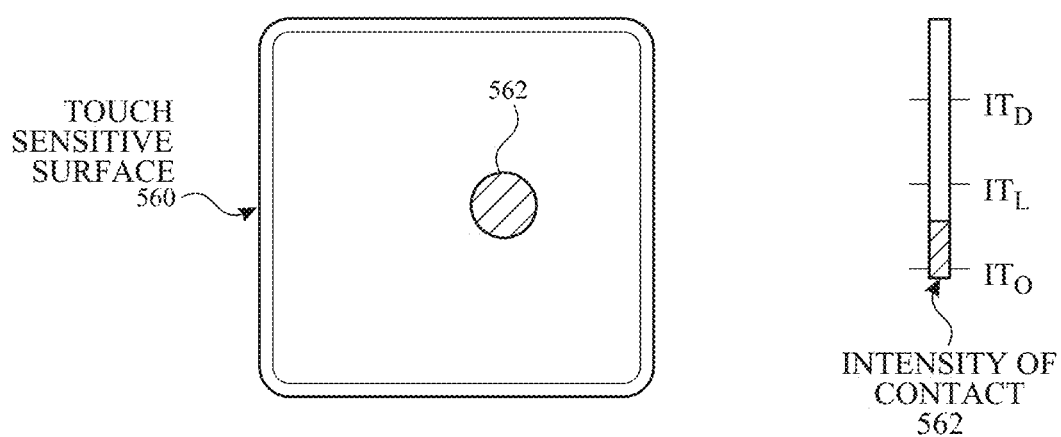
FIG. 5E

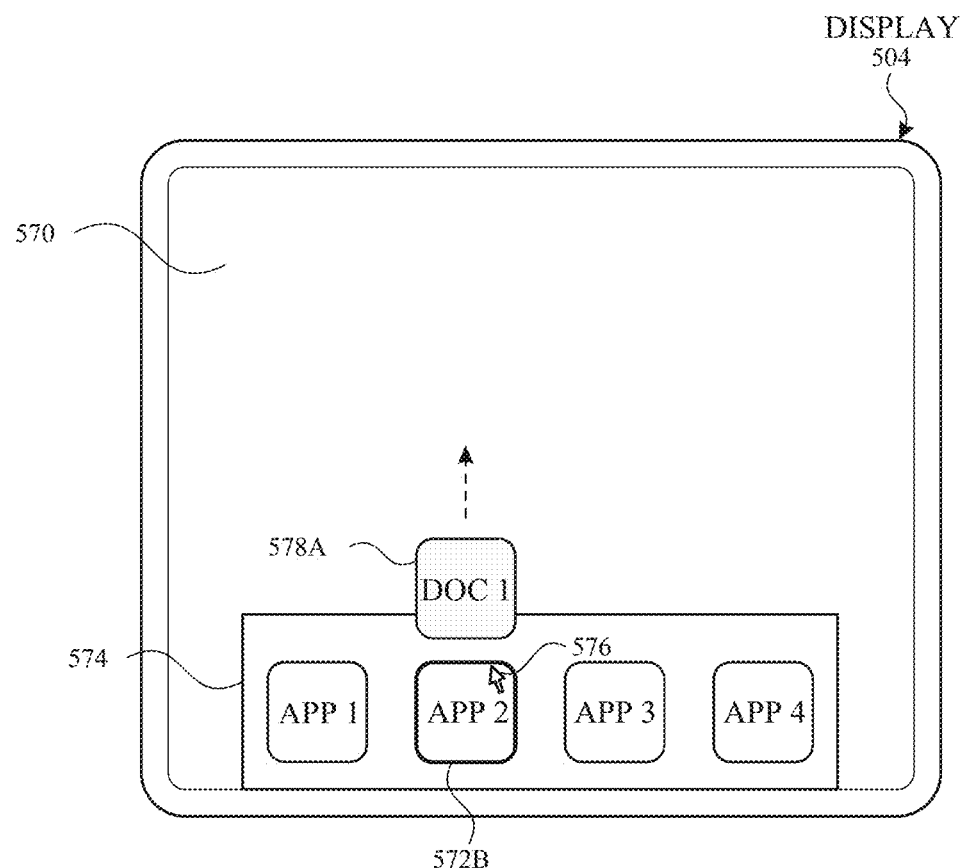
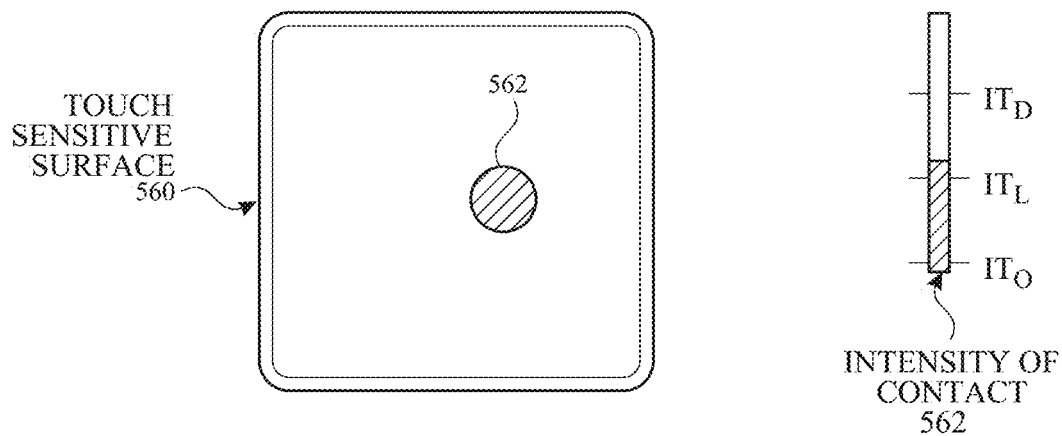
*FIG. 5F*

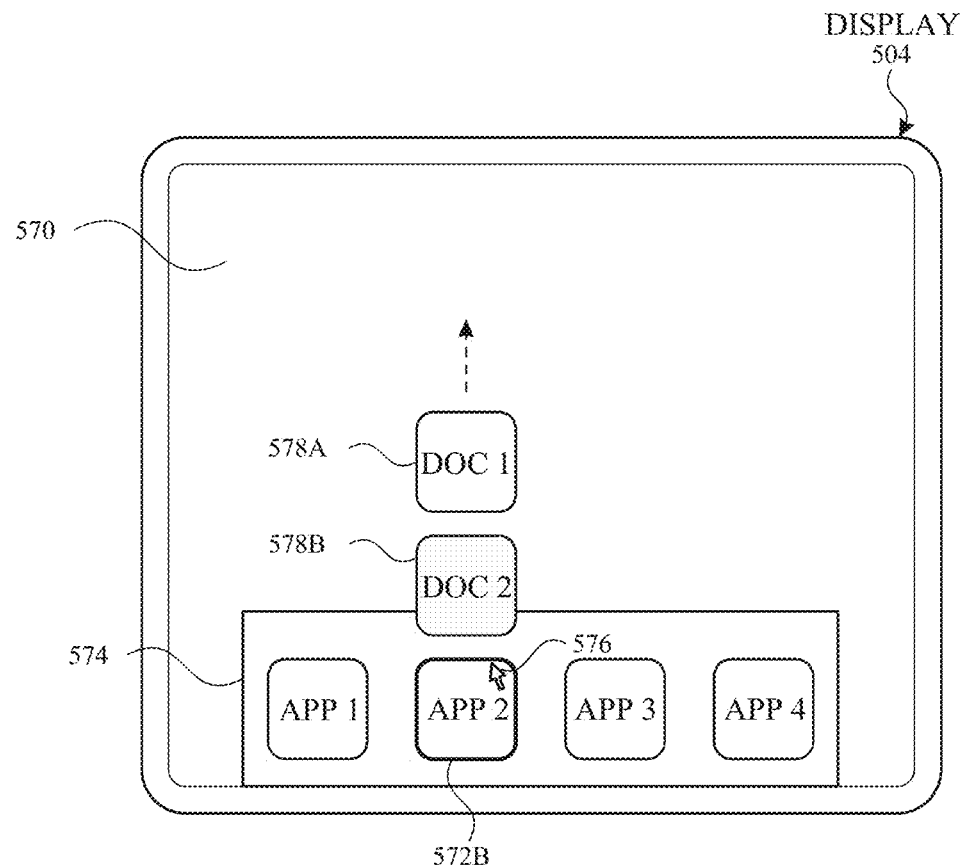
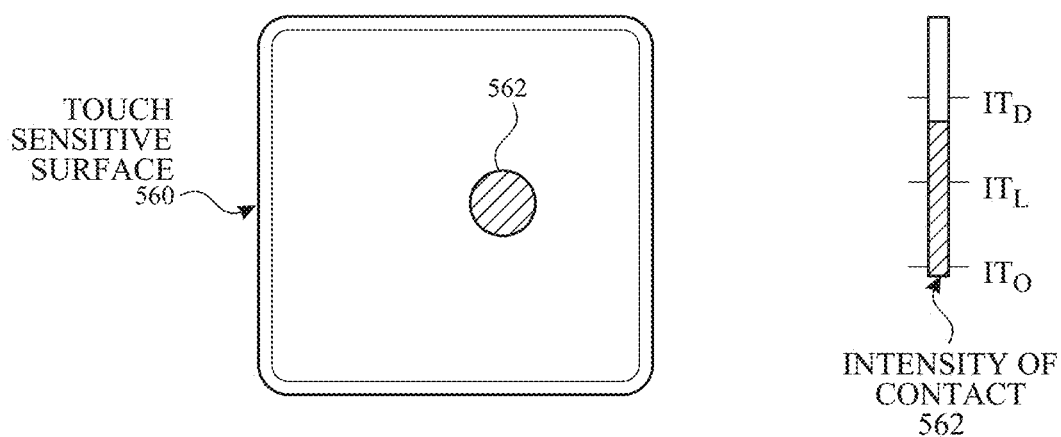
*FIG. 5G*

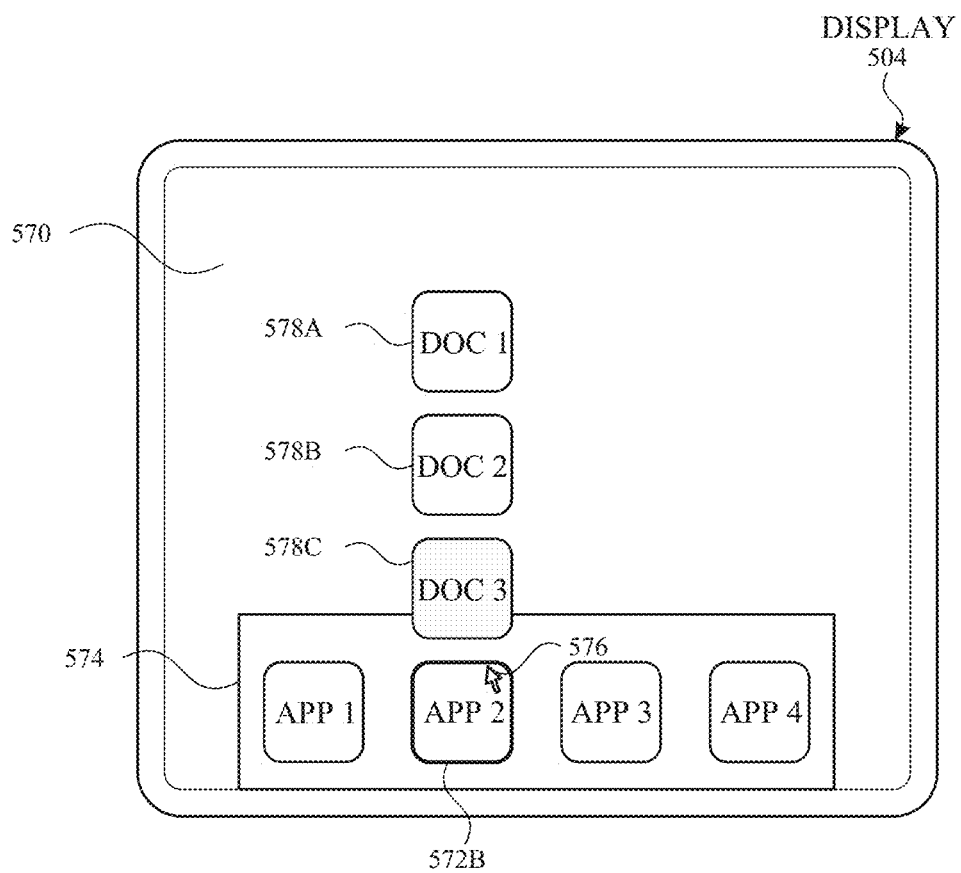
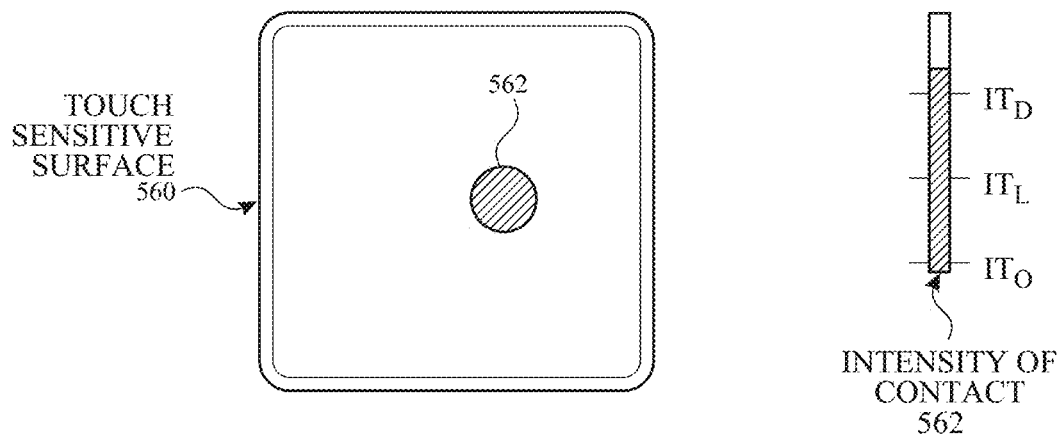
*FIG. 5H*

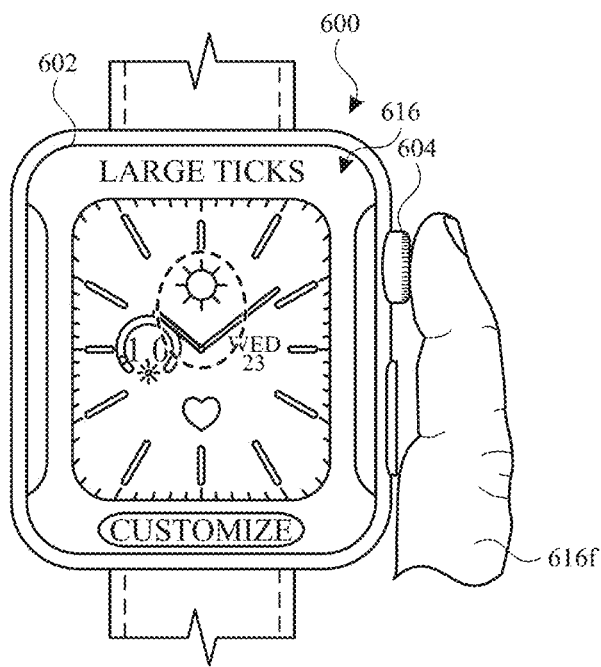
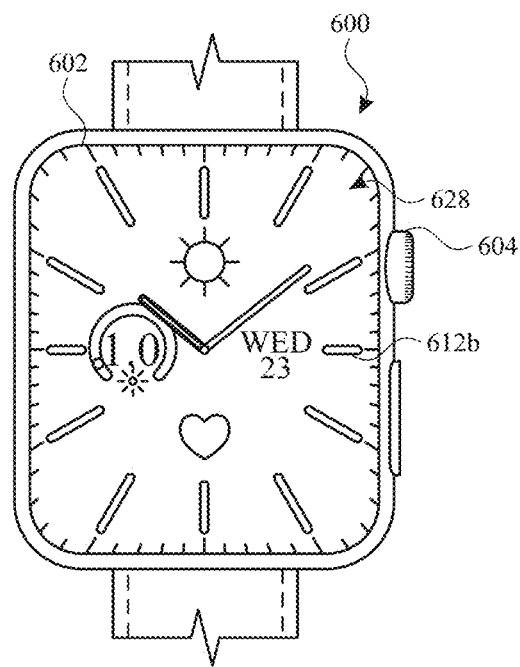
FIG. 6I
FIG. 6J

700 ↘

702
Receive a request to display a clock face that includes a plurality of analog-dial graphical elements corresponding to respective units of time.

704
In response to receiving the request to display the clock face:

706
In accordance with a determination that a respective graphical element is to be displayed at a respective location on the clock face, display the clock face with the plurality of analog-dial graphical elements, where the plurality of analog-dial graphical elements includes a first analog-dial graphical element that occupies a first position and has a first size while the respective graphical element is displayed at the respective location on the clock face.

708
In accordance with a determination that the respective graphical element is not to be displayed at a respective location on the clock face, display the clock face with the plurality of analog-dial graphical elements, where the first analog-dial graphical element of the plurality of analog-dial graphical elements occupies a second position different from the first position and/or has a second size different from the first size.

*FIG. 7*

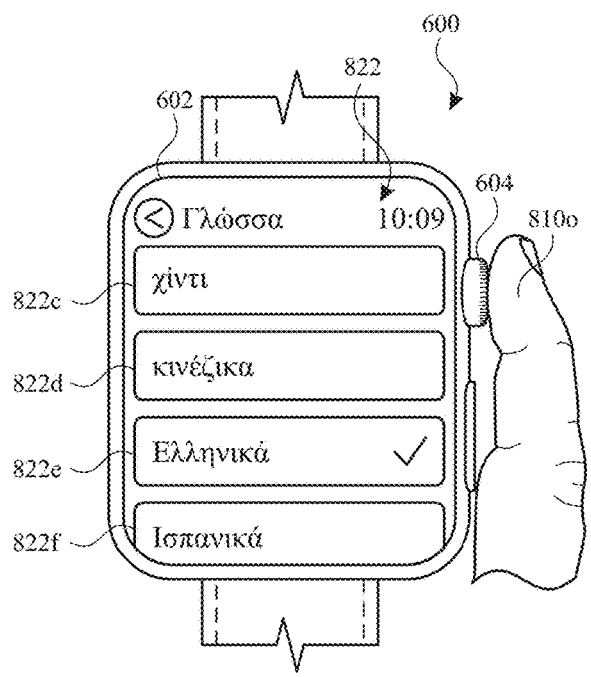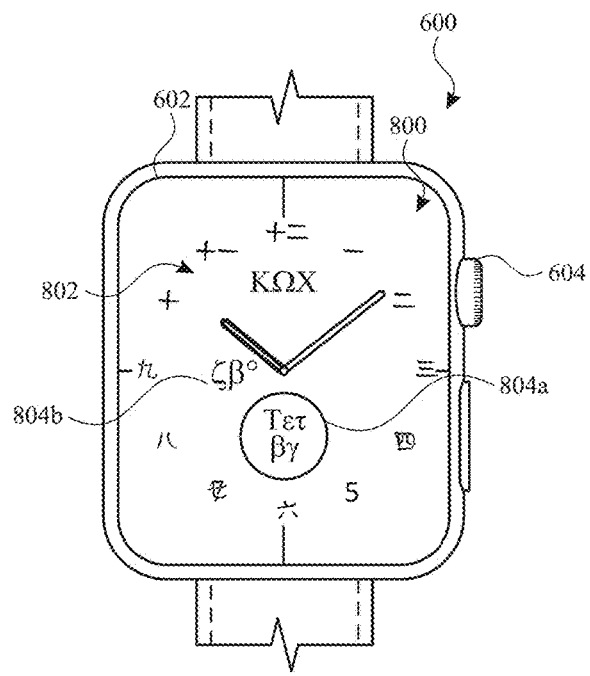
*FIG. 8P*  *FIG. 8Q*

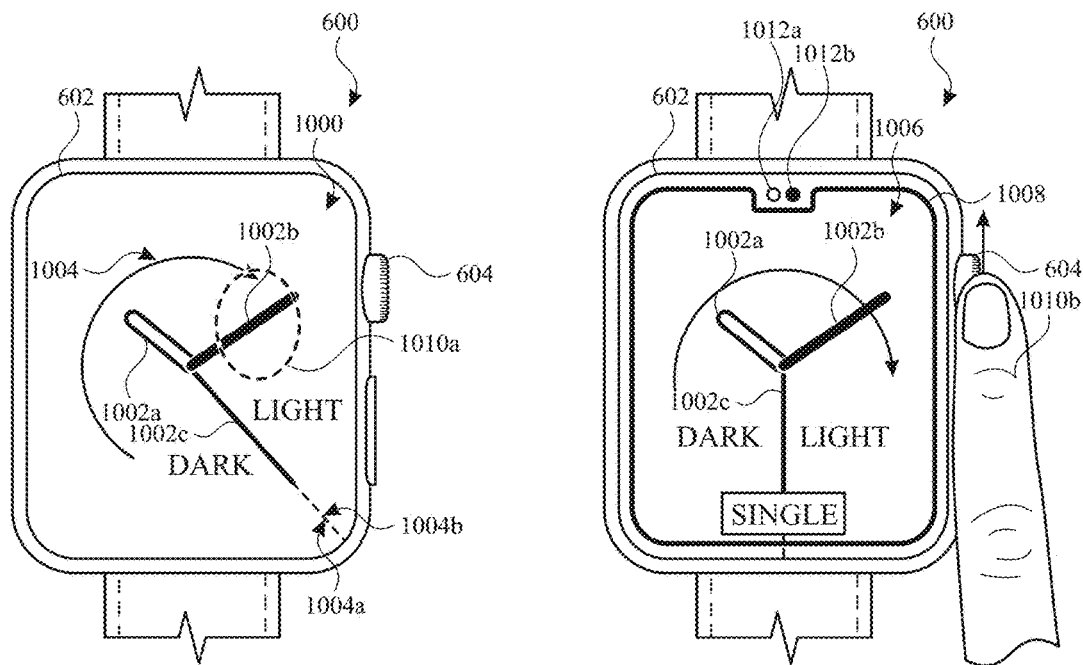
FIG. 10A  FIG. 10B
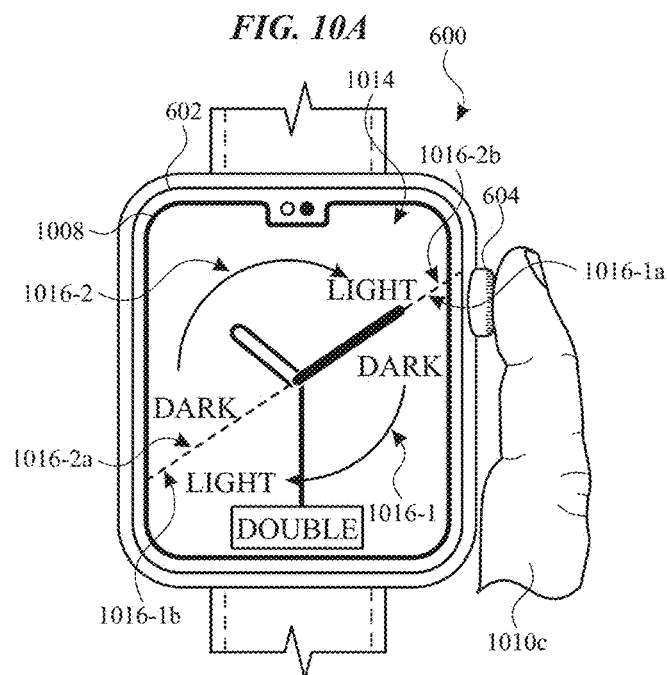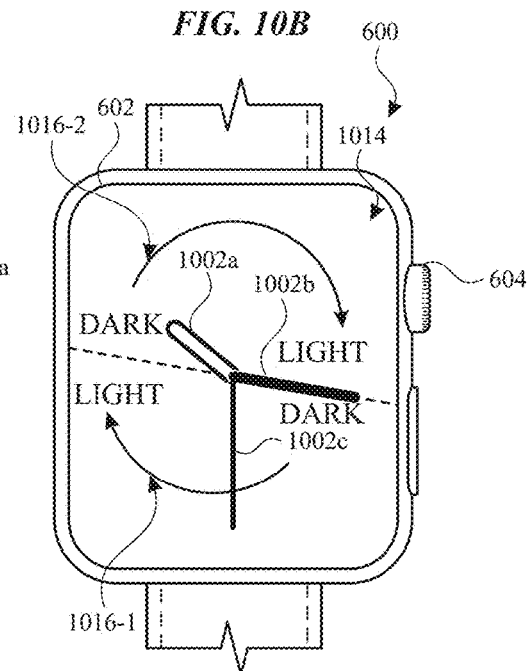
FIG. 10C  FIG. 10D

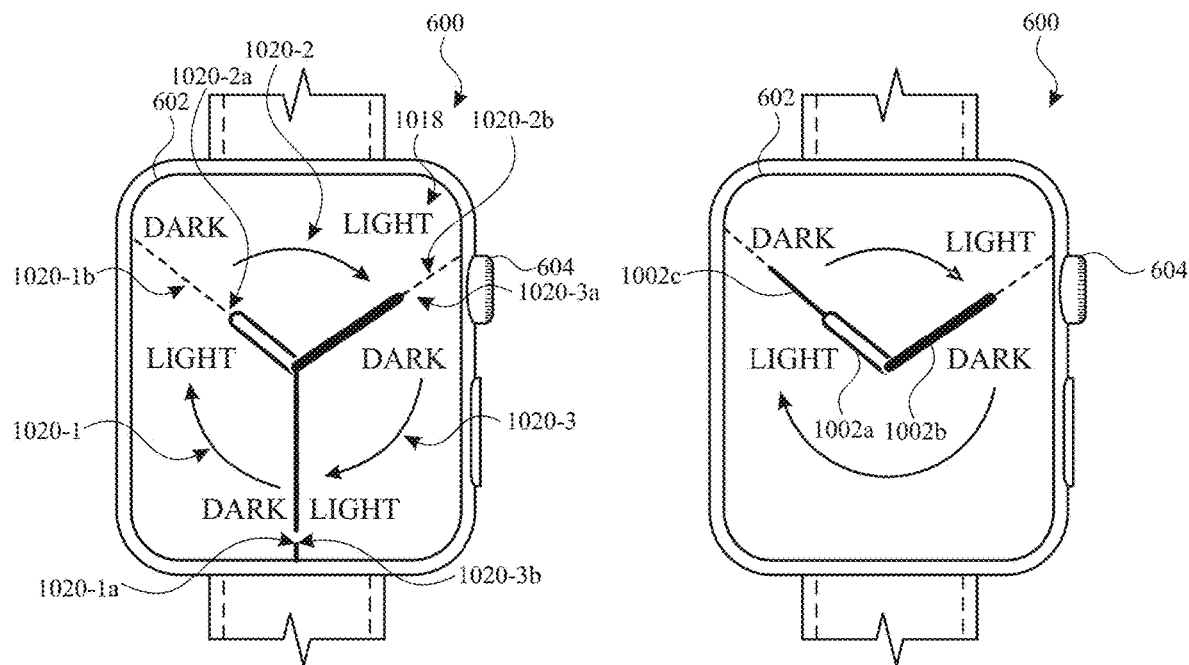
*FIG. 10E*    *FIG. 10F*
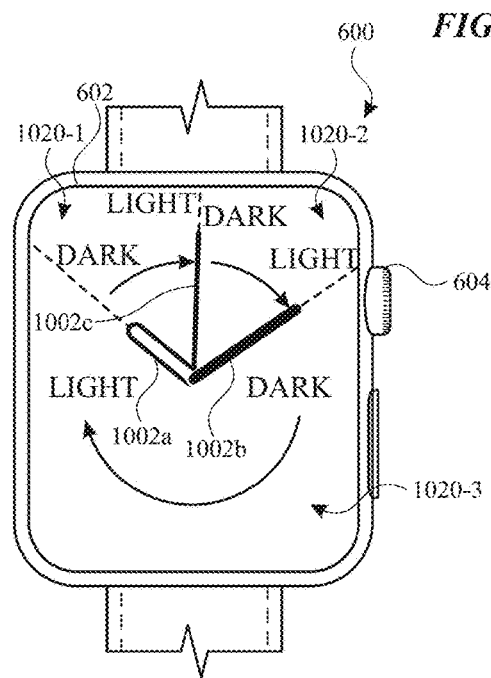
*FIG. 10G*

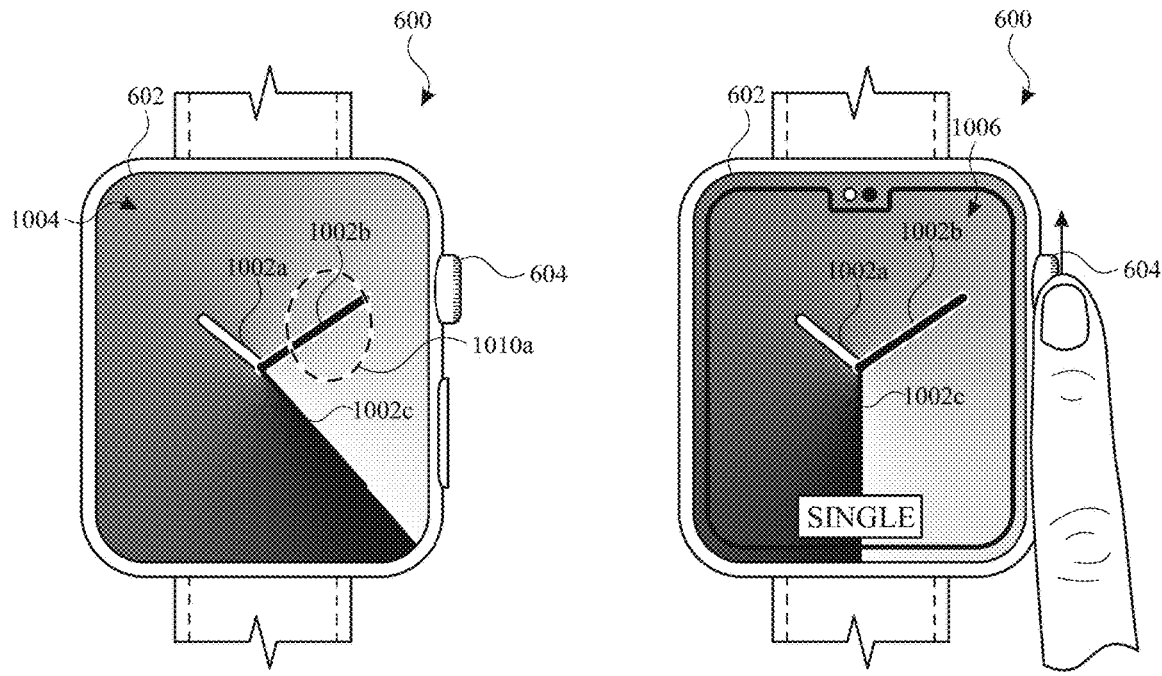
FIG. 10H    FIG. 10I
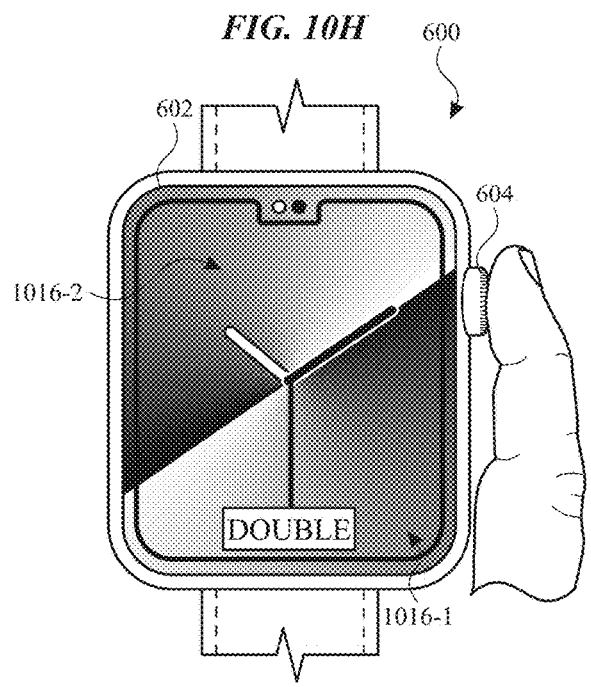 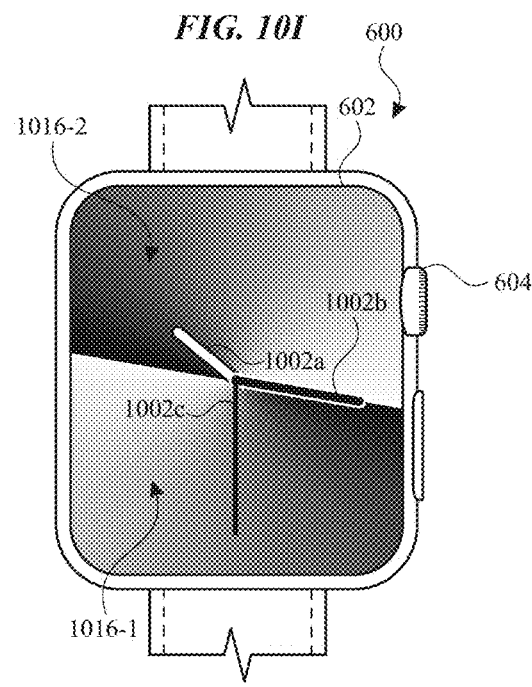
FIG. 10J    FIG. 10K

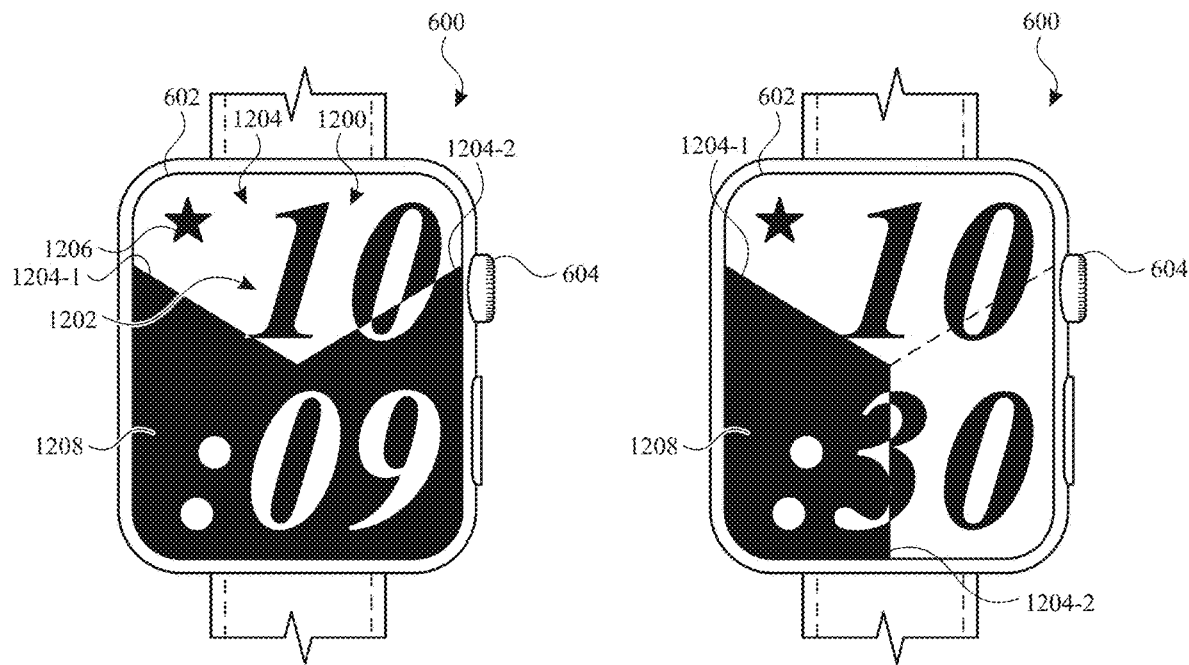
FIG. 12A
FIG. 12B
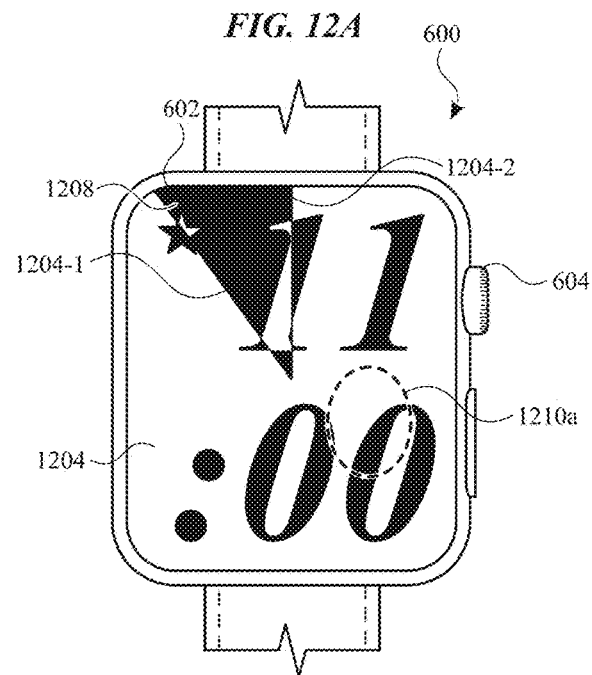
FIG. 12C
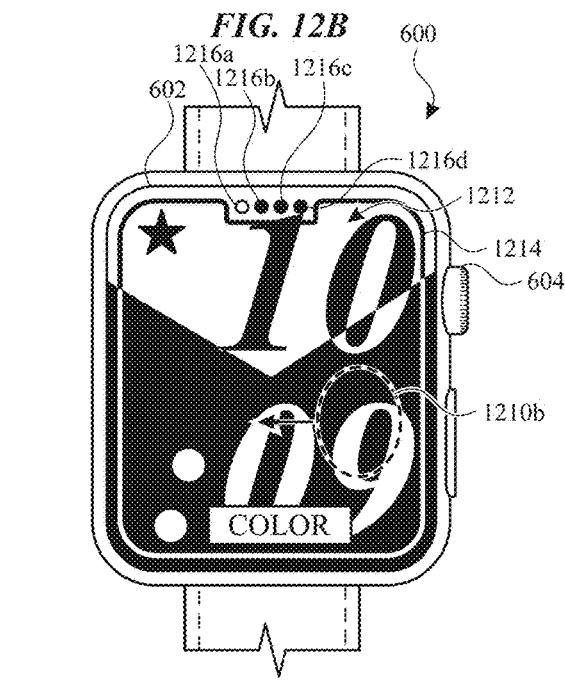
FIG. 12D

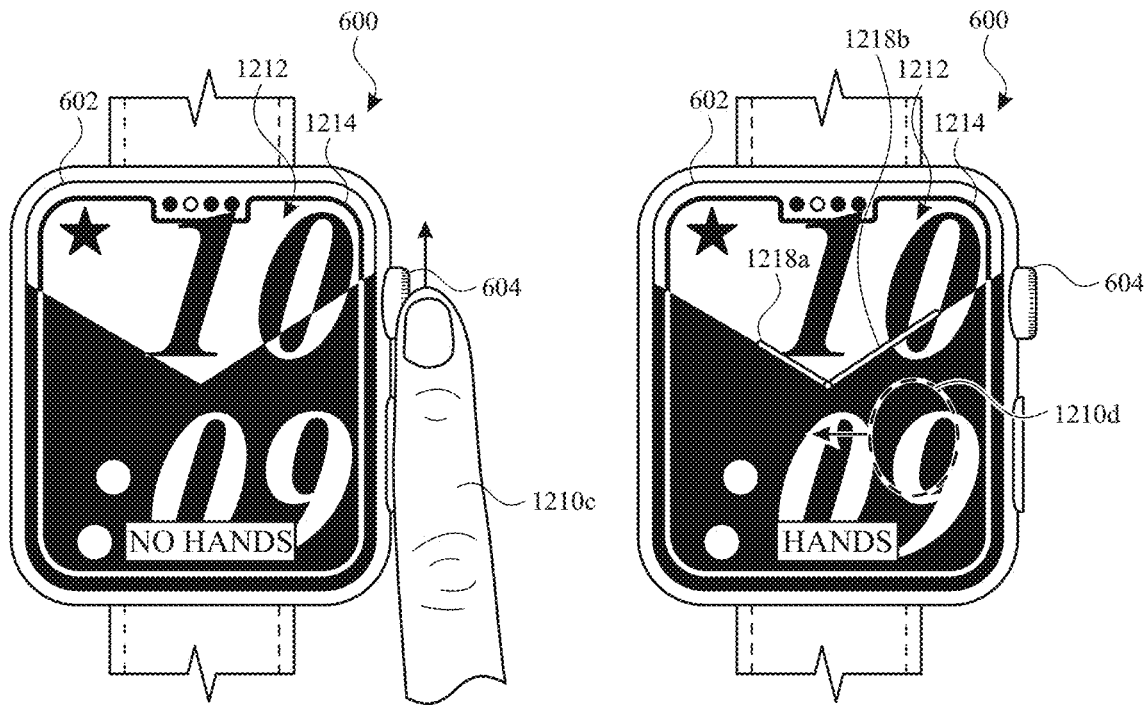
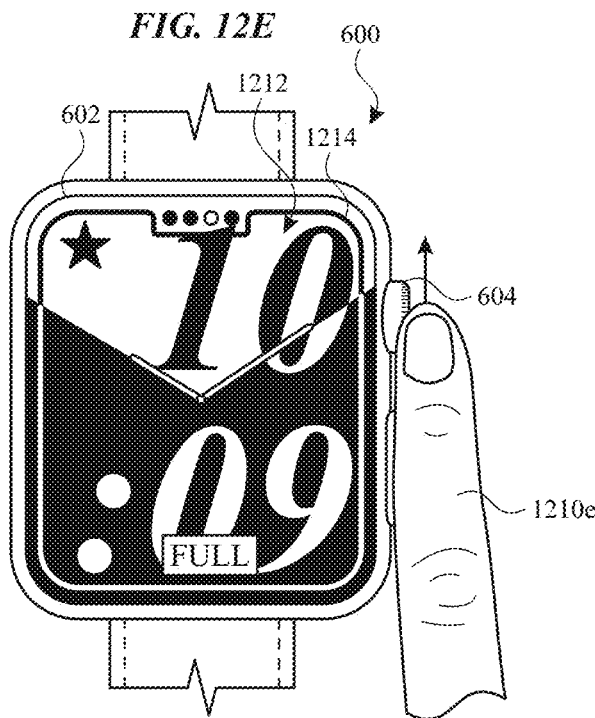
FIG. 12E
FIG. 12F
FIG. 12G
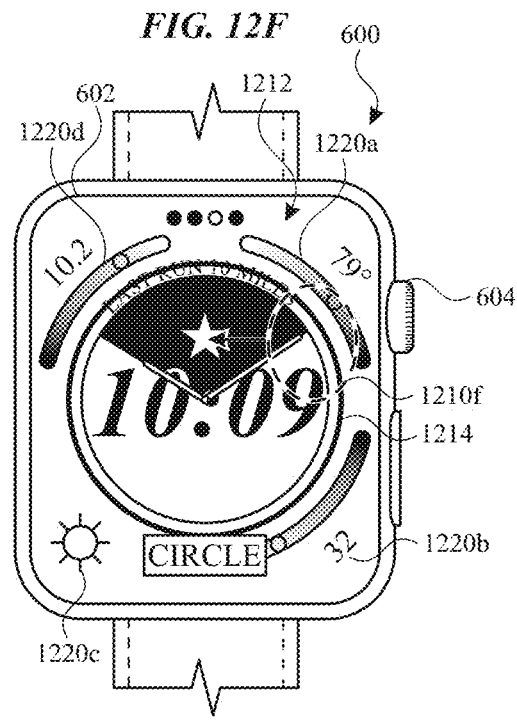
FIG. 12H

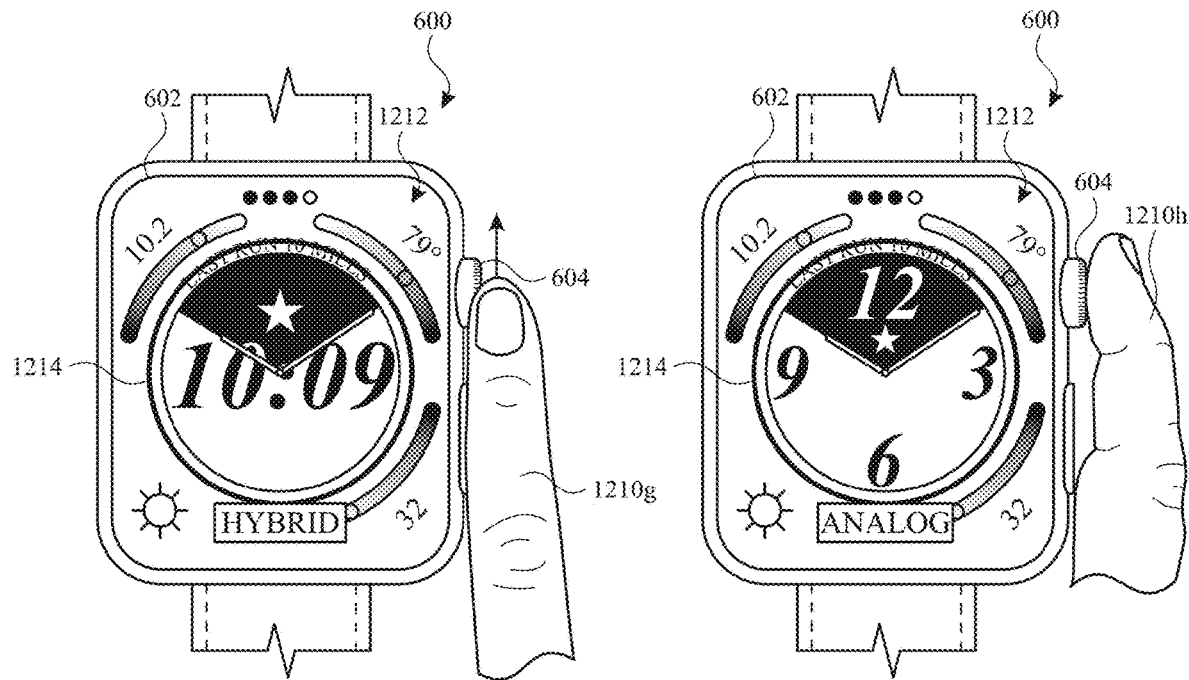
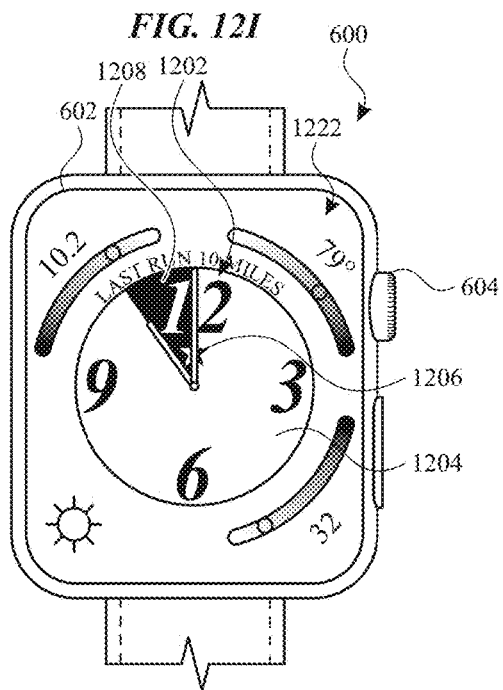
FIG. 12K
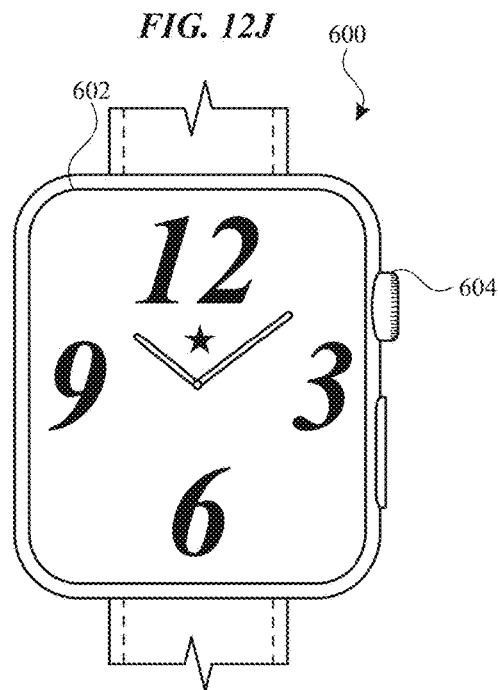
FIG. 12L

1300

1302
Receive a request to display a clock face.

1304
In response to receiving the request to display the clock face:

1306
In accordance with a determination that a current time is a first time, display a clock face that includes a digital indication of time indicating the first time and a segment that includes a first edge at a first position indicating a first unit of time of the first time and a second edge at a second position indicating a second unit of time of the first time.

1308
In accordance with a determination that a current time is a second time different from the first time, display the clock face, including the digital indication of time indicating the second time and the segment with the first edge at a third position indicating a first unit of time of the second time and the second edge at a fourth position indicating a second unit of time of the second time.

*FIG. 13*

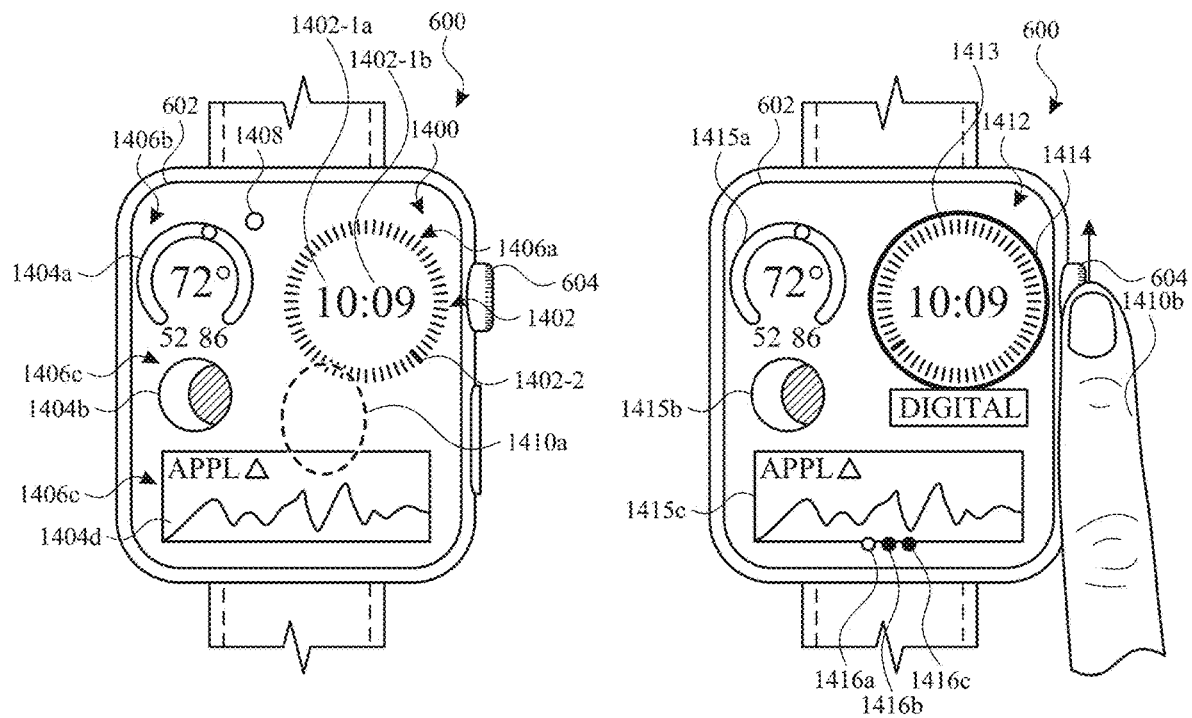
*FIG. 14A*  *FIG. 14B*
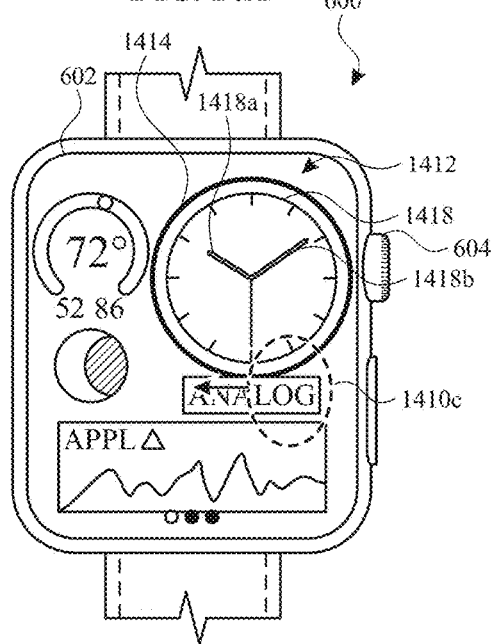  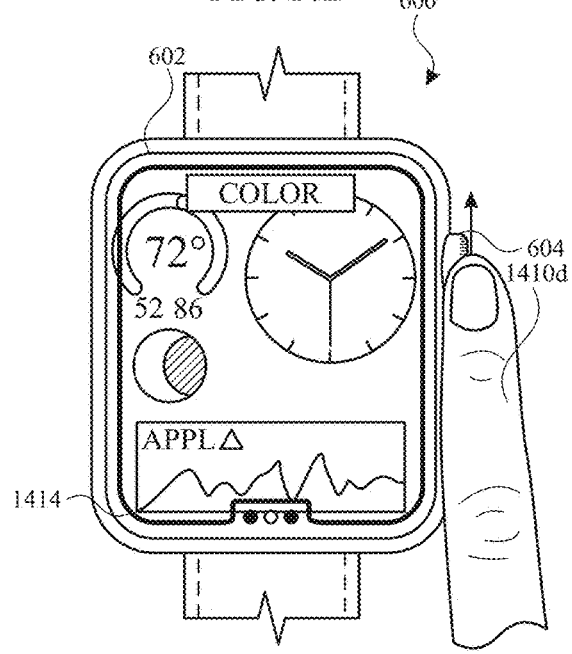
*FIG. 14C*  *FIG. 14D*

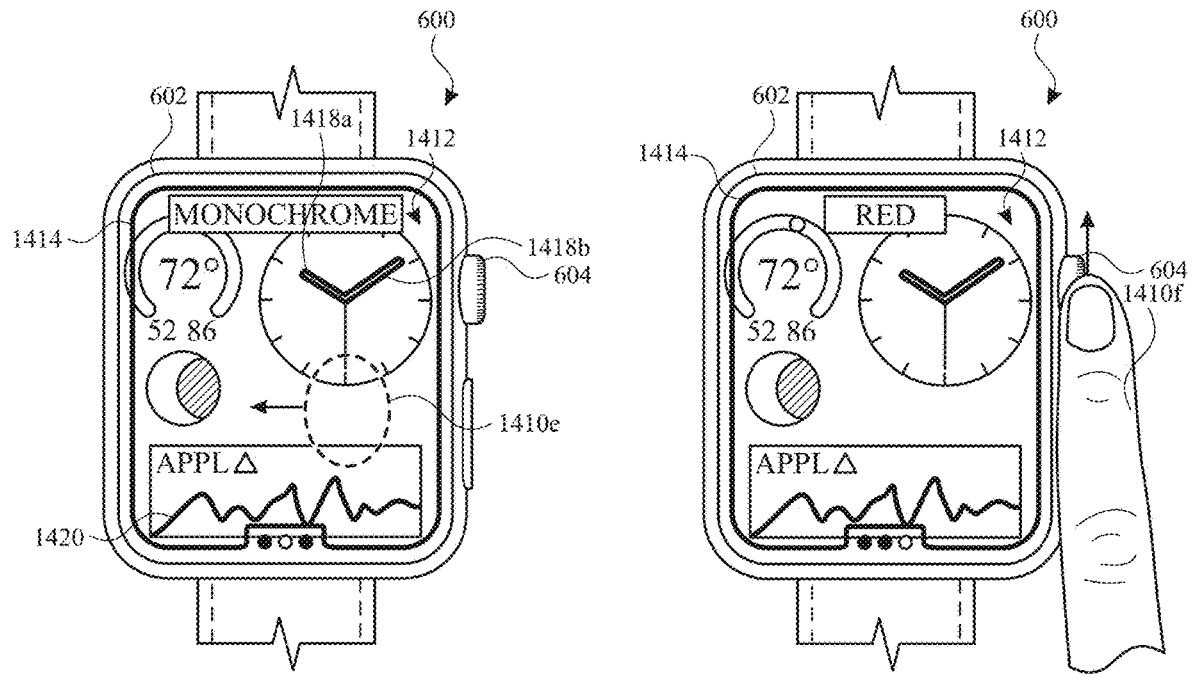
FIG. 14E  FIG. 14F
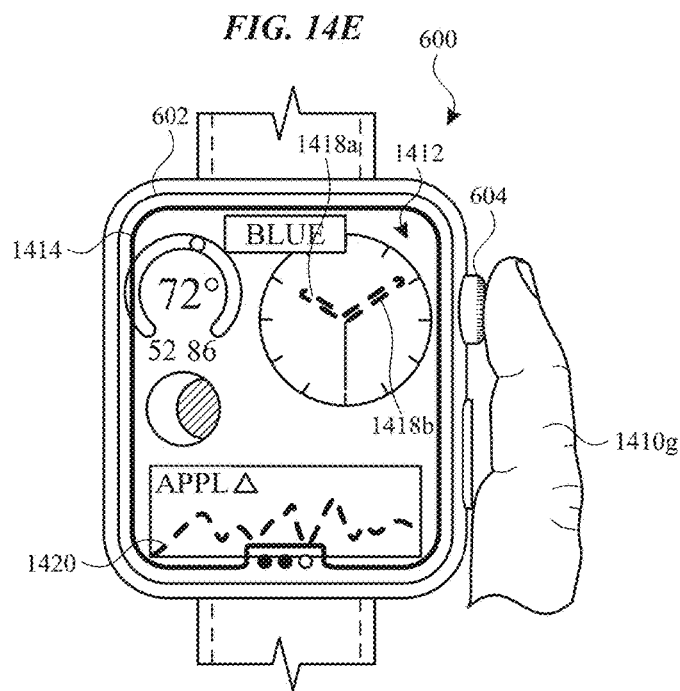 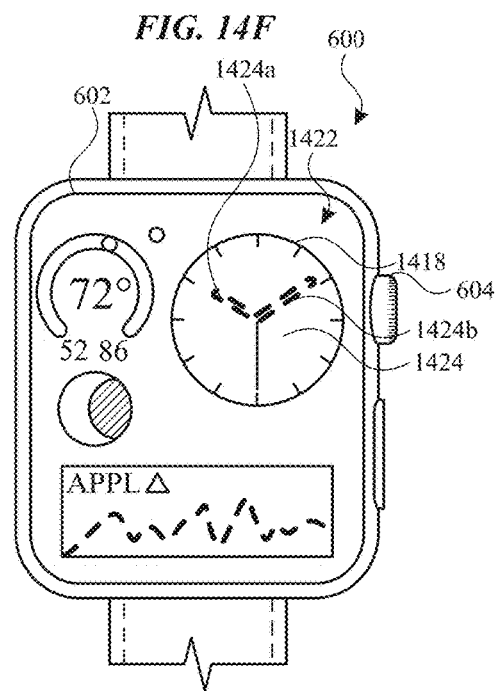
FIG. 14G  FIG. 14H

1500

1502
Display a first clock face with a respective layout including a first indication of time presented according to a first format at a first location in the respective layout and a first complication at a second location in the respective layout.

1504
Detect a sequence of one or more inputs corresponding to a request to edit the first clock face.

1506
In response to detecting the sequence of one or more inputs corresponding to a request to edit the first clock face, display a second clock face with the respective layout including a second indication of time, presented according to a second format different from the first format at the first location in the respective layout, and the first complication at the second location in the respective layout.

*FIG. 15*

CLOCK FACES FOR AN ELECTRONIC DEVICE

CROSS-REFERENCE TO RELATED APPLICATIONS

This application is a continuation of U.S. patent application Ser. No. 16/585,399, entitled "CLOCK FACES FOR AN ELECTRONIC DEVICE", filed on Sep. 27, 2019, which claims priority to U.S. Patent Application Ser. No. 62/844,108, entitled "CLOCK FACES FOR AN ELECTRONIC DEVICE", filed on May 6, 2019, and U.S. Patent Application Ser. No. 62/856,038, entitled "CLOCK FACES FOR AN ELECTRONIC DEVICE", filed on Jun. 1, 2019, the contents of all of which are hereby incorporated by reference in their entirety.

FIELD

The present disclosure relates generally to computer user interfaces, and more specifically to clock faces for electronic devices.

BACKGROUND

Users rely on portable multifunction devices for a variety of operations, including telling time. Such users may want to be provided with a current time along with other context-specific information.

BRIEF SUMMARY

Some techniques for presenting and interacting with clock faces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for presenting and interacting with clock faces. Such methods and interfaces optionally complement or replace other methods for presenting and interacting with clock faces. Such methods and interfaces reduce the cognitive burden on a user and produce a more efficient human-machine interface. For battery-operated computing devices, such methods and interfaces conserve power and increase the time between battery charges.

In some embodiments, a method comprises: at an electronic device with a display device: receiving a request to display a clock face that includes a plurality of analog-dial graphical elements corresponding to respective units of time; and in response to receiving the request to display the clock face: in accordance with a determination that a respective graphical element is to be displayed at a respective location on the clock face, displaying, via the display device, the clock face, the clock face including the plurality of analog-dial graphical elements corresponding to respective units of time, the plurality of analog-dial graphical elements including a first analog-dial graphical element that occupies a first position and has a first size while the respective graphical element is displayed at the respective location on the clock face; and in accordance with a determination that the respective graphical element is not to be displayed at a respective location on the clock face, displaying, via the display device, the clock face, the clock face including the plurality of analog-dial graphical elements corresponding to the respective units of time, the first analog-dial graphical element of the plurality of analog-dial graphical elements occupying a second position different from the first position and/or having a second size different from the first size.

In some embodiments, a non-transitory computer-readable storage medium stores one or more programs configured to be executed by one or more processors of an electronic device with a display device, the one or more programs including instructions for: receiving a request to display a clock face that includes a plurality of analog-dial graphical elements corresponding to respective units of time; and in response to receiving the request to display the clock face: in accordance with a determination that a respective graphical element is to be displayed at a respective location on the clock face, displaying, via the display device, the clock face, the clock face including the plurality of analog-dial graphical elements corresponding to respective units of time, the plurality of analog-dial graphical elements including a first analog-dial graphical element that occupies a first position and has a first size while the respective graphical element is displayed at the respective location on the clock face; and in accordance with a determination that the respective graphical element is not to be displayed at a respective location on the clock face, displaying, via the display device, the clock face, the clock face including the plurality of analog-dial graphical elements corresponding to the respective units of time, the first analog-dial graphical element of the plurality of analog-dial graphical elements occupying a second position different from the first position and/or having a second size different from the first size.

In some embodiments, a transitory computer-readable storage medium stores one or more programs configured to be executed by one or more processors of an electronic device with a display device, the one or more programs including instructions for: receiving a request to display a clock face that includes a plurality of analog-dial graphical elements corresponding to respective units of time; and in response to receiving the request to display the clock face: in accordance with a determination that a respective graphical element is to be displayed at a respective location on the clock face, displaying, via the display device, the clock face, the clock face including the plurality of analog-dial graphical elements corresponding to respective units of time, the plurality of analog-dial graphical elements including a first analog-dial graphical element that occupies a first position and has a first size while the respective graphical element is displayed at the respective location on the clock face; and in accordance with a determination that the respective graphical element is not to be displayed at a respective location on the clock face, displaying, via the display device, the clock face, the clock face including the plurality of analog-dial graphical elements corresponding to the respective units of time, the first analog-dial graphical element of the plurality of analog-dial graphical elements occupying a second position different from the first position and/or having a second size different from the first size.

In some embodiments, an electronic device comprises: a display device; one or more processors; and memory storing one or more programs configured to be executed by the one or more processors, the one or more programs including instructions for: receiving a request to display a clock face that includes a plurality of analog-dial graphical elements corresponding to respective units of time; and in response to receiving the request to display the clock face: in accordance with a determination that a respective graphical element is to be displayed at a respective location on the clock face, displaying, via the display device, the clock face, the clock face including the plurality of analog-dial graphical elements corresponding to respective units of time, the plurality of analog-dial graphical elements including a first analog-dial graphical element that occupies a first position and has a first size while the respective graphical element is displayed at the respective location on the clock face; and in accordance with a determination that the respective graphical element is not to be displayed at a respective location on the clock face, displaying, via the display device, the clock face, the clock face including the plurality of analog-dial graphical elements corresponding to the respective units of time, the first analog-dial graphical element of the plurality of analog-dial graphical elements occupying a second position different from the first position and/or having a second size different from the first size.

In some embodiments, an electronic device comprises: a display device; means for receiving a request to display a clock face that includes a plurality of analog-dial graphical elements corresponding to respective units of time; and means for, in response to receiving the request to display the clock face: in accordance with a determination that a respective graphical element is to be displayed at a respective location on the clock face, displaying, via the display device, the clock face, the clock face including the plurality of analog-dial graphical elements corresponding to respective units of time, the plurality of analog-dial graphical elements including a first analog-dial graphical element that occupies a first position and has a first size while the respective graphical element is displayed at the respective location on the clock face; and in accordance with a determination that the respective graphical element is not to be displayed at a respective location on the clock face, displaying, via the display device, the clock face, the clock face including the plurality of analog-dial graphical elements corresponding to the respective units of time, the first analog-dial graphical element of the plurality of analog-dial graphical elements occupying a second position different from the first position and/or having a second size different from the first size.

In some embodiments, a method comprises: at an electronic device with a display device: displaying, via the display device, a first clock face, the first clock face including: an indication of time, the indication of time displayed in a first language; and a graphical element distinct from the indication of time, the graphical element displayed in a second language; detecting a sequence of one or more inputs corresponding to a request to change a language associated with the indication of time on the first clock face; and in response to detecting the sequence of one or more inputs corresponding to a request to change a language associated with the indication of time on the first clock face, displaying, via the display device, a second clock face, the second clock face including: the indication of time, wherein the indication of time is displayed in a third language different from the first language; and the graphical element displayed in the second language.

In some embodiments, a non-transitory computer-readable storage medium stores one or more programs configured to be executed by one or more processors of an electronic device with a display device, the one or more programs including instructions for: displaying, via the display device, a first clock face, the first clock face including: an indication of time, the indication of time displayed in a first language; and a graphical element distinct from the indication of time, the graphical element displayed in a second language; detecting a sequence of one or more inputs corresponding to a request to change a language associated with the indication of time on the first clock face; and in response to detecting the sequence of one or more inputs corresponding to a request to change a language associated with the indication of time on the first clock face, displaying, via the display device, a second clock face, the second clock face including: the indication of time, wherein the indication of time is displayed in a third language different from the first language; and the graphical element displayed in the second language.

In some embodiments, a transitory computer-readable storage medium stores one or more programs configured to be executed by one or more processors of an electronic device with a display device, the one or more programs including instructions for: displaying, via the display device, a first clock face, the first clock face including: an indication of time, the indication of time displayed in a first language; and a graphical element distinct from the indication of time, the graphical element displayed in a second language; detecting a sequence of one or more inputs corresponding to a request to change a language associated with the indication of time on the first clock face; and in response to detecting the sequence of one or more inputs corresponding to a request to change a language associated with the indication of time on the first clock face, displaying, via the display device, a second clock face, the second clock face including: the indication of time, wherein the indication of time is displayed in a third language different from the first language; and the graphical element displayed in the second language.

In some embodiments, an electronic device comprises: a display device; one or more processors; and memory storing one or more programs configured to be executed by the one or more processors, the one or more programs including instructions for: displaying, via the display device, a first clock face, the first clock face including: an indication of time, the indication of time displayed in a first language; and a graphical element distinct from the indication of time, the graphical element displayed in a second language; detecting a sequence of one or more inputs corresponding to a request to change a language associated with the indication of time on the first clock face; and in response to detecting the sequence of one or more inputs corresponding to a request to change a language associated with the indication of time on the first clock face, displaying, via the display device, a second clock face, the second clock face including: the indication of time, wherein the indication of time is displayed in a third language different from the first language; and the graphical element displayed in the second language.

In some embodiments, an electronic device comprises: a display device; means for displaying, via the display device, a first clock face, the first clock face including: an indication of time, the indication of time displayed in a first language; and a graphical element distinct from the indication of time, the graphical element displayed in a second language; means for detecting a sequence of one or more inputs corresponding to a request to change a language associated with the indication of time on the first clock face; and means for, in response to detecting the sequence of one or more inputs corresponding to a request to change a language associated with the indication of time on the first clock face, displaying, via the display device, a second clock face, the second clock face including: the indication of time, wherein the indication of time is displayed in a third language different from the first language; and the graphical element displayed in the second language.

In some embodiments, a method comprises: at an electronic device with a display device: displaying, via the display device, a first clock face including: a plurality of clock hands including a first clock hand and a second clock hand; and a color gradient of the first clock face, the color gradient of the first clock face including a gradual transition from a first color at a first edge of the color gradient of the first clock face to a second color at a second edge of the color gradient of the first clock face, wherein the first edge of the color gradient of the first clock face is selected based on a position of the first clock hand of the first clock face and the second edge of the color gradient of the first clock face is selected based on the position of the first clock hand of the first clock face; detecting a sequence of one or more inputs corresponding to a request to edit the first clock face; and in response to detecting the sequence of one or more inputs corresponding to a request to edit the first clock face, displaying, via the display device, a second clock face including: the plurality of clock hands including the first clock hand and the second clock hand; and a first color gradient of the second clock face, the first color gradient of the second clock face including a gradual transition from the first color at a first edge of the first color gradient of the second clock face to the second color at a second edge of the first color gradient of the second clock face, wherein the first edge of the first color gradient of the second clock face is selected based on a position of the first clock hand of the second clock face and the second edge of the first color gradient of the second clock face is selected based on a position of the second clock hand of the second clock face; and a second color gradient of the second clock face, the second color gradient of the second clock face including a gradual transition from the first color at a first edge of the second color gradient of the second clock face to the second color at a second edge of the second color gradient of the second clock face, wherein the second edge of the second color gradient of the second clock face is selected based on the position of the first clock hand of the second clock face.

In some embodiments, a non-transitory computer-readable storage medium stores one or more programs configured to be executed by one or more processors of an electronic device with a display device, the one or more programs including instructions for: displaying, via the display device, a first clock face including: a plurality of clock hands including a first clock hand and a second clock hand; and a color gradient of the first clock face, the color gradient of the first clock face including a gradual transition from a first color at a first edge of the color gradient of the first clock face to a second color at a second edge of the color gradient of the first clock face, wherein the first edge of the color gradient of the first clock face is selected based on a position of the first clock hand of the first clock face and the second edge of the color gradient of the first clock face is selected based on the position of the first clock hand of the first clock face; detecting a sequence of one or more inputs corresponding to a request to edit the first clock face; and in response to detecting the sequence of one or more inputs corresponding to a request to edit the first clock face, displaying, via the display device, a second clock face including: the plurality of clock hands including the first clock hand and the second clock hand; and a first color gradient of the second clock face, the first color gradient of the second clock face including a gradual transition from the first color at a first edge of the first color gradient of the second clock face to the second color at a second edge of the first color gradient of the second clock face, wherein the first edge of the first color gradient of the second clock face is selected based on a position of the first clock hand of the second clock face and the second edge of the first color gradient of the second clock face is selected based on a position of the second clock hand of the second clock face; and a second color gradient of the second clock face, the second color gradient of the second clock face including a gradual transition from the first color at a first edge of the second color gradient of the second clock face to the second color at a second edge of the second color gradient of the second clock face, wherein the second edge of the second color gradient of the second clock face is selected based on the position of the first clock hand of the second clock face.

In some embodiments, a transitory computer-readable storage medium stores one or more programs configured to be executed by one or more processors of an electronic device with a display device, the one or more programs including instructions for: displaying, via the display device, a first clock face including: a plurality of clock hands including a first clock hand and a second clock hand; and a color gradient of the first clock face, the color gradient of the first clock face including a gradual transition from a first color at a first edge of the color gradient of the first clock face to a second color at a second edge of the color gradient of the first clock face, wherein the first edge of the color gradient of the first clock face is selected based on a position of the first clock hand of the first clock face and the second edge of the color gradient of the first clock face is selected based on the position of the first clock hand of the first clock face; detecting a sequence of one or more inputs corresponding to a request to edit the first clock face; and in response to detecting the sequence of one or more inputs corresponding to a request to edit the first clock face, displaying, via the display device, a second clock face including: the plurality of clock hands including the first clock hand and the second clock hand; and a first color gradient of the second clock face, the first color gradient of the second clock face including a gradual transition from the first color at a first edge of the first color gradient of the second clock face to the second color at a second edge of the first color gradient of the second clock face, wherein the first edge of the first color gradient of the second clock face is selected based on a position of the first clock hand of the second clock face and the second edge of the first color gradient of the second clock face is selected based on a position of the second clock hand of the second clock face; and a second color gradient of the second clock face, the second color gradient of the second clock face including a gradual transition from the first color at a first edge of the second color gradient of the second clock face to the second color at a second edge of the second color gradient of the second clock face, wherein the second edge of the second color gradient of the second clock face is selected based on the position of the first clock hand of the second clock face.

In some embodiments, an electronic device comprises: a display device; one or more processors; and memory storing one or more programs configured to be executed by the one or more processors, the one or more programs including instructions for: displaying, via the display device, a first clock face including: a plurality of clock hands including a first clock hand and a second clock hand; and a color gradient of the first clock face, the color gradient of the first clock face including a gradual transition from a first color at a first edge of the color gradient of the first clock face to a second color at a second edge of the color gradient of the first clock face, wherein the first edge of the color gradient of the first clock face is selected based on a position of the first clock hand of the first clock face and the second edge of the color gradient of the first clock face is selected based on the position of the first clock hand of the first clock face; detecting a sequence of one or more inputs corresponding to a request to edit the first clock face; and in response to detecting the sequence of one or more inputs corresponding to a request to edit the first clock face, displaying, via the display device, a second clock face including: the plurality of clock hands including the first clock hand and the second clock hand; and a first color gradient of the second clock face, the first color gradient of the second clock face including a gradual transition from the first color at a first edge of the first color gradient of the second clock face to the second color at a second edge of the first color gradient of the second clock face, wherein the first edge of the first color gradient of the second clock face is selected based on a position of the first clock hand of the second clock face and the second edge of the first color gradient of the second clock face is selected based on a position of the second clock hand of the second clock face; and a second color gradient of the second clock face, the second color gradient of the second clock face including a gradual transition from the first color at a first edge of the second color gradient of the second clock face to the second color at a second edge of the second color gradient of the second clock face, wherein the second edge of the second color gradient of the second clock face is selected based on the position of the first clock hand of the second clock face.

In some embodiments, an electronic device comprises: a display device; means for displaying, via the display device, a first clock face including: a plurality of clock hands including a first clock hand and a second clock hand; and a color gradient of the first clock face, the color gradient of the first clock face including a gradual transition from a first color at a first edge of the color gradient of the first clock face to a second color at a second edge of the color gradient of the first clock face, wherein the first edge of the color gradient of the first clock face is selected based on a position of the first clock hand of the first clock face and the second edge of the color gradient of the first clock face is selected based on the position of the first clock hand of the first clock face; means for detecting a sequence of one or more inputs corresponding to a request to edit the first clock face; and means for, in response to detecting the sequence of one or more inputs corresponding to a request to edit the first clock face, displaying, via the display device, a second clock face including: the plurality of clock hands including the first clock hand and the second clock hand; and a first color gradient of the second clock face, the first color gradient of the second clock face including a gradual transition from the first color at a first edge of the first color gradient of the second clock face to the second color at a second edge of the first color gradient of the second clock face, wherein the first edge of the first color gradient of the second clock face is selected based on a position of the first clock hand of the second clock face and the second edge of the first color gradient of the second clock face is selected based on a position of the second clock hand of the second clock face; and a second color gradient of the second clock face, the second color gradient of the second clock face including a gradual transition from the first color at a first edge of the second color gradient of the second clock face to the second color at a second edge of the second color gradient of the second clock face, wherein the second edge of the second color gradient of the second clock face is selected based on the position of the first clock hand of the second clock face.

In some embodiments, a method comprises: at an electronic device with a display device: receiving a request to display a clock face; and in response to receiving the request to display the clock face: in accordance with a determination that a current time is a first time, displaying, via the display device, a clock face, the clock face at the first time including: a digital indication of time indicating the first time; and a segment including a first edge at a first position and a second edge at a second position, wherein the first edge at the first position indicates a first unit of time of the first time, and wherein the second edge at the second position indicates a second unit of time of the first time; and in accordance with a determination that a current time is a second time different from the first time, displaying, via the display device, the clock face, the clock face at the second time including: the digital indication of time indicating the second time; and the segment including the first edge and the second edge, the first edge at a third position and the second edge at a fourth position, wherein the first edge at the third position indicates a first unit of time of the second time, and wherein the second edge at the fourth position indicates a second unit of time of the second time.

In some embodiments, a non-transitory computer-readable storage medium stores one or more programs configured to be executed by one or more processors of an electronic device with a display device, the one or more programs including instructions for: receiving a request to display a clock face; and in response to receiving the request to display the clock face: in accordance with a determination that a current time is a first time, displaying, via the display device, a clock face, the clock face at the first time including: a digital indication of time indicating the first time; and a segment including a first edge at a first position and a second edge at a second position, wherein the first edge at the first position indicates a first unit of time of the first time, and wherein the second edge at the second position indicates a second unit of time of the first time; and in accordance with a determination that a current time is a second time different from the first time, displaying, via the display device, the clock face, the clock face at the second time including: the digital indication of time indicating the second time; and the segment including the first edge and the second edge, the first edge at a third position and the second edge at a fourth position, wherein the first edge at the third position indicates a first unit of time of the second time, and wherein the second edge at the fourth position indicates a second unit of time of the second time.

In some embodiments, a transitory computer-readable storage medium stores one or more programs configured to be executed by one or more processors of an electronic device with a display device, the one or more programs including instructions for: receiving a request to display a clock face; and in response to receiving the request to display the clock face: in accordance with a determination that a current time is a first time, displaying, via the display device, a clock face, the clock face at the first time including: a digital indication of time indicating the first time; and a segment including a first edge at a first position and a second edge at a second position, wherein the first edge at the first position indicates a first unit of time of the first time, and wherein the second edge at the second position indicates a second unit of time of the first time; and in accordance with a determination that a current time is a second time different from the first time, displaying, via the display device, the clock face, the clock face at the second time including: the digital indication of time indicating the second time; and the segment including the first edge and the second edge, the first edge at a third position and the second edge at a fourth position, wherein the first edge at the third position indicates a first unit of time of the second time, and wherein the second edge at the fourth position indicates a second unit of time of the second time.

In some embodiments, an electronic device comprises: a display device; one or more processors; and memory storing one or more programs configured to be executed by the one or more processors, the one or more programs including instructions for: receiving a request to display a clock face; and in response to receiving the request to display the clock face: in accordance with a determination that a current time is a first time, displaying, via the display device, a clock face, the clock face at the first time including: a digital indication of time indicating the first time; and a segment including a first edge at a first position and a second edge at a second position, wherein the first edge at the first position indicates a first unit of time of the first time, and wherein the second edge at the second position indicates a second unit of time of the first time; and in accordance with a determination that a current time is a second time different from the first time, displaying, via the display device, the clock face, the clock face at the second time including: the digital indication of time indicating the second time; and the segment including the first edge and the second edge, the first edge at a third position and the second edge at a fourth position, wherein the first edge at the third position indicates a first unit of time of the second time, and wherein the second edge at the fourth position indicates a second unit of time of the second time.

In some embodiments, an electronic device comprises: a display device; means for receiving a request to display a clock face; and means for, in response to receiving the request to display the clock face: in accordance with a determination that a current time is a first time, displaying, via the display device, a clock face, the clock face at the first time including: a digital indication of time indicating the first time; and a segment including a first edge at a first position and a second edge at a second position, wherein the first edge at the first position indicates a first unit of time of the first time, and wherein the second edge at the second position indicates a second unit of time of the first time; and in accordance with a determination that a current time is a second time different from the first time, displaying, via the display device, the clock face, the clock face at the second time including: the digital indication of time indicating the second time; and the segment including the first edge and the second edge, the first edge at a third position and the second edge at a fourth position, wherein the first edge at the third position indicates a first unit of time of the second time, and wherein the second edge at the fourth position indicates a second unit of time of the second time.

In some embodiments, a method comprises: at an electronic device with a display device: displaying, via the display device, a first clock face that has a respective layout including: a first indication of time presented according to a first format at a first location in the respective layout; and a first complication at a second location in the respective layout; detecting a sequence of one or more inputs corresponding to a request to edit the first clock face; and in response to detecting the sequence of one or more inputs corresponding to a request to edit the first clock face, displaying, via the display device, a second clock face that has the respective layout including: a second indication of time presented according to a second format different from the first format at the first location in the respective layout; and the first complication at the second location in the respective layout.

In some embodiments, a non-transitory computer-readable storage medium stores one or more programs configured to be executed by one or more processors of an electronic device with a display device, the one or more programs including instructions for: displaying, via the display device, a first clock face that has a respective layout including: a first indication of time presented according to a first format at a first location in the respective layout; and a first complication at a second location in the respective layout; detecting a sequence of one or more inputs corresponding to a request to edit the first clock face; and in response to detecting the sequence of one or more inputs corresponding to a request to edit the first clock face, displaying, via the display device, a second clock face that has the respective layout including: a second indication of time presented according to a second format different from the first format at the first location in the respective layout; and the first complication at the second location in the respective layout.

In some embodiments, a transitory computer-readable storage medium stores one or more programs configured to be executed by one or more processors of an electronic device with a display device, the one or more programs including instructions for: displaying, via the display device, a first clock face that has a respective layout including: a first indication of time presented according to a first format at a first location in the respective layout; and a first complication at a second location in the respective layout; detecting a sequence of one or more inputs corresponding to a request to edit the first clock face; and in response to detecting the sequence of one or more inputs corresponding to a request to edit the first clock face, displaying, via the display device, a second clock face that has the respective layout including: a second indication of time presented according to a second format different from the first format at the first location in the respective layout; and the first complication at the second location in the respective layout.

In some embodiments, an electronic device comprises: a display device; one or more processors; and memory storing one or more programs configured to be executed by the one or more processors, the one or more programs including instructions for: displaying, via the display device, a first clock face that has a respective layout including: a first indication of time presented according to a first format at a first location in the respective layout; and a first complication at a second location in the respective layout; detecting a sequence of one or more inputs corresponding to a request to edit the first clock face; and in response to detecting the sequence of one or more inputs corresponding to a request to edit the first clock face, displaying, via the display device, a second clock face that has the respective layout including: a second indication of time presented according to a second format different from the first format at the first location in the respective layout; and the first complication at the second location in the respective layout.

In some embodiments, an electronic device comprises: a display device; means for displaying, via the display device, a first clock face that has a respective layout including: a first indication of time presented according to a first format at a first location in the respective layout; and a first complication at a second location in the respective layout; means for detecting a sequence of one or more inputs corresponding to a request to edit the first clock face; and means for, in response to detecting the sequence of one or more inputs corresponding to a request to edit the first clock face, displaying, via the display device, a second clock face that has the respective layout including: a second indication of time presented according to a second format different from the first format at the first location in the respective layout; and the first complication at the second location in the respective layout.

In some embodiments, a method comprises: at an electronic device with a display device: receiving a first request to display a clock face; in response to receiving the first request to display the clock face, displaying, via the display device, a clock face with an indication of a first time, the clock face at the first time including: an analog dial representing a twenty-four hour time period; and an inset time indication at a first position on the clock face inside the analog dial, the inset time indication indicating the first time; and receiving a second request to display the clock face; and in response to receiving the second request to display the clock face, displaying, via the display device, the clock face with an indication of a second time that is different from the first time, the clock face at the second time including: the analog dial representing a twenty-four hour time period; and the inset time indication at a second position on the clock face inside the analog dial different from the first position on the clock face inside the analog dial, the inset time indication indicating the second time.

In some embodiments, a non-transitory computer-readable storage medium stores one or more programs configured to be executed by one or more processors of an electronic device with a display device, the one or more programs including instructions for: receiving a first request to display a clock face; in response to receiving the first request to display the clock face, displaying, via the display device, a clock face with an indication of a first time, the clock face at the first time including: an analog dial representing a twenty-four hour time period; and an inset time indication at a first position on the clock face inside the analog dial, the inset time indication indicating the first time; and receiving a second request to display the clock face; and in response to receiving the second request to display the clock face, displaying, via the display device, the clock face with an indication of a second time that is different from the first time, the clock face at the second time including: the analog dial representing a twenty-four hour time period; and the inset time indication at a second position on the clock face inside the analog dial different from the first position on the clock face inside the analog dial, the inset time indication indicating the second time.

In some embodiments, a transitory computer-readable storage medium stores one or more programs configured to be executed by one or more processors of an electronic device with a display device, the one or more programs including instructions for: receiving a first request to display a clock face; in response to receiving the first request to display the clock face, displaying, via the display device, a clock face with an indication of a first time, the clock face at the first time including: an analog dial representing a twenty-four hour time period; and an inset time indication at a first position on the clock face inside the analog dial, the inset time indication indicating the first time; and receiving a second request to display the clock face; and in response to receiving the second request to display the clock face, displaying, via the display device, the clock face with an indication of a second time that is different from the first time, the clock face at the second time including: the analog dial representing a twenty-four hour time period; and the inset time indication at a second position on the clock face inside the analog dial different from the first position on the clock face inside the analog dial, the inset time indication indicating the second time.

In some embodiments, an electronic device comprises: a display device; one or more processors; and memory storing one or more programs configured to be executed by the one or more processors, the one or more programs including instructions for: receiving a first request to display a clock face; in response to receiving the first request to display the clock face, displaying, via the display device, a clock face with an indication of a first time, the clock face at the first time including: an analog dial representing a twenty-four hour time period; and an inset time indication at a first position on the clock face inside the analog dial, the inset time indication indicating the first time; and receiving a second request to display the clock face; and in response to receiving the second request to display the clock face, displaying, via the display device, the clock face with an indication of a second time that is different from the first time, the clock face at the second time including: the analog dial representing a twenty-four hour time period; and the inset time indication at a second position on the clock face inside the analog dial different from the first position on the clock face inside the analog dial, the inset time indication indicating the second time.

In some embodiments, an electronic device comprises: a display device; means for receiving a first request to display a clock face; means for, in response to receiving the first request to display the clock face, displaying, via the display device, a clock face with an indication of a first time, the clock face at the first time including: an analog dial representing a twenty-four hour time period; and an inset time indication at a first position on the clock face inside the analog dial, the inset time indication indicating the first time; and means for receiving a second request to display the clock face; and means for, in response to receiving the second request to display the clock face, displaying, via the display device, the clock face with an indication of a second time that is different from the first time, the clock face at the second time including: the analog dial representing a twenty-four hour time period; and the inset time indication at a second position on the clock face inside the analog dial different from the first position on the clock face inside the analog dial, the inset time indication indicating the second time.

In some embodiments, a method includes, at an electronic device with a display device: displaying, via the display device, a selection user interface for selecting a clock face among a plurality of clock faces, wherein displaying the selection user interface for selecting a clock face among a plurality of clock faces includes displaying at least a portion of two or more different clock faces from the plurality of clock faces, including displaying a first clock face of the plurality of clock faces at a first size; while displaying, via the display device, the selection user interface for selecting a clock face among the plurality of clock faces, detecting a user input at a location corresponding to the first clock face; in response to detecting the user input: in accordance with a determination that the user input meets first input criteria: displaying, via the display device, the first clock face at a second size that is greater than the first size; and in accordance with a determination that the user input meets second input criteria that is different from the first input criteria: displaying, via the display device, a reordering user interface for reordering the plurality of clock faces, wherein displaying the reordering user interface for reordering the plurality of clock faces includes displaying at least a portion of three or more clock faces, including the first clock face and at least a portion of a clock face that was not displayed prior to detecting the user input; while displaying the reordering user interface, detecting movement corresponding to the first clock face; and in response to detecting the movement corresponding to the first clock face, moving the first clock face relative to one or more of the other clock faces in the reordering user interface in accordance with the detected movement.

In some embodiments, a non-transitory computer-readable storage medium stores one or more programs configured to be executed by one or more processors of an electronic device with a display device, the one or more programs including instructions for: displaying, via the display device, a selection user interface for selecting a clock face among a plurality of clock faces, wherein displaying the selection user interface for selecting a clock face among a plurality of clock faces includes displaying at least a portion of two or more different clock faces from the plurality of clock faces, including displaying a first clock face of the plurality of clock faces at a first size; while displaying, via the display device, the selection user interface for selecting a clock face among the plurality of clock faces, detecting a user input at a location corresponding to the first clock face; in response to detecting the user input: in accordance with a determination that the user input meets first input criteria: displaying, via the display device, the first clock face at a second size that is greater than the first size; and in accordance with a determination that the user input meets second input criteria that is different from the first input criteria: displaying, via the display device, a reordering user interface for reordering the plurality of clock faces, wherein displaying the reordering user interface for reordering the plurality of clock faces includes displaying at least a portion of three or more clock faces, including the first clock face and at least a portion of a clock face that was not displayed prior to detecting the user input; while displaying the reordering user interface, detecting movement corresponding to the first clock face; and in response to detecting the movement corresponding to the first clock face, moving the first clock face relative to one or more of the other clock faces in the reordering user interface in accordance with the detected movement.

In some embodiments, a transitory computer-readable storage medium stores one or more programs configured to be executed by one or more processors of an electronic device with a display device, the one or more programs including instructions for: displaying, via the display device, a selection user interface for selecting a clock face among a plurality of clock faces, wherein displaying the selection user interface for selecting a clock face among a plurality of clock faces includes displaying at least a portion of two or more different clock faces from the plurality of clock faces, including displaying a first clock face of the plurality of clock faces at a first size; while displaying, via the display device, the selection user interface for selecting a clock face among the plurality of clock faces, detecting a user input at a location corresponding to the first clock face; in response to detecting the user input: in accordance with a determination that the user input meets first input criteria: displaying, via the display device, the first clock face at a second size that is greater than the first size; and in accordance with a determination that the user input meets second input criteria that is different from the first input criteria: displaying, via the display device, a reordering user interface for reordering the plurality of clock faces, wherein displaying the reordering user interface for reordering the plurality of clock faces includes displaying at least a portion of three or more clock faces, including the first clock face and at least a portion of a clock face that was not displayed prior to detecting the user input; while displaying the reordering user interface, detecting movement corresponding to the first clock face; and in response to detecting the movement corresponding to the first clock face, moving the first clock face relative to one or more of the other clock faces in the reordering user interface in accordance with the detected movement.

In some embodiments, an electronic device includes a display device; one or more processors; and memory storing one or more programs configured to be executed by the one or more processors, the one or more programs including instructions for: displaying, via the display device, a selection user interface for selecting a clock face among a plurality of clock faces, wherein displaying the selection user interface for selecting a clock face among a plurality of clock faces includes displaying at least a portion of two or more different clock faces from the plurality of clock faces, including displaying a first clock face of the plurality of clock faces at a first size; while displaying, via the display device, the selection user interface for selecting a clock face among the plurality of clock faces, detecting a user input at a location corresponding to the first clock face; in response to detecting the user input: in accordance with a determination that the user input meets first input criteria: displaying, via the display device, the first clock face at a second size that is greater than the first size; and in accordance with a determination that the user input meets second input criteria that is different from the first input criteria: displaying, via the display device, a reordering user interface for reordering the plurality of clock faces, wherein displaying the reordering user interface for reordering the plurality of clock faces includes displaying at least a portion of three or more clock faces, including the first clock face and at least a portion of a clock face that was not displayed prior to detecting the user input; while displaying the reordering user interface, detecting movement corresponding to the first clock face; and in response to detecting the movement corresponding to the first clock face, moving the first clock face relative to one or more of the other clock faces in the reordering user interface in accordance with the detected movement.

In some embodiments, an electronic device includes a display device; means for displaying, via the display device, a selection user interface for selecting a clock face among a plurality of clock faces, wherein displaying the selection user interface for selecting a clock face among a plurality of clock faces includes displaying at least a portion of two or more different clock faces from the plurality of clock faces, including displaying a first clock face of the plurality of clock faces at a first size; means for, while displaying, via the display device, the selection user interface for selecting a clock face among the plurality of clock faces, detecting a user input at a location corresponding to the first clock face; means for, in response to detecting the user input: in accordance with a determination that the user input meets first input criteria: displaying, via the display device, the first clock face at a second size that is greater than the first size; and in accordance with a determination that the user input meets second input criteria that is different from the first input criteria: displaying, via the display device, a reordering user interface for reordering the plurality of clock faces, wherein displaying the reordering user interface for reordering the plurality of clock faces includes displaying at least a portion of three or more clock faces, including the first clock face and at least a portion of a clock face that was not displayed prior to detecting the user input; means for, while displaying the reordering user interface, detecting movement corresponding to the first clock face; and means for, in response to detecting the movement corresponding to the first clock face, moving the first clock face relative to one or more of the other clock faces in the reordering user interface in accordance with the detected movement.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for presenting and interacting with clock faces, thereby increasing the effectiveness, efficiency, and user satisfaction with such devices. Such methods and interfaces may complement or replace other methods for presenting and interacting with clock faces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 6A-6J illustrate exemplary user interfaces in accordance with some embodiments.

FIG. 7 illustrates an exemplary method in accordance with some embodiments.

FIGS. 12A-12M illustrate exemplary user interfaces in accordance with some embodiments.

FIG. 13 illustrates an exemplary method in accordance with some embodiments.

FIGS. 14A-14H illustrate exemplary user interfaces in accordance with some embodiments.

FIG. 15 illustrates an exemplary method in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for presenting and interacting with clock faces. According to some embodiments, an element of an analog dial of a clock face is displayed based on a determination of whether or not another graphical element (e.g., a notification or a complication) is to be displayed on the clock face. According to some embodiments, an indication of time is displayed according to a selected language while the language in which other graphical elements of a clock face (e.g., complications) are displayed is maintained. According to some embodiments, a device displays a clock face including a gradient that is displayed based on the position of a clock hand, and in response to input, the device displays a clock face with two gradients, where the display of the two gradients is based on the positions of two clock hands. According to some embodiments, a clock face is displayed with a digital indication of time and a segments with two edges, where the positions of the two edges of the segment indicate hours and minutes of a time. According to some embodiments, the format of an indication of time on a clock face is changed in response to input, while the layout of the clock face and the position of other graphical elements remains the same. According to some embodiments, a clock face is displayed with an analog dial that represents a twenty-four hour time period and an inset time indication within the analog dial that indicates the current time, where the position of the inset time indication is based on the current time. Such techniques can reduce the cognitive burden on a user who views activity trends and/or manages workouts, thereby enhancing productivity. Further, such techniques can reduce processor and battery power otherwise wasted on redundant user inputs.

Figure 8A:
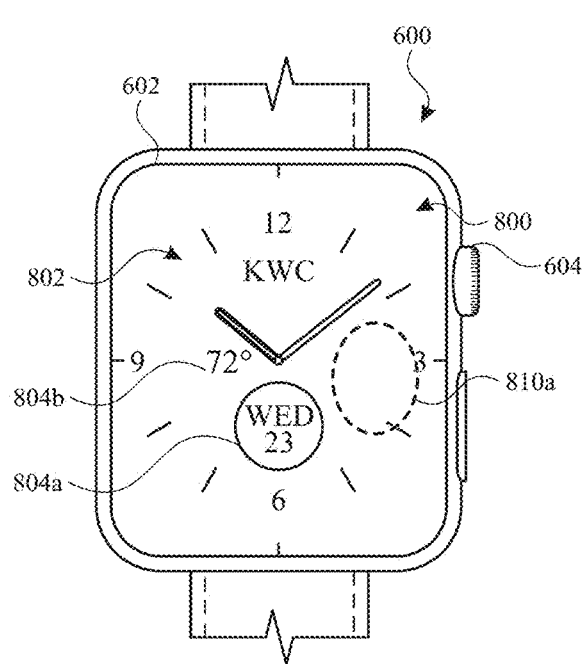
FIGS. 8A-8T illustrate exemplary user interfaces in accordance with some embodiments.

Below, FIGS. 1A-1B, 2, 3, 4A-4B, and 5A-5H provide a description of exemplary devices for performing the techniques for presenting and interacting with clock faces. FIGS. 6A-6J, 8A-8T, 10A-10N, 12A-12M, 14A-14H, and 16A-16K illustrate exemplary user interfaces for presenting and interacting with clock faces. FIGS. 7, 9, 11, 13, 15, and 17 are flow diagrams illustrating methods of presenting and interacting with clock faces in accordance with some embodiments. The user interfaces in FIGS. 6A-6J are used to illustrate the processes described below, including the processes in FIG. 7. The user interfaces in FIGS. 8A-8T are used to illustrate the processes described below, including the processes in FIG. 9. The user interfaces in FIGS. 10A-10N are used to illustrate the processes described below, including the processes in FIG. 11. The user interfaces in FIGS. 12A-12M are used to illustrate the processes described below, including the processes in FIG. 13. The user interfaces in FIGS. 14A-14H are used to illustrate the processes described below, including the processes in FIG. 15. The user interfaces in FIGS. 16A-16K are used to illustrate the processes described below, including the processes in FIG. 17. FIGS. 19A-19B is a flow diagram illustrating an exemplary method for reordering clock faces, in accordance with some embodiments. FIGS. 18A-18L are used to illustrate the processes described below, including the processes in FIGS. 19A-19B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
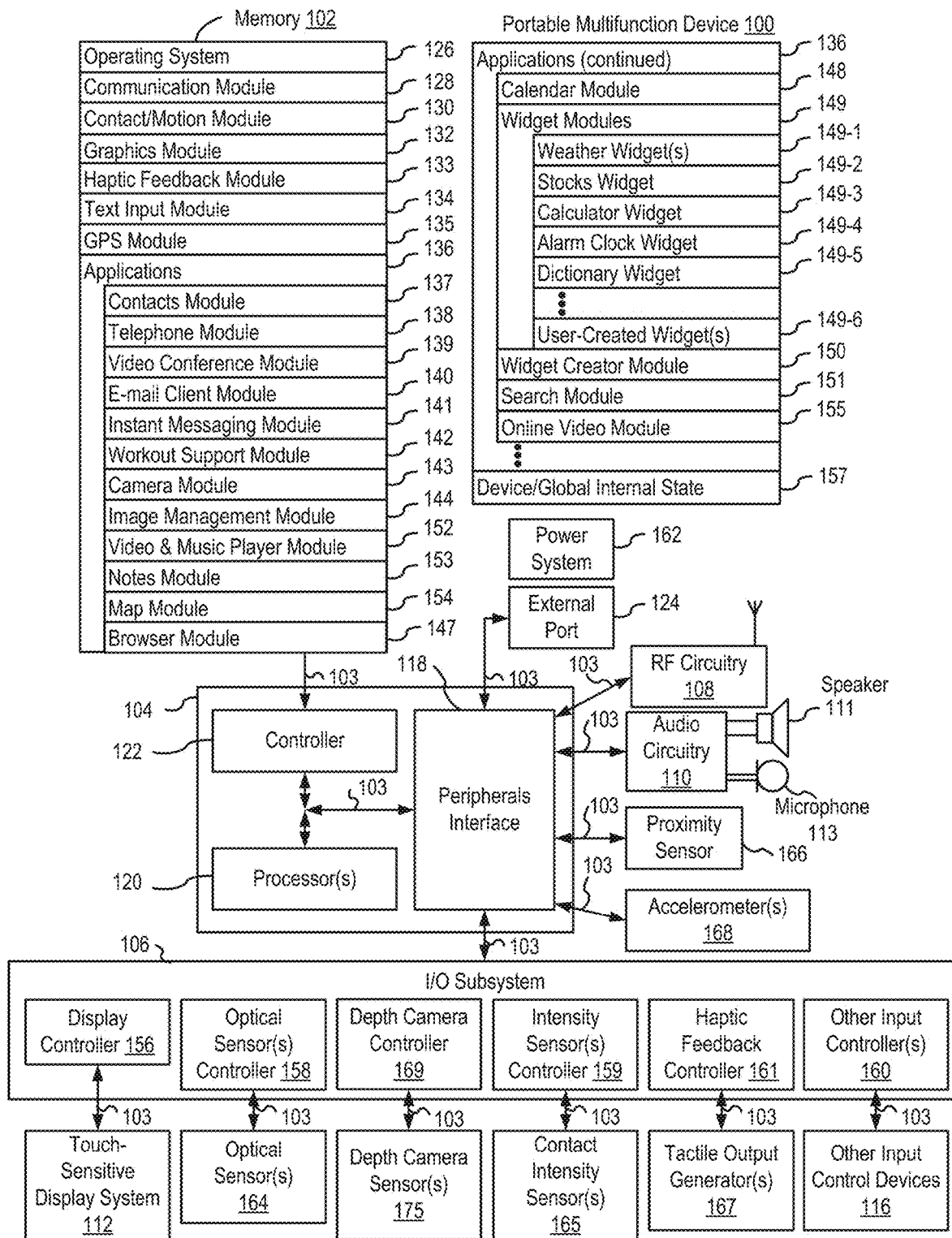
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
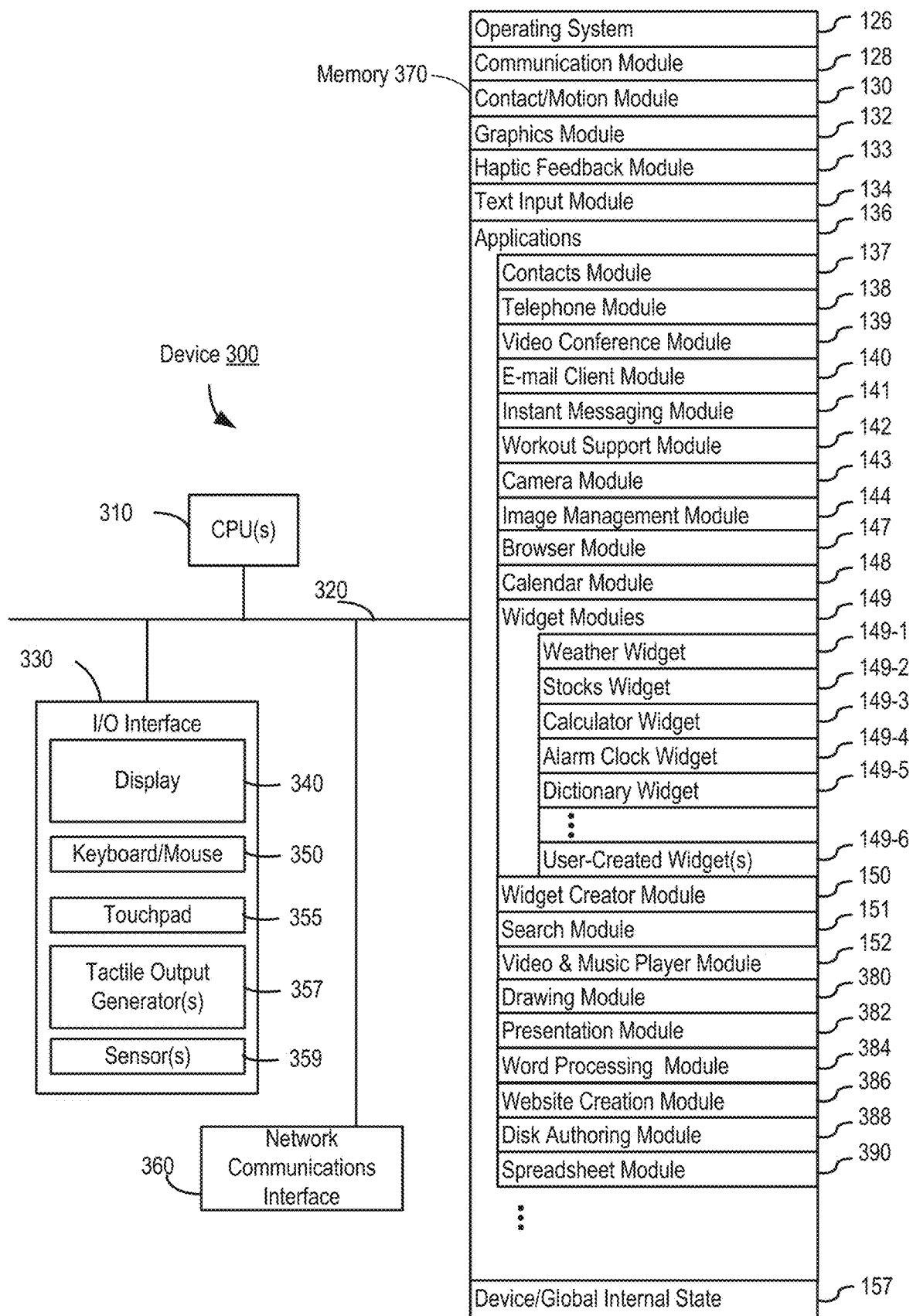
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
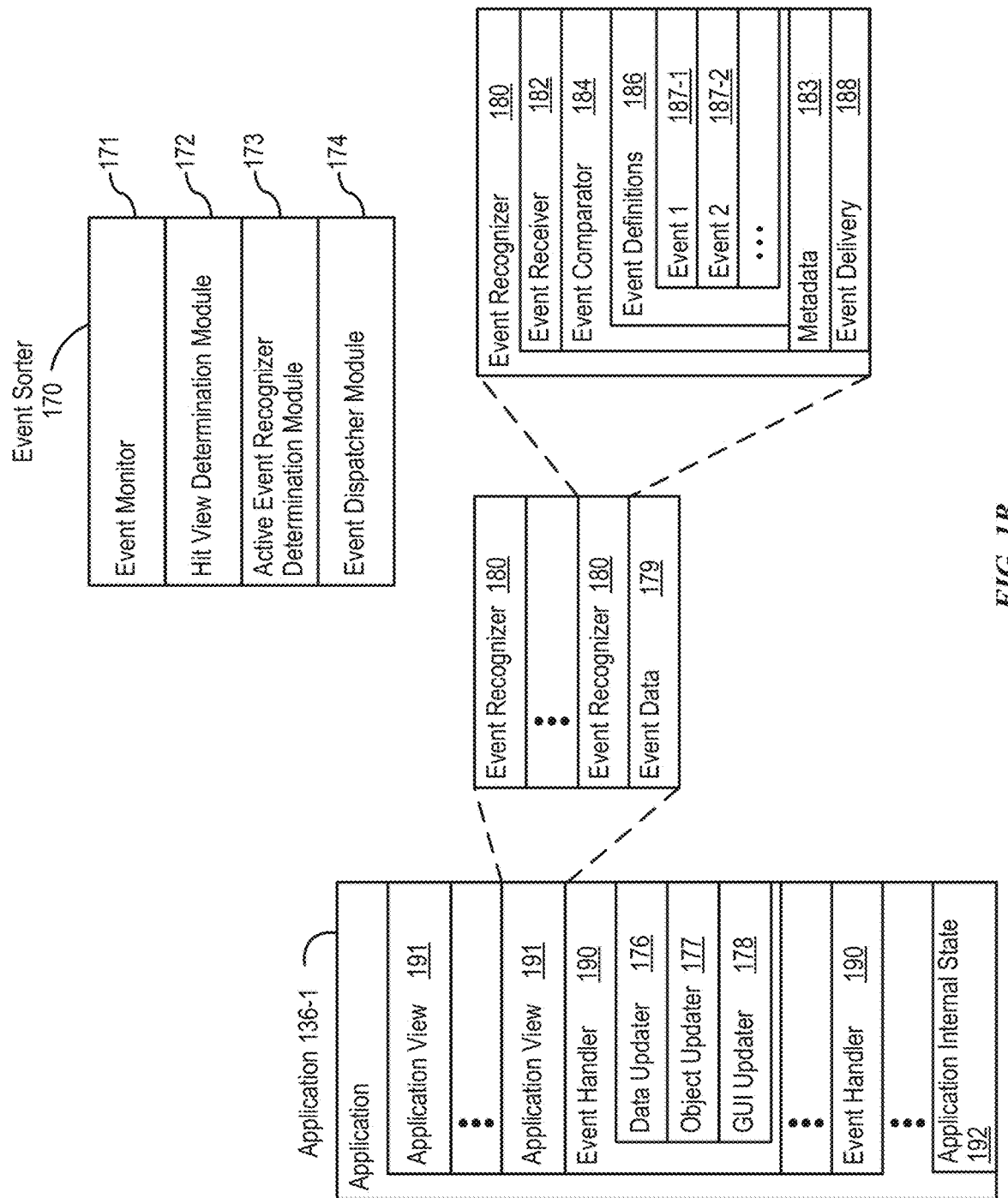
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
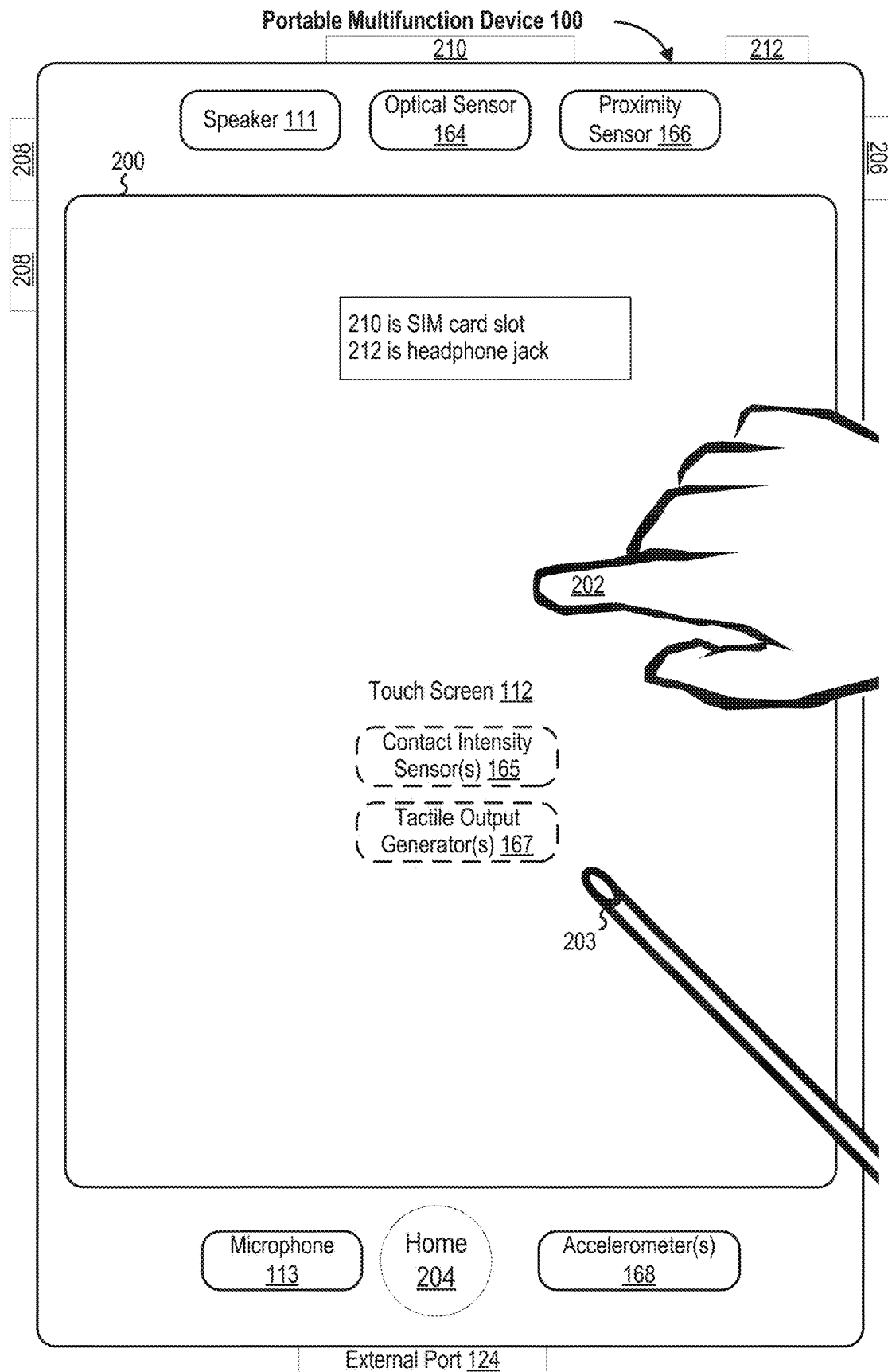
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
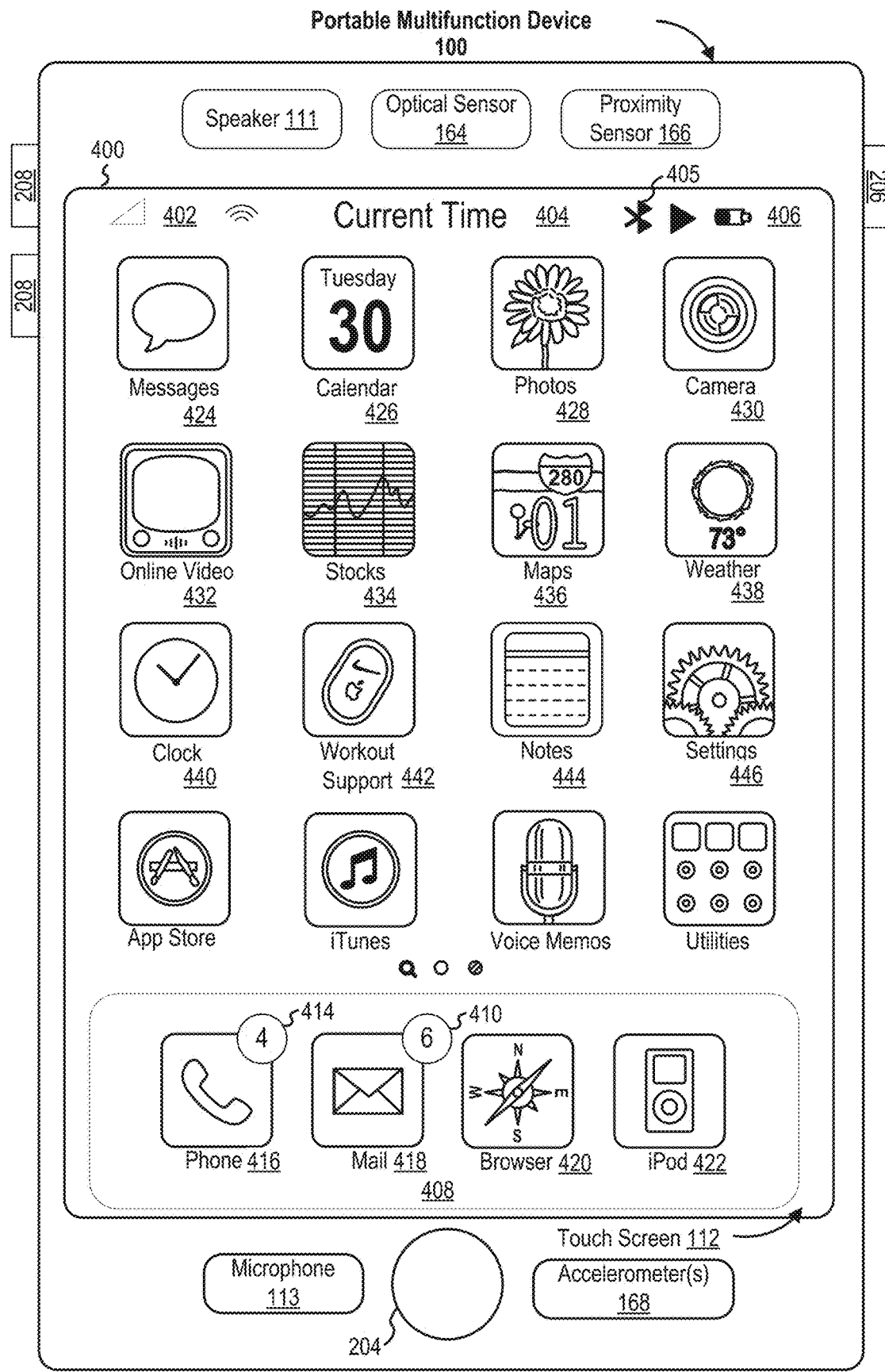
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
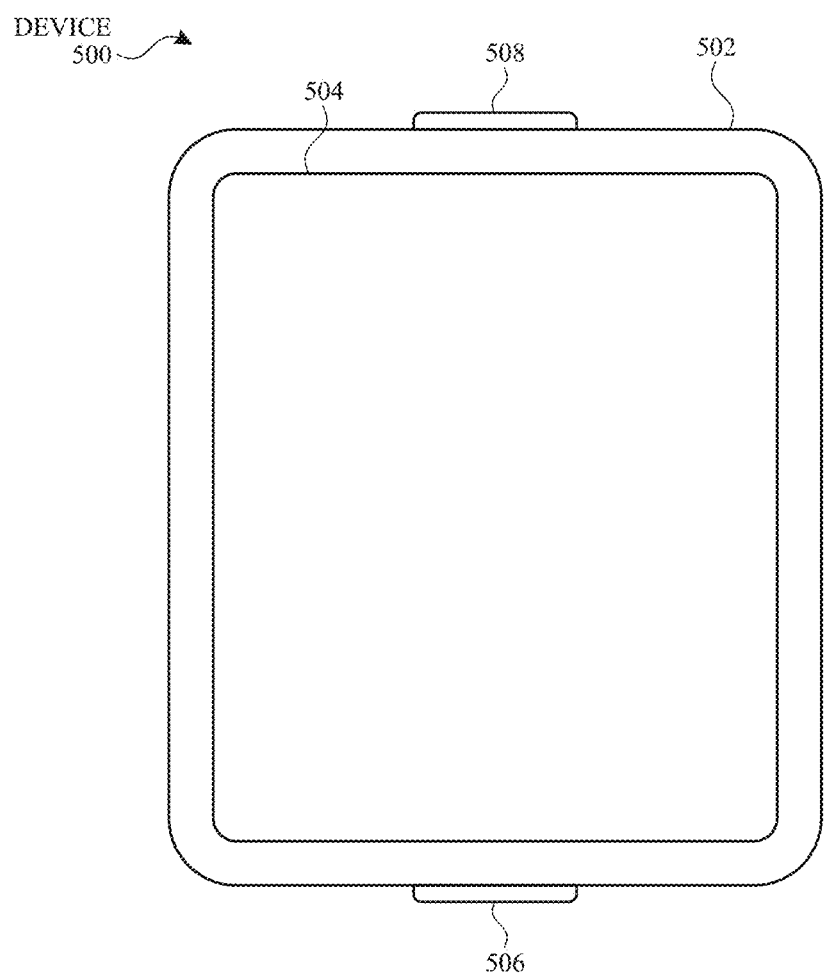
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
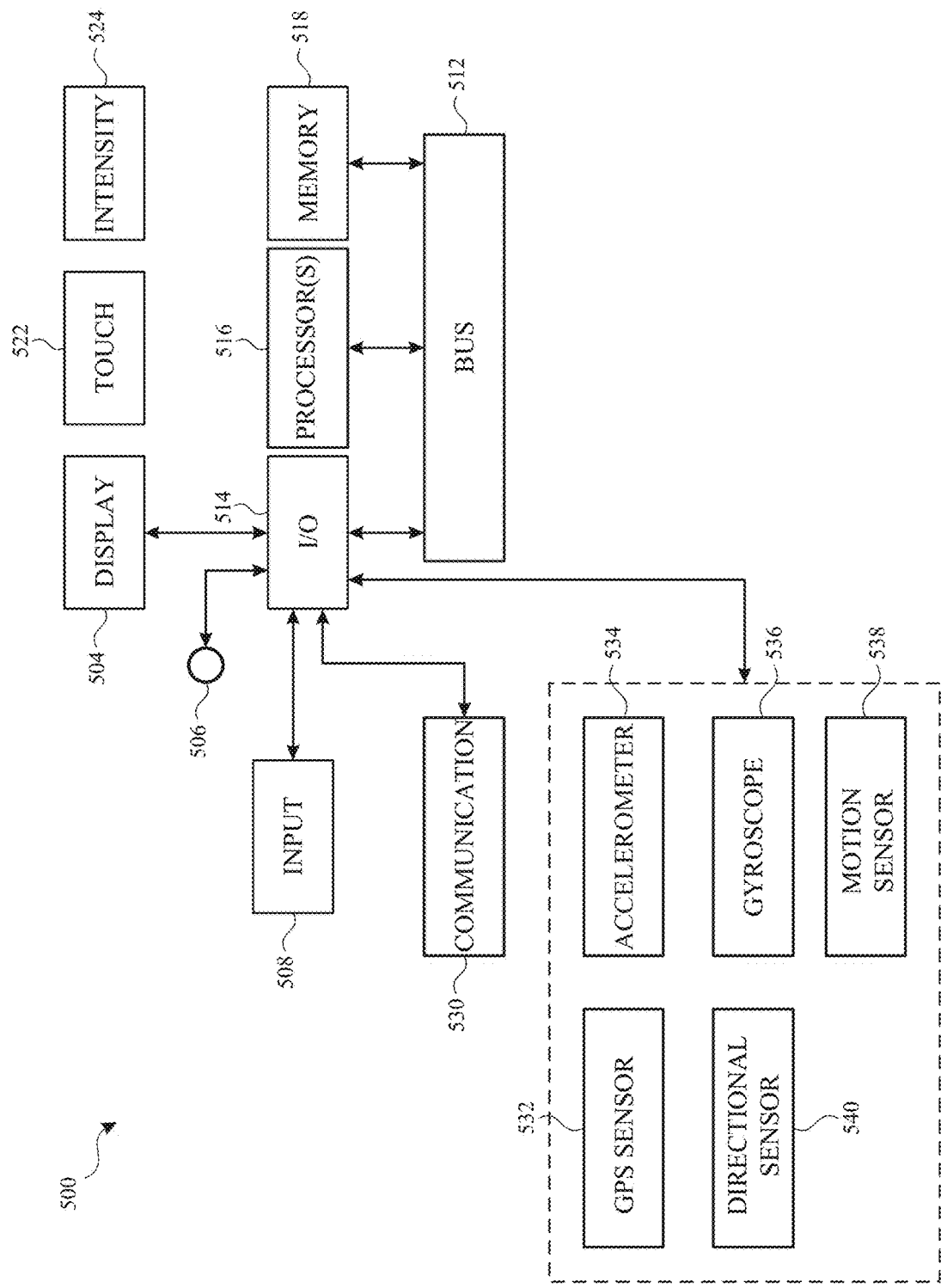
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, and 1900 (FIGS. 7, 9, 11, 13, 15, 17, and 19). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
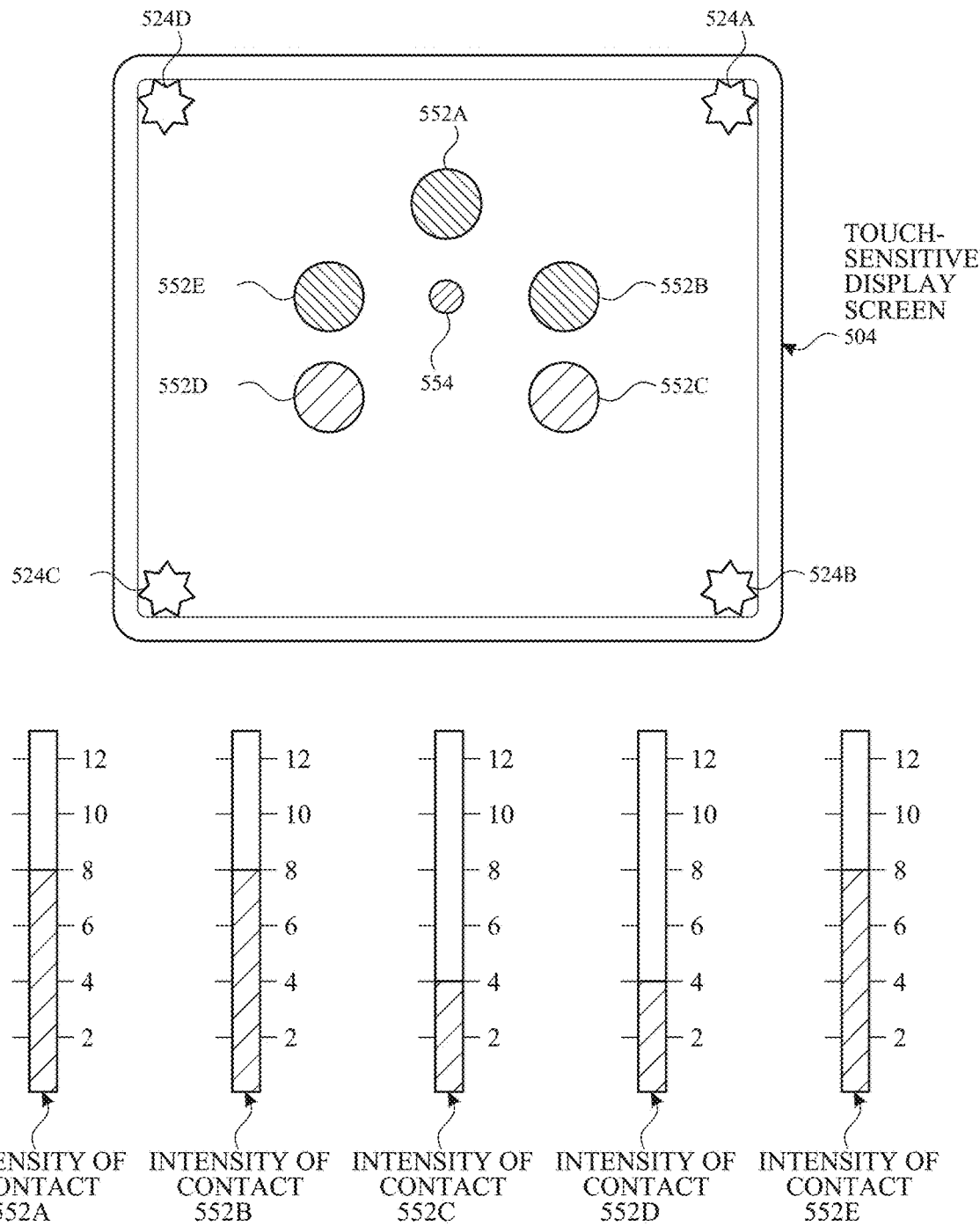

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT'D"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6J illustrate exemplary user interfaces for modifying the elements of a clock face (e.g., an analog dial) based on whether or not another graphical element (e.g., a notification or a complication) is to be displayed on the clock face, in accordance with some embodiments. The user interfaces in these figures are used to illustrate the processes described below, including the processes in FIG. 7.

Figure 6A:
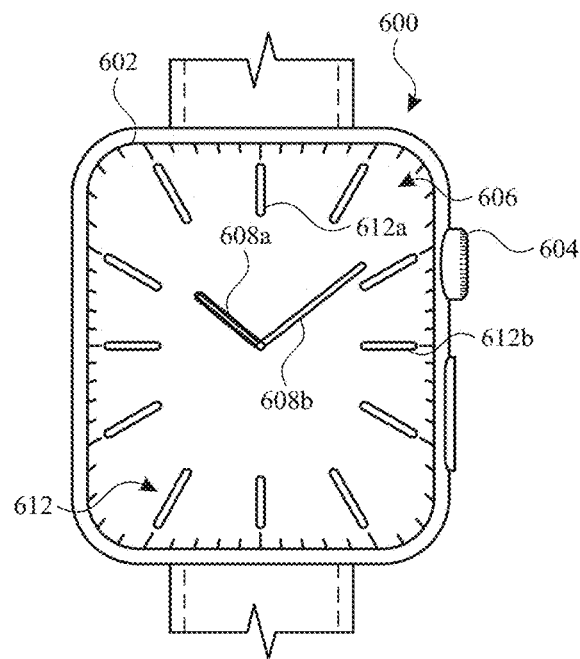

FIG. 6A depicts electronic device 600 displaying clock face 606 on display 602. In some embodiments, device 600 includes one or more features of device 100, device 300, or device 500. In the embodiment illustrated in FIG. 6A, device 600 includes depressible and rotatable input mechanism 604. In some embodiments, device 600 displays clock face 606 in response to receiving a request to display a clock face (e.g., a wrist raise gesture, a request to switch from viewing an application or notification screen to displaying the clock face). Clock face 606 includes an analog indication of time with hour hand 608a, minute hand 608b, and analog dial 612. Analog dial 612 includes a plurality of analog-dial elements corresponding to respective units of time. As depicted in FIG. 6A, clock face 606 includes a first set of analog-dial elements (hour markers) corresponding to units of one hour (as well as five minutes and five seconds) and a second set of analog-dial elements (minute markers) corresponding to units of one minute (as well as one second).

Figure 6B:
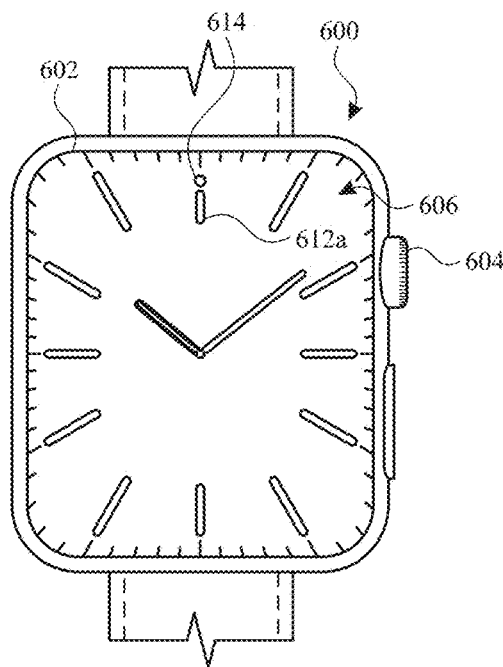

FIG. 6B depicts clock face 606 with notification 614. In some embodiments, device 600 receives an alert (e.g., a new text message, e-mail, etc.) and displays notification 614 as an indication of the alert in response to receiving the alert. In some embodiments, device 600 displays clock face 606 with notification 614 in response to receiving a request to display a clock face (e.g., a wrist raise gesture, a request to switch from viewing an application or notification screen to displaying the clock face).

As depicted in FIG. 6B, notification 614 is displayed as a graphical element (e.g., a circular dot) at a respective location near the top and middle on clock face 606. Notification 614 occupies a position on clock face 606 that was previously occupied by analog-dial element 612a in FIG. 6A. In order to provide room on clock face 606 for notification 614, the position and/or size of analog-dial element 612a is changed (e.g., such that notification 614 and analog-dial element 612a do not overlap or obstruct one another). In the illustrated embodiment, analog-dial element 612a is shortened such that it occupies a lower portion of the position on clock face 606 that it occupied in FIG. 6A, while notification 614 occupies an upper portion of the position on clock face 606 that was occupied by analog-dial element 612a in FIG. 6A.

In some embodiments, clock face 606 is displayed in the configuration depicted in FIG. 6B (e.g., with notification 614 and shortened analog-dial element 612a) in accordance with a determination that notification 614 is to be displayed at its respective location on the clock face. Alternatively, in accordance with a determination that notification 614 is not to be displayed at its respective location on the clock face, device 600 displays clock face 606 in the configuration in FIG. 6A (e.g., without notification 614 and with analog-dial element 612a having a longer length).

In some embodiments, device 600 ceases to display notification 614 (e.g., after notification 614 has been displayed for a threshold amount of time or in response to a user viewing the item (e.g., a newly received text message) associated with the notification). As used herein, a threshold can include a non-zero threshold (e.g., 0.5 seconds, 1 second).

Figure 6C:
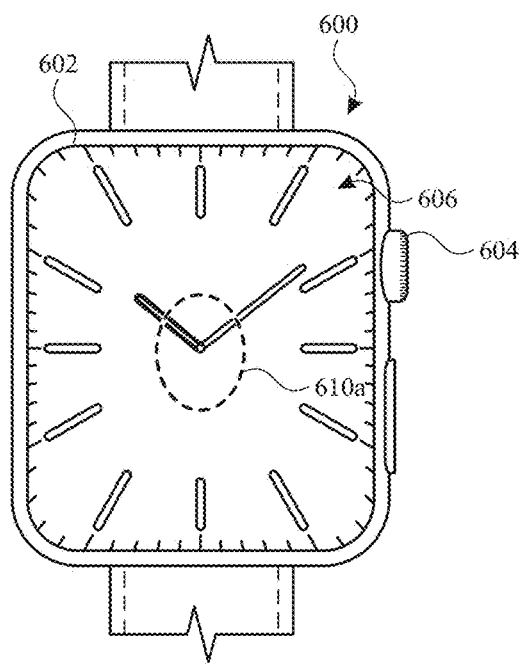

As shown in FIG. 6C, in response to ceasing to display notification 614, device 600 returns the analog dial to the state depicted in FIG. 6A (e.g., analog-dial element 612*a* is lengthened to occupy the location on clock face 606 occupied by notification 614 in FIG. 6B.

Figure 6D:
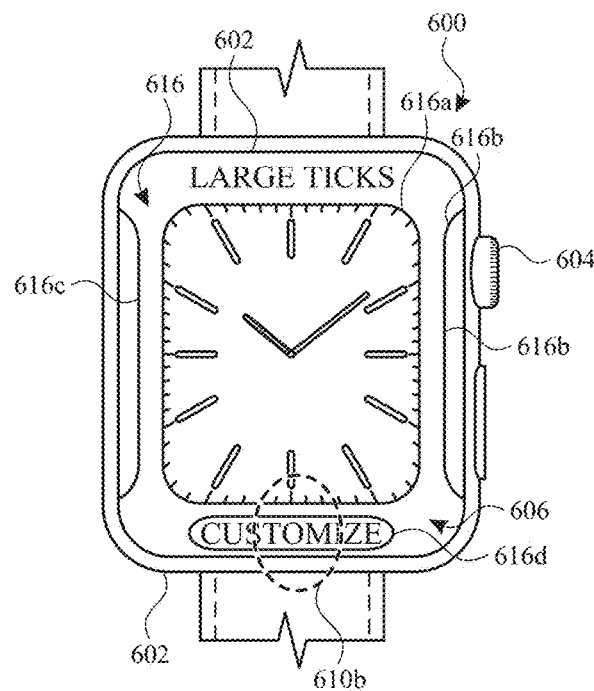

In FIG. 6C, device 600 detects input 610*a* (e.g., a contact on touch-sensitive display 602 with a characteristic intensity greater than a threshold intensity or a duration longer than a threshold duration). In response to detecting input 610*a*, device 600 enters a clock face edit mode and displays user interface 616 as shown in FIG. 6D. User interface 616 includes representation 616*a* corresponding to clock face 606. User interface 616 also includes representations 616*b* and 616*c* corresponding to other clock faces available for display by device 600. In some embodiments, in response to an input (e.g., a horizontal swipe on touch-sensitive display 602 or a rotation of input mechanism 604), device centers one of representations 616*b* and 616*c* on user interface 616 for selection as the current clock face. For example, a user can swipe from left to right to center representation 616*c* and then tap representation 616*c* or press input mechanism 604 to select the corresponding clock face as the current clock face. In some embodiments, input mechanism 604 is physically rotatable with respect to a housing of device 600.

User interface 616 also includes affordance 616*d* to select the clock face corresponding to the currently centered representation for editing. In FIG. 6D, device 600 detects input 610*b* (e.g., a tap on affordance 616*d*). In response to detecting input 610*b*, device 600 enters a clock face edit mode to edit clock face 606.

Figure 6E:
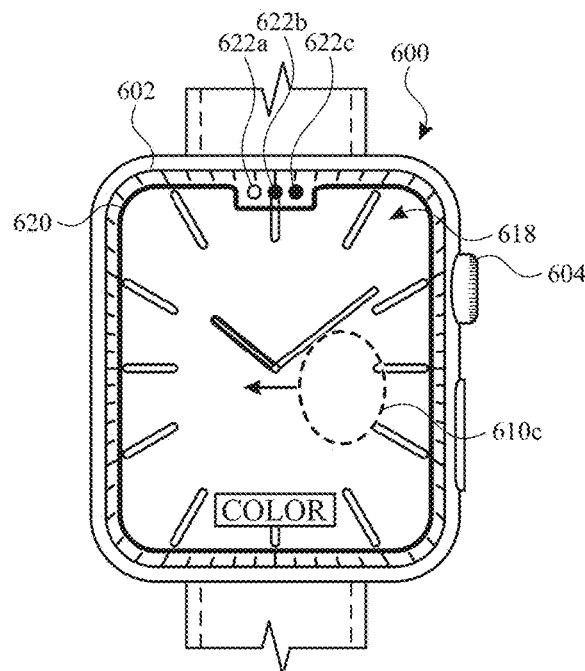

FIG. 6E illustrates user interface 618 for editing clock face 606. User interface 618 includes a representation of clock face 606, element indicator 620 indicating an element that is selected for editing, and paging dots 622*a*-622*c* corresponding to editing pages. Paging dot 622*a* corresponds to a first editing page in which a user can edit a background color setting of clock face 606; paging dot 622*b* corresponds to a second editing page in which a user can edit a color of the indication of time of clock face 606; and paging dot 622*c* corresponds to a third editing page in which a user can edit complications for clock face 606. In the present embodiment, as well as embodiments described above and below, a complication refers to any clock face feature other than those used to indicate the hours and minutes of a time (e.g., clock hands or hour/minute indications). In some embodiments, complications provide different types of information to a user, such as data obtained from an application. In some embodiments, the information conveyed to a user by a complication is customizable.

In FIG. 6E, illustrates the first editing page corresponding to paging dot 622*a*, as indicated by paging dot 622*a* being displayed in white to visually distinguish it from paging dots 622*b* and 622*c*, which are shown in black. In the first editing page a user can rotate input mechanism 604 to edit a background color of clock face 606.

A user can swipe on touch-sensitive display 602 to switch to a different editing page, as shown by input 610*c* in FIG. 6E. A user can provide multiple inputs to scroll through multiple editing pages. In the illustrated embodiment in FIG. 6F, the user has navigated to the third editing page, as indicated by paging dot 622*c* being displayed in white to visually distinguish it from paging dots 622*a* and 622*b*.

Figure 6F:
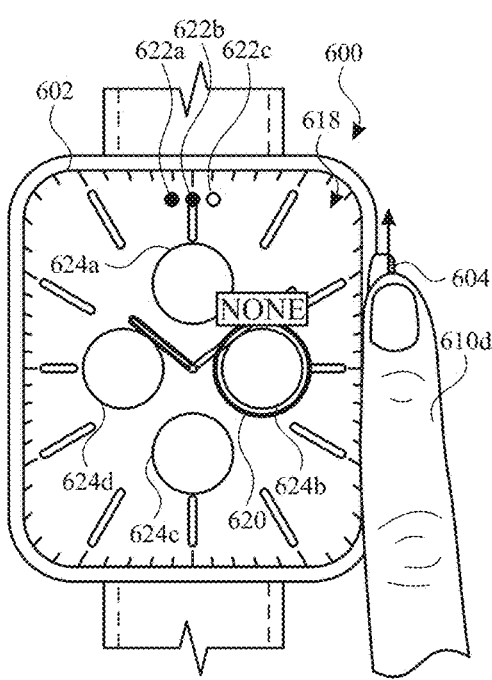
Figure 6G:
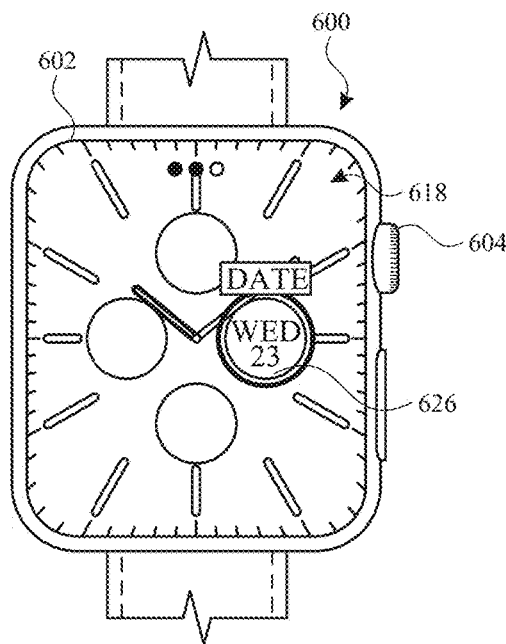
Figure 6H:
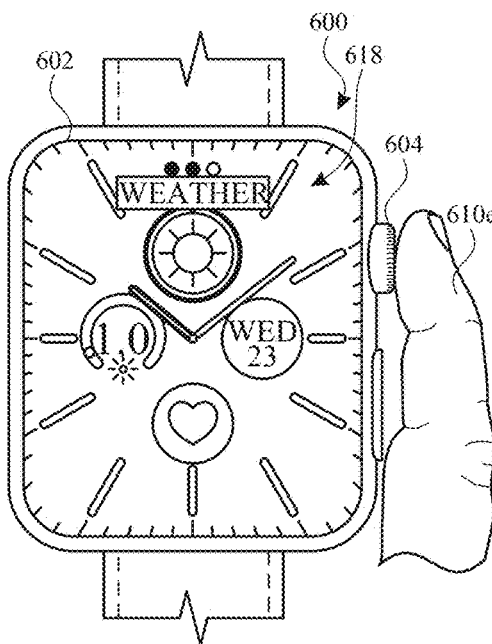

The third editing page provides capability to display complications at various locations on clock face 606. As shown in FIG. 6F, there are four locations 624*a*-624*d* on clock face 606 where a complication can be displayed. Element indicator 620 indicates that location 624*b* is selected for editing. In response to detecting input 610*d*, device 600 displays complication 626 at location 624*b*, as seen in FIG. 6G. In some embodiments, a user can select other locations (e.g., by tapping on a location) and select complications according to the technique described with reference to FIG. 6F. FIG. 6H illustrates user interface 618 after a complication has been selected for each location.

In response to detecting input 610*e* (e.g., a press of input mechanism 604), device 600 exits clock face edit mode and returns to user interface, with representation 616*a* updated with the selected complications, as shown in FIG. 6I. In response to input 610*f* (e.g., a press of input mechanism 604), displays clock face 628 with complication 626 at location 624*b*, as shown in FIG. 6J. Compared to clock face 606 without complication 626 (e.g., as illustrated in FIG. 6A), analog dial 612 is modified (e.g., to provide room on clock face 606 for complication 626). Complication 626 occupies a position on clock face 628 that was previously occupied by analog-dial element 612*b* in clock face 606. In order to provide room on clock face 628 for complication 626, the position and/or size of analog-dial element 612*b* is changed (e.g., such that complication 626 and analog-dial element 612*b* do not overlap or obstruct one another). In the illustrated embodiment in FIG. 6J, analog-dial element 612*b* is shortened such that it occupies a right-side portion of the position that it occupied in clock face 606, while complication 626 occupies a left-side portion of the position that was occupied by analog-dial element 612*b* in clock face 606.

FIG. 7 is a flow diagram illustrating a method for providing a clock face using an electronic device in accordance with some embodiments. Method 700 is performed at an electronic device (e.g., 100, 300, 500, 600) with a display device (e.g., 602). Some operations in method 700 are, optionally, combined, the orders of some operations are, optionally, changed, and some operations are, optionally, omitted.

As described below, method 700 provides an intuitive way for displaying features of a clock face. The method reduces the cognitive burden on a user interacting with a clock face, thereby creating a more efficient human-machine interface. For battery-operated computing devices, enabling a user to interact with a clock face faster and more efficiently conserves power and increases the time between battery charges.

The electronic device (e.g., 600) receives (702) a request to display a clock face (e.g., 606) (e.g., a wrist raise gesture, a request to switch from viewing an application or notification screen to displaying the clock face) that includes a plurality of analog-dial graphical elements (e.g., 612) corresponding to respective units of time.

In response (704) to receiving the request to display the clock face (e.g., 606) and in accordance (706) with a determination that a respective graphical element (e.g., 614, 626) (e.g., a notification dot or a complication that was not included on the clock face prior to editing the face) is to be displayed at a respective location (e.g., 614, 624*b*) on the clock face, the electronic device displays, via the display device, the clock face with the plurality of analog-dial graphical elements (e.g., 612) (e.g., user interface elements) corresponding to respective units of time (e.g., marks, ticks, or indices indicating hours, minutes, or seconds) and the plurality of analog-dial graphical elements including a first analog-dial graphical element (e.g., 612*a*, 612*b*) that occupies a first position and has a first size while the respective graphical element is displayed at the respective location on the clock face (e.g., the position corresponds to an area that defines the shape, location and/or size of the first analog-dial graphical element). Displaying the first analog-dial graphical element such that it occupies a first position and has a first size while the respective graphical element is displayed at the respective location on the clock face in accordance with a determination that a respective graphical element is to be displayed at a respective location on the clock face performs an operation when a particular condition has been met, without requiring further user input, and provides improved visual feedback without cluttering the user interface with additional or oversized graphical elements. This allows a device to modify the analog-dial element such that the analog-dial element and the information provided by the respective graphical element are displayed without obscuring either element. Performing an operation when a particular condition has been met, without requiring further user input, and providing improved visual feedback without cluttering the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the analog-dial graphical elements are arranged in a circular pattern around a perimeter of the display. In some embodiments, the analog-dial graphical elements extend radially away from a central point on the clock face. In some embodiments the respective graphical element has a position that includes at least a portion of a display position of the first analog-dial graphical element when the respective graphical element is not displayed.

In accordance (708) with a determination that the respective graphical element (e.g., 614, 626) is not to be displayed at a respective location (e.g., 614, 624*b*) on the clock face, the electronic device displays, via the display device, the clock face. The clock face includes the plurality of analog-dial graphical elements corresponding to the respective units of time. The first analog-dial graphical element of the plurality of analog-dial graphical elements occupies a second position (e.g., FIG. 6B) different from the first position (e.g., FIG. 6A) and/or has a second size different from the first size (e.g., the first analog-dial graphical element moves and/or shrinks to make room for the previously not-displayed graphical element). In some embodiments, the second position includes a portion of the first position (e.g., the second position is a portion of the first position). In some embodiments, the first position (when the respective graphical element is displayed) occupies at least a portion of the second position (when the respective graphical element is not displayed). Displaying the first analog-dial graphical element such that it occupies a second position different from the first position and/or has a second size different from the first size in accordance with a determination that a respective graphical element is not to be displayed at a respective location on the clock face performs an operation when a particular condition has been met, without requiring further user input, and optimizes the use of space on the user interface. This allows a device to fully display, without modification, the analog-dial element when the respective graphical element is not displayed. Performing an operation when a particular condition has been met, without requiring further user input, and optimizing the use of space on the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective graphical element (e.g., 626) is a complication (e.g., a complication refers to any clock face feature other than those used to indicate the hours and minutes of a time (e.g., clock hands or hour/minute indications)) and the plurality of analog-dial graphical elements (e.g., 612) are positioned around the complication. In some embodiments, complications provide different types of information to a user, such as data obtained from an application. In some embodiments, the information conveyed to a user by a complication is customizable. In some embodiments, the second size (when the complication is not displayed) is larger than the first size (when the complication is displayed). In some embodiments, the first analog-dial graphical element (e.g., a tick) gets shorter but maintains the same general shape (e.g., rounded ends). In some embodiments, some analog-dial graphical elements (e.g., ticks) have two states (e.g., short and long) and other analog-dial graphical elements have only one state.

In some embodiments, the respective graphical element (e.g., 614) represents an alert notification (e.g., a small red dot), the second position (when the notification is not displayed) occupies at least a portion of the respective location on the clock face (the position of the notification dot), and the first position (when the notification is displayed) does not occupy at least a portion of the respective location on the clock face. In some embodiments, the first analog-dial graphical element (e.g., a tick) gets shorter but maintains the same general shape (e.g., rounded ends).

In some embodiments, while displaying the clock face with the respective graphical element displayed at the respective location and the first analog-dial graphical element occupying the first position and having the first size, the electronic device ceases to display the respective graphical element. In response to ceasing to display the respective graphical element, the electronic device replaces display of the first analog-dial graphical element occupying the first position and having the first size with display of the first analog-dial graphical element occupying the second position and having the second size. The first position occupies at least a portion of the second position and the second size is larger than the first size (e.g., the first analog-dial graphical element is displayed at the same position and size as before the respective graphical element was displayed).

Note that details of the processes described above with respect to method 700 (e.g., FIG. 7) are also applicable in an analogous manner to the methods described below. For example, methods 900, 1100, 1300, 1500, 1700, and 1900 optionally include one or more of the characteristics of the various methods described above with reference to method 700. For example, operations 702, 704, 706, and 708 can be applied to the display of the clock faces in operations 902, 906, 908, 1306, and/or 1308. For brevity, these details are not repeated below.

FIGS. 8A-8T illustrate exemplary user interfaces for changing a language setting of a clock face to display features, such as the hour markers on an analog dial, in a selected language, in accordance with some embodiments.

The user interfaces in these figures are used to illustrate the processes described below, including the processes in FIG. 9.

FIG. 8A depicts electronic device 600 displaying clock face 800 on display 602. Clock face 800 includes indication of time 802, graphical element 804a, and graphical element 806a. Indication of time 802 is displayed according to an English language setting (e.g., a clock face-level language setting; a language setting specifically for or limited to clock face 800, or features thereof), with hour markers that include a mixture of numerals and ticks. Graphical elements 804a and graphical element 804b are distinct from indication of time 802. Graphical element 804a corresponds to a calendar application and displays date data from the calendar application. Graphical element 804b corresponds to a weather application and displays current temperature data from the weather application. Graphical element 804a and graphical element 804b are displayed according to an English language setting (e.g., a system-level English language setting).

In FIG. 8A, device 600 detects input 810a (e.g., a contact on touch-sensitive display 602 with a characteristic intensity greater than a threshold intensity or a duration longer than a threshold duration). In response to detecting input 810a, device 600 enters a clock face edit mode and displays user interface 806. In some embodiments, device 600 enters the clock face edit mode in response to detecting a sequence of one or more inputs, in accordance with the technique described above with reference to FIGS. 6C-6E.

User interface 806 includes a representation of clock face 800, element indicator 808 indicating the element that is selected for editing, and paging dots 812a-812d corresponding to first through fourth editing pages, respectively.

Figure 8B:
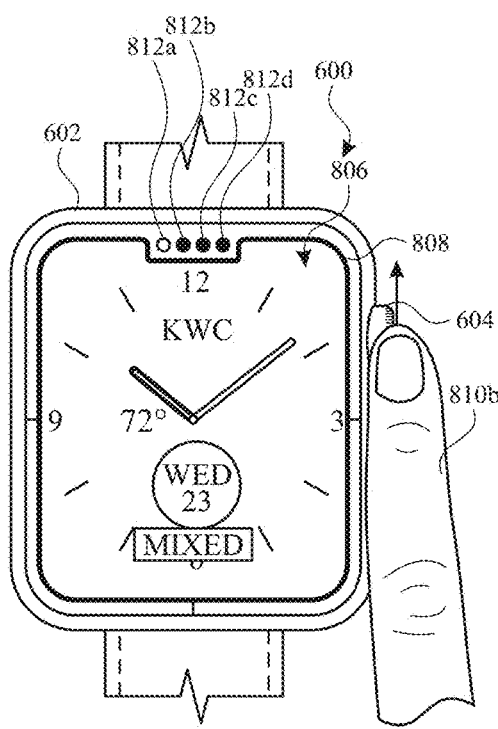

FIG. 8B illustrates the first editing page corresponding to paging dot 812a, as indicated by paging dot 812a being displayed in white to visually distinguish it from paging dots 812b-812d, which are shown in black. In the first editing page a user can rotate input mechanism 604 to edit a style of indication of time 802.

Figure 8C:
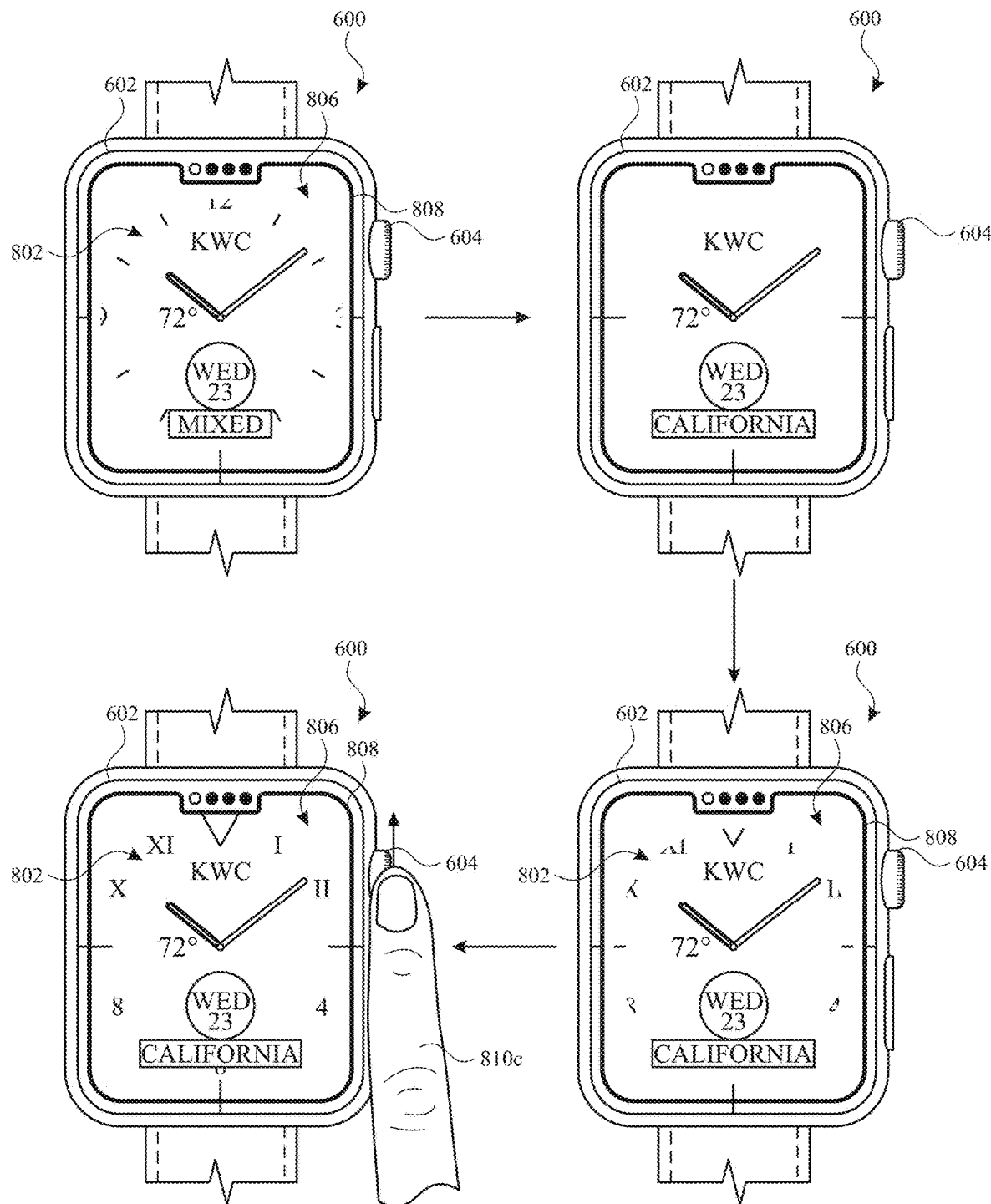

In response to detecting input 801b (e.g., a rotation of input mechanism 604), device 600 changes indication of time 802 from a mixed dial style, with numerals and ticks, to a California dial illustrated in FIG. 8C (e.g., having a mix of Arabic and Roman numerals).

In some embodiments, editing the style of the dial of a clock face includes an animation. FIG. 8C illustrates an embodiment of an animation. In FIG. 8C, device 600 fades out characters of the current style along a direction toward a center of the analog dial (FIG. 8C, top left to top right) and then fades in characters of the new style along a direction away from the center of the analog dial (FIG. 8C, bottom right to bottom left). In some embodiments, the first style fades out toward the center and the second style fades in away from the center. In some embodiments, the first style fades out away from the center and the second style fades in toward the center. In some embodiments, the first style fades out toward the center and the second style fades in toward the center. In some embodiments, the first style fades out away from the center and the second style fades in away from the center. In some embodiments, the characters used to represent divisions of time fade in and out in accordance with the rotation of the input mechanism 604.

As illustrated in FIG. 8C, the California dial includes Roman numerals for hour markers 1, 2, 10, and 11, Arabic numerals in English for hour markers 4, 5, 7, and 8, a symbol (e.g., downward pointing triangle) at 12 o'clock, and horizontal bars at 3, 6, and 9.

Figure 8D:
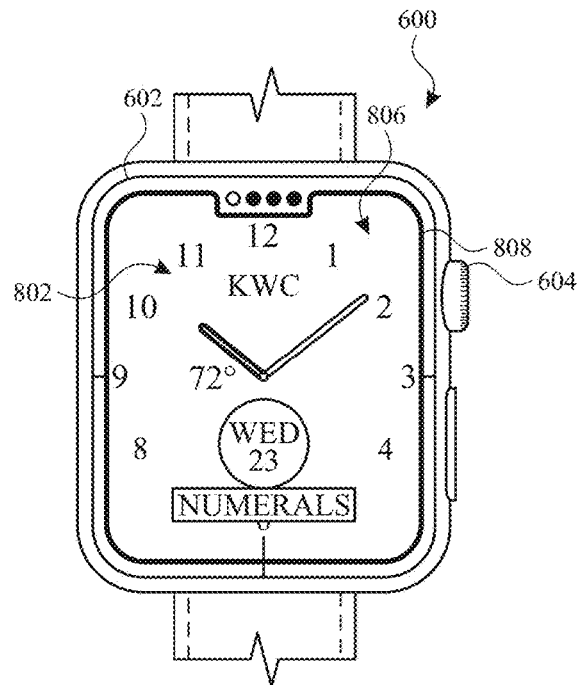

In response to detecting input 801c (e.g., a rotation of input mechanism 604), device 600 changes indication of time 802 from the California dial style to a dial style with a numeral at each hour marker, as illustrated in FIG. 8D.

Figure 8E:
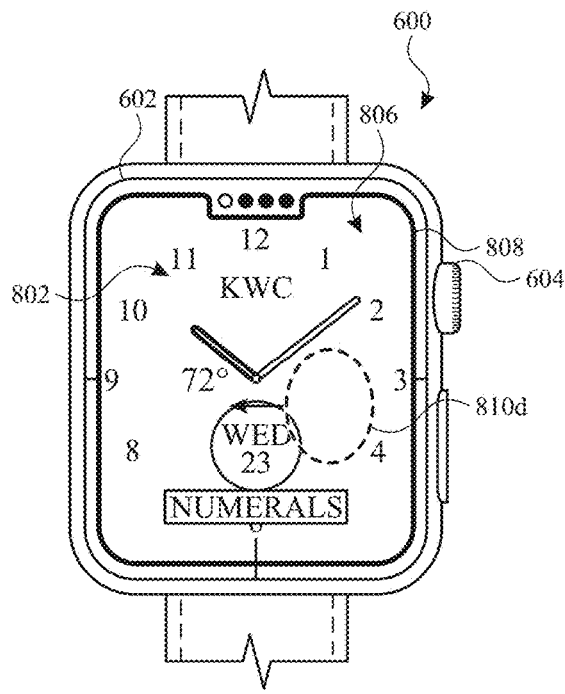
Figure 8F:
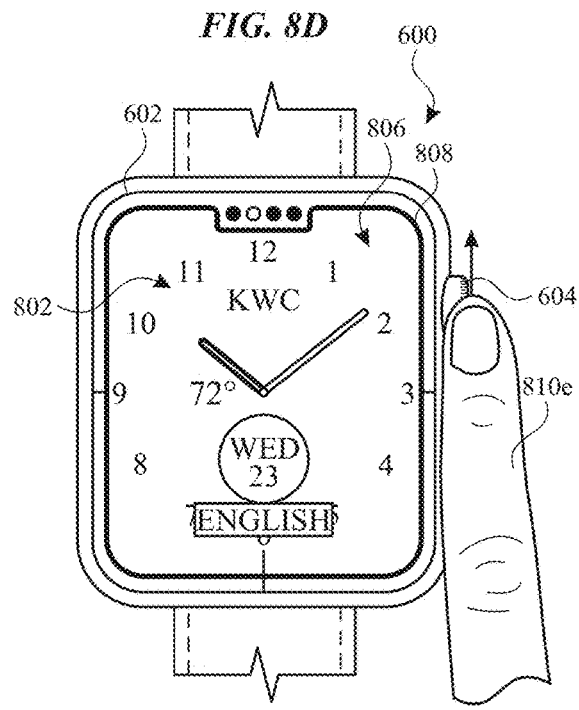
Figure 8G:
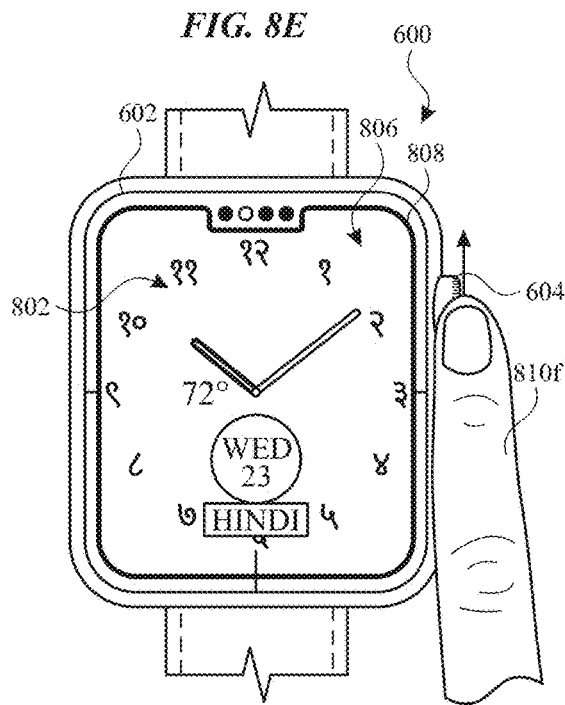

Turning to FIG. 8E, device 600 detects input 810d (e.g., a horizontal swipe). In response to input 810d, device 600 switches to the second editing page corresponding to paging dot 812b. The second editing page provides capability to change a language setting for clock face 800. In FIG. 8F, device 600 indicates that English is the current language setting. In response to detecting user input 810e (e.g., rotation of input mechanism 604), device 600 changes a language setting for clock face 800. As illustrated in FIG. 8G, device 600 sets the language setting to Hindi and changes the language in which indication of time 802 is displayed by changing the display of the numerals in indication of time 802 from English to Hindi. Graphical element 804a and graphical element 804b remain displayed in English.

Figure 8H:
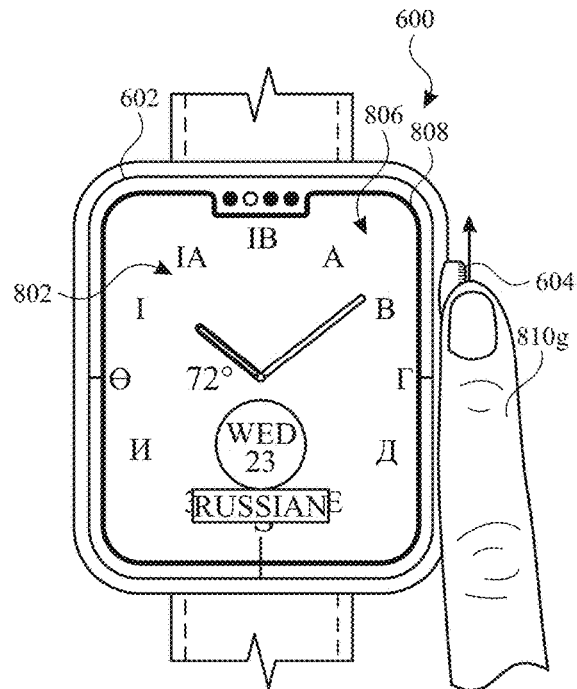

In response to detecting input 810f (e.g., rotation of input mechanism 604), device 600 sets the language setting to Latin and changes the display of the numerals in indication of time 802 from Hindi to Roman numerals, as illustrated in FIG. 8H. Graphical element 804a and graphical element 804b remain displayed in English.

Figure 8I:
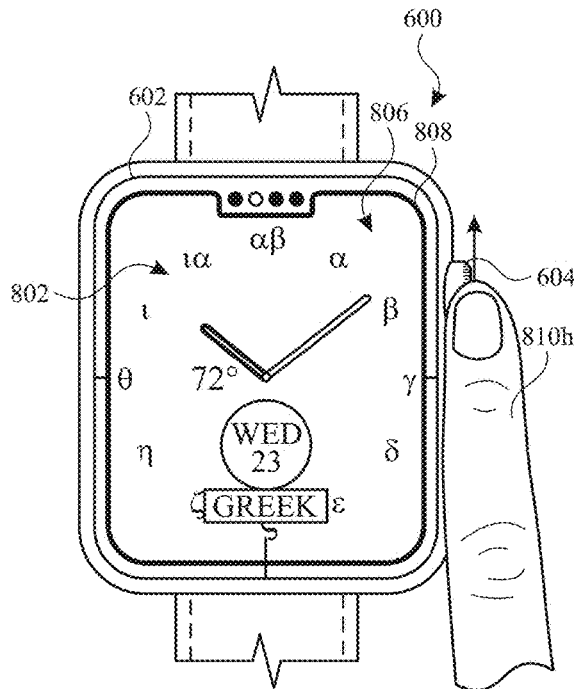

In response to detecting input 810g (e.g., rotation of input mechanism 604), device 600 sets the language setting to Greek and changes the display of the numerals in indication of time 802 from Roman numerals to Greek, as illustrated in FIG. 8I. Graphical element 804a and graphical element 804b remain displayed in English.

Figure 8J:
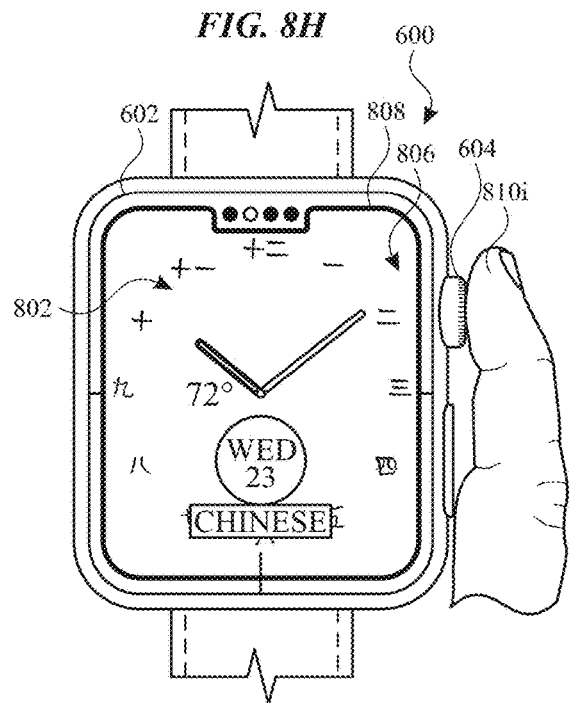

In response to detecting input 810h (e.g., rotation of input mechanism 604), device 600 sets the language setting to Chinese and changes the display of the numerals in indication of time 802 from Greek to Chinese, as illustrated in FIG. 8J. Graphical element 804a and graphical element 804b remain displayed in English.

Figure 8K:
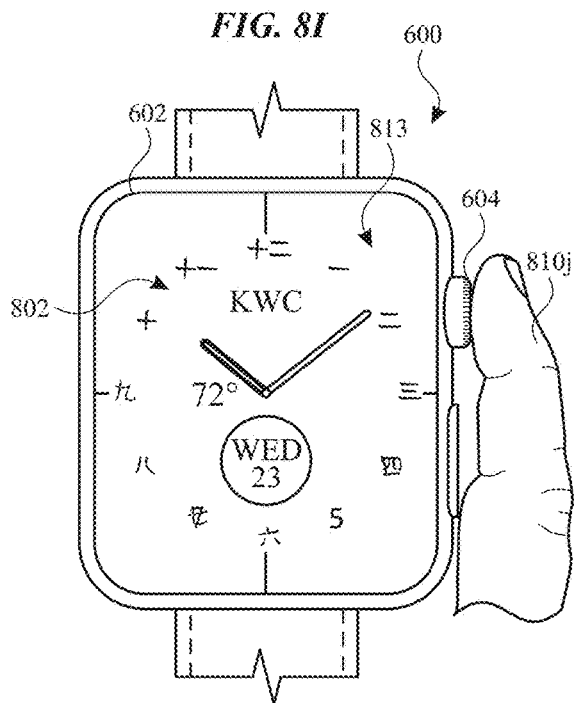

In response to detecting input 810i (e.g., a press of input mechanism 604), device 600 exits the clock face editing mode and displays clock face 813 with indication of time 802 displayed according to the last selected language, Chinese, while graphical element 804a and graphical element 804b remain displayed in English, as illustrated in FIG. 8K. In some embodiments, the language of the indication of time can be changed for other dial styles (e.g., "Mixed" in FIG. 8A and California in FIG. 8C).

Figure 8L:
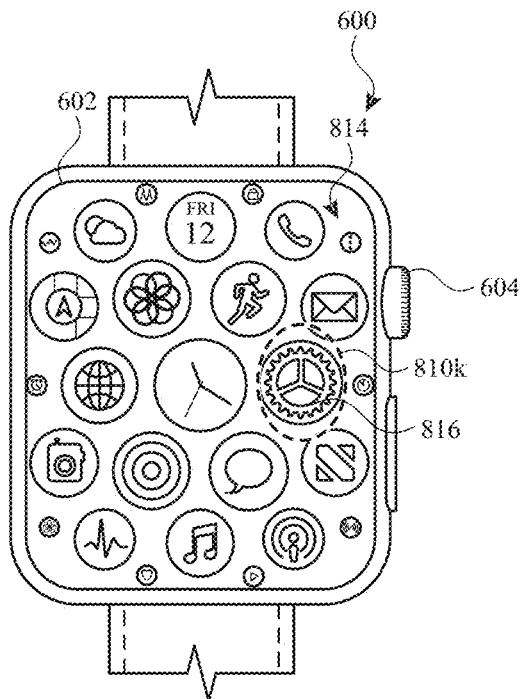
Figure 8M:
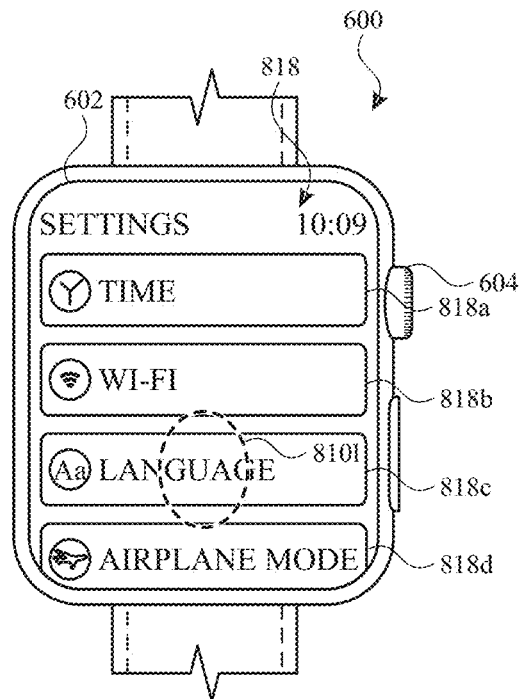
Figure 8N:
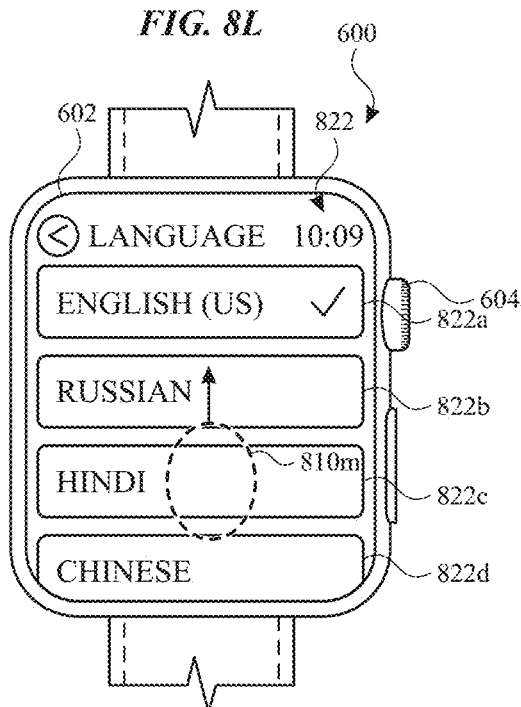
Figure 8O:
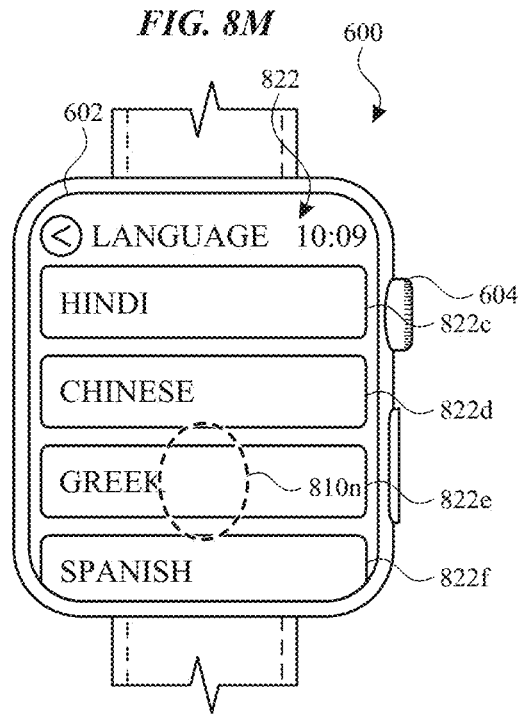

In FIG. 8K, device 600 detects input 810j (e.g., a press of input mechanism 604). In response to detecting input 810j, device 600 displays user interface 814, as illustrated in FIG. 8L. User interface 814 includes a plurality of affordances corresponding to respective applications, menus, user interfaces, or the like. In response to detecting input 810k (e.g., a tap) on affordance 816 (e.g., a settings menu affordance), device 600 displays user interface 818, as illustrated in FIG. 8M. User interface 818 includes a settings menu with affordances 818a-818d corresponding to respective settings options. In response to detecting input 810l (e.g., a tap) selecting affordance 818c, device 600 displays user interface 822 including a system language setting menu with language options, as illustrated in FIG. 8N. Initially, language options 822a-822d are displayed on display 602. In response to detecting input 810m (e.g., an upward swipe), device 600 scrolls user interface 822 to display additional language options 822e and 822f, while removing display of language options 822a and 822b, as illustrated in FIG. 8O. In response to detecting input 810n (e.g., a tap) selecting affordance 822e corresponding to the language Greek, device 600 sets a system language setting of device 600 to Greek, and changes the language in which the text in user interface 822 is displayed from English to Greek, as illustrated in FIG. 8P. In some embodiments, device 600 determines the system language setting based on a location of device 600. For example, device 600 can obtain location information and set the system language setting to a language associated with a location determined based on the obtained location information. In some embodiments, device 600 obtains location information via, for example, a GPS signal, a cellular signal, or other data.

In response to detecting input 810*o* (e.g., a press of input mechanism 604), device 600 exits the settings menu and displays clock face 823 according to the selected system language setting, Greek. As illustrated in FIG. 8Q, graphical element 804*a* and graphical element 804*b* are displayed in Greek according to the system language setting, and indication of time 802 remains displayed according to the selected clock face language setting, Chinese.

Figure 8R:
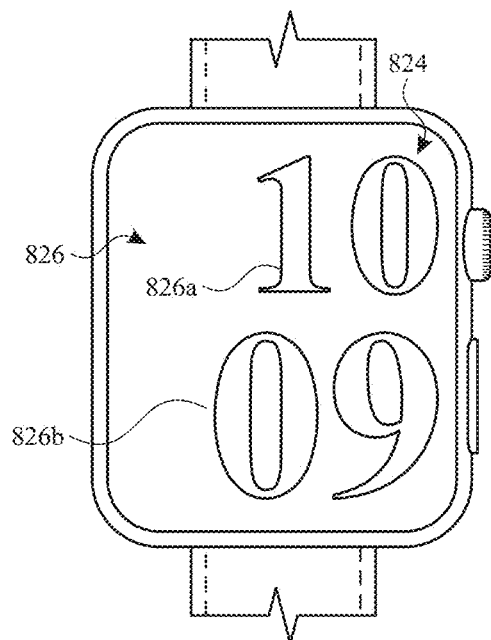
Figure 8S:
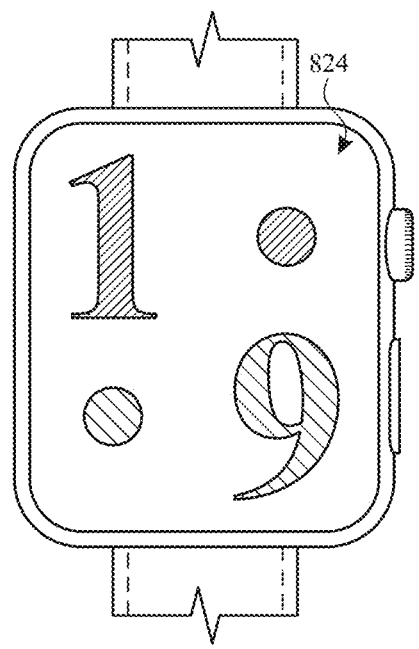
Figure 8T:
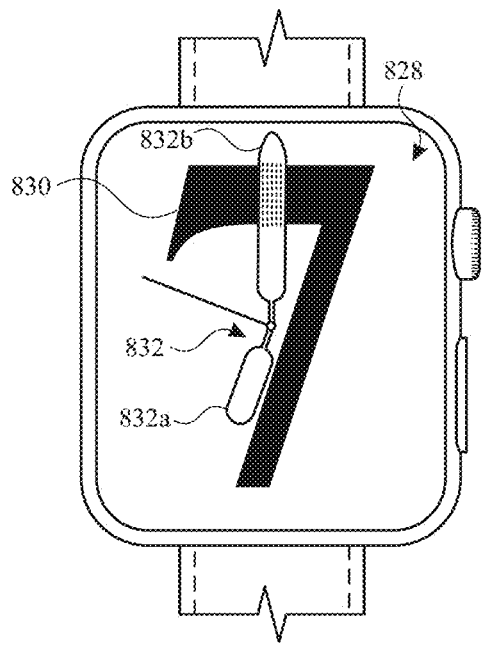

Turning to FIGS. 8R-8T, embodiments of clock faces to which at least some of the techniques described above with reference to FIGS. 8A-Q can be applied. FIG. 8R illustrates clock face 824 with digital indication of time 826, which includes hour indicator 826*a* and minute indicator 826*b*. In some embodiments, clock face 824 is selected by entering the clock face edit mode, navigating to a style editing page, and rotating input mechanism 604 to select the clock face style illustrated in FIG. 8R.

In FIG. 8R, clock face 824 is displayed according to a clock face language setting of English. In some embodiments, various elements of clock face 824 can be edited by entering the clock face edit mode, navigating to an editing page, and rotating input mechanism 604 to edit an element. In some embodiments, a user can edit a language setting and a color setting for clock face 824. FIG. 8S illustrates clock face 824 displayed according to a clock face language setting of Arabic. In FIG. 8S, hour indicator 826*a* is displayed in a first color and minute indicator 826*b* is displayed in a second color different from the first color. In some embodiments, the colors of hour indicator 826*a* and minute indicator 826*b* are the same or are in accordance with a predefined color scheme. In some embodiments, a first color of one of the hour indicator 826*a* and minute indicator 826*b* is determined (e.g., based on a color of a band of device 600) and a second color for the other indicator is generated (e.g., automatically) based on the determined first color.

FIG. 8T illustrates clock face 828. In some embodiments, clock face 828 is selected by entering the clock face edit mode, navigating to a style editing page, and rotating input mechanism 604 to select the clock face style illustrated in FIG. 8T. Clock face 828 includes digital indication of time 830 and analog indication of time 832. Digital indication of time 830 includes a single digit representing an hour. Analog indication of time 832 includes hour hand 832*a* and minute hand 832*b*. In FIG. 8T, hour hand 832*a* and minute hand 832*b* are different colors. Analog indication of time 832 is displayed in front of digital indication of time 832. In some embodiments, hour hand 832*a* and/or minute hand 832*b* are translucent such that a portion of the digit of digital indication of time 830 that overlaps with a hand of analog indication of time 832 is partially visible.

Figure 9:
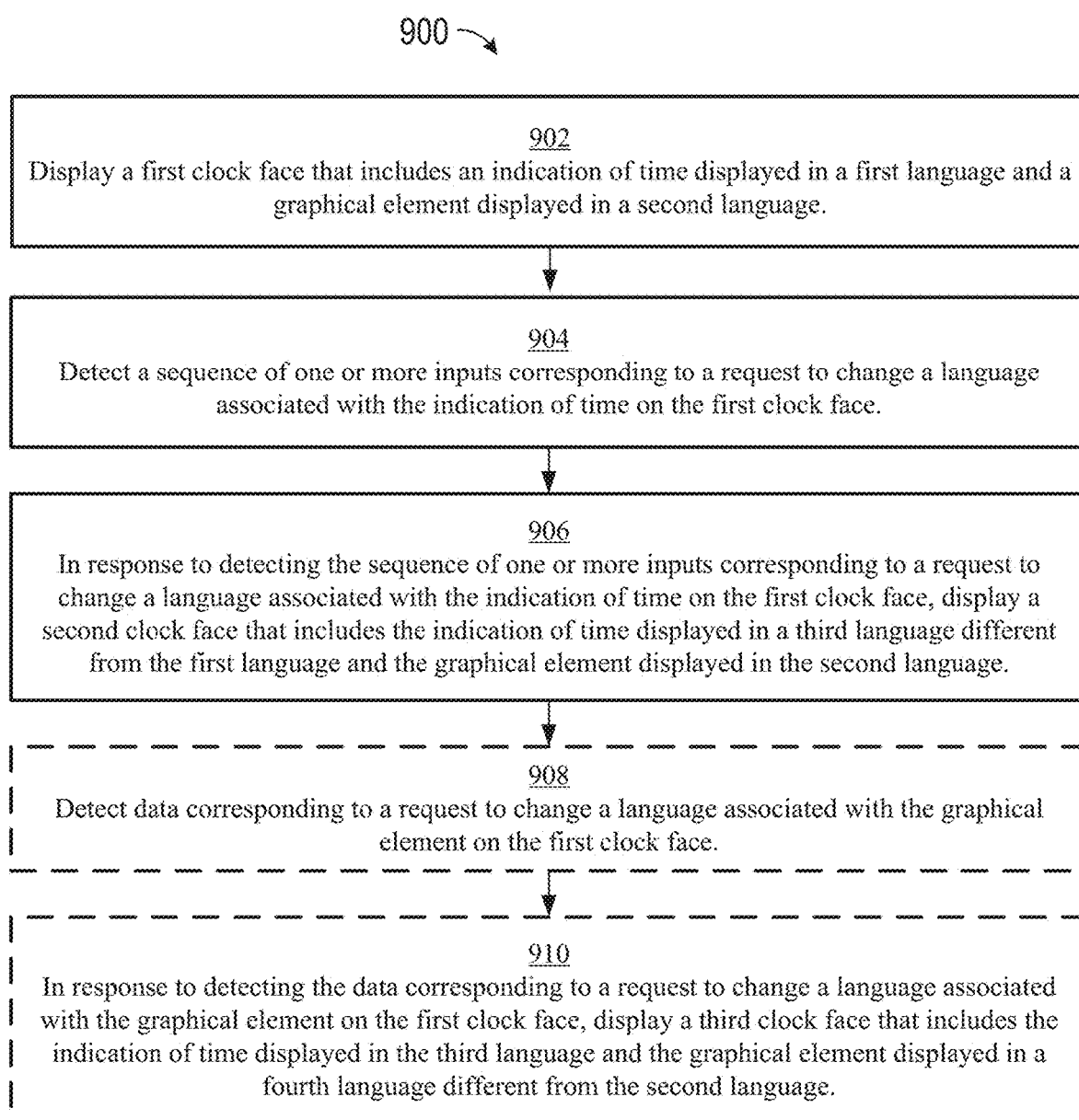
FIG. 9 illustrates an exemplary method in accordance with some embodiments.
Figures 10L, 10M:
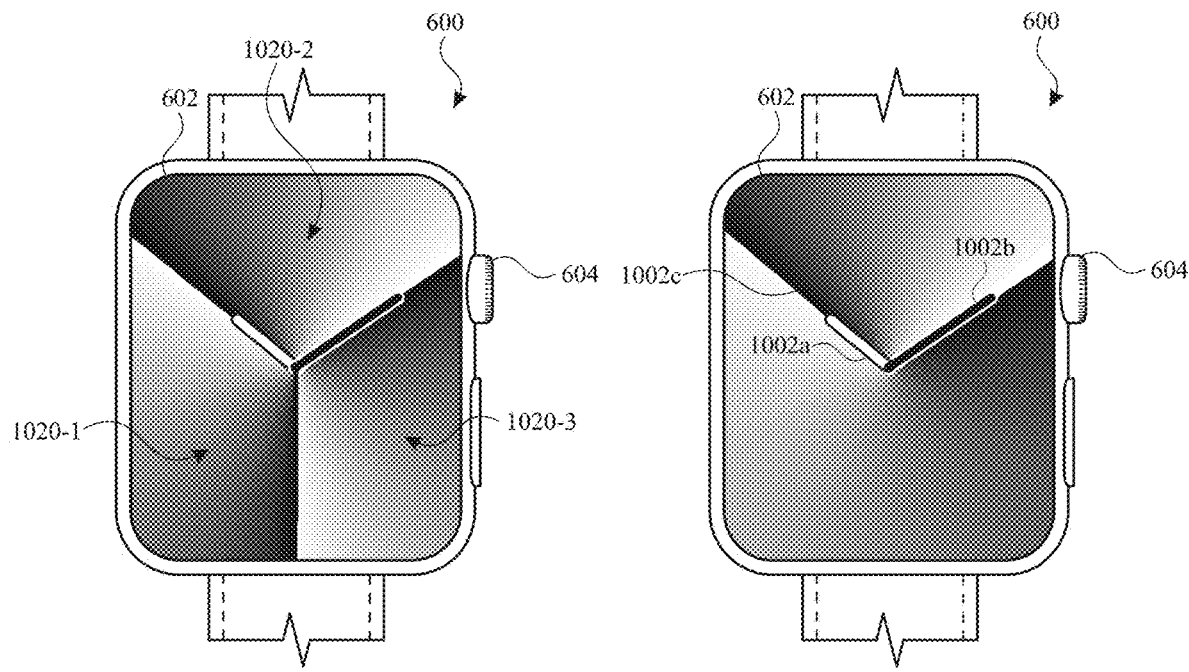
FIGS. 10A-10N illustrate exemplary user interfaces in accordance with some embodiments.
Figure 10N:
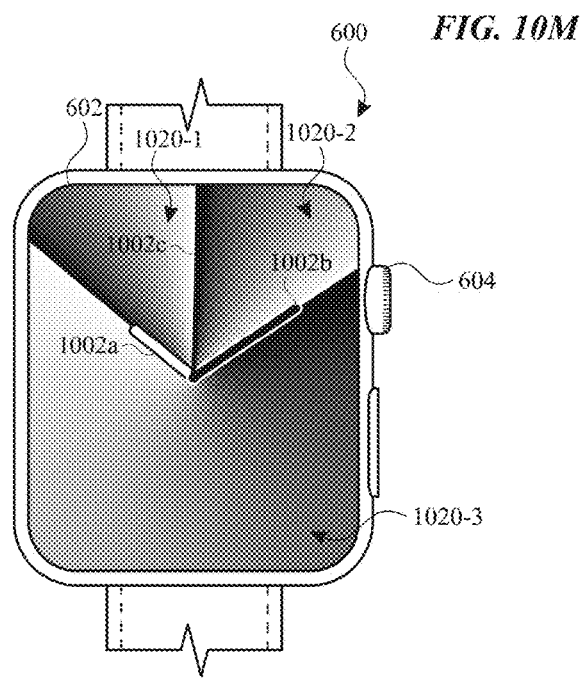

FIG. 9 is a flow diagram illustrating a method for selecting a language for a clock face using an electronic device in accordance with some embodiments. Method 900 is performed at an electronic device (e.g., 100, 300, 500, 600) with a display device (e.g., 602). Some operations in method 900 are, optionally, combined, the orders of some operations are, optionally, changed, and some operations are, optionally, omitted.

As described below, method 900 provides an intuitive way for selecting a language for a clock face. The method reduces the cognitive burden on a user for selecting a language for a clock face, thereby creating a more efficient human-machine interface. For battery-operated computing devices, enabling a user to select a language for a clock face faster and more efficiently conserves power and increases the time between battery charges.

The electronic device displays (902), via the display device, a first clock face (e.g., 800 in FIG. 8A). The first clock face includes an indication of time (e.g., 802, 826, 830) (e.g., a digital indication of time or an analog face including one or more hands and, optionally, a dial) and a graphical element (e.g., 804*a*, 804*b*) distinct from the indication of time (e.g., a complication; a complication refers to any clock face feature other than those used to indicate the hours and minutes of a time (e.g., clock hands or hour/minute indications). The indication of time is displayed in a first language (e.g., the numerals on a digital face or an analog dial are in the first language; e.g., English, Hindi, Arabic, Roman, Latin, Russian, Greek, Chinese) and the graphical element is displayed in a second language. In some embodiments, the second language is the same as the first language. In some embodiments, the second language is different from the first language. In some embodiments, complications provide different types of information to a user, such as data obtained from an application. In some embodiments, the information conveyed to a user by a complication is customizable.

The electronic device detects (904) a sequence of one or more inputs (e.g., 810*a*-810*i*) (e.g., contacts on a touch-sensitive display and/or activation (e.g., depression or rotation) of a rotatable input mechanism) corresponding to a request to change a language associated with the indication of time (e.g., 802) on the first clock face (e.g., 800) (e.g., enter a clock face editing mode, select a language-selection interface/page, select a different language, and confirm selection of clock face).

In response (906) to detecting the sequence of one or more inputs corresponding to a request to change a language associated with the indication of time on the first clock face, the electronic device displays, via the display device, a second clock face (e.g., 813). The second clock face includes the indication of time (e.g., 802). The indication of time is displayed in a third language (e.g., Chinese) different from the first language (e.g., English) (e.g., the language used for numerals on a digital face or an analog dial is changed) and the graphical element (e.g., 804*a*, 804*b*) is displayed in the second language (e.g., English) (e.g., the language of the graphical element is maintained). Displaying the second clock face with the indication of time in a third language different from the first language and the graphical element in the second language in response to detecting the sequence of one or more inputs corresponding to a request to change a language associated with the indication of time on the first clock face provides improved feedback and allows a user to customize a clock face by selecting a particular language for the indication of time on the clock face without affecting other elements of the clock face, such as complications. This feature also provides additional customization options (e.g., language customization) without requiring the user to change a location associated with the entire device. Providing improved feedback and customization enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes a rotatable input mechanism (e.g., 604) that is configured to rotate relative to a housing of the electronic device (e.g., around an axis parallel to a display of the electronic device). In some embodiments, the sequence of one or more inputs corresponding to the request to change the language associated with the indication of time on the first clock face includes a rotation (e.g., 810e-810h) of the rotatable input mechanism.

In some embodiments, while the indication of time is displayed in the third language, the electronic device detects (908) data (e.g., a second sequence (e.g., 810j-810o) of one or more inputs (e.g., contacts on a touch-sensitive display and/or activation (e.g., depression or rotation) of a rotatable and depressible input mechanism), GPS data indicating that the electronic device has moved to a location with a different common language) corresponding to a request to change a language associated with the graphical element on the first clock face. In some embodiments, a system language is changed in a general settings menu. In some embodiments, the system language is changed based on geographic location.

In some embodiments, in response (910) to detecting the data corresponding to a request to change a language associated with the graphical element on the first clock face, the electronic device displays, via the display device, a third clock face (e.g., 823). The third clock face includes the indication of time (e.g., 802) displayed in the third language (e.g., the current language of the indication of time is maintained) and the graphical element (e.g., 804a, 804b) displayed in a fourth language (e.g., Greek) different from the second language (e.g., English) (e.g., the language of the graphical element is changed). Displaying the third clock face with the graphical element in a fourth language different from the second language and the indication of time in the third language in response to detecting the data corresponding to a request to change a language associated with the graphical element on the first clock face provides improved feedback and allows a user to customize a clock face by selecting a particular language for graphical elements, such as complications, while maintaining a selected language for the indication of time. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first clock face and/or the second clock face includes displaying the indication of time in a first color. In some embodiments, the electronic device receives a request to display a current clock face (e.g., a wrist raise gesture, a request to switch from viewing an application or notification screen to displaying the clock face). In response to receiving the request to display a current clock face, the electronic device displays, via the display device, a fourth clock face. The fourth clock face includes the indication of time displayed in a second color different from the first color (e.g., the color used for numerals on a digital face or an analog dial is changed) and the graphical element (e.g., the appearance of the graphical element is maintained). In some embodiments, changing color on wrist raise is a user-selectable option (e.g., in an edit mode).

In some embodiments, the indication of time includes a plurality of graphical elements. The plurality of graphical elements include a first graphical element representing a numeral (e.g., "3", "III") and a second graphical element distinct from a representation of a numeral (e.g., a tick mark) (e.g., FIG. 8C). In some embodiments, the plurality of graphical elements are all numerals.

In some embodiments, the indication of time includes an analog dial and displaying the first clock face and/or the second clock face includes displaying the analog dial according to a first style (e.g., all numerals dial (FIG. 8D) or a dial (e.g., FIG. 8A, 8C) having a combination of numerals and non-numeric graphical elements (e.g., symbols)). In some embodiments, the electronic device detects a sequence of one or more inputs (e.g., 810a-810c) (e.g., contacts on a touch-sensitive display and/or activation (e.g., depression or rotation) of a rotatable input mechanism) corresponding to a request to change a style of the analog dial (e.g., enter a face editing mode, select a dial style-selection interface, select a different dial style, and confirm selection of style). In some embodiments, the dial style is adjusted after adjusting language (e.g., the style of the dial is changes while maintaining the language selected for the dial). In some embodiments, in response to detecting the sequence of one or more inputs corresponding to a request to change a style of the analog dial, the electronic device displays, via the display device, a fourth clock face (e.g., FIG. 8C, 8D). The fourth clock face includes the indication of time with the analog dial displayed according to a second style different from the first style and the graphical element (e.g., the appearance of the graphical element is maintained). Displaying the fourth clock face including the indication of time (analog or digital) according to a second style different from a first style in response to detecting a sequence of one or more inputs provides improved feedback and allows a user to customize a clock face by selecting a particular style of dial (in addition to the language of the dial). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes a rotatable input mechanism (e.g., 604) configured to rotate relative to a housing of the electronic device and the sequence of one or more inputs (e.g., 810b, 810c) corresponding to a request to change a style of the analog dial includes a rotation of the rotatable input mechanism. In some embodiments, displaying the fourth clock face includes fading out characters used to represent divisions of time (e.g., numerals and/or tick marks) in the analog dial displayed according to the first style along a first direction relative to a center of the analog dial (e.g., toward or away from the center of the analog dial) and then fading in characters used to represent divisions of time in the analog dial displayed according to the second style along a second direction relative to the center of the analog dial (e.g., toward or away from the center of the analog dial). In some embodiments, the first style fades out toward the center and the second style fades in away from the center. In some embodiments, the first style fades out away from the center and the second style fades in toward the center. In some embodiments, the first style fades out toward the center and the second style fades in toward the center. In some embodiments, the first style fades out away from the center and the second style fades in away from the center. In some embodiments, the characters used to represent divisions of time fade in and out in accordance with the rotation of the rotatable input mechanism.

In some embodiments, fading in the characters used to represent divisions of time displayed according to the second style begins after fading out the characters used to represent divisions of time displayed according to the first style is complete. In some embodiments, the second style begins fading in before the first style has finished fading out.

In some embodiments, the electronic device receives a request to display a current clock face (e.g., a wrist raise gesture, a request to switch from viewing an application, an application-selection screen (springboard), or a notification screen to displaying the clock face). In response to receiving the request to display a current clock face, the electronic device displays, via the display device, a fifth clock face including the indication of time and the graphical element. In some embodiments, the indication of time includes an analog dial and displaying the fifth clock face includes fading in characters used to represent divisions of time in the analog dial along a direction relative to a center of the analog dial (e.g., toward or away from the center of the analog dial).

In some embodiments (e.g., FIG. 8T), the indication of time includes a digital indication of time (e.g., 830) displayed concurrently with (e.g., displayed behind) an analog indication of time (e.g., 832) (e.g., the analog indication of time overlays at least a portion of the digital indication of time). The analog indication of time includes a plurality of clock hands (e.g., 832a, 832b) displayed in front of the digital indication of time (e.g., translucent or semi-transparent clock hands).

In some embodiments, the indication of time includes an analog dial and displaying the first clock face and/or the second clock face includes displaying the analog dial according to a first style (e.g., all numerals dial or California dial). In some embodiments, the electronic device detects a sequence of one or more inputs (e.g., contacts on a touch-sensitive display and/or activation (e.g., depression or rotation) of a rotatable input mechanism) corresponding to a request to change a color of a clock face (e.g., enter a face editing mode, select a color-selection interface, select a color, and confirm selection of face). In some embodiments, color is adjusted after adjusting language. In some embodiments, in response to detecting the sequence of one or more inputs corresponding to a request to change a color of a clock face, the electronic device displays, via the display device, a sixth clock face. The sixth clock includes the indication of time according to the request to change the color of the clock face and the graphical element according to the request to change the color of the clock face.

In some embodiments, the indication of time includes an hour indicator (e.g., 826a) (e.g., a digital numeral, hour hand, or one or more hour markers on an analog dial) displayed in a first color and a minute indicator (e.g., 826b) (e.g., a digital numeral, minute hand, or one or more minute markers on an analog dial) displayed in a second color different from the first color.

In some embodiments, the indication of time includes an hour indicator (e.g., a digital numeral, hour hand, or one or more hour markers on an analog dial) and a minute indicator (e.g., a digital numeral, minute hand, or one or more minute markers on an analog dial), and in accordance with a user selection of a first color for both the hour indicator and the minute indicator, the electronic device displays the hour indicator in a second color (e.g., the first color or a color different from the first color (e.g., a slightly darker shade of the first color) and the minute indicator in a third color different from the second color (e.g., a slightly darker or lighter shade of the second color).

Note that details of the processes described above with respect to method 900 (e.g., FIG. 9) are also applicable in an analogous manner to the methods described below/above. For example, methods 700, 1100, 1300, 1500, and 1700 optionally includes one or more of the characteristics of the various methods described above with reference to method 900. For example, the operations of method 900 can be used to change an indication of time in methods 700, 1300, 1500, and 1700. For brevity, these details are not repeated below.

FIGS. 10A-10N illustrate exemplary user interfaces for presenting one or more gradients on a clock face, where the gradient(s) are displayed based on the position of one or clock hands indicating a time on the clock face, in accordance with some embodiments. The user interfaces in these figures are used to illustrate the processes described below, including the processes in FIG. 11.

FIG. 10A depicts electronic device 600 displaying a first clock face 1000 on display 602 at a first time (e.g., 10 hr:09 min:23 sec). In some embodiments, device 600 displays first clock face 1000 in response to receiving a request to display a clock face (e.g., a wrist raise gesture, a request to switch from viewing an application or notification screen to displaying the clock face). First clock face 1000 includes a plurality of clock hands, including hour hand 1002a, minute hand 1002b, and seconds hand 1002c, and color gradient 1004 (e.g., an angular color gradient). Color gradient 1004 includes a gradual transition from a first color at first edge 1004a of color gradient 1004 to a second color at second edge 1004b of color gradient 1004. First edge 1004a is selected based on a position of seconds hand 1002c (e.g., a clockwise-facing side of seconds hand 1002c) and second edge 1002b is also selected based on the position of seconds hand 1002c (e.g., a counter-clockwise-facing side of seconds hand 1002c). In FIG. 10A, the edges of gradient 1004 are located along the position of seconds hand 1002c.

In FIGS. 10A-10G, the direction of the change in color of a gradient is indicated by a curved arrow. In some embodiments (e.g., angular color gradients), the color of a gradient is constant along a particular direction from an origin (e.g., the center of the face) and varies with angle around the origin.

Turning again to FIG. 10A, device 600 detects input 1010a (e.g., a contact on touch-sensitive display 602 with a characteristic intensity greater than a threshold intensity or a duration longer than a threshold duration). In response to detecting input 1010a, device 600 enters a clock face edit mode and displays user interface 1006. In some embodiments, device 600 enters the clock face edit mode in response to detecting a sequence of one or more inputs, in accordance with the technique described above with reference to FIGS. 6C-6E.

User interface 1006 provides capability to select the number of color gradients included on the clock face. User interface 1006 includes a representation of clock face 1000, element indicator 1008 indicating the element that is selected for editing, and paging dots 1012a-1012b corresponding to first and second editing pages, respectively. FIG. 10B also illustrates clock face 1000, with gradient 1004 displayed according to clock hands 1002a-1002c in a different position (e.g., indicating a different time). FIG. 10B illustrates that color gradient 1004 changes position (e.g., rotates) in accordance with movement of seconds hand 1002c. FIG. 10B depicts first clock face 1000 indicating a time (e.g., 10 hr:09 min:30 sec) different from the time indicated by hands 1002a-1002c in FIG. 10A. The colors of color gradient 1004 remain the same and first edge 1004a and second edge 1004b maintain the same relationship with the position of seconds hand 1002c (e.g., along seconds hand 1002c). Compared to the display at the time indicated in FIG. 10A, color gradient 1004 is rotated by the same amount as seconds hand 1002c (e.g., color gradient 1004 is fixed to seconds hand 1002c). In some embodiments, the position of color gradient 1004 (e.g., first edge 1004a and second edge 1004b) is based on the position of hour hand 1002a (e.g., not on the position of minutes hand 1002b or seconds hand 1002c). In some embodiments, the position of color gradient 1004 is based on the position of minute hand 1002b (e.g., not on the position of hour hand 1002a or seconds hand 1002c).

FIG. 10B illustrates the first editing page corresponding to paging dot 1012a, as indicated by paging dot 1012a being displayed in white to visually distinguish it from paging dot 1012b, which is shown in black. In the first editing page a user can rotate input mechanism 604 to change the number of gradients included on the clock face.

In response to detecting input 1001b (e.g., a rotation of input mechanism 604), device 600 displays clock face 1014 with two color gradients, color gradient 1016-1 and color gradient 1016-2, hour hand 1002a, minute hand 1002b, seconds hand 1002c, as illustrated in FIG. 10C.

Color gradient 1016-1 includes a gradual transition from the first color at first edge 1016-1a of color gradient 1016-1 to the second color at second edge 1016-1b of color gradient 1016-1. First edge 1016-1a and second edge 1016-1b are both selected based on a position of minute hand 1002b, with first edge 1016-1a located along the clockwise facing side of minute hand 1002b and second edge 1016-1b located 180 degrees around clock face 1014 from minute hand 1002b. Color gradient 1016-2 includes a gradual transition from the first color (e.g., a color that is the same or different than the first color of gradient 1016-1) at first edge 1016-2a of color gradient 1016-2 to the second color (e.g., a color that is the same or different than the second color of gradient 1016-1) at second edge 1016-2b of color gradient 1016-2. First edge 1016-2a and second edge 1008-2b are both selected based on the position of minute hand 1002b, with first edge 1016-1a located 180 degrees around clock face 1014 from minute hand 1002b and second edge 1016-1b located along the counterclockwise-facing side of minute hand 1002b.

In response to input 1010c (e.g., a press of input mechanism 604), device 600 exits clock face edit mode and displays clock face 1014 as shown in FIG. 10D. In some embodiments, device 600 exits clock face edit mode and displays clock face 1014 as shown in FIG. 10D in response to a sequence of one or more inputs as described above with reference to FIGS. 6H-6J.

FIG. 10D depicts clock face 1014 indicating a time different from the time indicated while in clock face edit mode in FIG. 10C. Color gradients 1016-1 and 1016-2 have different positions in accordance with the difference in position of minute hand 1002b compared to FIG. 10C. As time progresses, color gradients 1016-1 and 1016-2 rotate around clock face 1014 with minute hand 1002b, maintaining the same relationship relative to minute hand 1002b as described with reference to FIGS. 10C and 10D. As minute hand 1002b rotates, the angular extents of color gradients 1016-1 and 1016-2 remain constant, and the position of color gradient 1016-1 relative to color gradient 1016-2 remains constant.

Device 600 can also display a clock face with three color gradients. A user can edit the clock face to display three color gradients (or switch the clock face back to one color gradient) via the clock face edit mode described with reference to FIGS. 10A-10D.

FIG. 10E illustrates clock face 1018 with three color gradients, 1020-1, 1020-2, and 1020-3. Color gradient 1020-1 includes a gradual transition from the first color at first edge 1020-1a of color gradient 1020-1 to the second color at second edge 1020-1b of color gradient 1020-1. Based on the positions of clock hands 1002a-1002c in FIG. 10E, first edge 1020-1a is selected based on a position of seconds hand 1002c, with first edge 1020-1a located along the clockwise facing side of seconds hand 1002b. Second edge 1020-1b is selected based on a position of hour hand 1002a, with second edge 1020-1b located along the counterclockwise facing side of hour hand 1002a.

Color gradient 1020-2 includes a gradual transition from the first color at first edge 1020-2a of color gradient 1020-2 to the second color at second edge 1020-2b of color gradient 1020-2. Based on the positions of clock hands 1002a-1002c in FIG. 10E, first edge 1020-2a is selected based on a position of hour hand 1002a, with first edge 1020-2a located along the clockwise facing side of hour hand 1002a. Second edge 1020-2b is selected based on a position of minute hand 1002b, with second edge 1020-2b located along the counterclockwise facing side of minute hand 1002b.

Color gradient 1020-3 includes a gradual transition from the first color at first edge 1020-3a of color gradient 1020-3 to the second color at second edge 1020-3b of color gradient 1020-3. Based on the positions of clock hands 1002a-1002c in FIG. 10E, first edge 1020-3a is selected based on a position of minute hand 1002b, with first edge 1020-3a located along the clockwise facing side of minute hand 1002a. Second edge 1020-3b is selected based on a position of seconds hand 1002c, with second edge 1020-3b located along the counterclockwise facing side of seconds hand 1002c.

As the relative positions of clock hands 1002a-1002c change (e.g., as time progresses), color gradients 1020-1, 1020-2, and 1020-3 change position (e.g., compress, expand, and/or rotate) in accordance with the change in positions of clock hands 1002a-1002c. For example, as time progresses and seconds hand 1002c gets closer to hour hand 1002a, color gradient 1020-1 gets smaller (e.g., compressed) and color gradient 1020-3 gets larger (e.g., expanded).

FIG. 10F depicts clock hands 1002a-1002c indicating a time different from the time indicated in FIG. 10E. The colors of color gradients 1020-1, 1020-2, and 1020-3 remain the same, and the relationships between color gradients 1020-1, 1020-2, and 1020-3 relative to clock hands 1002a-1002c remain the same. In FIG. 10F, seconds hand 1002c has the same angular position as hour hand 1002a. Since there is no angular separation between hour hand 1002a and seconds hand 1002c color gradient 1020-1 is not displayed (e.g., since color gradient 1020-1 occupies the angular extent of clock face 1018 going clockwise from seconds hand 1002c to hour hand 1002a). The size and position of color gradient 1020-2 remains substantially the same since the positions of hour hand 1002a and minute hand 1002b are substantially unchanged (e.g., there is only slight movement of hour hand 1002a and minute hand 1002b over the course of approximately 20 seconds). The size of color gradient 1020-3 increases since the angular separation clockwise from minute hand 1002b to seconds hand 1002c has increased.

FIG. 10G illustrates clock face 1018 with clock hands 1002a-1002c indicating another time after the time indicated in FIG. 10F (e.g., approximately 10 seconds later), after seconds hand 1002c has passed hour hand 1002a and is between hour hand 1002a and minute hand 1002b (in the clockwise direction). One clock hand passing another causes change in the relationships between color gradients 1020-1, 1020-2, and 1020-3 and clock hands 1002a-1002c.

In FIG. 10G, color gradient 1020-1 is displayed with first edge 1020-1a selected based on a position of hour hand 1002a and second edge 1020-1b selected based on a position of seconds hand 1002c. Whereas color gradient 1020-1 previously went from the first color at seconds hand 1002c to the second color at hour hand 1002a, it now goes from the first color at hour hand 1002a to the second color at seconds hand 1002c. Color gradient 1020-2 is displayed with first edge 1020-2a selected based on a position of seconds hand 1002c and second edge 1020-2b selected based on a position of minute hand 1002b. Whereas color gradient 1020-2 previously went from the first color at hour hand 1002a to the second color at minute hand 1002b, it now goes from the first color at seconds hand 1002c to the second color at minute hand 1002b. Color gradient 1020-3 is displayed with first edge 1020-3a selected based on a position of minute hand 1002b and second edge 1020-3b selected based on a position of hour hand 1002a. Whereas color gradient 1020-3 previously went from the first color at minute hand 1002b to the second color at seconds hand 1002c, it now goes from the first color at minute hand 1002b to the second color at hour hand 1002a.

Analogous changes in the positions and sizes of color gradients 1020-1, 1020-2, and 1020-3, and in the relationships between color gradients 1020-1, 1020-2, and 1020-3 and clock hands 1002a-1002c, occurs when seconds hand 1002c passes minute hand 1002b and when minute hand 1002b passes hour hand 1002a. For example, as time progresses from FIG. 10G and seconds hand 1002c passes minute hand 1002b, the display of color gradient 1020-2 is temporarily removed and then re-displayed in the angular extent clockwise from minute hand 1002b to seconds hand 1002c, color gradient 1020-1 occupies the angular extent clockwise from hour hand 1002a to minute hand 1002b, and color gradient 1020-3 occupies the angular extent clockwise from seconds hand 1002c to hour hand 1002a.

FIGS. 10H-10N illustrate additional examples of clock faces, which corresponds to the clock faces of FIGS. 10A-10G, respectively. The clock faces of FIGS. 10H-10N provide visual depictions of features described and illustrated with respect to the clock faces of FIGS. 10A-10G. For example, the clock face of FIG. 10H corresponds to the clock face of FIG. 10A, the clock face of FIG. 10I corresponds to the clock face of FIG. 10B, the clock face of FIG. 10J corresponds to the clock face of FIG. 10C, the clock face of FIG. 10K corresponds to the clock face of FIG. 10D, the clock face of FIG. 10L corresponds to the clock face of FIG. 10E, the clock face of FIG. 10M corresponds to the clock face of FIG. 10F, the clock face of FIG. 10N corresponds to the clock face of FIG. 10G.

Figure 11:
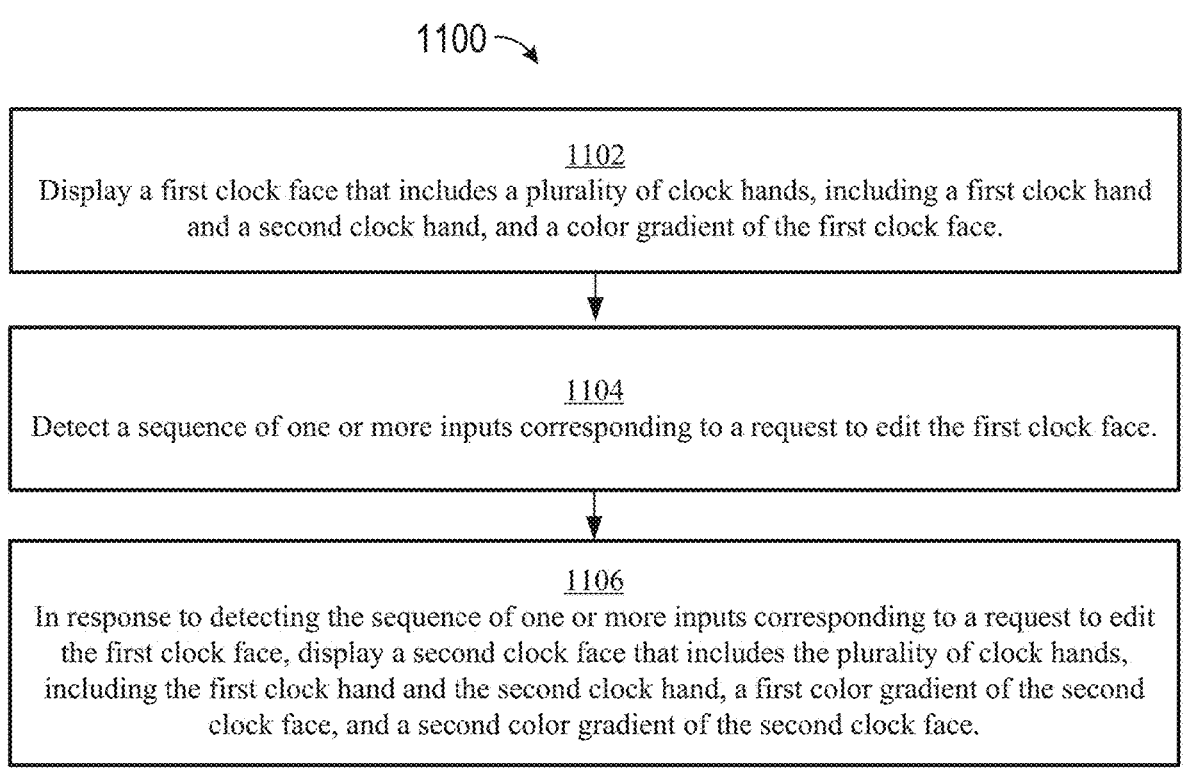
FIG. 11 illustrates an exemplary method in accordance with some embodiments.

FIG. 11 is a flow diagram illustrating a method for displaying gradients on a clock face using an electronic device in accordance with some embodiments. Method 1100 is performed at an electronic device (e.g., 100, 300, 500, 600) with a display device (e.g., 602). Some operations in method 1100 are, optionally, combined, the orders of some operations are, optionally, changed, and some operations are, optionally, omitted.

As described below, method 1100 provides an intuitive way for displaying gradients on a clock face. The method reduces the cognitive burden on a user for displaying gradients on a clock face, thereby creating a more efficient human-machine interface. For battery-operated computing devices, enabling a user to display gradients on a clock face faster and more efficiently conserves power and increases the time between battery charges.

The electronic device displays (1102), via the display device, a first clock face (e.g., 1000, 1014). The first clock face includes a plurality of clock hands (e.g., 1002a, 1002b, 1002c) including a first clock hand (e.g., 1002b) (e.g., an hour, minute, or second hand) and a second clock hand (e.g., 1002a) (e.g., another one of an hour, minute, or second hand) and a color gradient (e.g., 1004, 1016a, 1016b) of the first clock face. The color gradient of the first clock face includes a gradual transition from a first color at a first edge (e.g., 1004a, 1016a) of the color gradient of the first clock face to a second color at a second edge (e.g., 1004b, 1016b) of the color gradient of the first clock face (e.g., a color gradient that varies based on direction from an origin; an angular gradient; a conic gradient; the color gradient has the first color at a first edge of the gradient, which is located along a first direction from the origin, and the second color at a second edge of the gradient, which is located along a second direction from the origin; the color changes gradually (e.g., smoothly or in increments) with angle from the first color to the second color; the term "color" refers to different hues, tones, shades, tints, including but is not limited to, black, white, and gray; in some embodiments, the first color and/or the second color is user selectable). The first edge (e.g., 1004a, 1016a) of the color gradient of the first clock face is selected based on a position of the first clock hand (e.g., 1002b) of the first clock face and the second edge (e.g., 1004b, 1016b) of the color gradient of the first clock face is selected based on the position of the first clock hand (e.g., 1002b) of the first clock face. Displaying a gradient based on the position of a clock hand of a plurality of clock hands as described above provides improved visual feedback by presenting a clear visual indication of the value of the unit of time represented by the clock hand and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device detects (1104) a sequence of one or more inputs (e.g., 1010a-1010c) (e.g., contacts on a touch-sensitive display and/or activation (e.g., depression or rotation) of a rotatable input mechanism) corresponding to a request to edit the first clock face (e.g., enter a face editing mode, select a gradient style-selection interface, select a different number of gradients, and confirm selection of face).

In response (1106) to detecting the sequence of one or more inputs corresponding to a request to edit the first clock face, the electronic device displays, via the display device, a second clock face (e.g., 1018). The second clock face includes the plurality of clock hands including the first clock hand (e.g., 1002b) (e.g., the same first clock hand (i.e., hour, minute, or second hand) as on the first clock face) and the second clock hand (e.g., 1002a) (e.g., the same second clock hand (i.e., hour, minute, or second hand) as on the first clock face) and a first color gradient (e.g., 1020-3) of the second clock face. The first color gradient of the second clock face including a gradual transition from the first color at a first edge (e.g., 1020-3a) of the first color gradient of the second clock face to the second color at a second edge (e.g., 1020-3b) of the first color gradient of the second clock face. The first edge of the first color gradient of the second clock face is selected based on a position of the first clock hand (e.g., 1002b) of the second clock face and the second edge of the first color gradient of the second clock face is selected based on a position of the second clock hand (e.g., 1002a) of the second clock face. The second clock face further includes a second color gradient (e.g., 1020-2) of the second clock face. The second color gradient of the second clock face includes a gradual transition from the first color at a first edge (e.g., 1020-2a) of the second color gradient of the second clock face to the second color at a second edge (e.g., 1020-2b) of the second color gradient of the second clock face. The second edge of the color gradient of the second clock face is selected based on the position of the first clock hand (e.g., 1002b) of the second clock face. Displaying a clock face with two gradients in response to detecting a sequence of one or more inputs corresponding to a request to edit the first clock face, where the display of the two gradients are based on the positions of two clock hand as described above provides improved visual feedback by allowing for customization of the clock face, presenting a clear visual indication of the values of the units of time represented by the two clock hands, and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first clock hand (e.g., 1002c) of the first clock face indicates (e.g., represents) seconds of time.

In some embodiments, the first edge of the second color gradient of the second clock face is selected based on a position of the second clock hand of the second clock face (e.g., minute hand 1002b defines one transition between the two gradients; the second transition is defined by the hour hand or a fixed position (e.g., vertically from center of clock upward, 180 degrees from the minutes hand)). In some embodiments, the two gradients follow the hour hand (e.g., 1002a) or the seconds hand (e.g., 1002c).

In some embodiments, the plurality of clock hands (e.g., 1002a-1002c) of the second clock face includes a third clock hand (e.g., 1002c), and the first edge of the second color gradient of the second clock face is selected based on a position of the third clock hand of the second clock face (e.g., the first edge of the second color gradient of the second clock face is located along the third clock hand of the second clock face; the second color gradient starts at the third clock hand and ends at the first clock hand).

In some embodiments, the second clock face includes a third color gradient (e.g., 1020-1) of the second clock face. The third color gradient of the second clock face including a gradual transition from the first color at a first edge (e.g., 1020-1a) of the third color gradient of the second clock face to the second color at a second edge (e.g., 1020-1b) of the third color gradient of the second clock face. The first edge of the third color gradient of the second clock face is selected based on a position of the second clock hand (e.g., 1002a) of the second clock face (e.g., the first edge of the third color gradient of the second clock face is located along the second clock hand of the second clock face) and the second edge of the color gradient of the second clock face is selected based on a position of the third clock hand (e.g., 1002c) of the second clock face (e.g., the second edge of the third color gradient of the second clock face is located along the third clock hand of the second clock face; the third color gradient starts at the second clock hand of the second clock face and ends at the third clock hand of the second clock face). Displaying a clock face with three gradients, where the display of the three gradients are based on the positions of three clock hand as described above provides improved visual feedback by allowing for customization of the clock face, presenting a clear visual indication of the values of the units of time represented by the three clock hands, and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting the sequence of one or more inputs includes detecting a first input (e.g., 1010a) in the sequence of inputs. In response to detecting the first input, the electronic device displays a clock face editing user interface (e.g., 1006). While displaying the clock face editing user interface, the electronic device detects a second sequence of one or more inputs (e.g., 1010b, 1010c) that is a subset of the first sequence of one or more inputs.

In some embodiments, a spatial extent of the first color gradient of the second clock face is different from a spatial extent of the second color gradient of the second clock face (e.g., the angle between the edges of the first color gradient of the second clock face (e.g., X degrees) is different from the angle between the edges of the second color gradient of the second clock face (e.g., 360-X degrees)).

In some embodiments, displaying the second clock face includes, in accordance with the first clock hand of the second clock face having a first position relative to the second clock hand of the second clock face, the first color gradient of the second clock face has a first spatial extent, and in accordance with the first clock hand of the second clock face having a second position relative to the second clock hand of the second clock face different from the first position relative to the second clock hand of the second clock face, the first color gradient of the second clock face has a second spatial extent different from the first spatial extent.

In some embodiments, the second color is selected (e.g., algorithmically) based on the first color and is not user-configurable. In some embodiments, the first color is selected by a user or is based on an accessory of the electronic device (e.g., the color of a watch band). In some embodiments, the second color is determined (e.g., by the electronic device) according to an algorithm that uses the first color as an input. In some embodiments, selection of a monochrome color scheme switches the clock face from multicolor to black and white plus an accent color for less than half of the elements on the face.

In some embodiments, the first color is a first shade of grey in a range of greys including black and while, and the second color is a second shade of grey in the range of greys including black and white. In some embodiments, the first color is different from the second color.

In some embodiments, the first clock hand includes the first color and the second clock hand includes the second color.

In some embodiments, after displaying the second clock face including the first color gradient of the second clock face and the second color gradient of the second clock face, the electronic device receives a request to display a current clock face (e.g., a wrist raise gesture, a request to switch from viewing an application, an application-selection screen (springboard), a change in current time, or a notification screen to displaying the clock face). In response to receiving the request to display a current clock face and in accordance with a determination that the position of the first clock hand corresponds to the position of the second clock hand (e.g., FIG. 10F) (e.g., second hand moving onto minute hand or minute hand moving onto hour hand), the electronic device displays, via the display device, the second clock face with the first color gradient of the second clock face and without the second color gradient of the second clock face. In response to receiving the request to display a current clock face and in accordance with a determination that the position of the first clock hand does not correspond to the position of the second clock hand, the electronic device displays, via the display device, the second clock face with the first color gradient of the second clock face and with the second color gradient of the second clock face.

In some embodiments, after displaying, via the display device, the second clock face with the first color gradient of the second clock face and without the second color gradient of the second clock face, the electronic device receives a second request to display a current clock face (e.g., a wrist raise gesture, a request to switch from viewing an application, an application-selection screen (springboard), a change in current time, or a notification screen to displaying the clock face). In response to receiving the second request to display a current clock face and in accordance with a determination that the position of the first clock hand corresponds to the position of the second clock hand (e.g., hour and minute hands still overlap), the electronic device displays, via the display device, the second clock face with the first color gradient of the second clock face and without the second color gradient of the second clock face. In response to receiving the second request to display a current clock face and in accordance with a determination that the position of the first clock hand does not correspond to the position of the second clock hand (e.g., second hand moving past the minute hand or minute hand moving past the hour hand), the electronic device displays, via the display device, the second clock face with the first color gradient of the second clock face and with the second color gradient of the second clock face.

Note that details of the processes described above with respect to method 1100 (e.g., FIG. 7) are also applicable in an analogous manner to the methods described below/above. For example, methods 700, 900, 1300, 1500, 1700, and 1900 optionally include one or more of the characteristics of the various methods described above with reference to method 1100. For example, operations 1102, 1104, and 1106 can be applied to a clock face in methods 700 and 900, one or more segments in method 1300, and/or the indication of time in method 1500. For brevity, these details are not repeated below.

FIGS. 12A-12M illustrate exemplary user interfaces for a clock face, in accordance with some embodiments. The user interfaces in these figures are used to illustrate the processes described below, including the processes in FIG. 13.

FIG. 12A depicts electronic device 600 displaying clock face 1200 on display 602. In some embodiments, device 600 displays clock face 1200 in response to receiving a request to display a clock face (e.g., a wrist raise gesture, a request to switch from viewing an application or notification screen to displaying the clock face). Clock face 1200 includes digital indication of time 1202, segment 1204, and complication 1206. Digital indication of time 1202 indicates the current time (e.g., 10:09 am). Segment 1204 includes first edge 1204-1 and second edge 1204-2. First edge 1204-1 is at a first position (e.g., angular position) that indicates the hour of the current time (e.g., 10 o'clock), and second edge 1204-2 is at a second position (e.g., angular position) that indicates the minute of the current time (e.g., nine minutes after the hour). Each edge of segment 1204 extends radially from a common point (e.g., the center of display 602) to the edge of display 602.

Digital indication of time 1202 includes numerals. In some embodiments, the color of the numerals in digital indication of time 1202 is based on the position of the numerals relative to the segment. For example, segment 1204 is a first color or pattern, the portion of the numerals that overlaps with segment 1204 is displayed in a second color or pattern that is different from the color or pattern of segment 1204, and the portion of the numerals that does not overlap with segment 1204 is displayed in a third color or pattern that is different from the color of the portion that overlaps with segment 1204. In some embodiments, the first and third colors are the same. In FIG. 12A, segment 1204 is white, the portion of the numerals that overlaps with segment 1204 is black, and the portion of the numerals that do not overlap with segment 1204 is white (e.g., different than the portion of the numerals that overlaps segment 1204, but the same color as segment 1204).

In FIG. 12A, complication 1206 overlaps with segment 1204. Similar to the numerals of indication of time 1202, the portion of complication 1206 that overlaps with segment 1204 is displayed with a different color or pattern than segment 1204. In embodiments in which segment 1204 only partially overlaps complication 1206, the portion of complication 1206 that does not overlap segment 1204 is displayed with a color or pattern different from the color or pattern of the portion that overlaps segment 1204.

FIG. 12B depicts clock face 1200 at a time (e.g., 10:30 am) different from the time illustrated in FIG. 12A. Clock face 1200 still includes digital indication of time 1202, segment 1204, and complication 1206. Compared to FIG. 12A, digital indication of time 1202 is updated to indicate the current time, and the position (e.g., angular position and angular extent) of segment 1204 is updated to reflect the different time. First edge 1204-1 is at a third position indicating the hour of the current time and second edge 1204-2 is at a fourth position indicating the minute of the second time. As illustrated by FIGS. 12A-12B, the visual appearance (e.g., color or pattern) of the numerals in digital indication of time 1202 are varied as segment 1204 moves over time. For example, in FIG. 12A, the numerals representing minutes in digital indication of time 1202 are completely white, whereas in FIG. 12B, they are partially white and partially black.

In the embodiment illustrated in FIGS. 12A-12B, clock face 1200 includes second segment 1208 that occupies the portion of clock face 1200 that goes clockwise from second edge 1204-2 to first edge 1204-1 (whereas segment 1204 occupies the portion of clock face 1200 that goes clockwise from first edge 1204-1 to second edge 1204-2). As time passes, portions of segment 1204 become occupied by segment 1208, and vice versa. For example, in FIG. 12B, segment 1204 occupies the portion of clock face 1200 counterclockwise from second edge 1204-2 of segment 1204 to the dashed line indicating the previous position of second edge 1204-2 in FIG. 12A.

FIG. 12C depicts clock face 1200 at a third time (e.g., 11:00 am) different from the times illustrated in FIGS. 12A and 12B. Clock face 1200 still includes digital indication of time 1202, segment 1204, and complication 1206. To go from 10:30 am to 11:00 am, second edge 1204-2 (the minute indicator) passes first edge 1204-1 (the hour indicator). When second edge 1204-2 passes first edge 1204-1, second segment 1208 ceases to be displayed (when second edge 1204-2 and first edge 1204-1 overlap) and then is re-displayed clockwise from first edge 1204-1 to second edge 1204-2. When second edge 1204-2 passes first edge 1204-1, segment 1204 is re-defined by the angular extent counter-clockwise from first edge 1204-1 to second edge 1204-2 (or, equivalently, clockwise from second edge 1204-2 to first edge 1204-1). Similarly, as time progresses from 11:00 am to 12:10, for example, and second edge 1204-2 passes first edge 1204-1 again, first segment 1204 ceases to be displayed (when second edge 1204-2 and first edge 1204-1 overlap) and then is re-displayed clockwise from first edge 1204-1 to second edge 1204-2. At that point, segment 1204 is again defined by the angular extent clockwise from first edge 1204-1 to second edge 1204-2. In this way, segment 1204 and segment 1208 alternate being removed and re-displayed each time second edge 1204-2 passes 1204-1.

FIG. 12C illustrates a portion of complication 1206 that does not overlap segment 1204 is displayed with a color or pattern (e.g., while) different from the color or pattern (e.g., black) of a portion that overlaps segment 1204.

In FIG. 12C, device 600 detects input 1210*a* (e.g., a contact on touch-sensitive display 602 with a characteristic intensity greater than a threshold intensity or a duration longer than a threshold duration). In response to detecting input 1210*a*, device 600 enters a clock face edit mode and displays user interface 1212. In some embodiments, device 600 enters the clock face edit mode in response to detecting a sequence of one or more inputs, in accordance with the technique described above with reference to FIGS. 6C-6E.

User interface 1212 includes a representation of clock face 1200, element indicator 1214 indicating the element that is selected for editing, and paging dots 1216*a*-1216*d* corresponding to first through fourth editing pages, respectively.

FIG. 12D illustrates the first editing page corresponding to paging dot 1216*a*, as indicated by paging dot 1216*a* being displayed in white to visually distinguish it from paging dots 1216*b*-1216*d*, which are shown in black. In the first editing page a user can rotate input mechanism 604 to edit a color or pattern of the clock face (e.g., color or pattern of segment 1204, segment 1208, and/or digital indication of time 1202).

In response to input 1210*b* (e.g., a swipe), device 600 displays the second editing page as indicated by paging dot 1216*b* in FIG. 12E. In the second editing page, a user can select a style setting of clock face, and in particular, whether the clock face includes clock hands or no clock hands. In response to input 1210*c* (e.g., a rotation of input mechanism 604), device 600 changes the style and displays clock hands 1218*a* and 1218*b*.

In response to input 1210*d* (e.g., a swipe), device 600 displays the third editing page as indicated by paging dot 1216*c* in FIG. 12F. In the third editing page, a user can select a style setting of clock face, and in particular, whether the clock face is displayed in a full screen style or a circular style. In the full screen style, segment 1204 extends to an edge of display 602 and complication 1206 is displayed in an upper left portion of display 602, as shown in FIGS. 12A-12F. In response to input 1210*e* (e.g., a rotation of input mechanism 604), device 600 changes the style from full screen to circular. FIG. 12H illustrates an embodiment of clock face 1200 in a circular style. In the circular style, segment 1204 extends to the edge of a circular region and complication 1206 is displayed along a line running vertically through the center of the circular region and above the origin of the circular region. The circular style also includes four corner complications 1220*a*-1220*d*. In some embodiments, a user can touch a complication to select it for editing, and then rotate input mechanism 604 to edit the complication.

In response to input 1210*f* (e.g., a swipe), device 600 displays the fourth editing page as indicated by paging dot 1216*d* in FIG. 12I. In the third editing page, a user can select a style setting of an indication of time, and in particular, whether the indication of time is displayed in a digital style (e.g., FIG. 12I) or an analog style (e.g., FIG. 12J). In response to input 1210*g* (e.g., a rotation of input mechanism 604), device 600 changes indication of time 1202 from digital to analog, as shown in FIG. 12J. In response to input 1210*h* (e.g., a press of input mechanism 604), device 600 exits clock face edit mode and displays clock face 1222 indicating a current time (e.g., 11:00 am) and according to the selected features, as shown in FIG. 12K. The features of clock face 1222 are analogous to the features of clock face 1200 prior to editing. For example, the color or pattern of a portion of complication 1206 depends on whether or not the portion overlaps with segment 1204. Similarly, the color or pattern of a portion of the numeral hour markers of indication of time 1202 depends on whether or not the portion overlaps with segment 1204.

Figure 12M:
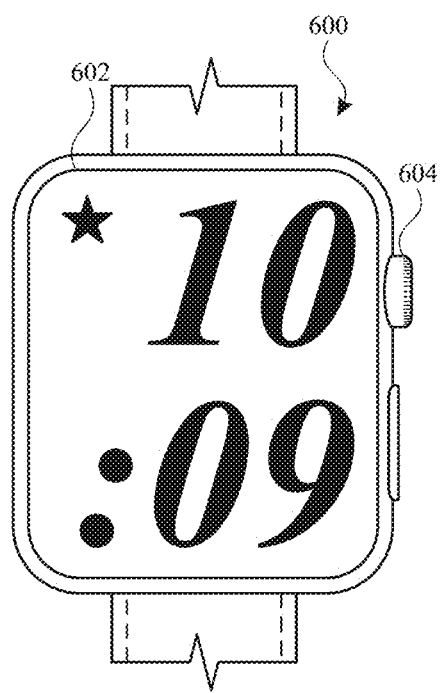

FIGS. 12L and 12M illustrate clock face styles, according to some embodiments. FIG. 12L illustrates a full screen, analog style. FIG. 12M illustrates a full screen, digital style (e.g., non-Hybrid, without segment 1204).

FIG. 13 is a flow diagram illustrating a method for providing a clock face using an electronic device in accordance with some embodiments. Method 1300 is performed at a device (e.g., 100, 300, 500, 600) with a display device (e.g., 602). Some operations in method 1300 are, optionally, combined, the orders of some operations are, optionally, changed, and some operations are, optionally, omitted.

As described below, method 1300 provides an intuitive way for providing a clock face. The method reduces the cognitive burden on a user for providing a clock face, thereby creating a more efficient human-machine interface. For battery-operated computing devices, enabling a user to interface with a clock face faster and more efficiently conserves power and increases the time between battery charges.

The electronic device receives (1302) a request to display a clock face (e.g., 1200) (e.g., a wrist raise gesture, a request to switch from viewing an application or notification screen to displaying the clock face).

In response (1304) to receiving the request to display the clock face and in accordance (1306) with a determination that a current time is a first time (e.g., 10:09), the electronic device displays, via the display device, a clock face (e.g., 1200). The clock face at the first time includes a digital indication of time (e.g., 1202) (e.g., numerals) indicating the first time and a segment (e.g., 1204) (e.g., a visually distinguishable portion of the clock face). The segment includes a first edge (e.g., 1204-1) at a first position (e.g., angular position) and a second edge (e.g., 1204-2) at a second position (e.g., angular position; the edges are boundaries of the segment between the segment and another portion or segment of the clock face; the first edge extends radially from an origin (e.g., the center of a display of the electronic device) in a first direction and the second edge extending radially from the origin in a second direction). In some embodiments, the edges are straight lines that begin at the origin and extend to (e.g., stop at) a boundary of the display (e.g., 602) and/or the clock face (e.g., to the perimeter of a circular clock face that does not extend to the edge of the display) or equivalently, straight lines that begin at a boundary of the display and/or the clock face and extend to (e.g., stop at) the origin). In some embodiments, the segment is a portion of a background of the clock face (e.g., the digital indication of time is displayed in front of the background, including the segment if the segment overlaps with the digital indication of time). The first edge at the first position indicates a first unit of time (e.g., hour) of the first time (e.g., the position of the first edge, as defined by the origin and the angular orientation of the edge, indicates the hour of the first time) and the second edge at the second position indicates a second unit of time (e.g., minute) of the first time (e.g., the position of the second edge, as defined by the origin and the angular orientation of the edge, indicates the minute of the first time).

In response (1304) to receiving the request to display the clock face and in accordance (1308) with a determination that a current time is a second time (e.g., 10:30) different from the first time, the electronic device displays, via the display device, the clock face (e.g., 1200). The clock face at the second time includes the digital indication of time (e.g., 1202) indicating the second time and the segment (e.g., 1204) including the first edge (e.g., 1204-1) and the second edge (e.g., 1204-2). The first edge is at a third position and the second edge is at a fourth position. The first edge at the third position indicates a first unit of time (e.g., hour) of the second time (e.g., the position of the first edge, as defined by the origin and the angular orientation of the edge, indicates the hour of the second time) and the second edge at the fourth position indicates a second unit of time (e.g., minute) of the second time (e.g., the position of the second edge, as defined by the origin and the angular orientation of the edge, indicates the minute of the second time). Displaying a clock face with a digital indication of time and a segment, where the positions of the edges of the segment vary based on a determination of whether a current time is a first time or a second time as described above provides improved visual feedback by presenting a clear visual indication of the current time and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the segment (e.g., 1204) is a first segment and the clock face includes a second segment (e.g., 1208) (e.g., the first segment is clockwise from the first edge to the second edge; the second segment is clockwise from the second edge to the first edge). In some embodiments, in accordance with the determination that the current time is the first time, the first segment occupies a first portion of the clock face and the second segment occupies a second portion of the clock face that does not include the first portion. In some embodiments, in accordance with the determination that the current time is the second time, the second segment occupies at least part of the first portion of the clock face (e.g., one segment gets larger as the other gets smaller).

In some embodiments, in accordance with the determination that the current time is the first time, the segment includes a first color. In some embodiments, in accordance with the determination that the current time is the second time, the segment includes a second color different from the first color (e.g., the segment changes color each hour; at the first time (e.g., 10:09 am), the segment has a first color (e.g., white) clockwise from the first edge (e.g., hour indicator) to the second edge (e.g., minute indicator); at the second time (e.g., 11:09 am), the segment has a second color (e.g., black) clockwise from the first edge (e.g., hour indicator) to the second edge (e.g., minute indicator)).

In some embodiments, in accordance with the determination that the current time is the first time (e.g., 10:09), a portion (e.g., minute digits) of the digital indication of time includes a third color (e.g., white), and in accordance with the determination that the current time is the second time (e.g., 11:00), the portion (e.g., minute digits) of the digital indication of time includes a fourth color (e.g., black) different from the third color. Displaying a portion of the digital indication of time in a third color in accordance with the determination that the current time is the first time and in a fourth color different from the third color in accordance with the determination that the current time is the second time provides improved visual feedback by presenting a clear visual distinction between the segment and the digital indication of time and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the clock face at the first time further includes a complication (e.g., 1206) (e.g., a complication refers to any clock face feature other than those used to indicate the hours and minutes of a time (e.g., clock hands or hour/minute indications). In some embodiments, complications provide different types of information to a user, such as data obtained from an application). In some embodiments, the information conveyed to a user by a complication is customizable. In some embodiments, the segment overlaps the complication at the first time (e.g., completely overlaps), and in accordance with a determination that the segment overlaps the complication at the first time, the complication includes a fifth color. In some embodiments, the clock face at the second time further includes the complication, the segment does not overlap the complication at the second time (e.g., the portions of the clock face occupied by the segment and the complication are mutually exclusive), and in accordance with a determination that the segment does not overlap the complication at the second time, the complication includes a sixth color different from the fifth color. In some embodiments, in accordance with a determination that the complication partially overlaps the segment (e.g., FIG. 12C), the non-overlapping portion of the complication is the sixth color and the overlapping portion is the fifth color.

In some embodiments, in response to receiving the request to display the clock face, the clock face is displayed without clock hands. In some embodiments, the electronic device detects a sequence of one or more inputs (e.g., 1210a-1210h) (e.g., contacts on a touch-sensitive display and/or activation (e.g., depression or rotation) of a rotatable input mechanism) corresponding to a request to edit the first clock face (e.g., enter a face editing mode, select a style-selection interface, select a different style, and confirm selection of face). In response to detecting the sequence of one or more inputs corresponding to a request to edit the first clock face (e.g., 1200), the electronic device displays, via the display device, the clock face including one or more clock hands (e.g., 1218a, 1218b) (e.g., the electronic device displays the clock face in accordance with the selected style; select style in editing mode). In some embodiments, the clock hands align with edges of the segment.

In some embodiments, in response to receiving the request to display the clock face, the segment extends to an edge of the display device (e.g., FIG. 12A) (e.g., in full screen mode/style, the segment extends to an edge of the display). In some embodiments, the electronic device detects a second sequence of one or more inputs (e.g., 1210a-1210h) (e.g., contacts on a touch-sensitive display and/or activation (e.g., depression or rotation) of a rotatable input mechanism) corresponding to a request to edit the first clock face (e.g., enter a clock face editing mode, select a style-selection interface, select a different style, and confirm selection of clock face). In response to detecting the second sequence of one or more inputs corresponding to a request to edit the first clock face, the electronic device displays, via the display device, the clock face including the segment extending to (e.g., but not past) a perimeter of a region (e.g., FIG. 12H) (e.g., a circular region or a region with a different predefined shape that is less than all of the display of the device and optionally has a shape different than a shape of the display of the device) of the clock face (e.g., the electronic device displays the segment in accordance with a selected style). In some embodiments, in circular face style/mode, the segment occupies a portion of a circular region (e.g., FIG. 12K) that does not extend to the edge of the display. In some embodiments, the segment extends to an edge of the circle (e.g., from center of circle). In some embodiments, the clock face has complications (e.g., 1220a-1220d) around the circular region.

In some embodiments, after displaying the clock face in response to receiving the request to display the clock face, the electronic device detects a third sequence of one or more inputs (e.g., 1210a-1210h) (e.g., contacts on a touch-sensitive display and/or activation (e.g., depression or rotation) of a rotatable input mechanism) corresponding to a request to edit the first clock face (e.g., enter a face editing mode, select a style-selection interface, select a different style, and confirm selection of face). In response to detecting the third sequence of one or more inputs corresponding to a request to edit the first clock face, the electronic device displays, via the display device, the clock face without the segment (e.g., FIG. 12L, 12M).

Note that details of the processes described above with respect to method 1300 (e.g., FIG. 13 are also applicable in an analogous manner to the methods described below/above. For example, methods 700, 900, 1100, 1500, 1700, and 1900 optionally include one or more of the characteristics of the various methods described above with reference to method 1300. For example, operations 1306 and 1308 can be applied to a clock face in methods 700 and 900 and/or the indication of time in method 1500. For brevity, these details are not repeated below.

FIGS. 14A-14H illustrate exemplary user interfaces for clock faces, in accordance with some embodiments. The user interfaces in these figures are used to illustrate the processes described below, including the processes in FIG. 15.

FIG. 14A depicts electronic device 600 displaying clock face 1400 on display 602. Clock face 1400 has a respective layout that includes indication of time 1402 and complications 1404a-1404c. Indication of time 1402 is presented according to a first format at a first location 1406a in the respective layout. Complications 1404a-1404c are at a second location 1406b, third location 1406c, and fourth location 1406d, respectively, in the respective layout of clock face 1400.

In FIG. 14A, indication of time 1402 occupies a circular region on clock face 1400 and is presented according to a first format that includes a digital indication of time, including a numerical representation of an hour 1402-1a and a numerical representation of a minute 1402-1b, and a circular dial 1402-2 with elements representing seconds. A current second indicated in the circular dial by highlighting a corresponding one of the elements of the dial. Complication 1404a corresponds to (e.g., displays data from) a weather application, complication 1404b corresponds to an activity application, and complication 1404c corresponds to a stock application. Complications 1404a and 1404b occupy circular regions on clock face 1400, and complication 1404c occupies a rectangular region on clock face 1400. Complication 1404c is wider than indication of time 1402. In some embodiments, complication 1404c occupies a larger region (e.g., larger area) on clock face 1400 than indication of time 1402. In some embodiments, clock face 1400 includes only one complication (e.g., one circular complication or one rectangular complication), only two complications (e.g., one circular complication and one rectangular complication), or more than three complications.

Clock face 1400 includes notification 1408. According to the format of clock face 1400, notification 1408 is located near the top of clock face 1400 and offset horizontally from the middle of clock face 1400 (e.g., notification 1408 is not centered horizontally on clock face 1400). In FIG. 14A, notification 1408 is positioned to the left of a line passing vertically through the center of clock face 1400. Notification 1408 is located between indication of time 1402 and complication 1404a. The horizontally offset location of notification 1408 is in contrast to the horizontally centered location of notification 614 in FIG. 6B.

In FIG. 14A, device 600 detects input 1410a (e.g., a contact on touch-sensitive display 602 with a characteristic intensity greater than a threshold intensity or a duration longer than a threshold duration). In response to detecting input 1410a, device 600 enters a clock face edit mode and displays user interface 1412 depicted in FIG. 14B. In some embodiments, device 600 enters the clock face edit mode in response to detecting a sequence of one or more inputs, in accordance with the technique described above with reference to FIGS. 6C-6E.

User interface 1412 includes a representation of clock face 1400, element indicator 1414 indicating the element that is selected for editing, and paging dots 1416a-1416c corresponding to first through third editing pages, respectively.

FIG. 14B illustrates the first editing page corresponding to paging dot 1416a, as indicated by paging dot 1416a being displayed in white to visually distinguish it from paging dots 1416b-1416c, which are shown in black. In the first editing page a user can tap an element (e.g., representation 1413 of indication of time 1202 and representations 1415a-1415c of complications 1404a-1404c) to select an element for editing, and then rotate input mechanism 604 to edit the selected element.

In FIG. 14B, indication of time 1402 is selected for editing as indicated by element indicator 1414. In response to detecting input 1410b (e.g., a rotation of input mechanism 604), device 600 changes indication of time 1402, as indicated by representation 1418 of the indication of time in FIG. 14C. Representation 1418 of the indication of time has a different format than indication of time 1402. The format of representation 1418 of the indication of time includes an analog indication of time (e.g., without a digital indication of time). Device 600 maintains the layout of clock face 1400 when the format of the indication of time is edited. For example, the indication of time remains at location 1406a (e.g., representation 1418 of the indication of time is at the same location on clock face 1400 as indication of time 1402), representations 1415a-1415c of complications 1404a-1404c remain at locations 1406b-1406d (respectively), and complications 1404a-1404c remain associated with the weather, activity, and stock applications (respectively).

In response to detecting input 1410c (e.g., a swipe), device 600 switches to the second editing page as indicated by paging dot 1416b in FIG. 14D. In the second editing page, a user can edit a color scheme of clock face 1400. In response to detecting input 1410d (e.g., a rotation of input mechanism 604), device 600 changes the color scheme from full color to monochrome as depicted in FIG. 14E. In some embodiments, according to the monochrome color scheme, a majority of graphical elements of the clock face are displayed in black or white, and the remaining element are displayed in an emphasis color (e.g., a single color other than black, white, or a shade between black and white). In some embodiments, the color is used to emphasize particular elements (e.g., the digits and/or emphasized seconds element of a digital indication of time, the hands of an analog indication of time). In FIG. 14E, according to the monochrome color scheme, clock hands 1418a and 1418b and trend line 1420 in complication 1404c are displayed in the emphasis color.

In response to detecting input 1410e (e.g., a swipe), device 600 switches to the third editing page as indicated by paging dot 1416c in FIG. 14F. In the third editing page, a user can edit a color setting of clock face 1400. For the monochrome color scheme, the third editing page allows a user to select an emphasis color. In response to detecting input 1410f (e.g., a rotation of input mechanism 604), device 600 changes the emphasis color from red to blue as depicted in FIG. 14G by illustrating clock hands 1418a and 1418b and trend line 1420 in broken lines.

In response to detecting input 1410g (e.g., a press of input mechanism 604), device 600 exits the clock face edit mode and displays clock face 1422, as edited, in FIG. 14H. Clock face 1422 maintains the layout of clock face 1400 when the format of the indication of time is edited. Indication of time 1424 (corresponding to representation 1418) is displayed at location 1406a, complications 1404a-1404c remain at locations 1406b-1406d (respectively), and complications 1404a-1404c remain associated with the weather, activity, and stock applications (respectively).

FIG. 15 is a flow diagram illustrating a method for providing a clock face using an electronic device in accordance with some embodiments. Method 1500 is performed at an electronic device (e.g., 100, 300, 500, 600) with a display device (e.g., 602). Some operations in method 1500 are, optionally, combined, the orders of some operations are, optionally, changed, and some operations are, optionally, omitted.

As described below, method 1500 provides an intuitive way for providing a clock face. The method reduces the cognitive burden on a user for interacting with an electronic device, thereby creating a more efficient human-machine interface. For battery-operated computing devices, enabling a user to interact with the device faster and more efficiently conserves power and increases the time between battery charges.

The electronic device displays (1502), via the display device, a first clock face (e.g., 1400 in FIG. 14A). The first clock face has a respective layout including a first indication of time (e.g., 1402) presented according to a first format (e.g., an analog clock face or a digital indication of time) at a first location (e.g., 1406a) in the respective layout, and a first complication (e.g., 1404a, 1404b, 1404c) at a second location (e.g., 1406b, 1406c, 1406d) in the respective layout (e.g., a complication refers to any clock face feature other than those used to indicate the hours and minutes of a time (e.g., clock hands or hour/minute indications)). In some embodiments, complications provide different types of information to a user, such as data obtained from an application. In some embodiments, the information conveyed to a user by a complication is customizable.

The electronic device detects (1504) a sequence of one or more inputs (e.g., 1410a-1410g) (e.g., contacts on a touch-sensitive display and/or activation (e.g., depression or rotation) of a rotatable input mechanism) corresponding to a request to edit the first clock face (e.g., enter a face editing mode, select a face element-selection interface, select the indication of time, select a different indication of time, and confirm selection of face).

In response (1506) to detecting the sequence of one or more inputs corresponding to a request to edit the first clock face, the electronic device displays, via the display device, a second clock face (e.g., 1422). The second clock face has the respective layout including a second indication of time (e.g., 1424) presented according to a second format different from the first format (e.g., change the indication of time from analog to digital or from digital to analog) at the first location (e.g., 1406a) in the respective layout, and the first complication (e.g., 1404a) at the second location (e.g., 1406b) in the respective layout. Displaying the second clock face with the respective layout including (1) a second indication of time presented according to a second format different from the first format at the first location in the respective layout and (2) the first complication at the second location in the respective layout in response to detecting a sequence of one or more inputs corresponding to a request to edit the first clock face provides improved visual feedback and allows a user to customize a clock face by selecting a particular format for the indication of time on the clock face without affecting other elements of the clock face, such as the first complication. Performing an operation when a particular condition has been met, without requiring further user input, and providing improved visual feedback without cluttering the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first clock face (e.g., 1400) includes a second complication (e.g., 1404b) at a third location (e.g., 1406c) in the respective layout. In some embodiments, the second complication is concurrently displayed with the first complication on the first clock face, and the second clock face includes the second complication at the third location in the respective layout. In some embodiments, the second complication is concurrently displayed with the first complication on the second clock face.

In some embodiments, in response to detecting the sequence of one or more inputs corresponding to a request to edit the first clock face and before displaying the second clock face, the electronic device displays, via the display device, a clock face editing interface (e.g., 1412) including concurrently displaying a representation (e.g., 1415a-1415c) of the first complication and a representation (1415a-1415c) of the second complication (e.g., FIG. 14B). Displaying a clock face editing interface including concurrently displaying a representation of the first complication and a representation of the second complication provides improved feedback and allows a user to customize a clock face by selecting a particular format for the indication of time on the clock face while maintaining context of other elements of the clock face (e.g., the first and second complications). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first complication (e.g., 1404c) occupies a rectangular region (e.g., 1406d) at the first location in the respective layout and the second complication (e.g., 1404b) occupies a circular region (e.g., 1406c) at the second location in the respective layout.

In some embodiments, the first format of the first indication of time includes a digital indication of time (e.g., 1402-1) that includes a numerical representation of an hour (e.g., 1402-1a), a numeral representation of a minute (e.g., 1402-1b), and a plurality of elements (e.g., 1402-2) arranged around the numerical representations of the hour and minute. In some embodiments, the plurality of elements (e.g., 1402-2) represent seconds and indicate a current second (e.g., by changing appearance).

In some embodiments, the electronic device receives first data representing a first alert. In response to receiving the data representing the alert, the electronic device displays a notification (e.g., 1408) (e.g., a dot) at a first location on the display device. In some embodiments, the electronic device detects a sequence of one or more inputs (e.g., 610a) (e.g., contacts on a touch-sensitive display and/or activation (e.g., depression or rotation) of a rotatable input mechanism) corresponding to a request to select a clock face with a second layout different from the respective layout (e.g., enter a clock face selection mode, select a clock face different face, and confirm selection of the face). In response to detecting the sequence of one or more inputs corresponding to a request to select a clock face with a second layout different from the respective layout, the electronic device displays, via the display device, a third clock face (e.g., 606) that has the second layout. In some embodiments, while displaying the third clock face (e.g., 606) that has the second layout, the electronic device receives second data representing a second alert. In response to receiving the second data representing the second alert, the electronic device displays a second notification (e.g., 614) (e.g., a dot) at a second location on the display device different from the first location on the display device. Displaying a notification at different locations on a display for clock face with different element layouts provides improved feedback by allowing the notification to be displayed while being able to maintain the layout of the clock face. The notification can be moved based on the layout of the clock face instead of, e.g., modifying the layout, displaying the notification at a location that obscures another element of the clock face, or refraining from displaying the notification. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first complication occupies a first region (e.g., 1406d) that has a first display size and the first indication of time occupies a second region (e.g., 1406a) that has a second display size smaller than the first display size.

In some embodiments, the second clock face is displayed according to a first (e.g., multicolor) color scheme. In some embodiments, the electronic device detects a sequence of one or more inputs (e.g., 1410a-1410g) (e.g., contacts on a touch-sensitive display and/or activation (e.g., depression or rotation) of a rotatable input mechanism) corresponding to a request to edit a color scheme of a clock face (e.g., enter a clock face editing mode, select a color scheme, and confirm selection of the face). In response to detecting the sequence of one or more inputs corresponding to a request to edit a color scheme of a clock face, the electronic device displays, via the display device, a fourth clock face (e.g., 1422) according to a second color scheme (e.g., monochrome). In some embodiments, the fourth clock face includes a plurality of elements consisting of a first set of elements (e.g., 1404a-1404c) and a second set of elements (e.g., 1424a, 1424b, 1420). In some embodiments, the first set of elements include a majority of the plurality of elements. In some embodiments, the first set of elements are displayed in two or more shades selected from a range of colors from a first color to a second color (e.g., a range of greyscale colors from black to white) and the second set of elements are displayed in an accent color that is outside of the range of colors.

In some embodiments, the second set of elements (e.g., 1424a, 1424b, 1420) are included in the indication of time (e.g., 1424) or represent data from an application (e.g., the stock application corresponding to 1404c).

Note that details of the processes described above with respect to method 1500 (e.g., FIG. 15 are also applicable in an analogous manner to the methods described below/above. For example, methods 700, 900, 1100, 1300, 1700, and 1900 optionally include one or more of the characteristics of the various methods described above with reference to method 1500. For example, operations 1502, 1504, and 1506 can be applied to change a format of the indication of time in methods 700, 900, 1300, and 1700. For brevity, these details are not repeated below.

FIGS. 16A-16J illustrate exemplary user interfaces for displaying solar information on a clock face, in accordance with some embodiments. The user interfaces in these figures are used to illustrate the processes described below, including the processes in FIG. 17.

Figure 16A:
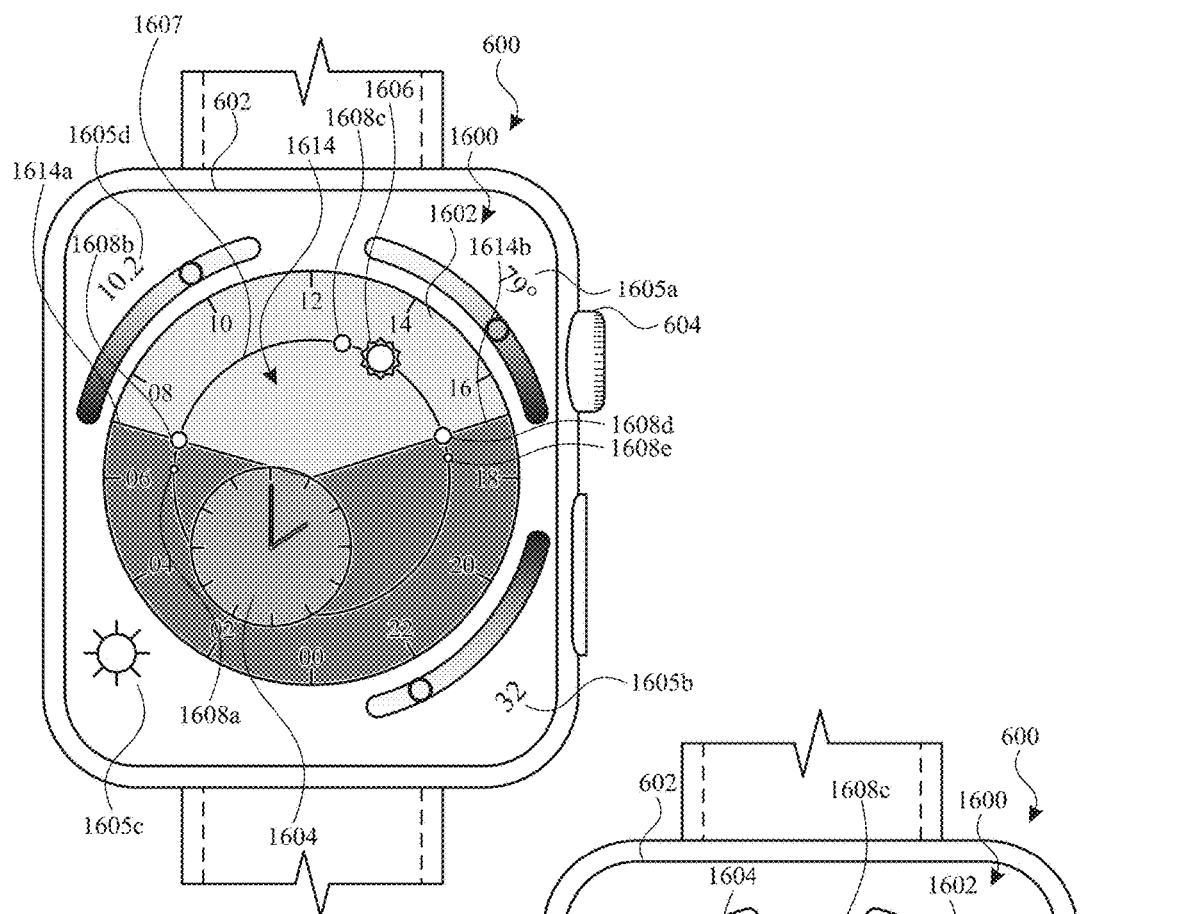
FIGS. 16A-16K illustrate exemplary user interfaces in accordance with some embodiments.

FIG. 16A depicts electronic device 600 displaying clock face 1600 on display 602. In some embodiments, device 600 displays clock face 1600 in response to receiving a request to display a clock face (e.g., a wrist raise gesture, a request to switch from viewing an application or notification screen to displaying the clock face). Clock face 1600 includes analog dial 1602, representing a twenty-four hour time period, and inset time indication 1604. In FIG. 16A, analog dial 1602 includes a circular dial with hour markers evenly spaced angularly around the perimeter of the circle, representing 24 hours. Analog dial 1602 is oriented with the zero hour (midnight) at the bottom of the dial and the twelfth hour (noon) at the top of the dial. In FIG. 16A, inset time indication 1604 includes an analog clock face with an hour hand and a minute hand indicating a current time (2:00 pm). At 2:00 pm, inset time indication 1604 is displayed at a first position on clock face 1600 inside analog dial 1602. As time progresses, inset time indication 1604 moves along a circular path within analog dial 1602. In some embodiments, inset time indication 1604 is translucent.

Clock face 1600 includes a representation 1606 indicating a position of the Sun (e.g., relative to a location on Earth (e.g., corresponding to the current location of device 600)) at the displayed time. The position of representation 1606 with respect to analog dial 1602 indicates the same time indicated by inset time indication 1604 (e.g., the current time). As time progresses, representation 1606 moves around a circular path 1607 that has a common origin with the circular path around which inset time indication 1604 moves. As illustrated in FIG. 16A, inset time indication 1604 and representation 1606 are separated by 180 degrees around the common origin of their paths.

Clock face 1600 includes a segment 1614 with a first edge 1614a indicating a sunrise time on analog dial 1602 and a second edge 1614b indicating a sunset time on analog dial 1602. The angular extent of segment 1614 clockwise from first edge 1614a to second edge 1641b represents the length of the day from sunrise to sunset.

Clock face 1600 also includes points of interest 1608a-1608e at designated times on path 1607 along which representation 1606 moves. Points of interest 1608a-1608e indicate events (e.g., astronomical solar events, such as dawn 1608a, sunrise 1608b, solar noon 1608c, sunset 1608d, and dusk 1608e) throughout the day. The position of a point of interest relative to analog dial 1602 indicates the time of the corresponding event.

Figure 16B:
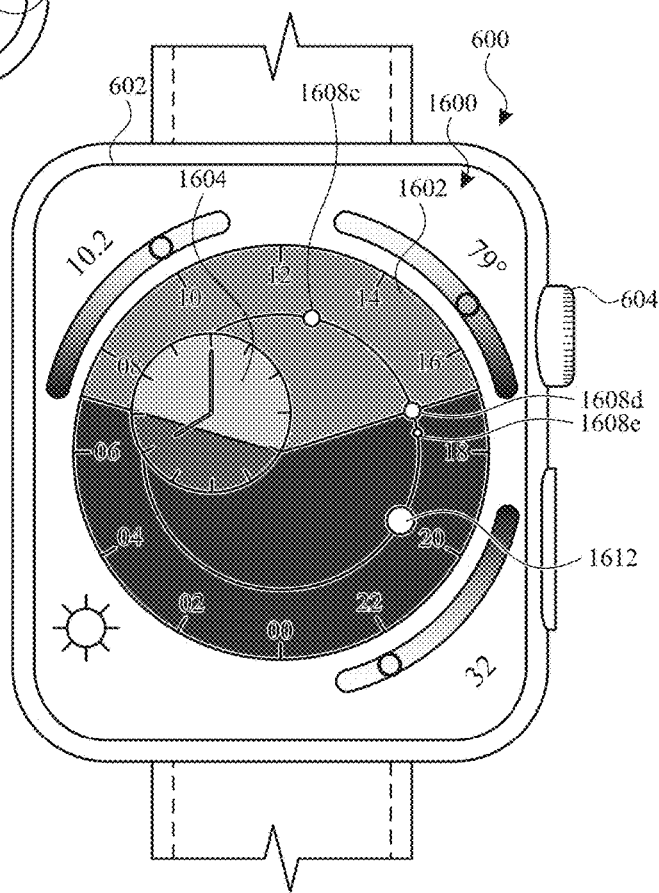

At a later time 8:00 pm, after sunset and before sunrise, device 600 receives a second request to display the clock face (e.g., a wrist raise gesture, a request to switch from viewing an application or notification screen to displaying the clock face). In response to receiving the second request to display the clock face, device 600 displays clock face 1600 indicating the second time, as shown in FIG. 16B. In FIG. 16B, clock face 1600 includes analog dial 1602 and inset time indication 1604 at a second position on clock face 1600 inside analog dial 1602 different from the first position. Inset time indication 1604 indicates the second time. As shown by FIGS. 16A-16B, the representation indicating the position of the Sun (representation 1606 in FIG. 16A and representation 1612 in FIG. 16B (described below)) and inset time indication 1604 move in unison clockwise on clock face 1600 such that the representation indicating the position of the Sun indicates the current time relative to analog dial 1602 and remains separated from inset time indication 1604 by 180 degrees.

In some embodiments, the visual characteristics of the representation indicating the position of the Sun change over time. For example, between sunset and sunrise, the representation indicating the position of the Sun is displayed with an appearance that more closely represents the Moon than the Sun (e.g., representation 1606 is displayed without rays) or, as illustrated in FIG. 16B, is replaced by a different representation 1612. Representation 1606 and/or 1612 can be tinted red around sunrise and sunset, and be displayed more brightly and/or nearly white at solar noon to correspond to the actual physical appearance of the Sun at those times. Clock face 1600 also includes complications 1605a-1605d. In some embodiments, the color of complications 1605a-1605d is determined based on the time of day. In some embodiments, clock face 1600 includes a background and the time of day determines the color of the background. For example, analog dial 1602 includes a background that is darker at 8:00 pm after sunset (FIG. 16B) than at 2:00 pm (FIG. 16A). In some embodiments, the background includes a gradient that has a gradual transition from a first color to a second color and that varies along a direction parallel to a line from the center of analog dial 1602 to a position corresponding to solar noon on analog dial 1602 (e.g., FIG. 16K). In some embodiments, the primary color of the gradient changes with time of day.

Figure 16C:
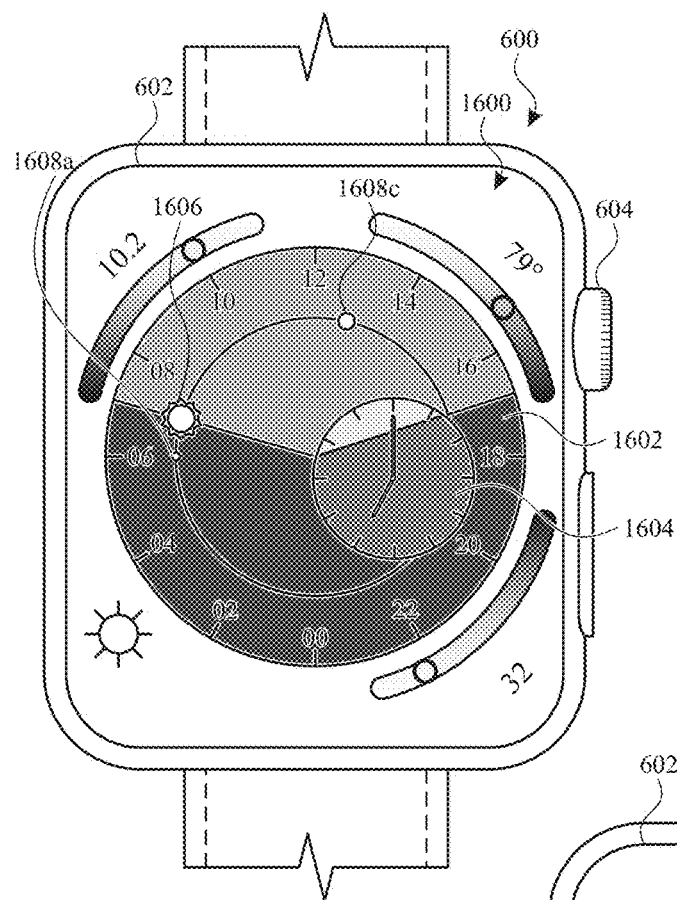

FIG. 16C illustrates clock face 1600 at a third time (e.g., 7:00 am) at sunrise. In FIG. 16C, representation 1606 is changed back to an appearance that resembles the sun and analog dial 1602 is displayed with a lighter color compared to FIG. 16B.

Figure 16D:
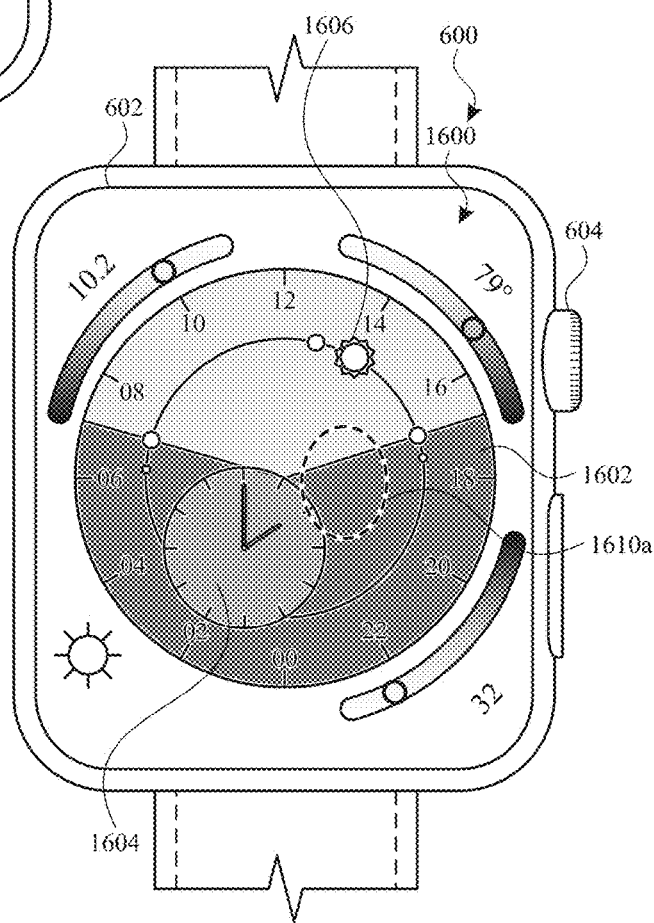

Turning to FIG. 16D, clock face 1600 is again displayed at a current time of 2:00 pm. In FIG. 16D, device 600 detects input 1610a (e.g., a contact on touch-sensitive display 602 with a characteristic intensity greater than a threshold intensity or a duration longer than a threshold duration). In response to detecting input 1610a, device 600 enters a clock face edit mode and displays user interface 1616. In some embodiments, device 600 enters the clock face edit mode in response to detecting a sequence of one or more inputs, in accordance with the technique described above with reference to FIGS. 6C-6E.

Figure 16E:
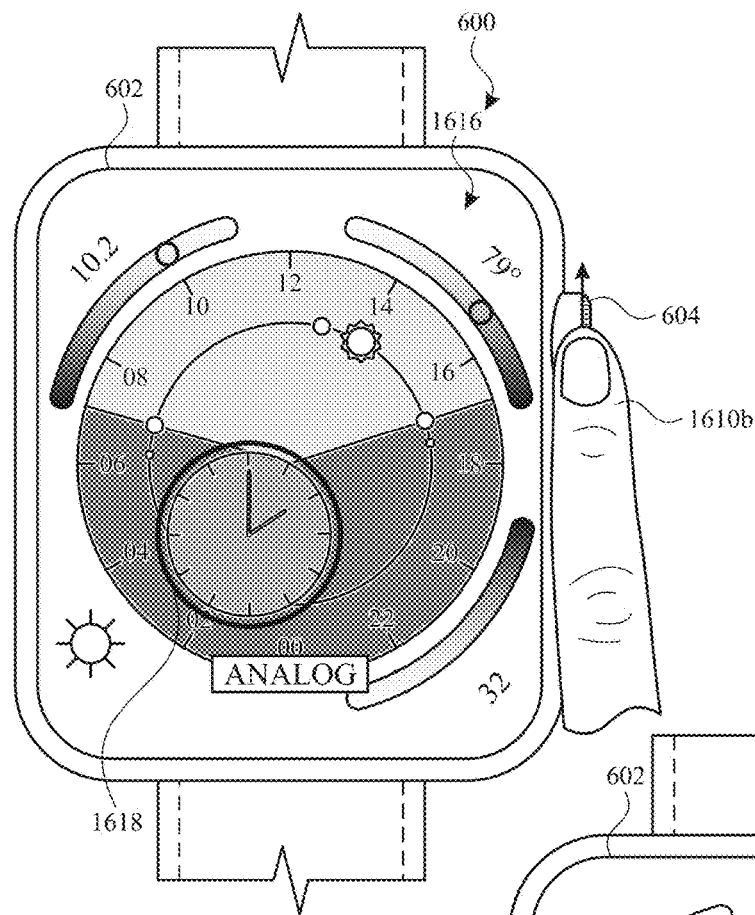
Figure 16F:
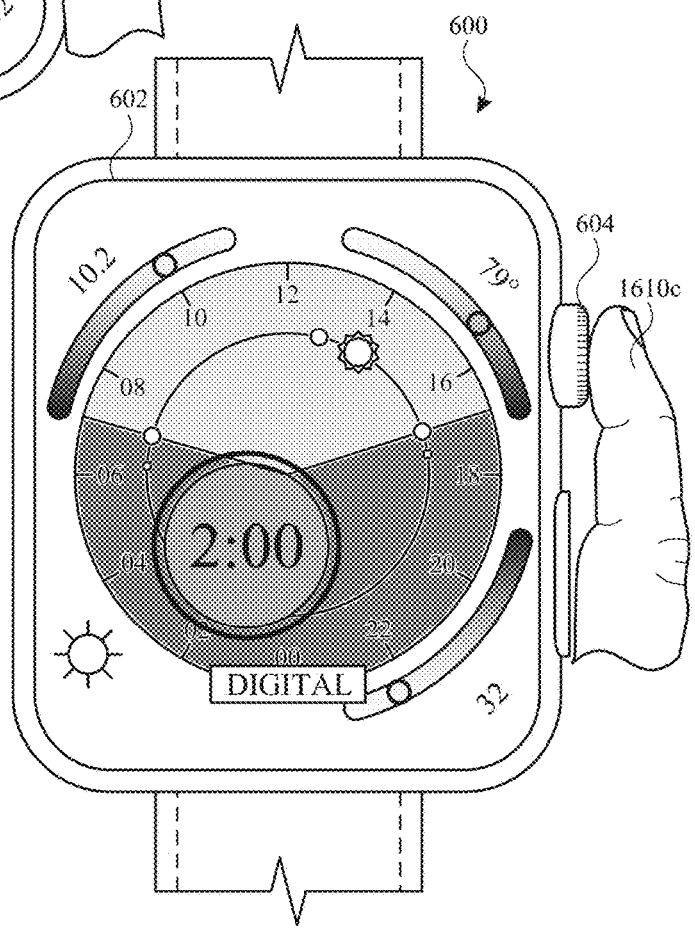

User interface 1616 includes a representation of clock face 1600 and element indicator 1618 indicating the element that is selected for editing. In FIG. 16E, element indicator 1618 indicates that inset time indication 1604 is selected for editing. In response to detecting input 1601b (e.g., rotation of input mechanism 604), device 600 changes inset time indication 1604 from analog to digital, as shown in FIG. 16F. In response to detecting input 1610c (e.g., a press of input mechanism 604), device 600 exits the clock face edit mode and displays clock face 1600 with digital inset time indication 604, as shown in FIG. 16G.

Figure 16G:
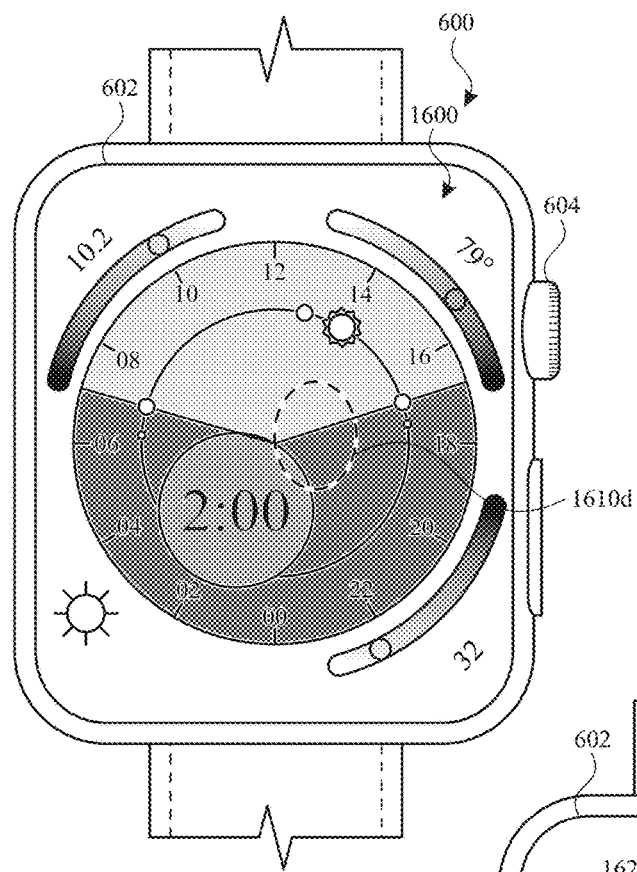

In FIG. 16G, device 600 detects input 1610d (e.g., a tap on display 602). In some embodiments, input 1610d includes a rotation of input mechanism 604. In response to detecting input 1610d, device 600 displays user interface 1620 shown in FIG. 16H, which includes information about the current day. User interface 1620 includes title 1622, which indicates that user interface 1620 is an information screen, and day length indicator 1624, which displays the length of the current day from sunrise to sunset.

Figure 16H:
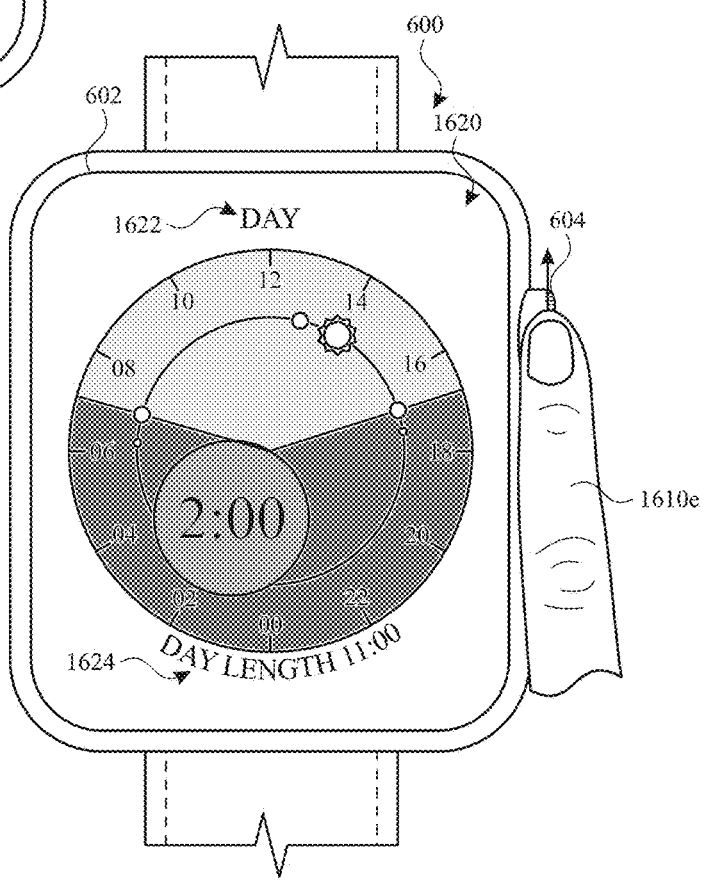
Figure 16I:
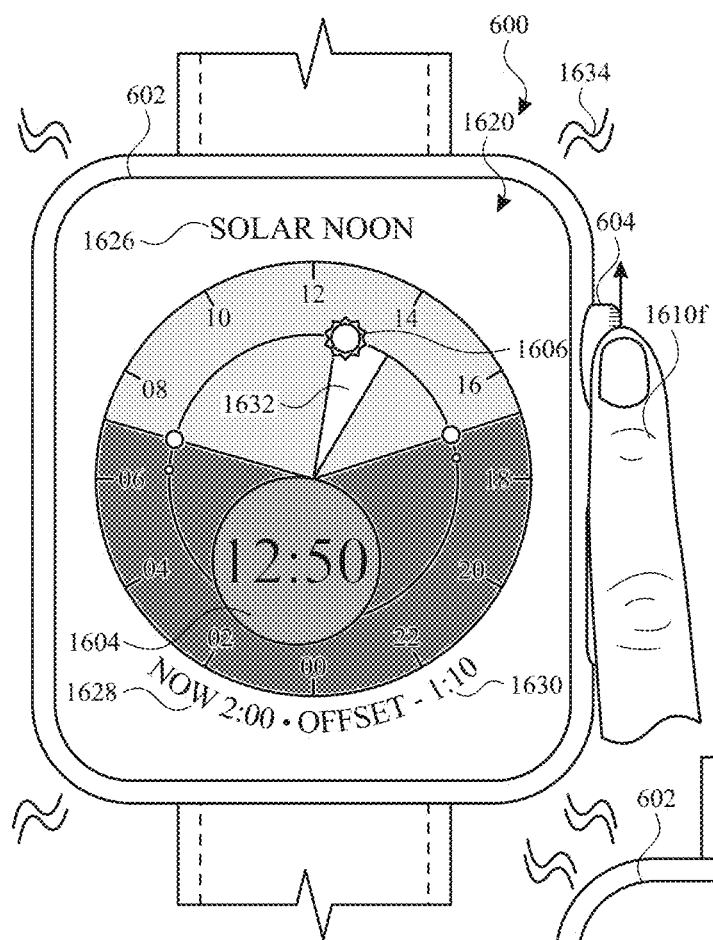

In the embodiment illustrated in FIG. 16H, device 600 enters a time-scrolling mode in response to detecting input 1610d. While in the time-scrolling mode, a user can provide input (e.g., rotate input mechanism 604) to scroll the clock face to a non-current time. This allows a user to view information for points of interest (e.g., the exact time of solar noon). In response to detecting input 1610e (e.g., rotation of input mechanism 604), device 600 displays an indication of a non-current time. As shown in FIG. 16I, inset time indication 1604 and representation 1606 are displayed at respective positions corresponding to non-current time 12:50 pm (which is indicated by the digital indication of time displayed in inset time indication 1604). In this way, if inset time indication 1604 is, for example, obstructing a point of interest at the current time, a user can scroll the clock face to move inset time indication and view the point of interest.

User interface 1620 also includes current time indicator 1628 (which indicates the current time), offset indicator 1630 (which indicates the offset between the non-current time and the current time (e.g., −1:10)), and wedge 1632 (which visually illustrates the offset on analog dial 1602 between the current time and the non-current time).

Figure 16J:
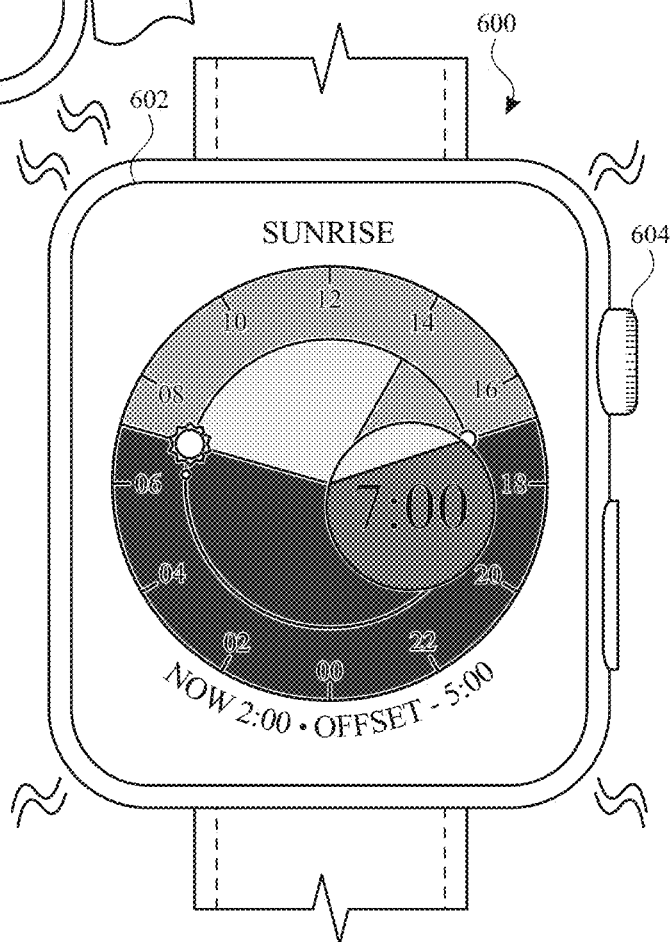

In FIG. 16I, the non-current time corresponds to a point of interest. User interface 1620 includes point-of-interest indicator 1626 (which indicates that the point of interest is Solar Noon) and provides tactile output 1634 (which indicates that a designated time has been reached). In some embodiments, device 600 provides tactile output in response to scrolling from the current time to the point of interest, but at a lesser magnitude. For example, as a user begins to scroll, device 600 provides tactile output at a relatively small magnitude, and then when the non-current time reaches a point of interest, device 600 provides a tactile output with a larger magnitude to indicate to the user that a point of interest has been reached. If the user scrolls past the point of interest, in some embodiments, device 600 resumes the relatively small tactile output until reaching another point of interest. For example, in FIG. 16I, device 600 detects input 1610*f* (e.g., further rotation of input mechanism 604). In response to detecting input 1610*f*, device 600 scrolls from non-current time 12:50 pm to another non-current time 7:00 am, corresponding to sunrise, as shown in FIG. 16J. While scrolling from 12:50 pm to 7:00 am, device 600 provides tactile output at a relatively small magnitude. Upon reaching 7:00 am (the point of interest "Sunrise"), device 600 provides tactile output with a larger magnitude.

Figure 16K:
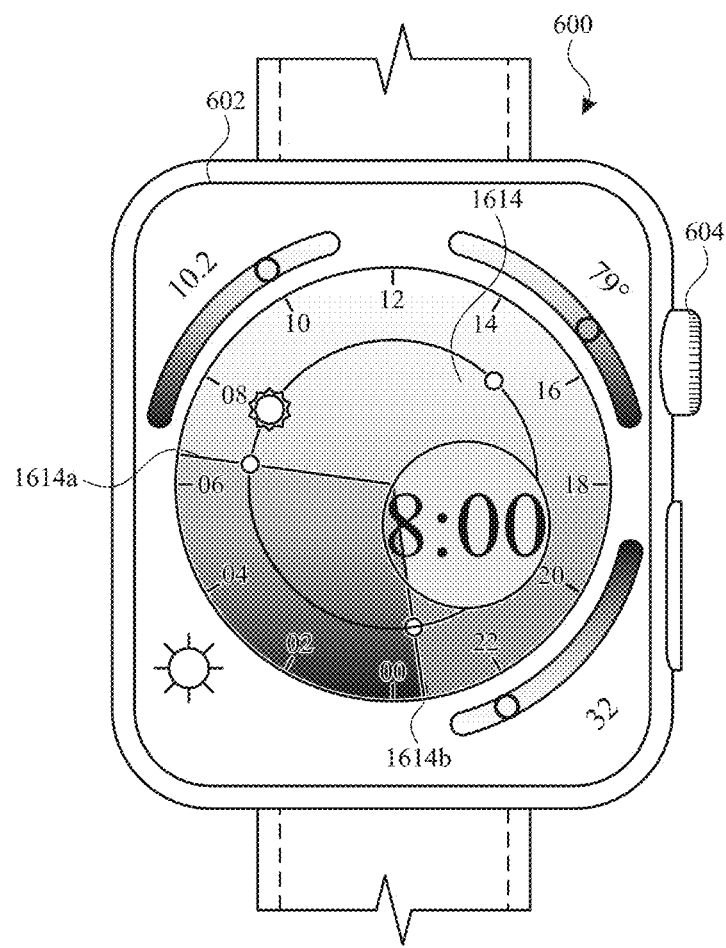

Turning to FIG. 16K, clock face 1600 can adjust the size and position of segment 1614 based on the time of year and a geographic location on Earth. FIG. 16K illustrates clock face 1600 for Nome, Ak. during summertime. The edges of segment 1614 indicate that sunrise is about 6:30 am and sunset is about 11:25 pm. The angular extent of segment 1614 indicates that the length of the day is about 17 hours. Segment 1614 is rotated clockwise relative to 12 noon to indicate that solar noon is after 12 noon at about 3:00 pm.

Figure 17:
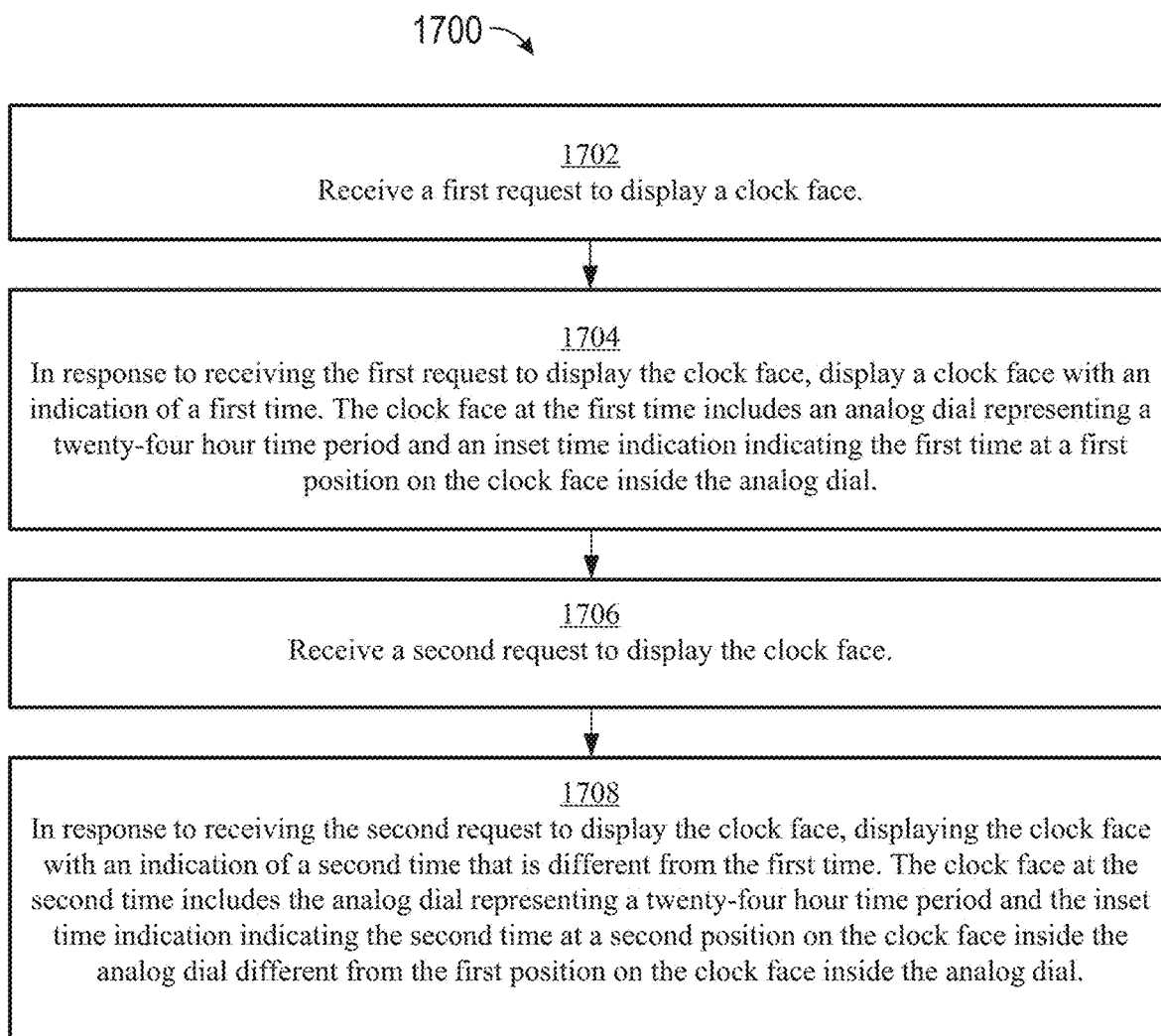
FIG. 17 illustrates an exemplary method in accordance with some embodiments.

FIG. 17 is a flow diagram illustrating a method for providing a clock face using an electronic device in accordance with some embodiments. Method 1700 is performed at an electronic device (e.g., 100, 300, 500, 600) with a display device (e.g., 602). Some operations in method 1700 are, optionally, combined, the orders of some operations are, optionally, changed, and some operations are, optionally, omitted.

As described below, method 1700 provides an intuitive way for providing a clock face. The method reduces the cognitive burden on a user for interacting with an electronic device, thereby creating a more efficient human-machine interface. For battery-operated computing devices, enabling a user to interact with the device faster and more efficiently conserves power and increases the time between battery charges.

The electronic device receives (1702) a first request to display a clock face (e.g., 1600) (e.g., a wrist raise gesture, a request to switch from viewing an application or notification screen to displaying the clock face).

In response (1704) to receiving the first request to display the clock face, the electronic device displays, via the display device, a clock face (e.g., 1600) with an indication of a first time (e.g., a current time). The clock face at the first time includes an analog dial (e.g., 1602) representing a twenty-four hour time period (e.g., a circular dial with hour markers evenly spaced angularly around the perimeter of the circle, representing 24 hours (as opposed to 12 hours). In some embodiments, the analog dial is oriented with the zero hour (midnight) at the bottom of the dial and the twelfth hour (noon) at the top of the dial. In some embodiments, the analog dial is contained within a first area of the watch face representing a first clock face. The clock face at the first time further includes an inset time indication (e.g., 1604) (e.g., an analog clock face with an hour hand and, optionally, a minute hand and/or a second hand indicating time) at a first position on the clock face inside the analog dial (e.g., the inset time indication is completely contained within an outer perimeter of the analog dial). The inset time indication indicates the first time. In some embodiments, the inset time indication includes a digital indication of time (e.g., FIG. 16G). In some embodiments, the inset time indication is circular. In some embodiments, the first position of the inset time indication inside the analog dial is based on the first time. In some embodiments in which the twenty-four hour analog dial is included in a first clock face, the inset time indication is a smaller, second clock face overlaid on top/in front of the first clock face. In some embodiments, the inset time indication has a diameter that is substantially less than a diameter of the analog dial.

The electronic device receives (1706) a second request to display the clock face (e.g., 1600) (e.g., a wrist raise gesture, a request to switch from viewing an application or notification screen to displaying the clock face)

In response (1708) to receiving the second request to display the clock face, the electronic device displays, via the display device, the clock face with an indication of a second time that is different from the first time. The clock face at the second time includes the analog dial representing a twenty-four hour time period and the inset time indication at a second position on the clock face inside the analog dial different from the first position on the clock face inside the analog dial. The inset time indication indicates the second time (e.g., the inset time indication moves along a circular path, where the distance between a first position on the path and a second position on the path is directly proportional to the amount of time between the first time and the second time). In some embodiments, the inset time indication moves continuously at a constant rate. In some embodiments, the inset time indication moves to discrete positions at discrete times. In some embodiments, the inset time indication makes half of a revolution around a circular path in twelve hours and a complete revolution around a circular path in twenty-hour hours. In some embodiments, the angular orientation of the inset time indication relative to the clock face (e.g., 1600) and/or analog dial (e.g., 1602) remains constant (e.g., the inset time indication remains upright with 12 o'clock in the vertical up direction). Displaying the clock face at the second time with the analog dial representing a twenty-four hour time period and the inset time indication at a second position on the clock face inside the analog dial different from the first position on the clock face inside the analog dial, where the inset time indication indicates the second time, allows the inset time indication to display the current time while moving to a position inside the analog dial that does not interfere with other graphical elements within the analog dial (e.g., representation 1606 of the Sun) whose position(s) relative to the analog dial provide information (e.g., current time and/or position of the Sun). This provides improved visual feedback without cluttering the user interface. Providing improved visual feedback without cluttering the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second position of the inset time indication relative to the first position of the inset time indication is based on an amount of time between the second time and the first time.

In some embodiments, the first position of the inset time indication is selected based on the first time (e.g., opposite to an hour hand in the 24 hour analog dial) and the second position of the inset time indication is selected based on the second time (e.g., opposite to the hour hand in the 24 hour analog dial).

In some embodiments, the inset time indication is offset from a center of the analog dial representing a twenty-four hour time period (e.g., the inset time indication moves along a circular path with a common origin as the analog dial and inside the analog dial).

In some embodiments, the clock face at the first time further includes a representation (e.g., 1606, 1612) indicating a position of the Sun (e.g., relative to a location on Earth) at the first time. In some embodiments, the representation (e.g., 1606, 1612) is at a third position on the clock face inside the analog dial at the first time. In some embodiments, the clock face at the second time further includes the representation indicating a position of the Sun at the second time. In some embodiments, the representation is at a fourth position on the clock face inside the analog dial at the second time different from the third position on the clock face inside the analog dial (e.g., the representation of the Sun moves around a circular path). In some embodiments, the angular separation between the representation of the Sun and the inset time indication remains constant (e.g., 180 degrees apart).

In some embodiments, the third position on the clock face relative to the analog dial indicates the first time, and the fourth position on the clock face relative to the analog dial indicates the second time.

In some embodiments, the inset time indication moves from the first position on the clock face to the second position on the clock face around an origin and along a first circular path. In some embodiments, the representation indicating the position of the Sun moves from the third position on the clock face to the fourth position on the clock face around the origin (and along a second circular path (e.g., 1607). In some embodiments, an angular separation relative to the origin between the inset time indication and the representation indicating the position of the Sun remains constant over time (e.g., 180 degrees; the inset time indication is offset 12 hours on the 24 hour dial from the representation of the Sun/moon; the angular separation relative to the origin between the first position and the third position is the same as an angular separation relative to the origin between the second position and the fourth position).

In some embodiments, the representation indicating the position of the Sun is displayed in a first color at the first time and a second color different from the first color at the second time. In some embodiments, the color of the representation of the position of the Sun is based on the time of day (e.g., the representation is nearly white at solar noon and tinted red near sunset).

In some embodiments, in accordance with a current time corresponding to a time between sunrise and sunset, the electronic device displays a first element representing the Sun (e.g., 1606). In some embodiments, in accordance with a current time corresponding to a time between sunset and sunrise, the electronic device displays a second element representing the Moon (e.g., 1612).

In some embodiments, the clock face includes a segment (e.g., 1614) (e.g., a circular sector) with a first edge indicating a sunrise time (e.g., 1614a) on the analog dial (e.g., the position of the first edge relative to the analog dial is selected based on the sunrise time) and a second edge (e.g., 1614b) indicating a sunset time on the analog dial (e.g., the position of the second edge relative to the analog dial is selected based on the sunset time. In some embodiments, the segment occupies an angular extent clockwise from the first edge to the second edge. In some embodiments, the angular extent clockwise from the first edge to the second edge is a first color (representing the time from sunrise to sunset), and the angular extent counterclockwise from the first edge to the second edge is a second color (representing the time from sunset to sunrise the next day). Displaying a clock face with a segment, where the positions of the edges of the segment indicate sunrise and sunset time as described above provides improved visual feedback by presenting a clear visual indication of the sunrise and sunset times. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the position and size of the segment is selected based on a time of year and a geographic location associated with the electronic device (e.g., a location on Earth) (e.g., wedge narrows/widens based on the time of year and the location on Earth; wedge rotates based on location (e.g., sunrise/sunset rotate clockwise as you move west within a time zone)).

In some embodiments, the electronic device includes a rotatable input mechanism (e.g., 604) that rotates relative to a frame of the electronic device. In some embodiments, the electronic device detects a rotation (e.g., 1610e, 1610f) of the rotatable input mechanism and in response to detecting the rotation of the rotatable input mechanism, the electronic device moves the inset time indication to a third position on the clock face inside the analog dial. In some embodiments, the inset time indication indicates a third time different from a current time (e.g., the configuration/state of the elements of the clock face correspond to the third time). Moving the inset time indication in response to input provides improved visual feedback by allowing, for example, the inset time indication to be moved to a position that does not obscure other graphical elements inside the analog dial (e.g., graphical elements representing designated time). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the rotation of the rotatable input mechanism, the electronic device displays an indication (e.g., 1630, 1632) of an offset between the third time and current time. In some embodiments, the offset is indicated by a position of the indication relative to the analog dial (e.g., a line from the center of the analog dial to the current time as represented on the analog dial). In some embodiments, the indication includes text (e.g., "NOW 2:00 OFFSET −1:10").

In some embodiments, in response to detecting the rotation of the rotatable input mechanism, the electronic device displays an indication (e.g., 1624) of a length of a day (e.g., the amount of time from sunrise to sunset).

In some embodiments, in response to detecting the rotation of the rotatable input mechanism and in accordance with a determination that the third time corresponds to a designated time (e.g., Solar Noon), the electronic device displays an indication (e.g., 1626) of an event corresponding to the designated time (e.g., an information point, such as solar noon, sunset). In some embodiments, the clock face includes a representation (e.g., 1608a-1608e) (e.g., a dot) of an event (e.g., a designated time; a point of interest; solar noon, sunset, sunrise, dawn, dusk, civil twilight, nautical twilight, astronomical twilight). In some embodiments, the representation of the event is at a position on the clock face (e.g., on the path of the representation of the position of the Sun), where the position of the representation is relative to the analog dial and indicates a time of the event.

In some embodiments, in response to detecting the rotation of the rotatable input mechanism and in accordance with a determination that the third time corresponds to a designated time, the electronic device provides a tactile output (e.g., 1634). In some embodiments, providing the tactile output in accordance with a determination that the third time corresponds to a designated time includes providing the tactile output with a first magnitude. In some embodiments, in response to detecting the rotation of the rotatable input mechanism and in accordance with a determination that the third time does not correspond to a designated time, the electronic device provides the tactile output with a second magnitude less than the first magnitude. Providing a tactile output in response to detecting the rotation of the rotatable input mechanism and in accordance with a determination that the third time corresponds to a designated time provides improved feedback by indicating that a navigated-to time is a point of interest. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects further rotation of the rotatable input mechanism. In response to detecting the further rotation of the rotatable input mechanism, the electronic device provides a second tactile output (e.g., the electronic device provides repeated tactile outputs as the rotatable input mechanism is rotated; the tactile outputs are repeated at the second (smaller) magnitude between designated times; at each designated time, a tactile output is provided with the first (larger) magnitude). In some embodiments, the tactile output is based on a speed or amount of rotation of the rotatable input mechanism (e.g., instead of the content of the clock face, such as the location of a designated time or point of interest). In some embodiments, the tactile output is based on a speed of rotation of the rotatable input mechanism (e.g., tactile outputs are provided at a greater rate or magnitude the faster the rotatable input mechanism is rotated). In some embodiments, the tactile output is based on an amount of rotation of the rotatable input mechanism (e.g., the tactile output is provided at a greater rate or magnitude the more the rotatable input mechanism is rotated).

In some embodiments, the clock face includes a first graphical element (e.g., 1605a, 1605b, 1605c, 1605d, 1602, 1604) (e.g., a complication or a tick on the analog dial). In some embodiments, a color of the first graphical element is selected based on a time of day (e.g., the current time, a non-current navigated-to time). In some embodiments, the time of day determines the color of a background of the clock face. In some embodiments, the background includes a gradient (e.g., the primary color of the gradient changes with time of day). Displaying an element of a clock face with a color, where the color varies based on the time of day, provides improved visual feedback by presenting a visual indication of the current time other than a digital or analog representation and providing a dynamic user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the inset time indication includes an indication of time. In some embodiments, the indication of time is displayed according to a first style (e.g., analog) at the second time. In some embodiments, after displaying the clock face at the second time, the electronic device detects a sequence of one or more inputs (e.g., 1610a-1610c) (e.g., contacts on a touch-sensitive display and/or activation (e.g., depression or rotation) of a rotatable input mechanism) corresponding to a request to edit a style of the indication of time of the inset time indication (e.g., enter a clock face editing mode, select a time style, and confirm selection of the clock face). In response to detecting the sequence of one or more inputs corresponding to a request to edit a style of the indication of time of the inset time indication, the electronic device displays, via the display device, the clock face including the indication of time of the inset time indication according to a second style (e.g., digital) different from the first style (e.g., the second style is based on the selection of the second style via the sequence of one or more inputs).

In some embodiments, the inset time indication is translucent (e.g., the inset time indication is displayed in front of the analog dial (and features within the analog dial); the analog dial (and features within the analog dial) are visible through the inset time indication but lack detail).

In some embodiments, the clock face includes a color gradient (e.g., a linear color gradient) that has a gradual transition from a first color (e.g., a dark color near the bottom of the analog dial) to a second color (e.g., a lighter color near the top of the analog dial, with various colors/shades of colors in between). In some embodiments, the color gradient varies along a direction from a center of the analog dial to a position on the analog dial representing solar noon (e.g., for a position along the direction of the gradient, the color is constant in a direction perpendicular to the direction of the gradient).

Note that details of the processes described above with respect to method 1700 (e.g., FIG. 17) are also applicable in an analogous manner to the methods described above. For example, methods 700, 900, 1100, 1300, 1500, and 1900 optionally include one or more of the characteristics of the various methods described above with reference to method 1700. For example, the operations of method 1700 can be applied consistent with the operations of methods 700 and 900. For brevity, these details are not repeated below.

FIGS. 18A-18L illustrate exemplary user interfaces for reordering clock faces, in accordance with some embodiments. The user interfaces in these figures are used to illustrate the processes described below, including the processes in FIGS. 19A-19B.

Figure 18A:
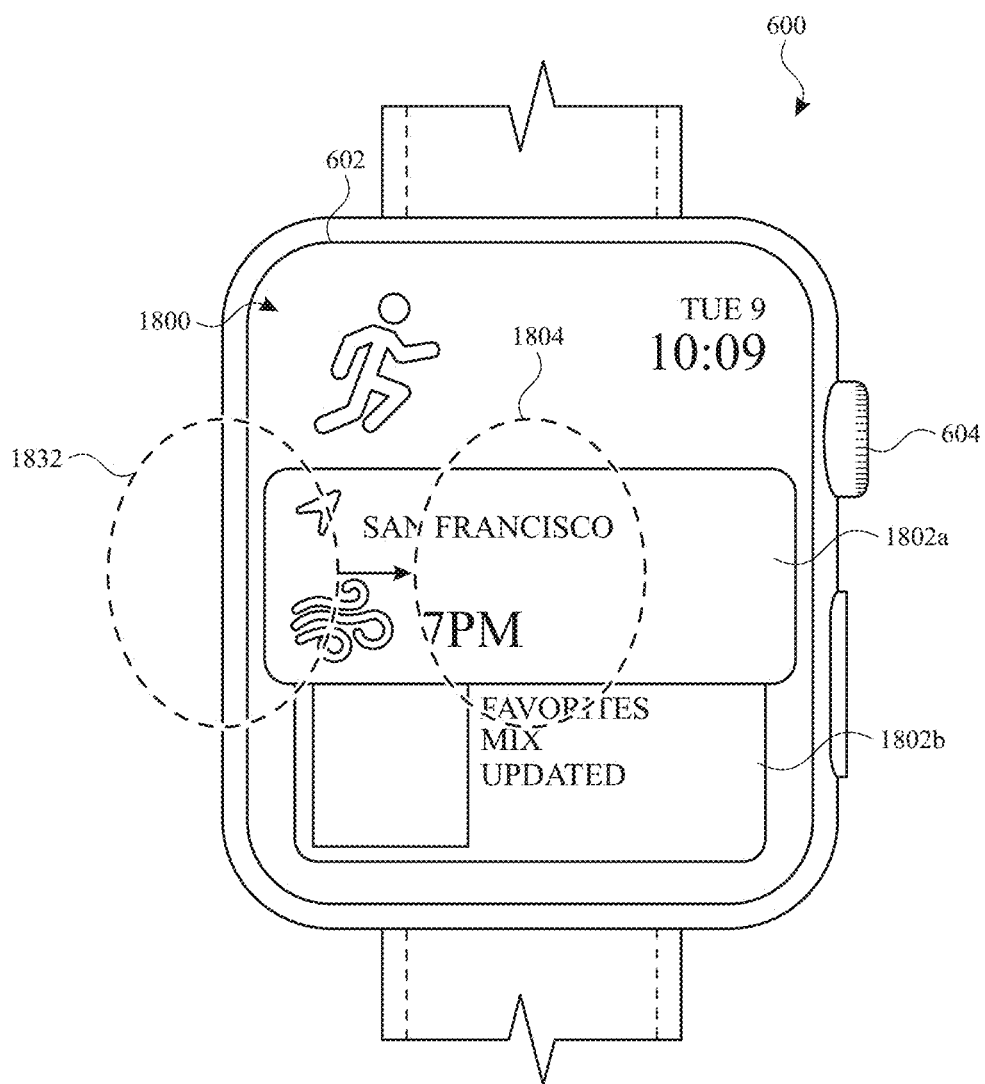
FIGS. 18A-18L illustrate exemplary user interfaces for reordering clock faces, in accordance with some embodiments.
Figure 19A:
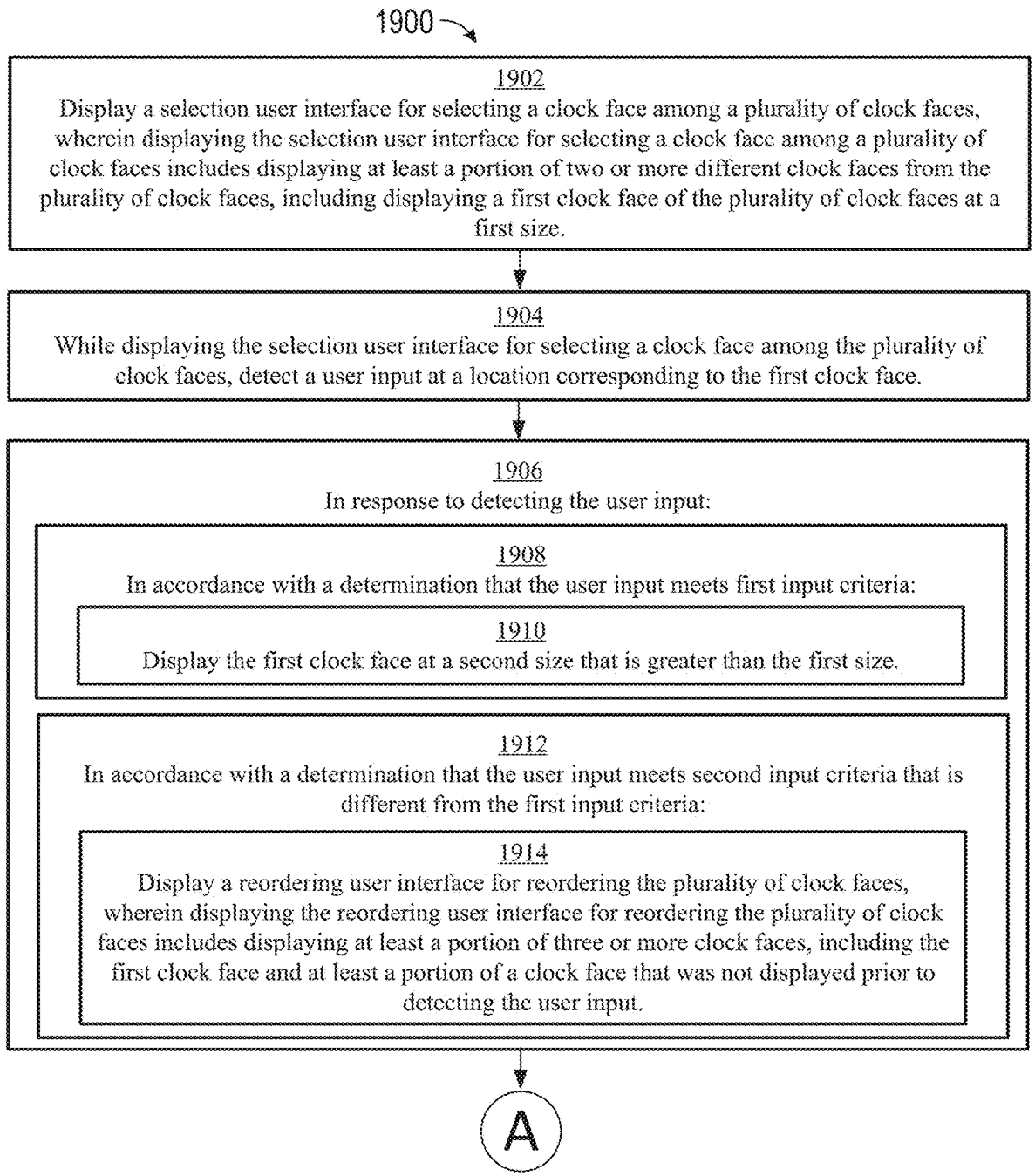
FIGS. 19A-19B illustrate an exemplary method for reordering clock faces, in accordance with some embodiments.
Figure 19B:
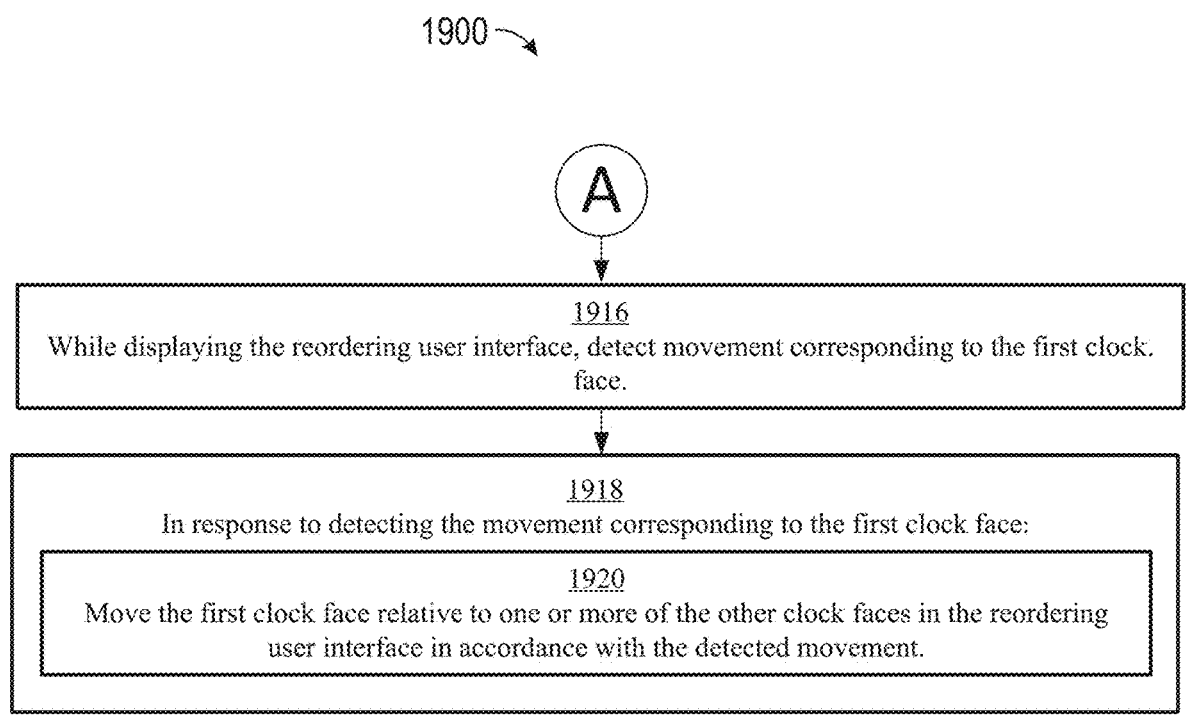

FIG. 18A depicts electronic device 600 displaying clock face 1800 on display 602 (e.g., a touch-sensitive display). In some embodiments, electronic device 600 includes one or more features of device 100, device 300, or device 500. In the embodiment illustrated in FIG. 18A, electronic device 600 includes depressible and rotatable input mechanism 604. In some embodiments, electronic device 600 displays clock face 1800 in response to receiving a request to display the current clock face (e.g., a wrist raise gesture, a request to switch from viewing an application or notification screen to displaying the current clock face). Clock face 1800 includes an indication of the time and date. Additionally, clock face 1800 includes complications 1802a-1802b. In some embodiments, a complication refers to a clock face feature other than those used to indicate the hours and minutes of a time (e.g., clock hands or hour/minute indications)). In some embodiments, complications provide different types of information to a user, such as data obtained from an application. In some embodiments, the information conveyed to a user by a complication is customizable.

At FIG. 18A, a user performs a deep press gesture to navigate to a clock face selection mode. As a result, electronic device 600 detects input 1804 (e.g., a contact on display 602 with a characteristic intensity greater than an intensity threshold).

Figure 18B:
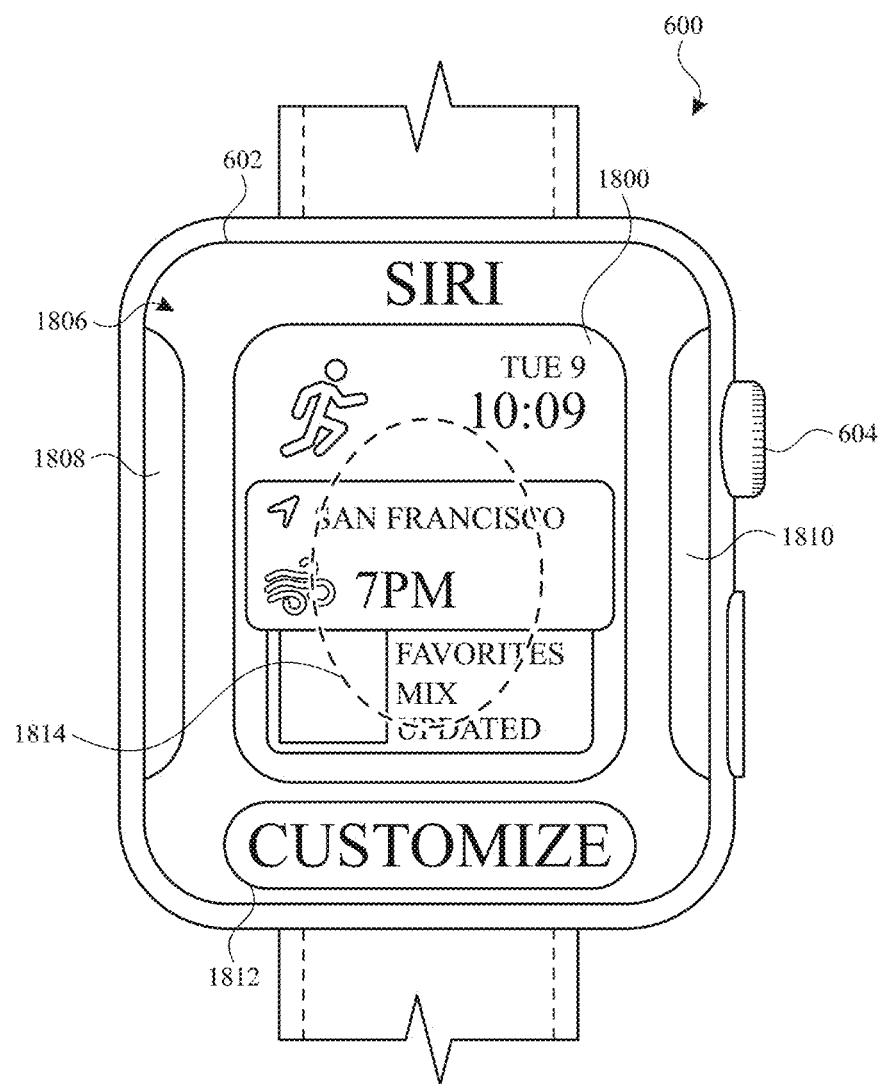

At FIG. 18B, in response to detecting input 1804 and in accordance with a determination that a characteristic intensity of input 1804 exceeds an intensity threshold, electronic device 600 enters a clock face selection mode and displays user interface 1806. User interface 1806 includes clock face 1800 being displayed at a size that is smaller than the size at which clock face 1800 is being displayed in FIG. 18A. User interface 1806 also includes portions (but not all) of clock faces 1808 and 1810, which are available for display by electronic device 600. In some embodiments, in response to an input (e.g., a horizontal swipe on display 602 or a rotation of input mechanism 604), electronic device 600 centers one of clock faces 1808 or 1810 on user interface 1806 for selection as the current clock face (e.g., by scrolling clock faces 1800, 1808, and 1810). For example, a user can swipe from left to right in order to center clock face 1808 and then tap clock face 1808 (or press input mechanism 604) to select the corresponding clock face as the current clock face. In some embodiments, input mechanism 604 is physically rotatable with respect to a housing of electronic device 600.

In some embodiments, returning to FIG. 18A, instead of detecting a deep press gesture, electronic device 600 detects input 1804 as a tap gesture (e.g., a contact on display 602 with a characteristic intensity less than the intensity threshold) at a location corresponding to complication 1802a. In some embodiments, in response to detecting input 1804 and in accordance with a determination that the detected input has a characteristic intensity that does not exceed the intensity threshold, electronic device 600 replaces display of clock face 1800 with a user interface of an application (e.g., weather application) corresponding to the complication (e.g., 1802a) at which the input was detected.

At FIG. 18B, user interface 1806 also includes affordance 1812 to select the clock face corresponding to the currently centered representation for editing. In some embodiments, electronic device 600 detects a tap gesture at a location corresponding to affordance 1812 and, in response, enters a clock face edit mode to edit clock face 1800.

As depicted in FIG. 18B, the user performs a long press gesture on clock face 1800 to navigate to a clock face reordering mode. As a result, electronic device 600 detects input 1814 (e.g., a contact on display 602 with a contact duration longer than a threshold duration) at a location corresponding to clock face 1800.

Figure 18C:
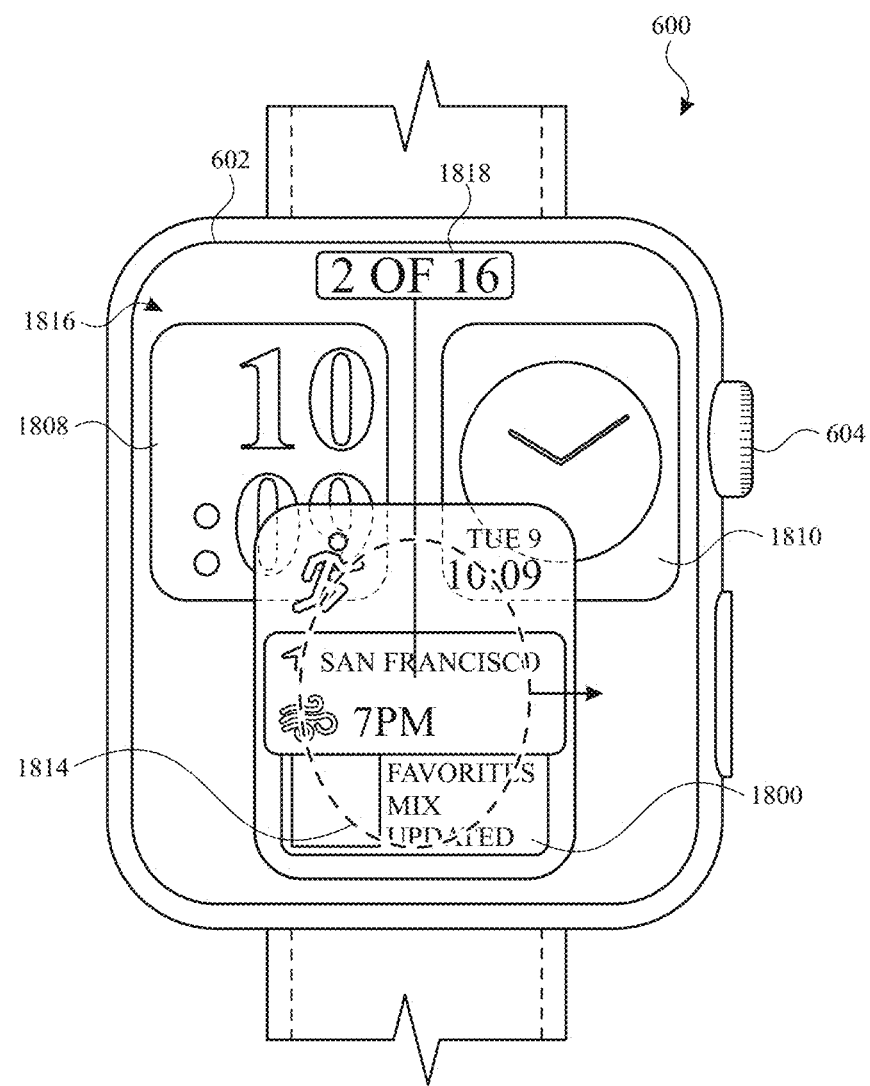

At FIG. 18C, in response to detecting input 1814 and in accordance with a determination that the contact duration of input 1814 exceeds a threshold duration, electronic device 600 enters a clock face reordering mode and displays user interface 1816. The clock face reordering mode allows a user to reorder the sequence of the clock faces available for display by electronic device 600. In the embodiment illustrated in FIG. 18C, sixteen clock faces are available for display by electronic device 600, where the sixteen clock faces are organized in a particular sequence (e.g., an ordered set) from a first position in the sequence to a sixteenth position in the sequence. Clock faces 1808, 1800, and 1810 are in the first, second, and third positions in the clock face sequence (e.g., in the ordered set), respectively.

In some embodiments, instead of detecting a long press gesture, electronic device 600 detects input 1814 as a tap gesture. In some embodiments, in response to detecting input 1814 and in accordance with a determination that the contact duration of input 1814 does not exceed a threshold duration, electronic device exits the clock face selection mode, and returns to displaying clock face 1800 at the bigger size shown in FIG. 18A (e.g., ceases to display portions of clock faces 1808 and 1810).

As shown in FIG. 18C, the user continues to maintain contact with display 602. As a result, electronic device detects a continuation of input 1814 (e.g., electronic device 600 continues to detect contact via input 1814 without detecting liftoff of the contact). While electronic device 600 displays user interface 1816 and continues to detect input 1814, electronic device 600 displays clock face 1800 at a location on display 602 corresponding to a location at which input 1814 is being detected. Additionally, user interface 1816 includes position indicator 1818, which provides a visual indication of a position in the sequence of clock faces at which clock face 1800 would be placed if electronic device 600 detects liftoff of input 1814. Thus, in some embodiments, if electronic device 600 detected liftoff of input 1814 at FIG. 18C, electronic device 600 would return to displaying user interface 1806 as shown in FIG. 18B (e.g., clock face 1800 would remain in the second position in the clock face sequence).

At FIG. 18C, user interface 1816 includes clock face 1800 being displayed at a size that is smaller than the size at which clock face 1800 is being displayed in FIG. 18B. User interface 1816 also includes clock faces 1808 and 1810 being displayed at the same size as each other, but at a size that is smaller than the size at which clock face 1800 is being displayed in FIG. 18C. Additionally, clock face 1800 is being displayed with a reduced opacity (e.g., reduced as compared to clock faces 1808, 1810; such that clock face 1800 is partially transparent). As a result, the portion of clock faces 1808 and 1810 that are covered by clock face 1800 are still displayed and can still be seen by the user. In contrast to clock face 1800, clock faces 1808 and 1810 are displayed with full opacity (e.g., such that the clock faces are not transparent).

As discussed above, the user continues to maintain contact with display 602. The user then performs a left-to-right drag gesture to reposition clock face 1800 in the sequence of clock faces. As a result, electronic device detects input 1814 with movement in the left-to-right direction.

Figure 18D:
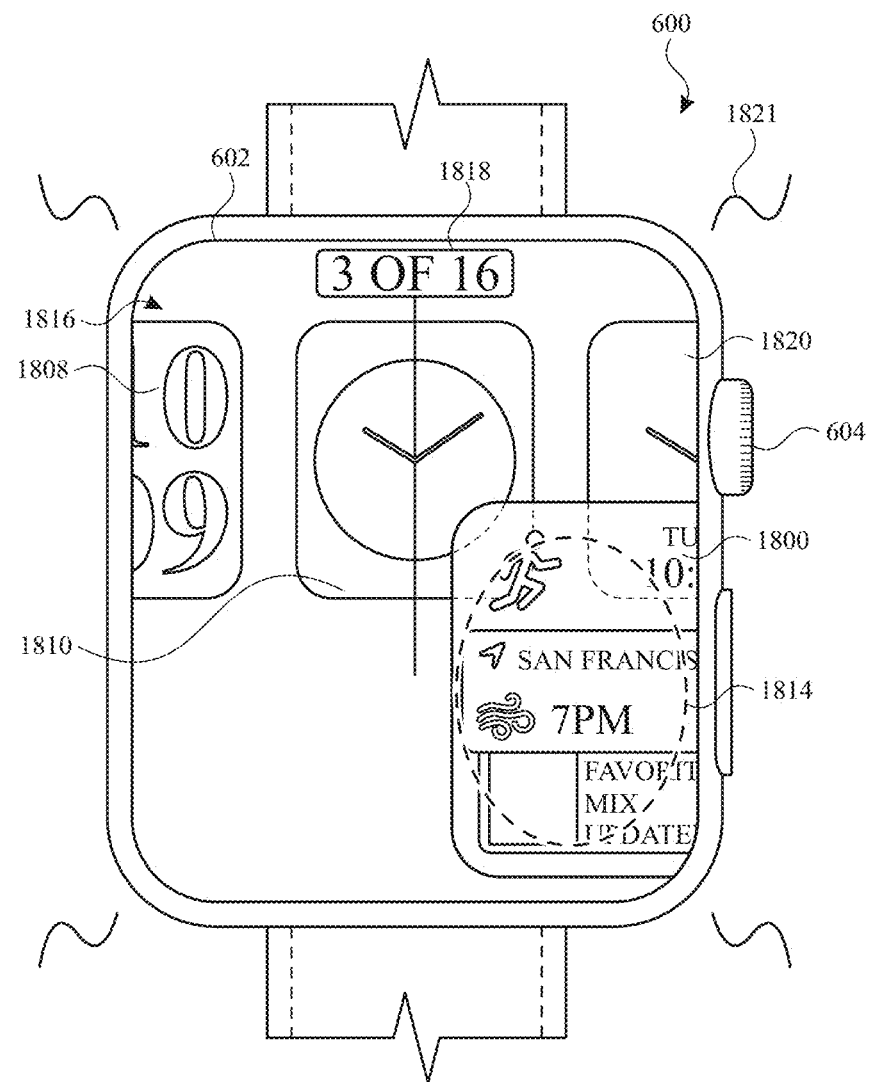

At FIG. 18D, in response to detecting input 1814 with movement in the left-to-right direction, electronic device 600 initiates a process for reordering clock face 1800 in the sequence of clock faces, and moves clock face 1800 relative to clock faces 1808 and 1810 in accordance with the movement of input 1814. After performing the left-to-right drag gesture, the user maintains contact with the right side of touch-sensitive display 602. As a result, electronic device 600 detects input 1814 at a location corresponding to the right side of display 602.

In response to detecting input 1814 at a location corresponding to the right side of display 602, electronic device 600 scrolls the displayed clock faces (e.g., 1808, 1810) in the right-to-left direction (e.g., while maintaining the display location of clock face 1800 on the display), and initially displays at least a portion of clock face 1820. Clock face 1820 is scrolled onto display 602 from the right edge of display 602.

Further in response to detecting input 1814 at a location corresponding to the right side of display 602, electronic device 600 scrolls clock face 1810 passed position indicator 1818, and updates position indicator 1818 to reflect the current position of clock face 1800. As clock face scrolls passed position indicator 1818, electronic device 600 generates tactile outputs 1821 (e.g., haptic feedback) that are capable of being sensed by the user, thereby providing an indication that the user is successfully reordering the clock faces. In some embodiments, electronic device 600 generates the tactile outputs upon a determination that a scrolled clock face has reached a threshold location with respect to position indicator 1818.

Figure 18E:
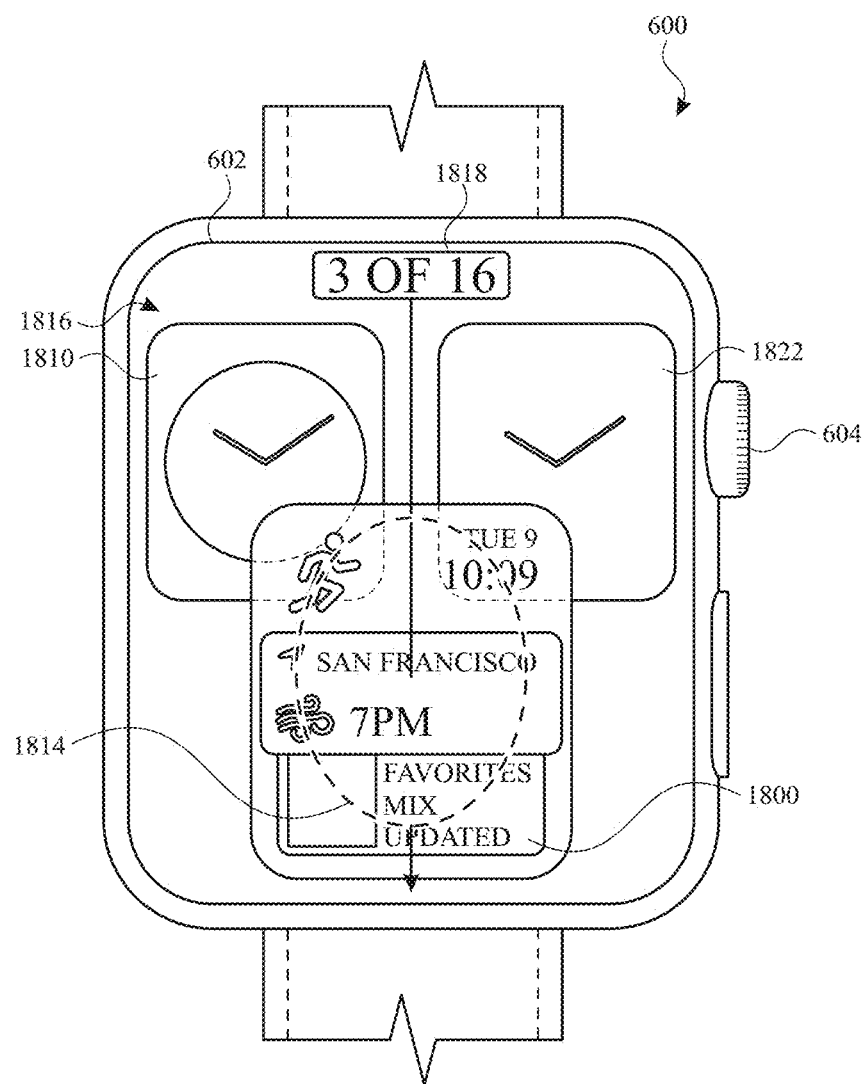

At FIG. 18E, the user has successfully reordered the sequence of the clock faces. In particular, clock face 1800 is now in the third position in the clock face sequence, as indicated by position indicator 1818. Thus, clock face 1808 is now in the first position, while clock face 1810 is in the second position in the clock face sequence. In some embodiments, if electronic device 600 detected liftoff of input 1814, electronic device 600 would display user interface 1806 in FIG. 18B, but with clock face 1810 in place of clock face 1808 and clock face 1822 in place of clock face 1810.

As shown in FIG. 18E, the user continues to maintain contact with display 602. The user then performs a downward drag gesture to enable faster scrolling of the clock faces in the clock face reordering mode. As a result, electronic device detects input 1814 with movement in the downward direction without detecting liftoff of input 1814.

Figure 18F:
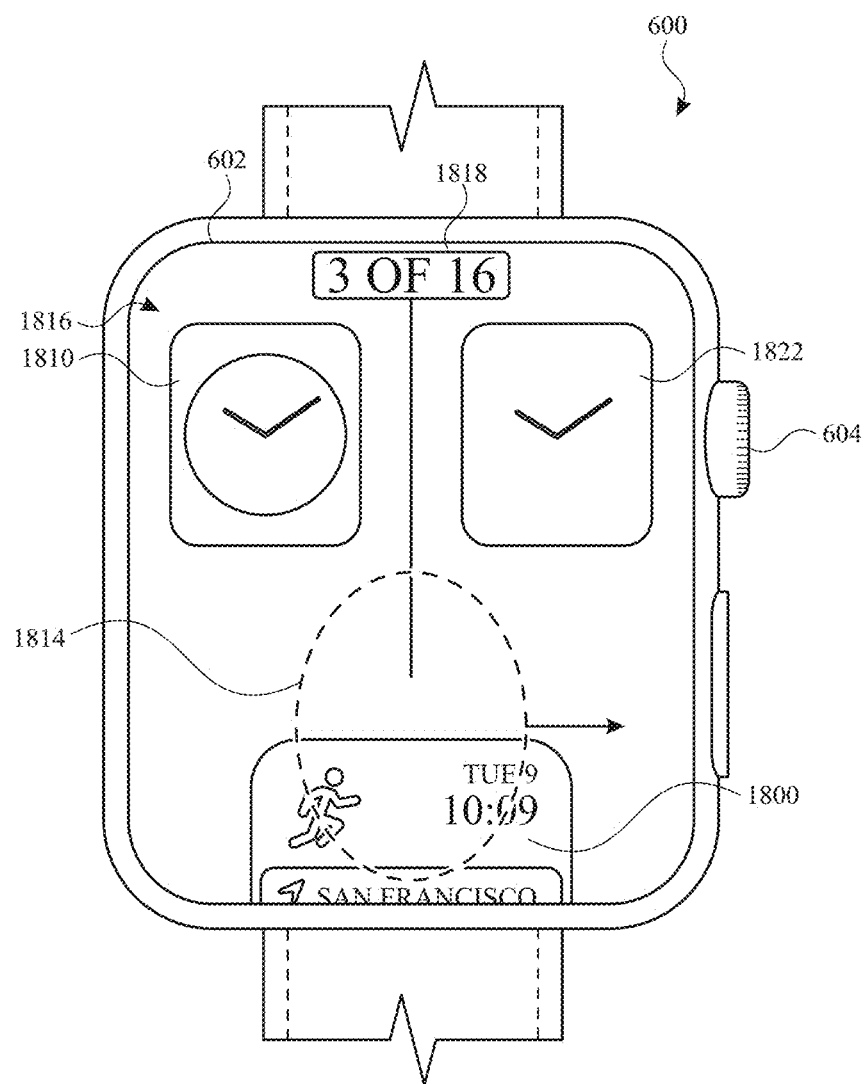

At FIG. 18F, in response to detecting input 1814 with movement in the downward direction, electronic device 600 shrinks clock faces 1810 and 1822, and displays clock face 1800 at a location corresponding to the location at which input 1814 is being detected. While clock faces 1810 and 1822 are being displayed at a smaller size, the device enables scrolling the clock faces at a faster rate for quicker reordering of the clock faces.

As depicted in FIG. 18F, the user continues to maintain contact with display 602. The user then performs a left-to-right drag gesture to reposition clock face 1800 in the sequence of clock faces. As a result, electronic device detects input 1814 with movement in the left-to-right direction without detecting liftoff of input 1814.

Figure 18G:
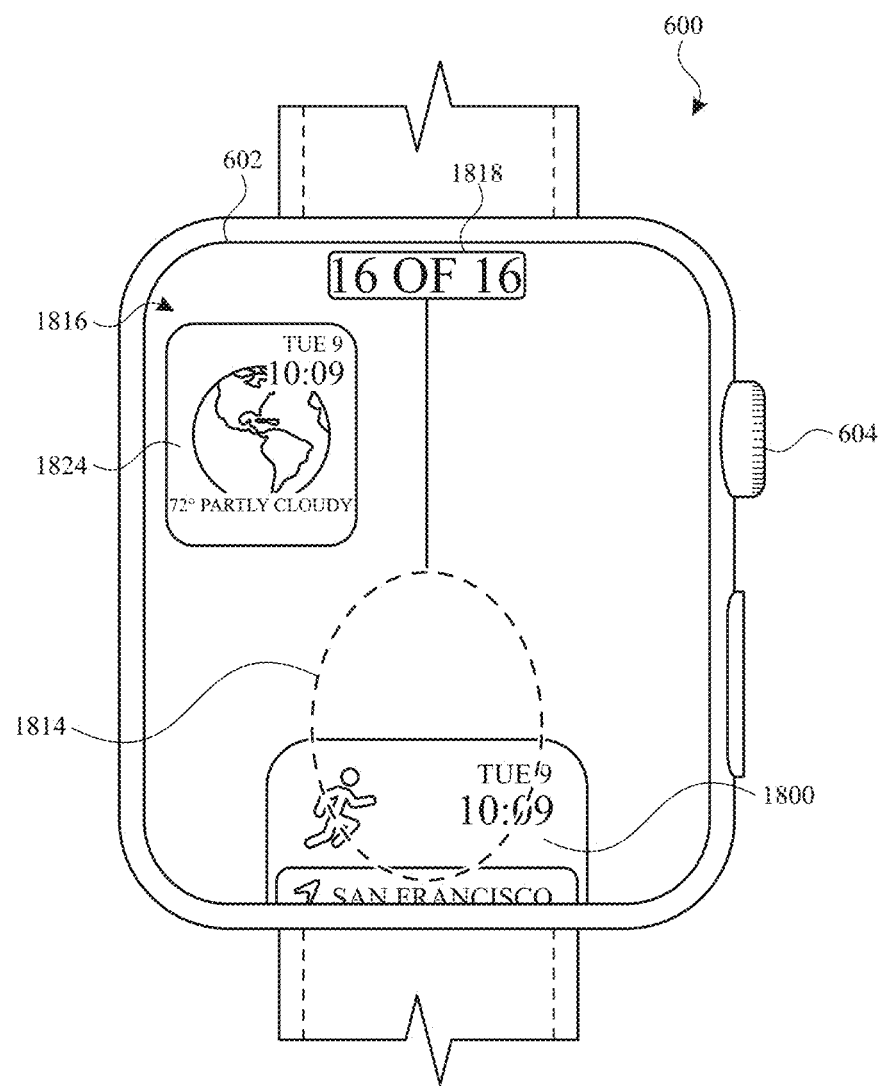

At FIG. 18G, in response to detecting input 1814 with movement in the left-to-right direction, electronic device 600 initiates a process for reordering clock face 1800 in the sequence of clock faces, and moves clock face 1800 relative to clock faces 1810 and 1822 in accordance with the movement of input 1814. In some embodiments, after performing the left-to-right drag gesture, the user maintains contact with the right side of display 602. As a result, electronic device 600 continues to detect input 1814 at a location corresponding to the right side of display 602.

In some embodiments, in response to detecting input 1814 at a location corresponding to the right side of display 602, electronic device 600 scrolls, in the right-to-left direction, the displayed clock faces (e.g., 1810, 1822) in addition to the clock faces later in the sequence. While the clock faces are being displayed at a smaller size (e.g., in comparison to FIG. 18E), electronic device 600 scrolls the clock faces at a faster rate (e.g., as compared to FIG. 18D). Reaching the end of the sequence of clock faces, electronic device 600 scrolls clock face 1824 onto display 602 from the right edge of display 602, as shown in FIG. 18G. In some embodiments, electronic device 600 scrolls clock face 1824 onto display 602 in response to continued detection of input 1814 at a location corresponding to the right side of display 602.

At FIG. 18G, the user has again successfully reordered the sequence of the clock faces. In particular, clock face 1800 is now in the sixteenth position in the clock face sequence, as indicated by position indicator 1818. In some embodiments, electronic device 600 generates tactile outputs (e.g., haptic feedback) that are capable of being sensed by the user, thereby providing an indication that the user has reached the end of the sequence of clock faces. In some embodiments, electronic device 600 generates the tactile outputs upon a determination that the end of the clock face sequence has been reached. In some embodiments, when the end of the clock face sequence is reached, electronic device 600 generates tactile outputs with a stronger intensity than that of the tactile outputs in FIG. 18D.

As shown in FIG. 18G, the user continues to maintain contact with display 602. As a result, electronic device 600 continues to detect input 1814 on display 602 (without detecting liftoff of input 1814), and displays clock face 1800 at a location corresponding to the location at which input 1814 is being detected.

The user then lifts their finger off of display 602 to exit the clock face reordering mode and return to the clock face selection mode. As a result, electronic device 600 detects liftoff of input 1814.

Figure 18H:
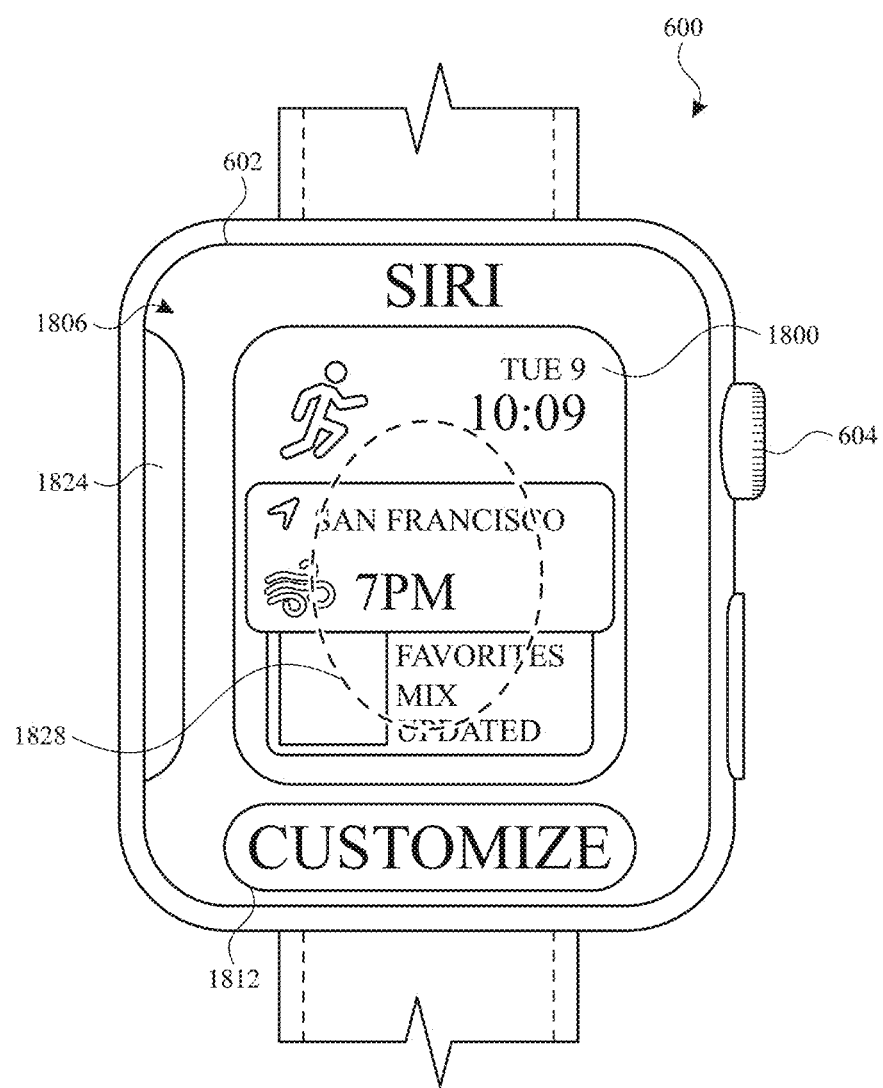

At FIG. 18H, in response to detecting liftoff of input 1814, electronic device enters the clock face selection mode, and displays user interface 1806. User interface 1806 includes clock face 1800 and a portion (but not all) of clock face 1824. No portion of a clock face is displayed to the right of clock face 1800, as clock face 1800 is the last clock face (e.g., sixteenth) in the clock face sequence due to the reordering that has occurred.

As depicted in FIG. 18H, the user performs a tap gesture to select clock face 1800 as the current clock face. As a result, electronic device 600 detects input 1828 (e.g., tap gesture) at a location corresponding to clock face 1800.

Figure 18I:
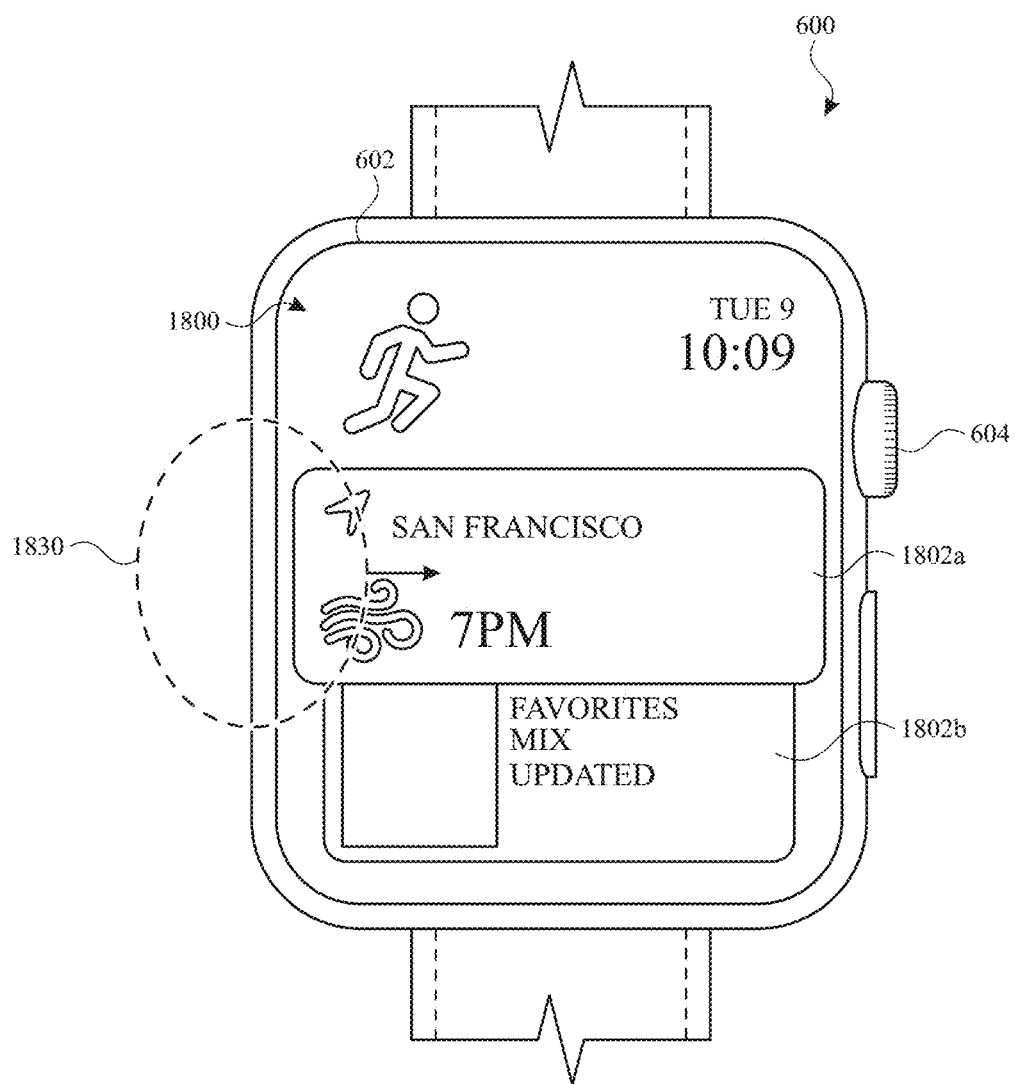

At FIG. 18I, in response to detecting input 1828, electronic device 600 exits the clock face selection mode, and displays clock face 1800 at a size that is larger than the size at which clock face 1800 is being displayed in FIG. 18H (e.g., in FIG. 18I clock face 1800 is being displayed at a size that occupies all of display 602, in FIG. 18I clock face 1800 is being displayed at the same size as in FIG. 18A).

As shown in FIG. 18I, the user performs a left-to-right swipe gesture to switch to the clock face in the position just prior to clock face 1800 in the sequence of clock faces. As a result, electronic device detects input 1830 with movement in the left-to-right direction (e.g., starting from off of display 602).

Figure 18J:
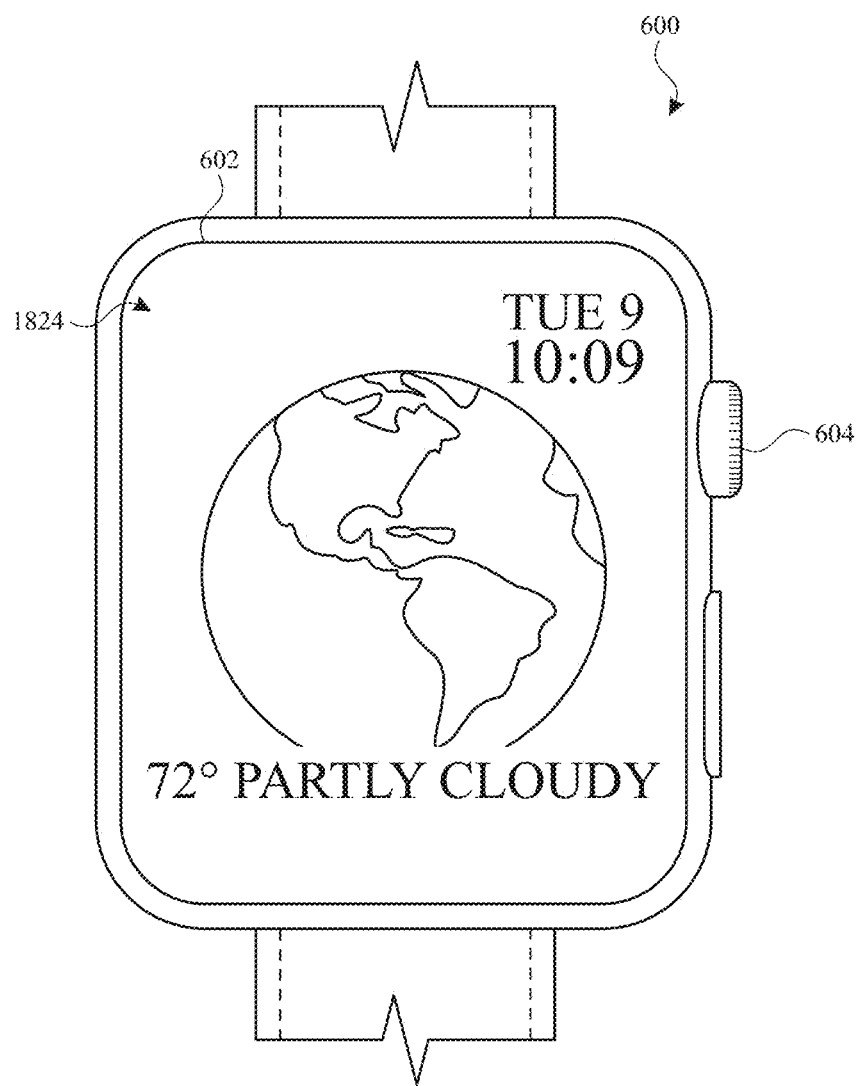

At FIG. 18J, in response to detecting input 1830, electronic device 600 replaces display of clock face 1800 with display of clock face 1824, which is the clock face that is in the position just prior to clock face 1800 in the sequence of clock faces. As a result of the clock face reordering that occurred in FIGS. 18F-18G, clock face 1800 is in the sixteenth position in the clock face sequence, and clock face 1824 is in the fifteenth position.

Figure 18K:
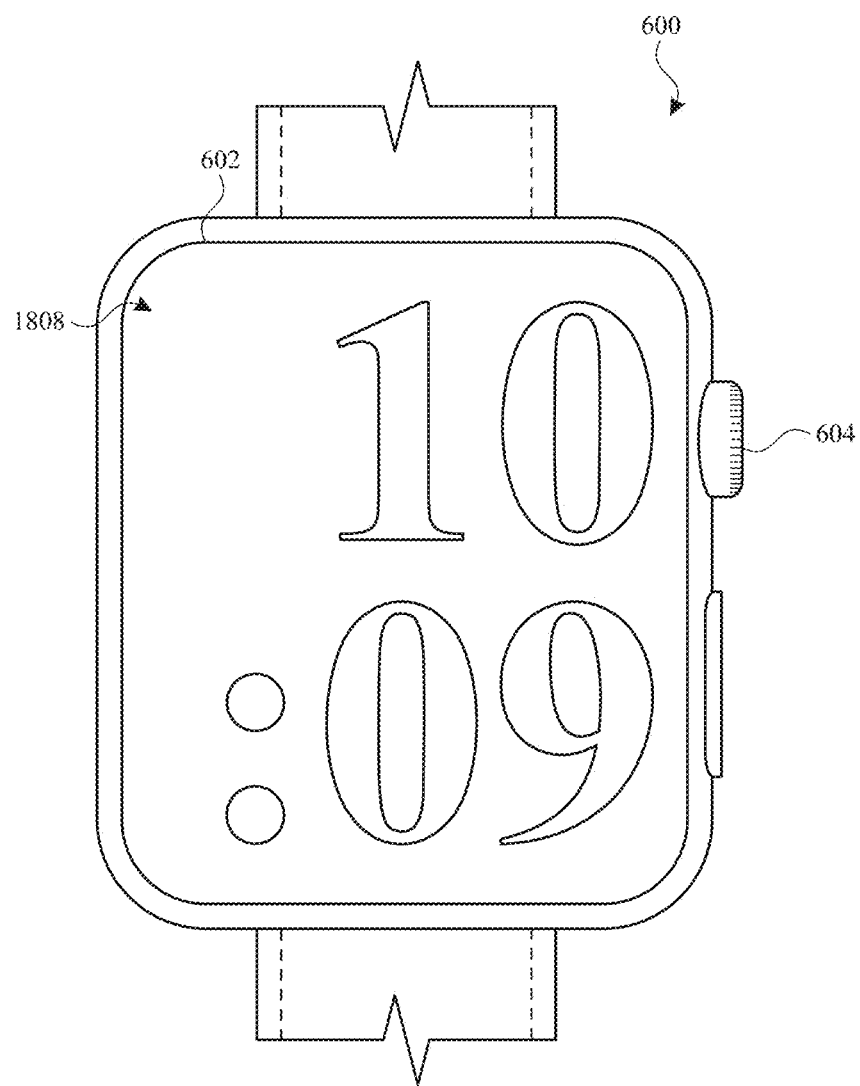

In some embodiments, before any reordering of the clock faces has occurred, the user performs a left-to-right swipe gesture to switch to the clock face in the position just prior to clock face 1800 in the sequence of clock faces. As a result, electronic device 600 detects input 1832 with movement in the left-to-right direction, as depicted in FIG. 18A. In response to detecting input 1832, electronic device 600 replaces display of clock face 1800 with display of clock face 1808, as shown in FIG. 18K. It is noted that electronic device 600 replaces display of clock face 1800 with a different clock face than in FIG. 18J, since the sequence of the clock faces is different. In contrast to FIG. 18J, clock face 1808 is in the position prior to clock face 1800 in the sequence of clock faces, since clock face reordering has yet to occur in FIG. 18A.

Figure 18L:
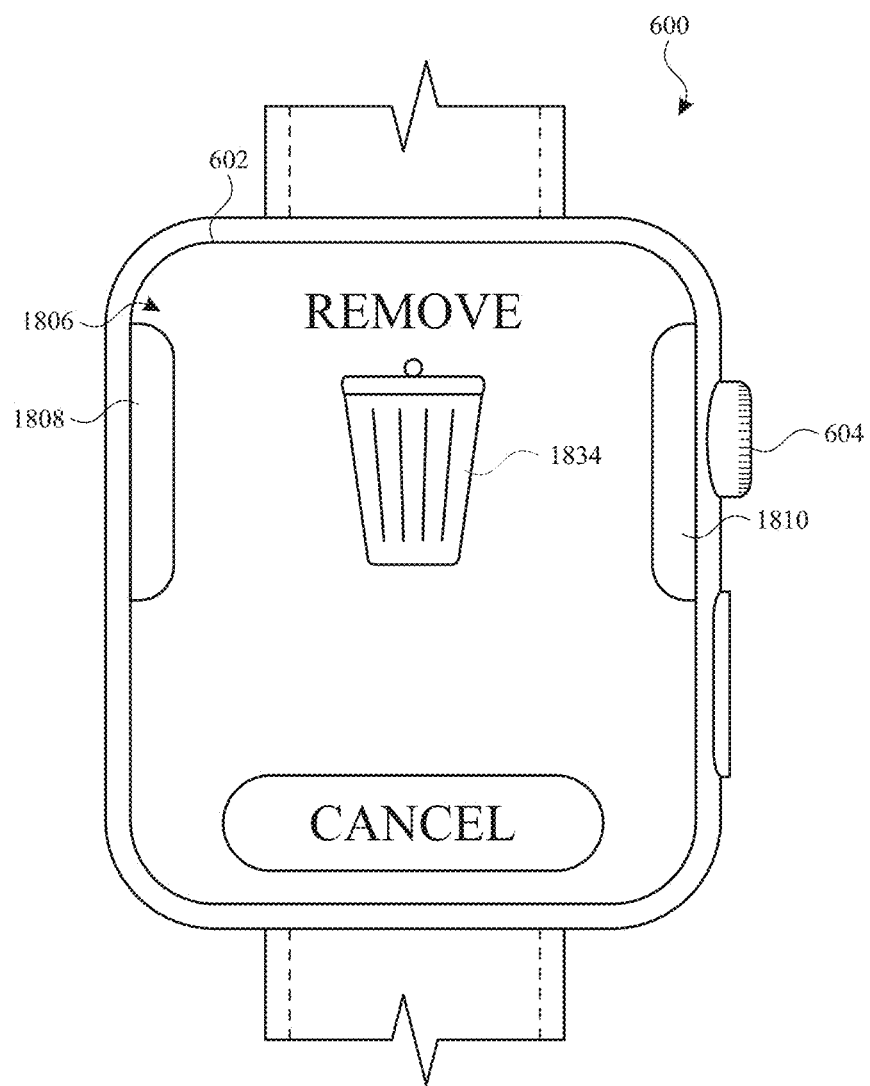

In some embodiments, a user can perform an upward swipe gesture to delete a clock face from the sequence of clock faces. For example, at FIG. 18B, instead of detecting a long press gesture, electronic device 600 detects input 1814 as an upward swipe gesture. In some embodiments, in response to detecting an upward swipe gesture starting at a location corresponding to a displayed clock face (e.g., 1800), electronic device 600 initiates a process for deleting a clock face from the sequence of clock faces (e.g., the clock face on which the swipe gesture was detected). In some embodiments, initiating the process for deleting the clock face includes replacing display of the clock face (e.g., 1800) with display of delete icon 1834, as depicted in FIG. 18L. In some embodiments, in response to detecting selection of delete icon 1834, electronic device 600 deletes a clock face (e.g., 1800) from the sequence of clock faces (e.g., the clock face on which the swipe gesture was detected).

FIG. 19 is a flow diagram illustrating a method for reordering clock faces using an electronic device in accordance with some embodiments. Method 1900 is performed at a device (e.g., 100, 300, 500, 600) with a display device. Some operations in method 1900 are, optionally, combined, the orders of some operations are, optionally, changed, and some operations are, optionally, omitted.

As described below, method 1900 provides an intuitive way for reordering clock faces. The method reduces the cognitive burden on a user for reordering clock faces, thereby creating a more efficient human-machine interface. For battery-operated computing devices, enabling a user to reorder clock faces faster and more efficiently conserves power and increases the time between battery charges.

In some embodiments, an electronic device (e.g., 600) displays (1902), via the display device, a selection user interface (e.g., 1806) for selecting a clock face among a plurality of clock faces (e.g., 1800, 1808, 1810). In some embodiments, displaying the selection user interface for selecting a clock face among a plurality of clock faces includes displaying at least a portion of two or more different clock faces (e.g., 1808 and 1810 of FIG. 18B, including at least: a portion of a first clock face and a portion of a second clock face) from the plurality of clock faces, including displaying a first clock face (e.g., 1800) of the plurality of clock faces at a first size. In some embodiments, the first clock face is displayed concurrently with a second clock face and/or a third clock face. In some embodiments, the second clock face and/or third clock face are displayed at the first size. In some embodiments, the selection user interface includes an affordance (e.g., 1812) that, when activated, causes the electronic device to enter a clock face reconfiguration mode. In some embodiments, entering the clock face reconfiguration mode includes displaying a reconfiguration user interface that is different from the selection user interface for selecting a clock face, where the reconfiguration user interface also includes the first clock face or one or more elements of the first clock face.

In some embodiments, while displaying, via the display device (e.g., 602), the selection user interface (e.g., 1806 in FIG. 18B) including displaying the first clock face (e.g., 1800) at the first size), the electronic device (e.g., 600) detects a scrolling user input corresponding to a first scroll direction (e.g., a left swipe gesture, a right swipe gesture, rotation of a rotatable input mechanism (e.g., 604, watch crown) of the electronic device in a direction, rotation of a rotatable input mechanism (e.g., watch crown) of the electronic device in the opposite direction). In some embodiments, in response to detecting the scrolling input, the electronic device causes the first clock face (e.g., 1800) to slide off of the display in a direction that corresponds to the first scroll direction and a second clock face (e.g., 1820, that was previously not displayed) to slide onto the display in the direction that corresponds to the first scroll direction. In some embodiments, detecting a scrolling user input that corresponds to a second scroll direction that is different from (e.g., opposite of) the first scroll direction causes the first clock face to slide off of the display in a second direction different from the direction that corresponds to the first scroll direction and causes a third clock face to be scrolled onto the display (in the second direction) rather than the second clock face. In some embodiments, the scroll input is a determination that the first clock face has been moved (e.g., via a drag gesture) to a location that is within a predetermined distance from an edge of the display.

In some embodiments, displaying at least a portion of two or more different clock faces (e.g., 1800, 1810) from the plurality of clock faces (as part of display the selection user interface (e.g., 1806 in FIG. 18B) for selecting a clock face among a plurality of clock faces) includes displaying at least a portion of the two or more different clock faces from the plurality of clock faces in a first order (e.g., 1800 followed by 1810) (e.g., the first order based on a first ordered set of the plurality of clock faces). In some embodiments, subsequent to moving the first clock face (e.g., 1800) relative to one or more of the other clock faces in the reordering user interface (e.g., 1816 in FIGS. 18C-18E) in accordance with the detected movement (e.g., 1814), the electronic device (e.g., 600) receives a request (e.g., user input (e.g., liftoff of 1814)) to display the selection user interface (e.g., 1806) for selecting a clock face among a plurality of clock faces. In some embodiments, in response to receiving the request (e.g., user input) to display the selection user interface, the electronic device displays, via the display device, the selection user interface. In some embodiments, displaying the selection user interface (e.g., 1806) includes displaying at least a portion of the two or more different clock faces (e.g., 1800, 1810) from the plurality of clock faces in a second order (e.g., 1810 followed by 1800) that is different from the first order (e.g., the second order based on a second ordered set of the plurality of clock faces). Thus, as a result of moving the first clock face relative to one or more of the other clock faces in the reordering user interface in accordance with the detected movement, the device reorders the plurality of clock faces such that when the device re-displays the selection user interface the plurality of clock faces become accessible to the user using the reordered state.

In some embodiments, prior to displaying the selection user interface (e.g., 1806 in FIG. 18B) for selecting a clock face among a plurality of clock faces that includes displaying at least a portion of two or more different clock faces (e.g., including at least: a portion of a first clock face and a portion of a second clock face) from the plurality of clock faces, the electronic device (e.g., 600) displays the first clock face (e.g., 1800) at the second size (e.g., as shown in FIG. 18A). In some embodiments, while displaying the first clock face at the second size, the electronic device detects (prior to displaying the selection user interface) a third user input (e.g., 1804) that meets respective criteria (e.g., a long press or a hard press such as a press input with a characteristic intensity above an intensity threshold). In some embodiments, displaying the selection user interface for selecting a clock face among a plurality of clock faces is in response to receiving the third user input.

In some embodiments, while displaying the first clock face (e.g., 1800) at the second size, detecting a second user input (e.g. 1804 at FIG. 18A) at a location corresponding to (e.g., at, on) the first clock face; and in response to detecting the second user input: in accordance with a determination that the second user input meets third input criteria (e.g., wherein the third input criteria includes a criterion that is met when the second user input includes a contact with a characteristic intensity that exceeds an intensity threshold), displaying, via the display device, the selection user interface (e.g., 1806 in FIG. 18B) for selecting a clock face among a plurality of clock faces (e.g., 1808, 1800, 1810); and in accordance with a determination that the second user input does not meet the third input criteria (e.g., the second user input does not include a contact with a characteristic intensity that exceeds an intensity threshold), forgoing displaying, via the display device, the selection user interface (e.g., 1806) for selecting a clock face among a plurality of clock faces (and, optionally, performing a function (e.g., displaying information from an application corresponding to 1802*a*, displaying a graphical element) based on a location of the second user input). In some embodiments, determining whether the second user input meets the third input criteria is independent of a location of the user input, the device displays the selection user interface.

In some embodiments, in response to detecting the user input (e.g., 1814 in FIG. 18B with upward movement) (that was received while displaying the selection user interface), in accordance with a determination that the user input meets fourth input criteria (e.g., the first input criteria includes a requirement that is met when the user input is, or corresponds to, a swipe up gesture on the first clock face), the electronic device initiates a process (e.g., displaying a "delete" affordance (e.g., 1834) in FIG. 18L) for removing the first clock face from the plurality of clock faces. In some embodiments, the device automatically ceases to display, on the display device, the first clock face (e.g., by moving the first clock face off of the display in the direction of the received user input) when the user input meets fourth input criteria. In some embodiments, in accordance with the determination that the user input meets fourth input criteria, the device removes (e.g., automatically, in response to detecting activation of the "delete" affordance) the first clock face from the plurality of clock faces.

In some embodiments, while displaying, via the display device (e.g., 602), the selection user interface (e.g., 1806 in FIG. 18B) for selecting a clock face among the plurality of clock faces, the electronic device detects (1904) a user input (e.g., 1814) at a location corresponding to (e.g., at, on top of) the first clock face (e.g., 1800) (e.g., user gesture, long press (e.g., an input that is detected for longer than a non-zero threshold amount of time), a deep press (e.g., a contact with a characteristic intensity that exceeds an intensity threshold)).

In some embodiments, in response (1906) to detecting the user input, in accordance with (1908) a determination that the user input meets first input criteria (e.g., the first input criteria includes a requirement that is met when the user input is, or corresponds to, a certain type of gesture (e.g., tap gesture, swipe/drag (in a particular direction (up, down, right, left)))), the electronic device displays (1910), via the display device, the first clock face (e.g., 1800) at a second size (e.g., 1800) that is greater than the first size (e.g., without displaying other clock faces of the plurality of clock faces (e.g., second clock face, third clock face)).

In some embodiments, in response (1906) to detecting the user input, in accordance with (1912) a determination that the user input (e.g., 1814) meets second input criteria that is different from the first input criteria (e.g., the second input criteria includes a requirement that is met when the user input is, or corresponds to, a certain type of gesture (e.g., tap gesture, swipe/drag (in a particular direction (up, down, right, left)))), the electronic device displays (1914), via the display device, a reordering user interface (e.g., 1816) for reordering the plurality of clock faces. In some embodiments, displaying the reordering user interface (e.g., 1816 in FIG. 18C) for reordering the plurality of clock faces includes displaying at least a portion of three or more clock faces (e.g., including at least: a portion of the first clock face (e.g., 1800), a portion of a second clock face (e.g., 1808), and a portion of a third clock face (e.g., 1810)), including the first clock face and at least a portion of a clock face (e.g., 1808, 1810) that was not displayed prior to detecting the user input. In some embodiments, the first clock face (e.g., 1800) is displayed such that it is overlaid on at least a portion of a different clock face (e.g., overlaid on a portion of a second clock face (e.g., 1808) and overlaid on a portion of a third clock face (e.g., 1810)).

In some embodiments, at least two clock faces of the plurality of clock faces (e.g., 1800, 1810) are in an ordered set. In some embodiments, while displaying the reordering user interface (e.g., 1816 in FIG. 18C), the electronic device (e.g., 600) displays, via the display device (e.g., 602), a location indicator (e.g., 1818) (e.g., separate from the clock faces). In some embodiments, the location indicator provides an indication of a current ordering location for the first clock face (e.g., 1800) among the at least two clock faces of the plurality of clock faces (e.g., a location in the set of clock faces at which the first clock face will be placed if an end of the input (e.g., 1814) is detected, such as liftoff of the contact from the touch-sensitive display). In some embodiments, the location of the location indicator moves relative to (at least some of) the plurality of clock faces as the device detects the movement corresponding to the first clock face.

Displaying a location indicator (e.g., 1818) provides the user with a visual indication of the current location of the first clock face with respect to the other clock faces during the reordering process. This is particularly useful when the user has performed a drag down gesture on the first clock face such that the first clock face is no longer aligned with the other clock faces in the plurality of clock faces (e.g., the first clock face is lower than the other clock faces). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the reordering user interface (e.g., 1816 in FIGS. 18C-18D), the electronic device detects (1916) movement corresponding to the first clock face (e.g., 1800) (e.g., a continuation of the user input (e.g., 1814), where continuation of the user input includes dragging the first clock face across the reordering user interface; a continuation of the user input (e.g., 1814), where no liftoff has been detected between the time at which the user input was detected and the time at which the beginning of the continuation of the user input was detected, a user input (e.g., 1814) that occurs after the device detects lift-off of the initial user input that caused the reordering user interface to be displayed).

In some embodiments, displaying the reordering user interface (e.g., 1816 in FIG. 18C) for reordering the plurality of clock faces (e.g., 1800, 1808, 1810) includes concurrently displaying the first clock face (e.g., 1800), a second clock face (e.g., 1808) (or at least a portion of the second clock face) of the plurality of clock faces, and a third clock face (e.g., 1810) (or at least a portion of the third clock face) of the plurality of clock faces. In some embodiments, the first clock face (e.g., 1800) is displayed at a first reduced size that is smaller than the first size. In some embodiments, the second clock face (e.g., 1808) is displayed at a size that is smaller than the first reduced size. In some embodiments, the third clock face (e.g., 1810) is displayed at a size that is smaller than the first reduced size (e.g., the third size or, optionally, a fourth size that is also smaller than the first reduced size). In some embodiments, the second clock face is different from the third clock face.

Displaying the second clock face (e.g., 1808) and the third clock face (e.g., 1810) smaller than the first clock face provides the user with feedback about which clock face is selected for reordering. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the reordering user interface (e.g., 1816) includes displaying the first clock face (e.g., 1800) at a first reduced size that is smaller than the first size.

Reducing the size of the first clock face (e.g., 1800) provides the user with feedback that a reordering process has been initiated and that the user can provide additional inputs to reorder the clock faces. Additionally, reducing the size of the first clock face enables the device to display additional clock faces (or portions thereof), thereby providing the user with additional visual feedback about the current ordering of the clock faces. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the reordering user interface (e.g., 1816 in FIGS. 18E-18F) for reordering the plurality of clock faces (e.g., 1800, 1810, 1822) includes concurrently displaying the first clock face (e.g., 1800) at a first reduced size that is less than the first size, a second clock face (e.g., 1810) (or at least a portion of the second clock face) of the plurality of clock faces at a third size that is smaller than the first reduced size, and a third clock face (e.g., 1822) (or at least a portion of the third clock face) of the plurality of clock faces at the third size. In some embodiments, while displaying the reordering user interface (e.g., 1816) that includes the first clock face at the first reduced size, the electronic device detects second movement (e.g., corresponding to input 1814 in FIG. 18E) (e.g., down direction, away from the top of the device). In some embodiments, the second movement corresponds to the first clock face (e.g., 1800). In some embodiments, the device (e.g., 600) detects a drag gesture (e.g., 1814) on the first clock face (e.g., 1800) to drag the clock face down. In some embodiments, in response to detecting the second movement corresponding to the first clock face, in accordance with a determination that the second movement causes the first clock face to be moved a threshold distance (non-zero threshold distance) in a first direction (e.g., away from the top of the display device (e.g., 602), towards the bottom of the display device): the electronic device (e.g., 600) further reduces a size of the second clock face (e.g., 1810 in FIGS. 18E-18F) and the third clock face (e.g., 1822 in FIGS. 18E-18F) (or at least the displayed portion of the second clock face) (or at least the displayed portion of the third clock face) (and optionally maintaining display of the first clock face (e.g., 1800) at the first reduced size). In some embodiments, in response to detecting the second movement corresponding to the first clock face, in accordance with a determination that the second movement does not cause the first clock face to be moved the threshold distance (non-zero threshold distance) in the first direction, the electronic device continues to display the second clock face and the third clock face without reducing a size of the second clock face and the third clock face (and optionally maintain display of the first clock face at the first reduced size). In some embodiments, the device determines that the second movement has caused the first clock face to be moved a threshold distance (non-zero threshold distance) in a direction (e.g., away from the top of the display device, towards the bottom of the display device) and updates the display device to display the first clock face at a second reduced size (smaller than the first reduced size) in accordance with that determination (and maintains the first clock face at the first reduced size when the first clock face has not been moved the threshold distance in the direction). Thus, when the electronic device detects input (e.g., 1814 in FIG. 18E) (while displaying the reordering user interface) that causes the first clock face (e.g., 1800) to shift down on the display, the device reduces the size of the second clock face (e.g., 1810 in FIGS. 18E-18F) and the third clock face (e.g., 1822 in FIGS. 18E-18F) once the first clock face is shifted down by a predetermined amount.

Further reducing the size of the first clock face when the user provides a particular input (e.g., a drag down input on the first clock face) provides the user with feedback that the reordering process has been accelerated and that a left/right drag of the first clock face will cause the first clock face to transition more quickly through the other clock faces. Additionally, reducing the size of the first clock face enables the device to optionally display additional clock faces (or portions thereof), thereby providing the user with additional visual feedback about the current ordering of the clock faces (and the ordering of the clock faces which the user is traversing). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the device detects the movement corresponding to the first clock face while displaying the reordering user interface, the first clock face in the reordering user interface is at least partially transparent (e.g., 1800 of FIG. 18C) such that at least a portion of the one or more other clock faces (e.g., 1808, 1810) in the reordering user interface (e.g., 1816 in FIG. 18C) are visible behind (or through) the first clock face. In some embodiments, the one or more of the other clock faces in the reordering user interface have a second opacity that is higher than the first opacity.

Displaying the first clock face at least partially transparent such that at least a portion of the one or more other clock faces are visible behind the first clock face during the reordering process provides the user with feedback about where the first clock face is on the user interface relative to the other clock faces. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to (1918) detecting the movement (e.g., corresponding to input 1814) corresponding to the first clock face, the electronic device moves (1920) the first clock face (e.g., 1800) relative to one or more of the other clock faces (e.g., 1808, 1810, 1820, 1822, 1824) in the reordering user interface in accordance with the detected movement (e.g., as illustrated in FIGS. 18C-18E).

Enlarging the first clock face to the second size that is greater than the first size provides the user with feedback that the first clock face has been selected. Displaying the at least a portion of three or more clock faces provides visual feedback to the user about the current ordering of the clock faces, thereby enabling the user to appropriately reorder the clock faces. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, moving, in accordance with the detected movement (e.g., corresponding to input 1814 in FIGS. 18C-18D), the first clock face (e.g., 1800) relative to the one or more of the other clock faces (e.g., 1810) in the reordering user interface (e.g., 1816) includes altering an order of the first clock face relative to the one or more of the other clock faces and generating a tactile output (e.g., 1821 in FIG. 18D) that corresponds to altering the order of the first clock face relative to one or more of the other clock faces (e.g., haptic feedback) (e.g., that corresponds (e.g., corresponds in time) to a visual reordering of the plurality of clock faces caused by altering the order of the first clock face relative to the one or more of the other clock faces). In some embodiments, moving the first clock face relative to one or more of the other clock faces in the reordering user interface further causes a visual reordering of the plurality of clock faces and the electronic device additionally provides a tactile output that corresponds (e.g., corresponds in time) to the visual reordering.

Providing tactile output that corresponds to visual reordering of the plurality of clock faces provides the user with non-visual feedback about the reordering process, thereby indicating to the user each time the first clock face is moved within the plurality of clock faces. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while moving the first clock face (e.g., 1800) relative to one or more of the other clock faces in the reordering user interface (e.g., 1816 in FIGS. 18F-18G) in accordance with the detected movement (e.g., corresponding to input 1814) (and, optionally, while detecting the movement corresponding to the first clock face), the electronic device determines that an end of the plurality of clock faces (e.g., passed clock face 1824 in FIG. 18G) has been reached (e.g., the first clock face has been moved to the end of the list of the plurality of clock faces). In some embodiments, in response to determining that the end of the plurality of clock faces has been reached, the electronic device generates a second tactile output (e.g., similar to 1821) that corresponds to reaching the end of the plurality of clock faces (e.g., haptic feedback). In some embodiments, the tactile output provided by the electronic device when the end of the plurality of clock faces has been reached has a higher intensity as compared to the tactile output provided by the electronic device that corresponds (e.g., corresponds in time) to the visual reordering of the plurality of clock faces.

Providing tactile output when the end of the list of clock faces has been reached provides the user with tactile feedback that the input that was previously causing the first clock face to more relative to the other clock faces is no longer effective (since the end of the list has been reached). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying at least a portion of two or more different clock faces (e.g., 1808, 1810) from the plurality of clock faces (as part of display the selection user interface (e.g., 1806 in FIG. 18B) for selecting a clock face among a plurality of clock faces) includes displaying at least a portion of the two or more different clock faces from the plurality of clock faces based on a first order (e.g., 1800 followed by 1824, as shown in FIG. 18B) of the plurality of clock faces. In some embodiments, moving the first clock face (e.g., 1800) relative to one or more of the other clock faces in the reordering user interface (e.g., 1816 in FIGS.

18C-18E) in accordance with the detected movement (e.g., corresponding to input 1814) changes an order of the plurality of clock faces to a second order (e.g., 1824 followed by 1800 as shown in FIG. 18G) that is different from the first order. In some embodiments, subsequent to moving the first clock face relative to one or more of the other clock faces in the reordering user interface in accordance with the detected movement, the electronic device receives a request (e.g., 1828 at FIG. 18H) to display the first clock face (e.g., 1800) at the second size (e.g., without displaying other clock faces of the plurality of clock faces (e.g., second clock face, third clock face)). In some embodiments, subsequent to moving the first clock face relative to one or more of the other clock faces in the reordering user interface in accordance with the detected movement, in response to receiving the request (e.g., 1828 at FIG. 18H) to display the first clock face at the second size, the electronic device (e.g., 600) displays, via the display device (e.g., 602), the first clock face (e.g., 1800) at the second size (e.g., as shown in FIG. 18I) (e.g., without displaying other clock faces of the plurality of clock faces (e.g., second clock face, third clock face)). In some embodiments, subsequent to moving the first clock face relative to one or more of the other clock faces in the reordering user interface in accordance with the detected movement, while displaying the first clock face (e.g., 1800) at the second size (e.g., as shown in FIG. 18I) (e.g., without displaying other clock faces of the plurality of clock faces (e.g., second clock face, third clock face), in response to the determination that the user input meets first input criteria), the electronic device (e.g., 600) detects a user input (e.g., 1830 at FIG. 18I) to change a clock face. In some embodiments, the user input to change a clock face includes a directional component. In some embodiments, in response to detecting the user input (e.g., 1830 at FIG. 18I) to change a clock face, the electronic device replaces display of the first clock face (e.g., 1800) at the second size with a next clock face (e.g., 1824) in the second order (e.g., at the second size), selected based on the directional component (and not based on the first order) (e.g., in accordance with a determination that the second clock face (e.g., 1824 in FIG. 18J) is a next face in the second order, then the second clock face is displayed and in accordance with a determination that the third clock face (e.g., 1808 in FIG. 18K) is a next face in the second order, then the third clock face is displayed). Thus, as a result of moving the first clock face relative to one or more of the other clock faces in the reordering user interface in accordance with the detected movement, the device reorders the plurality of clock faces such that when the device receives a request to change clock faces when a single clock face is displayed, the device selects the next clock face to display based on the reordered plurality of clock faces.

Note that details of the processes described above with respect to method 1900 (e.g., FIGS. 9A-9B) are also applicable in an analogous manner to the methods described above. For example, methods 700, 900, 1100, 1300, 1500, and 1700 optionally includes one or more of the characteristics of the various methods described above with reference to method 1900. For example, the clock faces reordered in method 1900 include the clock faces described above with respect to methods 700, 900, 1100, 1300, 1500, and 1700. Thus, clock face 606 of FIG. 6A can be one of the clock faces that is reordered when electronic device 600 is performing method 1900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of interactive clock faces, the present technology can be configured to allow users to select to "opt in" or "opt out" of participation in the collection of personal information data during registration for services or anytime thereafter. In another example, users can select not to provide data. In yet another example, users can select to limit the length of time data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

What is claimed is:

1. An electronic device, comprising:
a display device;
one or more processors; and
memory storing one or more programs configured to be executed by the one or more processors, the one or more programs including instructions for:
displaying, via the display device, a first clock face that has a respective layout including:
a first indication of a current time presented according to a first format at a first location in the respective layout, wherein the first format of the first indication of the current time includes an analog indication of time, and
a first complication at a second location in the respective layout;
detecting a sequence of one or more inputs corresponding to a request to edit the first clock face; and
in response to detecting the sequence of one or more inputs corresponding to a request to edit the first clock face, updating the first clock face that has the respective layout to include:
a second indication of the current time presented according to a second format different from the first format at the first location in the respective layout, wherein the second format of the second indication of the current time includes a digital indication of time; and
the first complication at the second location in the respective layout.

2. The electronic device of claim 1, wherein:
the first clock face, before being updated in response to detecting the sequence of one or more inputs corresponding to a request to edit the first clock face, includes a second complication at a third location in the respective layout, the second complication concurrently displayed with the first complication on the first clock face, and
the first clock face, after being updated in response to detecting the sequence of one or more inputs corresponding to a request to edit the first clock face, includes the second complication at the third location in the respective layout, the second complication concurrently displayed with the first complication on the first clock face.

3. The electronic device of claim 2, the one or more programs further including instructions for:
in response to detecting the sequence of one or more inputs corresponding to a request to edit the first clock face:
before updating the first clock face in response to detecting the sequence of one or more inputs corresponding to a request to edit the first clock face, displaying, via the display device, a clock face editing interface including concurrently displaying a representation of the first complication and a representation of the second complication.

4. The electronic device of claim 2, wherein the first complication occupies a rectangular region at the first location in the respective layout and the second complication occupies a circular region at the second location in the respective layout.

5. The electronic device of claim 1, wherein the second format of the second indication of the current time includes the digital indication of time that includes a numerical representation of an hour, a numeral representation of a minute, and a plurality of elements arranged around the numerical representations of the hour and minute, the plurality of elements representing seconds and indicating a current second.

6. The electronic device of claim 1, the one or more programs further including instructions for:
receiving first data representing a first alert;
in response to receiving the data representing the alert, displaying a notification at a first location on the display device;

detecting a sequence of one or more inputs corresponding to a request to select a clock face with a second layout different from the respective layout; and in response to detecting the sequence of one or more inputs corresponding to a request to select a clock face with a second layout different from the respective layout, displaying, via the display device, a third clock face that has the second layout;

while displaying the third clock face that has the second layout, receiving second data representing a second alert; and in response to receiving the second data representing the second alert, displaying a second notification at a second location on the display device different from the first location on the display device.

7. The electronic device of claim 1, wherein the first complication occupies a first region that has a first display size and the first indication of the current time occupies a second region that has a second display size smaller than the first display size.

8. The electronic device of claim 1, wherein, after updating the first clock face in response to detecting the sequence of one or more inputs corresponding to a request to edit the first clock face, the first clock face is displayed according to a first color scheme, the one or more programs further including instructions for:

detecting a sequence of one or more inputs corresponding to a request to edit a color scheme of a clock face; and in response to detecting the sequence of one or more inputs corresponding to a request to edit a color scheme of a clock face, displaying, via the display device, a fourth clock face according to a second color scheme, the fourth clock face including a plurality of elements consisting of a first set of elements and a second set of elements, the first set of elements including a majority of the plurality of elements, wherein the first set of elements are displayed in two or more shades selected from a range of colors from a first color to a second color and the second set of elements are displayed in an accent color that is outside of the range of colors.

9. The electronic device of claim 8, wherein the second set of elements are included in the indication of the current time or represent data from an application.

10. A non-transitory computer-readable storage medium storing one or more programs configured to be executed by one or more processors of an electronic device with a display device, the one or more programs including instructions for:

displaying, via the display device, a first clock face that has a respective layout including:
  a first indication of a current time presented according to a first format at a first location in the respective layout, wherein the first format of the first indication of the current time includes an analog indication of time, and
  a first complication at a second location in the respective layout;

detecting a sequence of one or more inputs corresponding to a request to edit the first clock face; and in response to detecting the sequence of one or more inputs corresponding to a request to edit the first clock face, updating the first clock face that has the respective layout to include:
  a second indication of the current time presented according to a second format different from the first format at the first location in the respective layout,
  wherein the second format of the second indication of the current time includes a digital indication of time; and
  the first complication at the second location in the respective layout.

11. The non-transitory computer-readable storage medium of claim 10, wherein:

the first clock face, before being updated in response to detecting the sequence of one or more inputs corresponding to a request to edit the first clock face, includes a second complication at a third location in the respective layout, the second complication concurrently displayed with the first complication on the first clock face, and the first clock face, after being updated in response to detecting the sequence of one or more inputs corresponding to a request to edit the first clock face, includes the second complication at the third location in the respective layout, the second complication concurrently displayed with the first complication on the first clock face.

12. The non-transitory computer-readable storage medium of claim 11, wherein the one or more programs further comprises instructions for:

in response to detecting the sequence of one or more inputs corresponding to a request to edit the first clock face:

before updating the first clock face in response to detecting the sequence of one or more inputs corresponding to a request to edit the first clock face, displaying, via the display device, a clock face editing interface including concurrently displaying a representation of the first complication and a representation of the second complication.

13. The non-transitory computer-readable storage medium of claim 11, wherein the first complication occupies a rectangular region at the first location in the respective layout and the second complication occupies a circular region at the second location in the respective layout.

14. The non-transitory computer-readable storage medium of claim 10, wherein the second format of the second indication of the current time includes the digital indication of time that includes a numerical representation of an hour, a numeral representation of a minute, and a plurality of elements arranged around the numerical representations of the hour and minute, the plurality of elements representing seconds and indicating a current second.

15. The non-transitory computer-readable storage medium of claim 10, wherein the one or more programs further comprises instructions for:

receiving first data representing a first alert;

in response to receiving the data representing the alert, displaying a notification at a first location on the display device;

detecting a sequence of one or more inputs corresponding to a request to select a clock face with a second layout different from the respective layout; and in response to detecting the sequence of one or more inputs corresponding to a request to select a clock face with a second layout different from the respective layout, displaying, via the display device, a third clock face that has the second layout;

while displaying the third clock face that has the second layout, receiving second data representing a second alert; and in response to receiving the second data representing the second alert, displaying a second notification at a second location on the display device different from the first location on the display device.

16. The non-transitory computer-readable storage medium of claim 10, wherein the first complication occupies a first region that has a first display size and the first indication of the current time occupies a second region that has a second display size smaller than the first display size.

17. The non-transitory computer-readable storage medium of claim 10, wherein, after updating the first clock face in response to detecting the sequence of one or more inputs corresponding to a request to edit the first clock face, the first clock face is displayed according to a first color scheme, wherein the one or more programs further comprises instructions for:
   detecting a sequence of one or more inputs corresponding to a request to edit a color scheme of a clock face; and
   in response to detecting the sequence of one or more inputs corresponding to a request to edit a color scheme of a clock face, displaying, via the display device, a fourth clock face according to a second color scheme, the fourth clock face including a plurality of elements consisting of a first set of elements and a second set of elements, the first set of elements including a majority of the plurality of elements, wherein the first set of elements are displayed in two or more shades selected from a range of colors from a first color to a second color and the second set of elements are displayed in an accent color that is outside of the range of colors.

18. The non-transitory computer-readable storage medium of claim 17, wherein the second set of elements are included in the indication of the current time or represent data from an application.

19. A method comprising:
   at an electronic device with a display device:
      displaying, via the display device, a first clock face that has a respective layout including:
         a first indication of a current time presented according to a first format at a first location in the respective layout, wherein the first format of the first indication of the current time includes an analog indication of time, and
         a first complication at a second location in the respective layout;
      detecting a sequence of one or more inputs corresponding to a request to edit the first clock face; and
      in response to detecting the sequence of one or more inputs corresponding to a request to edit the first clock face, updating the first clock face that has the respective layout to include:
         a second indication of the current time presented according to a second format different from the first format at the first location in the respective layout, wherein the second format of the second indication of the current time includes a digital indication of time; and
         the first complication at the second location in the respective layout.

20. The method of claim 19, wherein:
   the first clock face, before being updated in response to detecting the sequence of one or more inputs corresponding to a request to edit the first clock face, includes a second complication at a third location in the respective layout, the second complication concurrently displayed with the first complication on the first clock face, and
   the first clock face, after being updated in response to detecting the sequence of one or more inputs corresponding to a request to edit the first clock face, includes the second complication at the third location in the respective layout, the second complication concurrently displayed with the first complication on the first clock face.

21. The method of claim 20, further comprising:
   in response to detecting the sequence of one or more inputs corresponding to a request to edit the first clock face:
   before updating the first clock face in response to detecting the sequence of one or more inputs corresponding to a request to edit the first clock face, displaying, via the display device, a clock face editing interface including concurrently displaying a representation of the first complication and a representation of the second complication.

22. The method of claim 20, wherein the first complication occupies a rectangular region at the first location in the respective layout and the second complication occupies a circular region at the second location in the respective layout.

23. The method of claim 19, wherein the second format of the second indication of the current time includes the digital indication of time that includes a numerical representation of an hour, a numeral representation of a minute, and a plurality of elements arranged around the numerical representations of the hour and minute, the plurality of elements representing seconds and indicating a current second.

24. The method of claim 19, further comprising:
   receiving first data representing a first alert;
   in response to receiving the data representing the alert, displaying a notification at a first location on the display device;
   detecting a sequence of one or more inputs corresponding to a request to select a clock face with a second layout different from the respective layout; and
   in response to detecting the sequence of one or more inputs corresponding to a request to select a clock face with a second layout different from the respective layout, displaying, via the display device, a third clock face that has the second layout;
   while displaying the third clock face that has the second layout, receiving second data representing a second alert; and
   in response to receiving the second data representing the second alert, displaying a second notification at a second location on the display device different from the first location on the display device.

25. The method of claim 19, wherein the first complication occupies a first region that has a first display size and the first indication of the current time occupies a second region that has a second display size smaller than the first display size.

26. The method of claim 19, wherein, after updating the first clock face in response to detecting the sequence of one or more inputs corresponding to a request to edit the first clock face, the first clock face is displayed according to a first color scheme, the method further comprising:
   detecting a sequence of one or more inputs corresponding to a request to edit a color scheme of a clock face; and
   in response to detecting the sequence of one or more inputs corresponding to a request to edit a color scheme of a clock face, displaying, via the display device, a fourth clock face according to a second color scheme, the fourth clock face including a plurality of elements consisting of a first set of elements and a second set of elements, the first set of elements including a majority of the plurality of elements, wherein the first set of elements are displayed in two or more shades selected from a range of colors from a first color to a second color and the second set of elements are displayed in an accent color that is outside of the range of colors.

27. The method of claim 26, wherein the second set of elements are included in the indication of the current time or represent data from an application.

\* \* \* \* \*